US006853388B2

(12) United States Patent
Ueno et al.

(10) Patent No.: US 6,853,388 B2
(45) Date of Patent: Feb. 8, 2005

(54) NETWORK MANAGEMENT EQUIPMENT AND COMMUNICATION PATH SETTING METHOD

(75) Inventors: Michiko Ueno, Niiza (JP); Tooru Nakao, Tachikawa (JP); Hidetoshi Iwasaki, Kawasaki (JP); Yasushi Ariga, Fuchu (JP); Youko Yamamoto, Tsukui-gun (JP); Hakaru Nakagawa, Hino (JP); Kiyoshi Yamaguchi, Hino (JP); Tatsuko Akimoto, Nakano-ku (JP); Masaaki Nagano, Koganei (JP); Shinichi Izawa, Sagamihara (JP); Shinsuke Watanabe, Hachioji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 614 days.

(21) Appl. No.: 09/982,898
(22) Filed: Oct. 22, 2001
(65) Prior Publication Data

US 2002/0024535 A1 Feb. 28, 2002

Related U.S. Application Data

(63) Continuation of application No. PCT/JP01/01271, filed on Feb. 21, 2001.

(30) Foreign Application Priority Data

Feb. 21, 2000 (JP) ........................................ 2000-043199

(51) Int. Cl.[7] .............................................. G06F 15/00
(52) U.S. Cl. ........................................ 345/736; 709/246
(58) Field of Search ................................. 345/735, 736, 345/853, 854, 780; 709/223, 242, 246, 248

(56) References Cited

U.S. PATENT DOCUMENTS 6,480,901 B1 * 11/2002 Weber et al. ............... 709/246

6,769,022 B1 * 7/2004 DeKoning et al. .......... 709/223

FOREIGN PATENT DOCUMENTS

| EP | 0 820 203 | 1/1998 |
| JP | 6-326750 | 11/1994 |

OTHER PUBLICATIONS

Takayuki Kan, , Hitachi Hyoron, vol. 77, No. 9, jmmpp. 27–30, "Network Management System for Broadband Network", Sep. 1, 1995.

Hiroshi Asoh, et al., NEC Technical Journal, vol. 46, No. 5, pp. 41–53, "Network Operation System", Jun. 15, 1993.

"Hitachi HI–UX/WE2 Sogo Network Kanri System/Network Hyoji NETM/EYE Kaistesu, Tebiki, Sousasho", pp. 110, 22, 127, 156–159 and 19, Jun. 1, 1994.

"UXP/DS Netwalker/CM Setsumeisho V10 You", p. 157, Apr. 30, 1997.

"Fujitsu SNMP Manager Setsumeishi", 99SP–2530–1, pp. 55–70, Jan. 31, 1994.

(List continued on next page.)

*Primary Examiner*—Cao (Kevin) Nguyen
(74) *Attorney, Agent, or Firm*—Oblon, Spivak, McClelland, Maier & Neustadt, P.C.

(57) ABSTRACT

A graphics map of an area in which a system is set is displayed on a screen of a display unit, and minimized stations and line connecting between the stations are displayed on the map. Display colors of the station icon and the line icon are changed in accordance with presence/absence of a failure. When each station icon is clicked, a window showing a list of NODEs belonging to that station is opened, and a NODE having a failure and a NODE having no failure are also distinguished from each other by changing the display colors in this window.

61 Claims, 104 Drawing Sheets

OTHER PUBLICATIONS

Yasumasa Iwase, et al., NTT Gijutsu Journal, vol. 2, No. 7, pp. 19–23, "Service no Koudoka Ni Taioushi, Network No 1Gen Kanri Wo Jitsugen; Atarashii Kousoku Digital Senyou sen System no Seigyo, Operation Kei no Kousei", Jul. 1, 1990.

Hiroshi Tokunaga, NTT R&D, vol. 42, No. 2, pp. 195–200, "Service Operation System Platform", Feb. 10, 1993.

H. Yamaguchi, UNIX Magazine, vol. 14, No. 2, pp. 14–21, "UNIX Communication Notes 128 Network Kanri (12) Account Kanri", Feb. 1, 1999.

Hitachi Ltd., "Hitachi Multimedia Kousoku Kikan Network; Super Lan Σ–600 Kaisetsusho", p. 4, Nov. 30, 1992.

NEC Technical Journal, vol. 51, No. 5, p. 115 and 292, "SDH you Pass Kanri System no Kaihatsu", May 25, 1998.

Kunio Hoshizawa, et al., NTT Gijutsu Journal, vol. 1, No. 8, pp. 12–19, "Kaisen Unyou Wo Shien Suru Network Operation System", Nov. 1, 1989.

Naoki Ishii, et al., NEC Technical Journal, vol. 46, No. 5, pp. 62–68 and 98, "SDH Network no Unyou, Kanri", Jun. 15, 1993.

Hiroshi Sakano, et al., NEC Technical Journal, vol. 46, No. 8, pp. 54–62 and 106, "Netmos Ni Yoru Dai Kibo, Kou Shinraisei Computer Kei Manager", Aug. 25, 1993.

Kouhel Hayakawa, Software Design, No. 87, pp. 26–33, "SNMP to Network Kanri Soft; Senyou Software Wo Riyou Shita Network Kanri", Jan. 18, 1998.

Shogo Ayame, et al., Toshiba Review, vol. 55, No. 4, pp. 45–48 and 74, "Hiraki Ring Kanshi System (Supervisory System for Optical Ring Network)", Apr. 4, 2000.

* cited by examiner

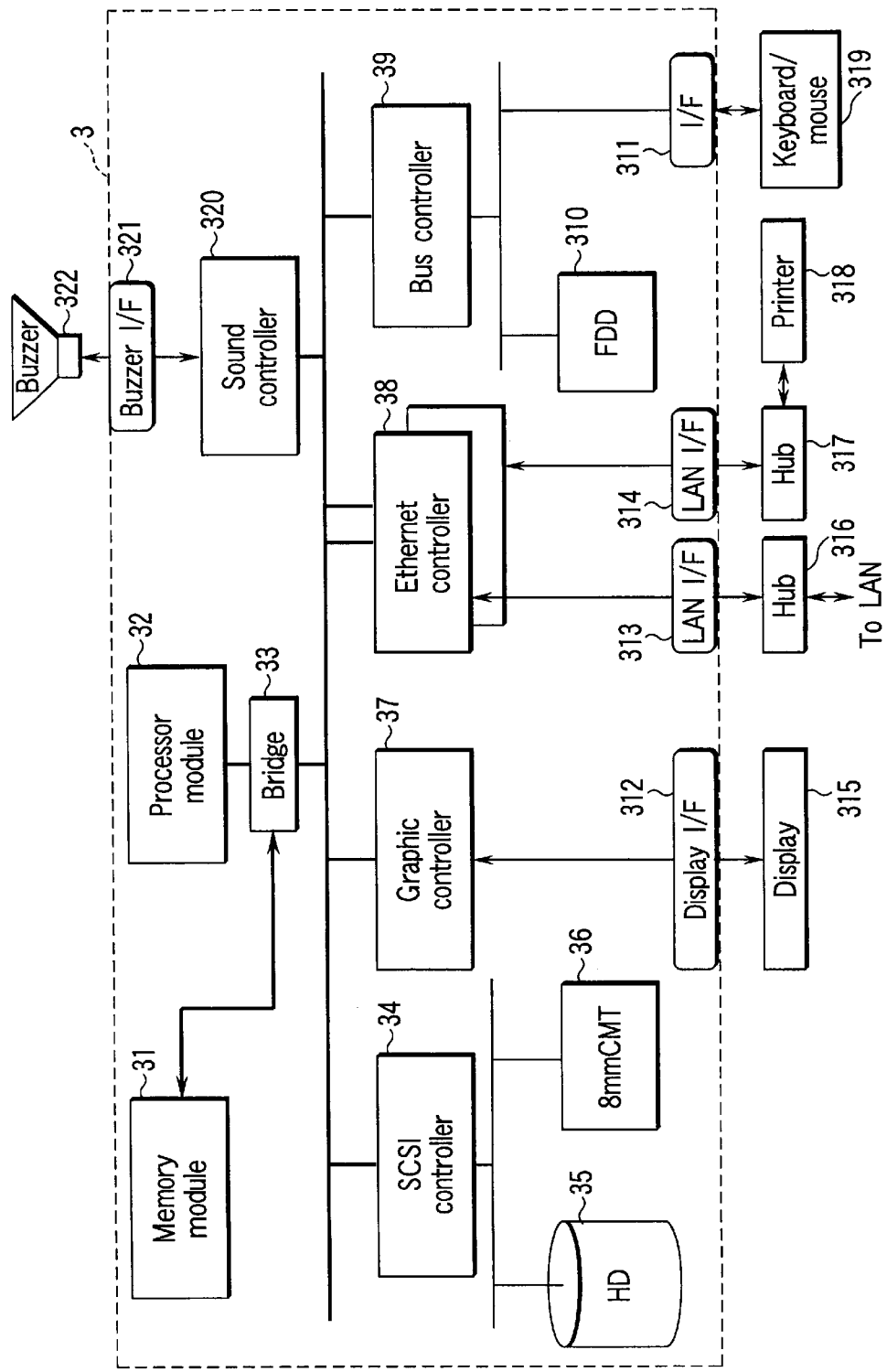
F I G. 2

Item Selection (Column)

Common Item [1☐] Alarm Notification: [2☐] State Change Notification: [3☐] Protection Switch Reporting Notification: [4☐] Security Alarm Notification: [5☐]

- ☐ Data / Time
- ☐ Ring Network
- ☐ Station
- ☐ NODE / SSE
- ☐ Event Type
- ☐ Shelf (Object Class)
- ☐ Card (Object Instance)
- ☐ Notification ID

- ☐ Probable Cause
- ☐ Severity
- ☐ Specific Problems
- ☐ Triggered Threshold
- ☐ Observed Value
- ☐ Additional Text

- ☐ Attribute ID

- ☐ Protecting Unit
- ☐ Protection Direction
- ☐ Additional Text

- ☐ Security Alarm Cause
- ☐ Security Alarm Severity
- ☐ Security Alarm Detector
- ☐ Service User
- ☐ Service Provider

[Exec]   [Cancel]

FIG. 8

| Ring Network | Station | NODE | Shelf | Card | Probable Cause | Severity |
|---|---|---|---|---|---|---|
| ###### | ##### | ###### | ##### | ##### | ###### | ##### |
| ###### | ##### | ###### | ##### | ##### | ###### | ##### |

Network Alarm Summary Display

Tabs: All, Ring Network #01 – Ring Network #32

Display Tab

FIG. 13

| Transmitter number | HS APS activation status (ex.) Normal Status : 0 Active Status : 1 |
|---|---|
| #01 | 0 |
| #02 | 1 |
| #03 | 0 |
| #04 | 1 |
| #05 | 1 |
| #06 | 0 |
| #07 | 1 |
| ⋮ | ⋮ |
| #218 | 1 |
| #219 | 0 |
| #220 | 0 |
| #221 | 0 |
| #222 |   |
| #223 | 0 |
| #224 | 0 |

Corresponding to network #01 (rows #01–#07)
Corresponding to network #32 (rows #218–#224)

FIG. 22

| Network number | HS APS activation status (ex.) Normal Status : 0 Active Status : 1 | Confirmation status (ex.) Unconfirmed : 0 (default) Confirmed : 1 |
|---|---|---|
| #01 | 1 | 1 |
| ⋮ | ⋮ | ⋮ |
| #08 | 0 | 0 |
| ⋮ | ⋮ | ⋮ |
| #25 | 0 | 1 |
| ⋮ | ⋮ | ⋮ |
| #32 | 1 | 0 |

FIG. 23

| Button display | | Meaning of display | |
|---|---|---|---|
| Red | Blinking | HS APS Active Status | Unconfirmed |
| Red | Lighting | HS APS Active Status | Confirmed |
| Green | Blinking | HS APS Nomal Status | Unconfirmed |
| Green | Lighting | HS APS Nomal Status | Confirmed |

FIG. 24

NODE Alarm Record Retrieval Filter

Ring Network:
- Ring Network #01
- Ring Network #02
- Ring Network #03
- Ring Network #04
- Ring Network #05

Station:
- Station A
- Station B
- Station C
- Station D

NODE:
- NODE #01
- NODE #02
- NODE #03
- NODE #04

Shelf:
- FAN #1
- LS #1
- LS #2
- LS #3
- LS #4

Card:
- ECCM
- ECCR
- OS WEST
- OS EAST
- OR WEST

Event Type: ☑ Communications  ☐ Quality of Service
              ☐ Equipment       ☐ Environmental

Probable Cause:
- Loss Of Signal
- Loss Of Frame
- Transmission Error
- AIS
- Remote Defect Indication

Severity: ☑ Critical  ☐ Major  ☐ Minor
             ☐ Warning  ☐ Cleared

Specific Problems:
- External Clock In Down
- Not Specified

[ Exec ]   [ Default ]   [ Cancel ]

FIG. 31

NODE Alarm Record Retrieval Item Selection

Item : ☑ Date/Time  ☐ Ring Network  ☐ Station  ☐ Card(Object Instance)
☐ NODE  ☐ Shelf(Object Class)  ☐ Severity  ☐ Observed Value
☐ Event Type  ☐ Probable Cause  ☐ Memo
☐ Specific Problems  ☐ Triggered Threshold
☐ Notification ID  ☐ Additional Text Exec   Cancel

Object Creation/Deletion Record Retrieval Filter

- Ring Network:
  - Ring Network #01
  - Ring Network #02
  - Ring Network #03
  - Ring Network #04
  - Ring Network #05

- Station:
  - Station A
  - Station B
  - Station C
  - Station D
  - Station E

- NODE:
  - NODE #01
  - NODE #02
  - NODE #03
  - NODE #04

- Event Type: ☐ Creation
  ☐ Deletion

[Exec]    [Cancel]

FIG. 37

Object Creation/Deletion Record Retrieval Item Selection

Item:
- ☑ Date/Time    ☐ Ring Network    ☐ Station
- ☐ NODE          ☐ Event Type      ☐ Object Class
- ☐ Object Instance  ☐ Notification ID  ☐ Additional Text
- ☐ Memo

[Exec]    [Cancel]

```
┌─────────────────────────────────────────────────────────┐
│ ////Protection Control Record Retrieval Filter///////// │
│                                                         │
│   Ring Network:  ┌─────────────────────┐△               │
│                  │ Ring Network #01    │                │
│                  │ Ring Network #02    │                │
│                  │ Ring Network #03    │                │
│                  │ Ring Network #04    │                │
│                  │ Ring Network #05    │▽               │
│                  └─────────────────────┘                │
│                                                         │
│        Station:  ┌─────────────────────┐△               │
│                  │ Station A           │                │
│                  │ Station B           │                │
│                  │ Station C           │                │
│                  │ Station D           │▽               │
│                  └─────────────────────┘                │
│                                                         │
│          NODE:   ┌─────────────────────┐△               │
│                  │ NODE #01            │                │
│                  │ NODE #02            │                │
│                  │ NODE #03            │                │
│                  │ NODE #04            │▽               │
│                  └─────────────────────┘                │
│                                                         │
│  Protecting Unit: ☑ HS                                  │
│                   ☐ Equipment                           │
│                   ☐ LS                                  │
│                                                         │
│        ┌─────────┐                      ┌─────────┐    │
│        │  Exec   │                      │ Cancel  │    │
│        └─────────┘                      └─────────┘    │
└─────────────────────────────────────────────────────────┘
```

FIG. 42

```
┌────────────────────────────────────────────────────────────┐
│ //  Protection Control Record Retrieval Item Selection  // │
│ Item: ☑ Data/Time      ☐ Ring Network    ☐ Station         │
│       ☐ NODE           ☐ Protecting Unit ☐ Protection Direction │
│       ☐ Object Class   ☐ Object Instance ☐ Protection Status │
│       ☐ Request Source ☐ Switch Status   ☐ Auto Switch Condition │
│       ☐ Switch Type    ☐ Notification ID ☐ Additional Text │
│       ☐ Memo                                               │
│         ┌─────────┐                      ┌─────────┐      │
│         │  Exec   │                      │ Cancel  │      │
│         └─────────┘                      └─────────┘      │
└────────────────────────────────────────────────────────────┘
```

FIG. 43

```
┌─────────────────────────────────────────────────┐
│ ▨▨▨ Security Alarm Record Retrieval Filter ▨▨▨ │
│                                                 │
│   Ring Network:  ┌─────────────────┐ △         │
│                  │ Ring Network #01│ │         │
│                  │ Ring Network #02│ │         │
│                  │ Ring Network #03│ │         │
│                  │ Ring Network #04│ │         │
│                  │ Ring Network #05│ ▽         │
│                  └─────────────────┘           │
│                                                 │
│         Station: ┌─────────────────┐ △         │
│                  │ Station A       │ │         │
│                  │ Station B       │ │         │
│                  │ Station C       │ │         │
│                  │ Station D       │ │         │
│                  │ Station E       │ ▽         │
│                  └─────────────────┘           │
│                                                 │
│           NODE:  ┌─────────────────┐ △         │
│                  │ NODE #01        │ │         │
│                  │ NODE #02        │ │         │
│                  │ NODE #03        │ │         │
│                  │ NODE #04        │ │         │
│                  │ NODE #05        │ ▽         │
│                  └─────────────────┘           │
│                                                 │
│ Security Alarm Cause: ┌──────────────────┐ △   │
│                       │Authentication Failure│ │
│                       │                  │ │   │
│                       │Unauthorized Access│ │   │
│                       │Attempt           │ │   │
│                       │                  │ ▽   │
│                       └──────────────────┘    │
│                                                 │
│    ┌────────┐                     ┌────────┐   │
│    │  Exec  │                     │ Cancel │   │
│    └────────┘                     └────────┘   │
└─────────────────────────────────────────────────┘
```

FIG. 48

```
┌──────────────────────────────────────────────────────┐
│ ▨▨ Security Alarm Record Retrieval Item Selection ▨▨ │
│ Item: ☐ Data/Time    ☐ Ring Network  ☐ Station      │
│       ☐ NODE         ☐ Managed Object ☐ Security Alarm Cause │
│       ☐ Security Alarm ☐ Security Alarm ☐ Service User │
│         Severity       Detector                      │
│       ☐ Service Provider ☐ Notification ID ☐ Additional Text │
│       ☐ Memo                                         │
│                                                      │
│       ┌────────┐                    ┌────────┐      │
│       │  Exec  │                    │ Cancel │      │
│       └────────┘                    └────────┘      │
└──────────────────────────────────────────────────────┘
```

FIG. 49

Performance Data Record Retrieval Condition

Performance Condition : 1

Station/Ring Network : ● All  ○ Station  ○ Ring Network

[ Ring Network #01 ▽ ]

NODE : [ NODE #01 ▽ ]

Channel : [ LS 1 ▽ ]

Operation Mode : [ SRV □ ]

Monitoring Section : ☑ R-Section  ☐ M-Section

Performance Event : [ TCCV □ ]

[ Exec ]　　　　[ Cancel ]

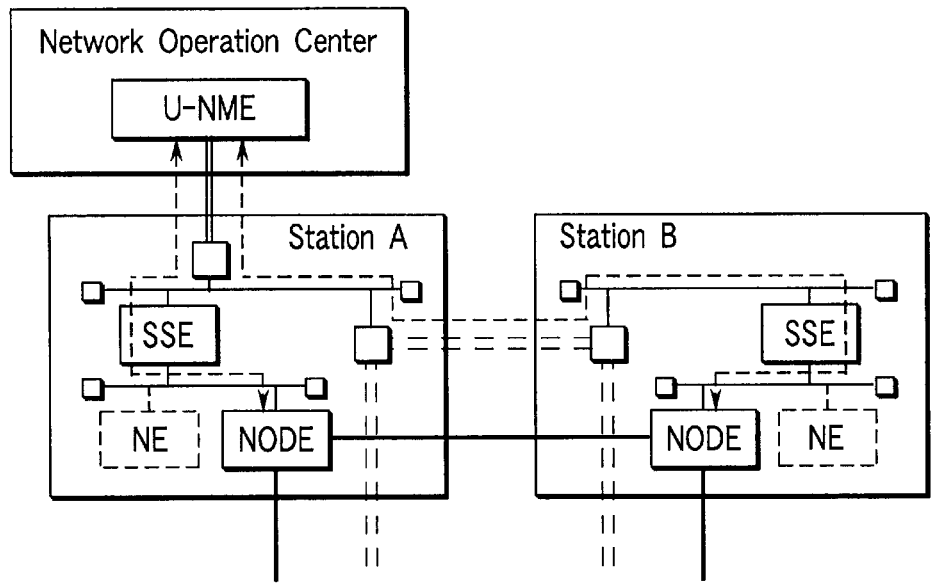
F I G. 136
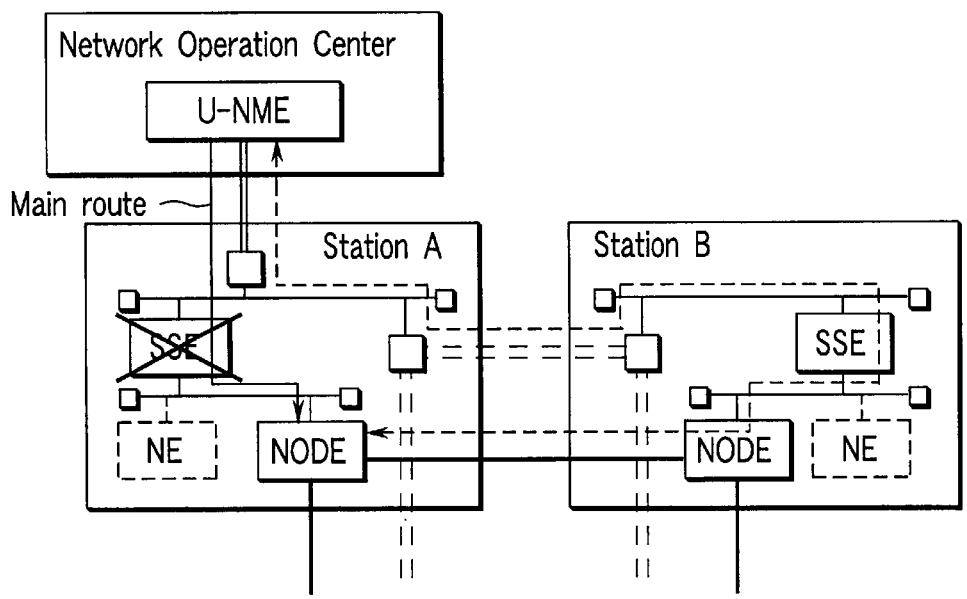
F I G. 137

Display Control

Critical : [ ☐ ] [Color]    Other Notifications : [ ☐ ] [Color]
Major : [ ☐ ] [Color]    Not Mount : [ ☐ ] [Color]
Minor : [ ☐ ] [Color]    Time out : [ ☐ ] [Color]
Warning : [ ☐ ] [Color]    Maintenance : [ ☐ ] [Color]
Clear : [ ☐ ] [Color]    APS Active : [ ☐ ] [Color]
　　　　　　　　　　　　　　APS Normal : [ ☐ ] [Color]

[Initialize]

Date/Time Sorting : [ Time Date ] ⦿ Time Date ◯ Date Time
Date Type : [DD-MMM-YYY] ◯ MM/DD/YYY ◯ DD/MM/YYY ◯ YYYY-MM-DD ⦿ DD-MMM-YYYY Sorting : [ Earliest ] ◯ Latest ⦿ Earliest

[Exec]    [Quit]

FIG. 138

NETWORK MANAGEMENT EQUIPMENT AND COMMUNICATION PATH SETTING METHOD

CROSS REFERENCE TO RELATED APPLICATIONS

This is a Continuation Application of PCT Application No. PCT/JP01/01271, filed Feb. 21, 2001, which was not published under PCT Article 21(2) in English.

This application is based upon and claims the benefit of priority from the prior Japanese Patent Application No. 2000-043199, filed Feb. 21, 2000, the entire contents of which are incorporated herein by reference.

BACKGROUND OF THE INVENTION

1. Field of the Invention

The present invention relates to a network management equipment for managing a system in an information transmission system, e.g., an information transmission system such as an optical submarine cable system.

2. Description of the Related Art

In general, a node for transmitting communication data and a network management equipment for providing OAM (Operations, Administration and Maintenance) services to a communication network are provided to a transmission system.

Meanwhile, in recent years, the global spread of networks increases a number of devices constituting the networks, and a number of supervisory control targets (e.g., nodes) is thereby increasing. Therefore, the operation in the network management equipment becomes considerably troublesome and advanced, and the burden of operators is getting large.

As described above, in recent transmission systems, the operation in the network management equipment becomes troublesome and advanced, and the provision of any countermeasure is demanded.

In order to solve the above-described problem, it is an object of the present invention to provide a network management equipment and a communication path setting method which can improve the human-machine interface and enhance the convenience of the operation.

BRIEF SUMMARY OF THE INVENTION

To achieve this aim, the present invention provides the following means.

According to the present invention, there is provided a network management equipment for managing a network system including a plurality of stations, a communication line provided between these stations, and one or a plurality of nodes which are respectively provided to the stations and connected to each other through the communication line, the network management equipment comprising: a display unit (for example, a display); information acquiring means (for example, a processor module) for acquiring notification information transmitted from each of a plurality of the nodes; information processing means (for example, a processor module) for managing states of occurrence of failures in the network system based on the notification information acquired by this information acquiring means; and display controlling means (for example, the processor module and a graphic controller) for displaying information processed by this information processing means on the display unit, wherein the display controlling means displays an area map of an area in which the network system is set on the display unit, displays a plurality of station icons respectively associated with the stations and a line associated with the communication line on the area map, displays a plurality of the station icons in a display mode which varies depending on presence/absence of failures in the respective corresponding stations, and displays the line in a display mode which varies depending on presence/absence of failures in the corresponding communication line.

By doing so, a station or a communication line with a failure can be recognized at a glance, and the human-machine interface can be improved.

According to the present invention, there is provided a network management equipment for managing a network system including a plurality of nodes based on notification information transmitted from a plurality of the nodes, the network management equipment comprising: a display unit; operating means (for example, an input device) for accepting click operations by a user; information acquiring means for acquiring notification information including alarm information respectively transmitted from a plurality of the nodes; and a display controlling means for displaying information processed by this information processing means on the display unit, wherein the display controlling means displays a first button (for example, "Notification" in FIG. 3) on a screen of the display unit, displays a first window (for example, FIG. 6) on the screen of the display unit when the first button is clicked by the operating means, and displays a list of notification information acquired by the information acquiring means in the first window in a text format together with a plurality of attributes characterizing respective sets of notification information.

As the attributes characterizing the notification information, there are a node which has transmitted the notification information, a ring network and a station to which that node belongs, an event type, a shelf of a node (object class), a card of a shelf (object instance) and others. The button is realized as a clickable icon displayed on the screen. By doing so, a list of the notification information acquired from the node can be recognized at a glance, and a procedure to get to this window can be extremely facilitated.

According to the present invention, there is provided a network management equipment provided to a network system including a plurality of ring networks with a plurality of nodes connected to each other in the ring form through a communication line, the network management equipment comprising: a display unit; information acquiring means for acquiring notification information respectively transmitted from a plurality of the nodes; information processing means for managing states of occurrence of failures in the network system based on the notification information acquired by this information acquiring means; and display controlling means for displaying information processed by this information processing means on the display unit, wherein the display controlling means displays a sixth button (for example, "Alarm Summary" in FIG. 3) on a screen of the display unit, displays a sixth window (for example, FIG. 13) on the screen of the display unit when the sixth button is clicked by the operating means, displays a plurality of headers respectively associated with a plurality of the ring networks in the sixth window, displays a plurality of these headers in a display mode which varies depending on presence/absence of failures in the corresponding ring networks, displays a view showing a structure of a ring network corresponding to any clicked header in the sixth window when this header is clicked by the operating means, and displays a plurality of nodes shown in a view displaying the structure of the ring network in display modes which differ from each other depending on presence/absence of failures in the respective nodes.

By doing so, a ring network and a node in which failures exist can be recognized at a glance. Further, since the ring networks are displayed in a so-called tab (header) format, the selection operation can be facilitated.

According to the present invention, there is provided a network management equipment for managing a network system including a plurality of stations, a communication line provided between these stations, and one or a plurality of nodes which are respectively provided to the stations and connected to each other through the communication line, the network management equipment comprising: a display unit; operating means for accepting first and second click operations (for example, right-click or left-click of a mouse) by a user which are different from each other; information acquiring means for acquiring notification information respectively transmitted from a plurality of the nodes; information processing means for managing states of occurrence of failures in the network system based on the notification information acquired by this information acquiring means; and display controlling means for displaying information processed by this information processing means on the display unit, wherein the display controlling means displays a plurality of station icons (for example, Station A to Station G in FIG. 3) respectively associated with the stations on a screen of the display unit, displays a plurality of the station icons in a display mode which varies depending on presence/absence of failures in the respective corresponding stations, displays an eighth window (for example, FIG. 17) on the screen of the display unit when any of the station icons is clicked by the first click operation by the operating means, displays in the eighth window one or a plurality of node icons respectively associated with the nodes provided in a station corresponding to the clicked station icon, and displays one or a plurality of the node icons in a display mode which varies depending on presence/absence of failures in the respective corresponding nodes.

By doing so, a station having a node with a failure can be recognized at a glance.

According to the present invention, there is provided a network management equipment provided to a network system including a plurality of ring networks, a plurality of the ring networks comprising a plurality of nodes, and a traffic bypass function, a plurality of the nodes being connected to each other in the ring form through a communication line, the communication line including a working system line and a preliminary system line, the traffic bypass function being a function which detours service traffic transmitted through the working system line to the preliminary system line and enters either an active status or a normal status, the network management equipment comprising: a display unit; information acquiring means for acquiring notification information respectively transmitted from a plurality of nodes; information processing means for managing statuses of the traffic bypass function in the network system based on the notification information acquired by this information acquiring means; and display controlling means for displaying information processed by this information processing means on the display unit, wherein the display controlling means displays a seventh button (for example, "HS APS Activate Summary" in FIG. 3) on a screen of the display unit, displays a 12th window (for example, FIGS. 20 and 21) on the screen of the display unit when the seventh button is clicked by the operating means, displays a plurality of icons respectively associated with a plurality of the ring networks in the 12th window, displays a plurality of the icons in a display mode which varies depending on whether the traffic bypass function in each corresponding ring network is in the active status or the normal status, and displays a plurality of the icons in a display mode which varies depending on whether the status of the traffic bypass function in each corresponding ring network is confirmed by an operator of its own apparatus.

According to the present invention, there is provided a network management equipment for managing a network system including a plurality of nodes based on notification information transmitted from a plurality of the nodes, the network management equipment comprising: a display unit; information acquiring means for acquiring notification information respectively transmitted from a plurality of the nodes; storing means (for example, a memory module, an HD, and a CMT) for accumulating a history of the notification information acquired by this information acquiring means; information processing means for managing the network system based on the notification information acquired by the information acquiring means; and display controlling means for displaying information processed by this information processing means on the display unit, wherein the display controlling means displays a 13th window (for example, FIG. 28) on a screen of the display unit, and displays in the 13th window a retrieval condition specification section for specifying retrieval conditions for retrieving desired notification information from a history accumulated in the storing means, wherein the information processing means retrieves notification information according to retrieval conditions specified in the 13th window from the history accumulated in the storing means, and wherein the display controlling means displays a 14th window (for example, FIG. 30) on the screen of the display unit and displays the notification information retrieved by the information processing means in the 14th window in a text format together with a plurality of attributes characterizing the retrieved notification information.

By doing so, a list of notification information which fulfills the desired condition can be displayed from the past history of the notification information acquired from the nodes, and the procedure to get the desired notification can be also extremely facilitated.

According to the present invention, there is provided a network management equipment for managing a network system including a plurality of nodes based on notification information transmitted from a plurality of the nodes, the network management equipment comprising: a display unit; information acquiring means for acquiring notification information respectively transmitted from a plurality of nodes; storing means for accumulating a history of the notification information acquired by this information acquiring means; information processing means for managing the network system based on the notification information acquired by the information acquiring means; and display controlling means for displaying information processed by this information processing means on the display unit, wherein the display controlling means displays an 11th button (for example, "Performance Data Record Retrieval" in FIG. 60) on a screen of the display unit, displays a 19th window (for example, FIG. 61) on the screen of the display unit when the 11th button is clicked by the operating means, and displays in the 19th window a retrieval condition specification section for specifying retrieval conditions for retrieving desired notification information from a history accumulated in the storing means, wherein the information processing means retrieves notification information according to the retrieval conditions specified in the 13th window from the history accumulated in the storing means, and wherein the display controlling means displays a 20th window (for example, FIGS. 64 to 66) on the screen of the display unit, and makes a graph of and displays a result of retrieval of notification information by the information processing means in the 20th window.

By doing so, a result of retrieval of quality information can be grasped at a glance, which is convenient.

According to the present invention, there is provided a network management equipment for managing a network system including a plurality of nodes based on notification information transmitted from a plurality of the nodes, the network management equipment comprising: a display unit; information acquiring means for acquiring notification information respectively transmitted from a plurality of the nodes; information processing means for managing states of occurrence of the alarm in the network system based on the notification information acquired by this information acquiring means; and display controlling means for displaying information processed by this information processing means on the display unit, wherein the display controlling means displays a 16th button (for example, "Probable Cause" in FIG. 76) on a screen of the display unit, displays a 26th window (for example, FIG. 77) on the screen of the display unit when the 16th button is clicked by the operating means, displays a first section for specifying an operation target of an emergency degree of the alarm in the 26th window, displays a second column for selecting a reason of occurrence of the alarm for the operation target specified in the first column, and reads a current setting state of the emergency degree of the specified factor of occurrence of alarm with respect to a node having the operation target, and displays a list of its result in accordance with each factor of occurrence when the operation target and the factor of occurrence of alarm are specified in the 26th window, and wherein the information processing means individually sets the emergency degree with respect to an operator of its own apparatus for each factor of occurrence of alarm displayed in the list format in the 26th window and sets the emergency degree for each set factor of occurrence of alarm with respect to the node of the operation target.

By doing so, it is possible to easily set the emergency degree for each of a plurality of factors of occurrence of alarm with respect to an arbitrary node (which must be allowed to be accessed) from the network management equipment side.

According to the present invention, there is provided a network management equipment provided in a network system including a plurality of ring networks, a plurality of the ring networks including a plurality of nodes and a traffic bypass function, a plurality of the nodes being connected to each other in the ring form through a communication line in which a plurality of paths are multiplexed, the communication line including a working system line and a preliminary system line, the traffic bypass function being a function which detours service traffic transmitted through the working system line to the preliminary system line, the network management equipment comprising: a display unit; information acquiring means for acquiring notification information respectively transmitted from a plurality of the nodes; information processing means for managing states of the traffic bypass function in the network system based on the notification information acquired by this information acquiring means; and display controlling means for displaying information processed by this information processing means on the display unit, wherein the display controlling means displays a clickable button for displaying on a screen of the display unit a window for setting parameters concerning the traffic bypass function on the screen of the display unit.

By doing so, various settings concerning paths in the network system can be set.

According to the present invention, there is provided a communication path setting method in a network management equipment with a display unit, the network management equipment being provided in a network system including a plurality of ring networks, each of a plurality of the ring networks including a plurality of nodes connected to each other in the ring form through a communication line in which a plurality of communication paths are multiplexed, the communication path setting method comprising: a step of selecting any ring network, dividing a screen of the display unit into a plurality of areas in association with each interval between nodes belonging to the selected ring network, and displaying in the divided area each arrow associated with a communication path existing in the interval; a first step of specifying on the screen a low-speed side channel of a node which is a start point of a communication path to be set; a second step of specifying on the screen a low-speed side channel of a node which is an end point of the communication path to be set; a third step of displaying an arrow associated with the communication path to be set in a display area according to a node interval specified by the first and second steps; a fourth step of repeating the first to third steps when there is any other communication path to be set; a fifth step of transmitting a request of setting a communication path according to an arrow associated with the communication path to be set to a node concerning formation of the communication path; and a sixth step of causing a node which has accepted the request of setting a communication path to form a new communication path based on the request.

Further, by doing so, the operation for setting the path can be intuitively performed, which is convenient.

According to the present invention, there is provided a network management equipment for managing a network system including a plurality of nodes with a plurality of boards based on notification information transmitted from a plurality of nodes, the network management equipment comprising: a display unit; operating means for accepting click operations by a user; information acquiring means for acquiring notification information respectively transmitted from a plurality of the nodes; storing means for accumulating a history of the notification information acquired by this information acquiring means; information processing means for managing the network system based on the notification information acquired by the information acquiring means; and display controlling means for displaying information processed by this information processing means on the display unit, wherein the display controlling means displays a 27th button (for example, "LS Card Control" in FIG. 107) on a screen of the display unit, displays a 34th window (for example, FIG. 108) on the screen of the display unit when the 27th button is clicked by the operating means, and displays in the 34th window a section for causing an operator of its own apparatus to select one of nodes existing in the network system and specify a low-speed side board of the selected node, and wherein the information processing means deletes the low-speed side board selected in the 34th window from the supervisory control target of its own apparatus.

By doing so, a procedure for deleting the low-speed side board from the supervisory target can be facilitated.

According to the present invention, there is provided a network management equipment provided in a network system including a plurality of nodes, the network management equipment comprising: a display unit; information acquiring means for acquiring notification information respectively transmitted from a plurality of the nodes; information processing means for managing the network system based on the notification information acquired by this information acquiring means; and display controlling means for displaying information processed by this information processing means on the display unit, wherein the display controlling means displays a 29th button (for example, "User Control" in FIG. 111) on a screen of the display unit, displays a 36th window (for example, FIG. 112) on the screen of the display unit when the 29th button is clicked by the operating means, and displays in the 36th window a list of operators who are permitted to log in its own apparatus while associating a term of validity of a password and an access level of each of the operators with a name of each operator.

As a result, users capable of logging in can be grasped at a glance.

According to the present invention, there is provided a network management equipment provided in a network system including a plurality of nodes, the network management equipment comprising: a display unit, information acquiring means for acquiring notification information respectively transmitted from a plurality of the nodes; information processing means for managing the network system based on the notification information acquired by this information acquiring means; and display controlling means for displaying information processed by this information processing means on the display unit, wherein the display controlling means displays a 33rd button (for example, "System Timing Setting" in FIG. 123) on a screen of the display unit, displays a 40th window (for example, FIG. 124) on the screen of the display unit when the 33rd button is clicked by the operating means, displays in the 40th window a section for causing an operator of its own apparatus to select an arbitrary node in the network system, displays a list of current setting states of an operation reference time of each node in accordance with each node selected in this section, and displays a section for causing the user to select an arbitrary apparatus from this list and individually causing the user to set the operation reference time with respect to the selected apparatus, and wherein the information processing means sets the operation reference time set in the 40th window with respect to the selected node.

Consequently, the operation for setting the operation reference time relative to each node can be facilitated.

According to the present invention, there is provided a network management equipment provided in a network system including a plurality of nodes, the network management equipment comprising: a display unit; information acquiring means for acquiring notification information respectively transmitted from a plurality of the nodes; information processing means for managing the network system based on the notification information acquired by this information acquiring means; and display controlling means for displaying information processed by this information processing means on the display unit, wherein the display controlling means displays a 36th button (for example, "Display" in FIG. 3) on a screen of the display unit, displays a 43rd window (for example, FIG. 138) on the screen of the display unit when the 36th button is clicked by the operating means, displays in the 43rd window a color specification button in accordance with each possible state of an object displayed on the screen of the display unit, displays a color pallet and causes an operator of its own apparatus to set a display color in a state according to the color specification button when an arbitrary color specification button is clicked, and displays an object shown on the screen of the display unit in a display color set in the color pallet.

As a result, when displaying on the display unit, color coding is performed in accordance with, e.g., a degree of a failure, and the state of the network system can be visually grasped at a glance.

BRIEF DESCRIPTION OF THE SEVERAL VIEWS OF THE DRAWING

FIG. 2 is a block diagram showing a structure of a network management equipment (U-NME) 3 depicted in FIG. 1;

FIG. 8 is a view showing an Item Selection (Column) window;

FIG. 13 is a Network Alarm Summary Display window;

FIG. 22 is a view showing a data table for managing the activation status of the HS APS in the network system in units of node;

FIG. 23 is a view showing a data table for managing the activation status of the HS APS in the network system in units of ring network;

FIG. 24 is a view showing a list of display patterns of the HS APS Activate Summary Display window;

FIG. 31 is a NODE Alarm Record Retrieval Filter window;

FIG. 32 is a view showing a NODE Alarm Record Retrieval Item Selection window;

FIG. 36 is a view showing an Object Creation/Deletion Record Retrieval Filter window;

FIG. 37 is a view showing an Object Creation/Deletion Record Retrieval Item Selection window;

FIG. 42 is a Protection Control Record Retrieval Filter window;

FIG. 43 is a view showing a Protection Control Record Retrieval Item Selection window;

FIG. 48 is a view showing a Security Alarm Record Retrieval Filter window;

FIG. 49 is a view showing a Security Alarm Record Retrieval Item Selection window;

FIG. 62 is a view showing a Performance Data Record Retrieval Condition window;

FIG. 68 is a view showing a Performance Data Record Retrieval Report (Table) window;

FIG. 74 is a view showing an example of a daily report of quality information;

FIG. 120 is a view showing a Manager Name Selection window;

FIG. 121 is a view showing a Change Manager Level window;

FIG. 122 is a view showing an Auto Logout Time Setting window;

FIG. 123 is a view showing a System Service window;

FIG. 124 is a view showing a System Time Setting window;

FIG. 125 is a view showing a Station/Ring Network Selection window;

FIG. 126 is a view showing a Software Information window;

FIG. 127 is a view showing a NODE Selection window;

FIG. 128 is a view showing a Name Setting window;

FIG. 129 is a view showing a Ring Network Selection window;

FIG. 130 is a view showing an Auto Time Adjustment Setting window;

FIG. 131 is a view showing an SSE Switching Control window;

Figure 132:
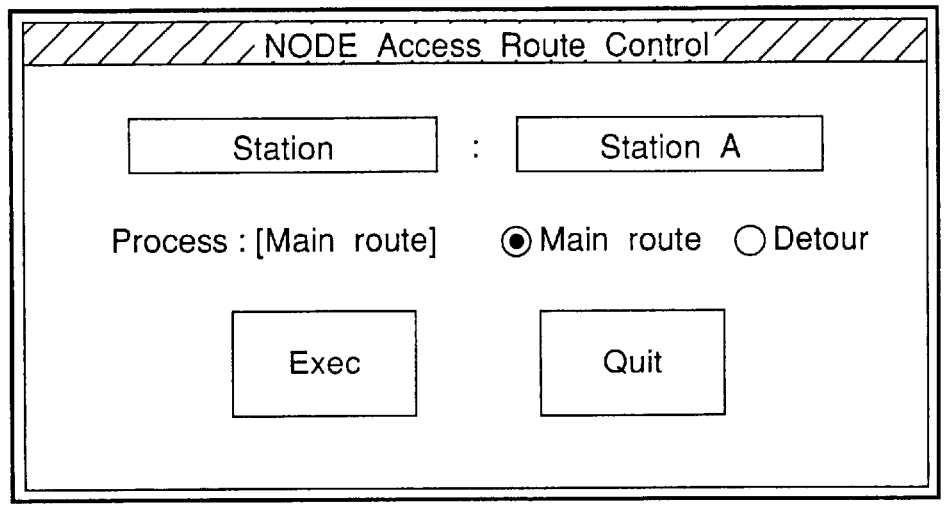
Figure 133:
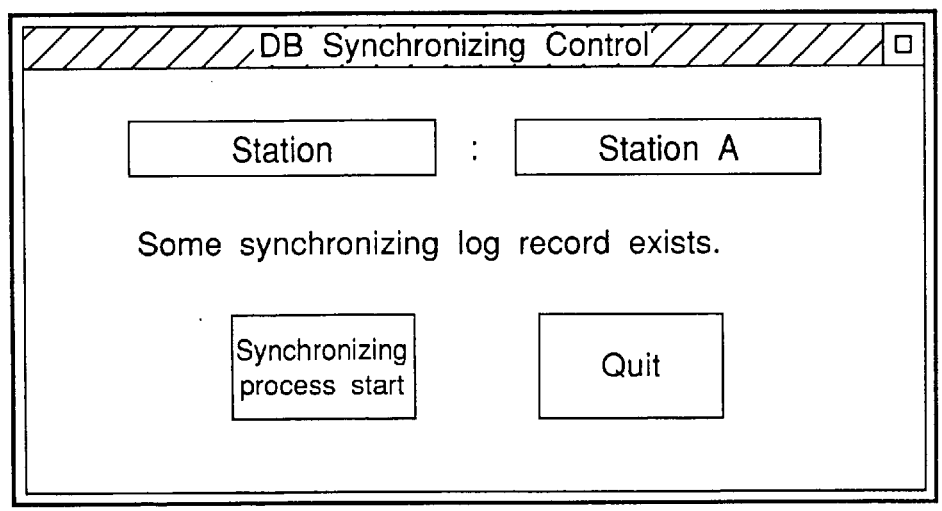
Figure 134:
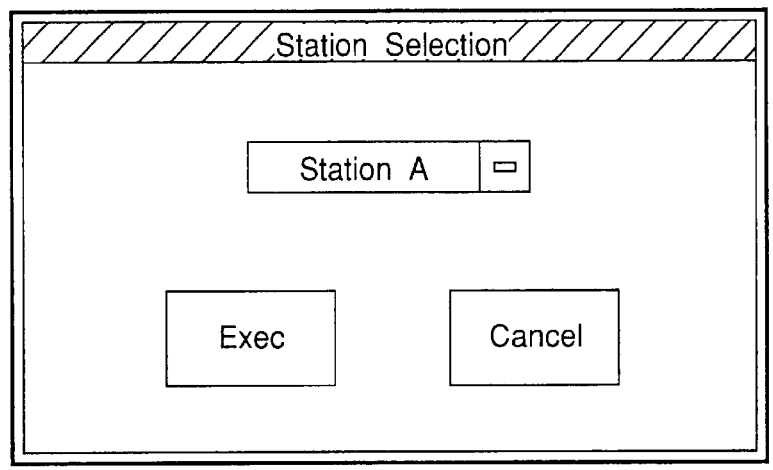
Figure 135:
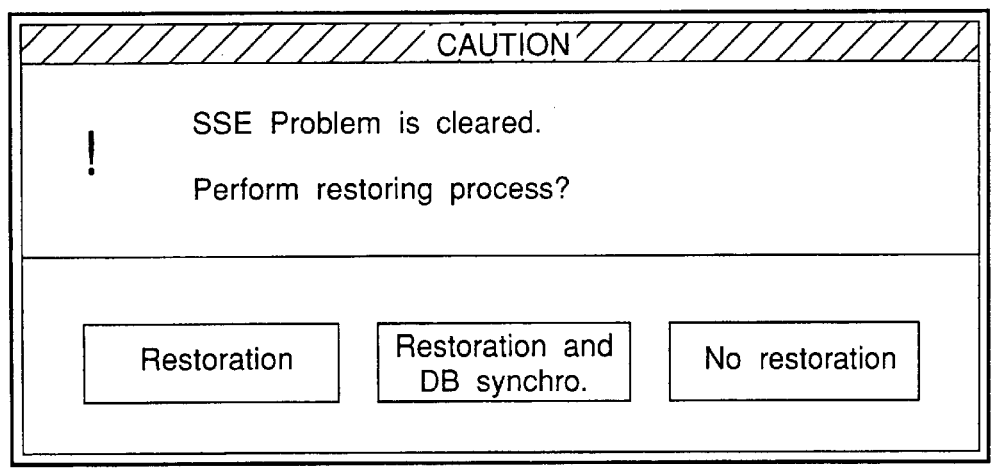

FIG. 132 is a view showing a NODE Access Route Control window;

FIG. 133 is a view showing a DB Synchronizing Control window;

FIG. 134 is a view showing a Station Selection window;

FIG. 135 is a view showing an example of a CAUTION window;

FIG. 136 is a type drawing showing the state when matching of data of the SSE 2 is performed between different stations;

FIG. 137 is a type drawing showing the state of setting a detour between the U-NME 3 and a NODE 1-1;

FIG. 138 is a view showing a Display Control window; and

Figure 139:
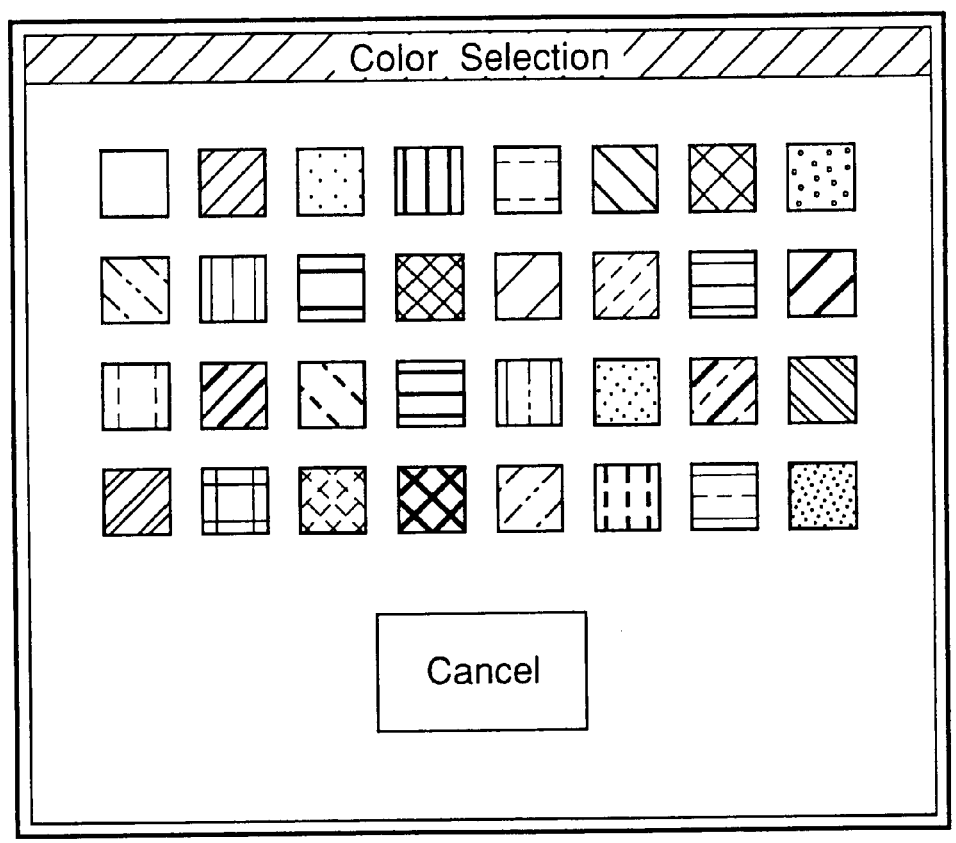

FIG. 139 is a view showing a Color Selection window.

DETAILED DESCRIPTION OF THE INVENTION

Embodiments according to the present invention will now be described in detail hereinafter with reference to the accompanying drawings.

Figure 1:
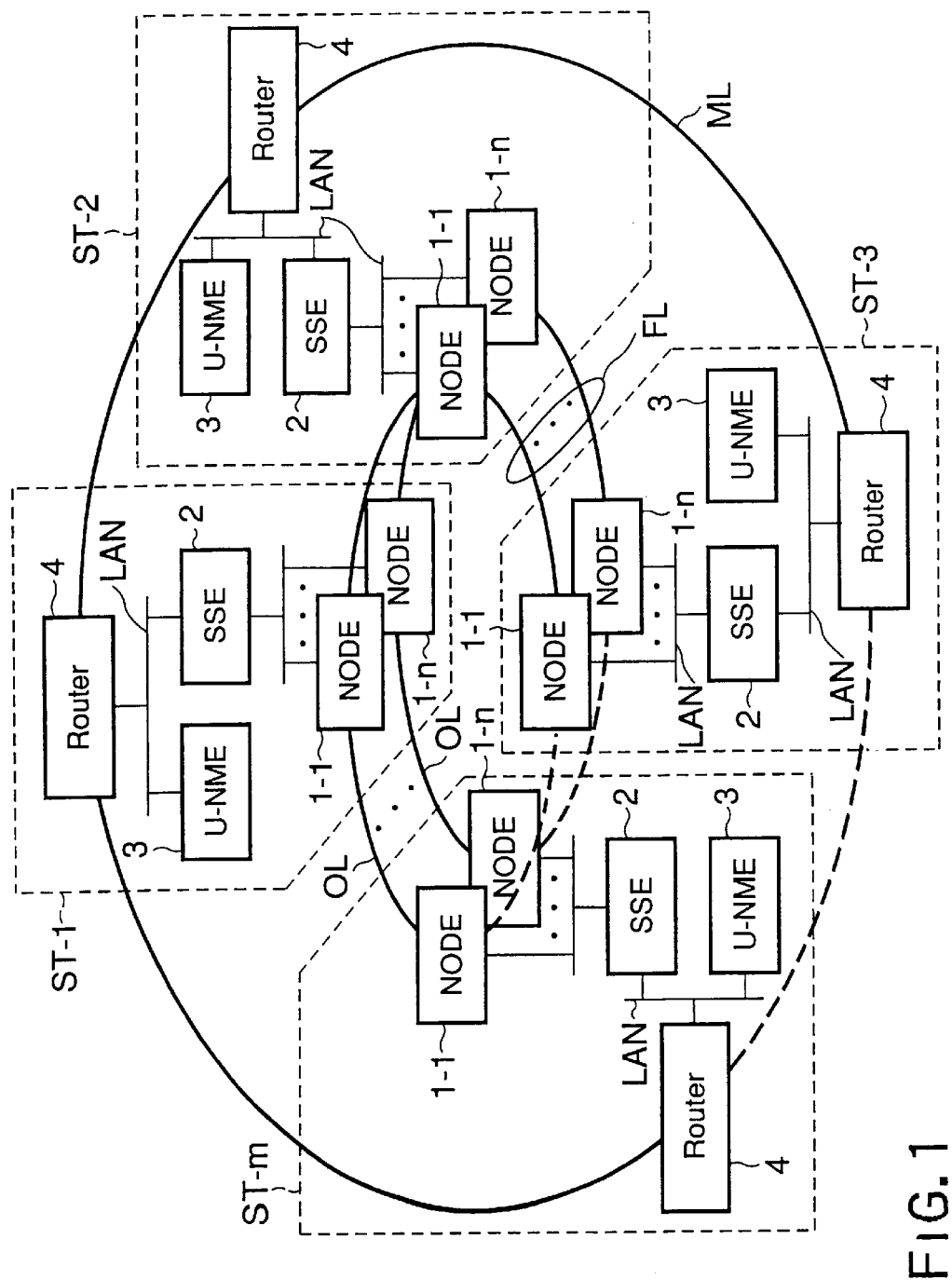
FIG. 1 is a system structural view of a transmission system in which a network management equipment according to an embodiment of the present invention is set.

FIG. 1 is a system structural view of a transmission system in which a network management equipment according to an embodiment of the present invention is set. In FIG. 1, a plurality of nodes (NODE) 1-1 to 1-n are set in a plurality of stations (Stations) ST-1 to ST-m. The nodes 1-1 to 1-n are connected to each other in the ring form through a high-speed line OL, thereby forming a plurality of ring networks. That is, n ring networks exist, and each ring network provided with m nodes 1-1, 1-2, . . . , 1-n is formed.

The high-speed line OL is realized as a synchronous multiplex line having, e.g., an STM-64 (Synchronous Transfer Module-level 64: corresponding to 10 Gbps) class transmission capacity. The high-speed line OL forming each ring network transmits optical signals. A wavelength of this optical signal differs in accordance with each ring network, and the optical signals having such wavelengths are wavelength-multiplexed, thus forming a wavelength multiplex line FL.

The nodes 1-1 to 1-n in the respective stations ST-1 to ST-m are respectively connected to an in-station network management equipment (SSE) 2 in accordance with each station. The SSE 2 is further connected to a network management equipment (U-NME) 3 through a LAN. Furthermore, a router 4 is connected to the LAN, and a supervisory control line ML for connecting the U-NMEs 3 of the respective stations is formed through the router 4. It is to be noted that the supervisory control line ML depicted in FIG. 1 is logically realized by a DCC (Data Communication Channel) and the like defined by an SOH (Section Over Head) of an SDH frame transmitted through the wavelength multiplex line FL.

FIG. 2 shows a structure of the network management equipment (U-NME) 3 illustrated in FIG. 1. The U-NME 3 is in charge of supervisory control across the net. The U-NME 3 in FIG. 2 includes: a memory module 31; a processor module 32; a bridge 33; an SCSI controller 34; an HD (hard disk drive) 35; an 8-mm CMT (Cassette Magnetic Tape) 36; a graphic controller 37; an Ethernet controller 38; a bus controller 39; an FDD (floppy disk drive) 310; an interface (I/F) 311; a display interface (I/F) 312; LAN interfaces (I/F) 313 and 314; a display 315; Hubs 316 and 317; a printer 318; an input device 319 (for example, a keyboard, a mouse and others); a sound controller 320; a buzzer interface (I/F) 321; and a buzzer 322.

Among these members, the human-machine interface unit consisting of the display 315, the 8-mm CMT 36, the FDD 310, the printer 318, the input device 319, the buzzer 322 and others has strong ties with the idea of the present invention. It is to be noted that the mouse of the input device 319 is provided with two right and left click buttons for clicking icons or objects on the display 315.

The effect in the above-described structure will now be described. In the following description, there are provided 14 chapters consisting of (Observation Display), (U-NME shutdown), (Login/Logout), (Notification Display), (Alarm Summary Display), (HS APS Activate Summary Display), (Log Control), (Performance Control), (Alarm Control), (Network Configuration), (NODE Function), (Security Control), (System Service), and (Display Control) for the sake of convenience.

Each function provided to the network management equipments M1 to Mn described below is newly implemented by applying, for example, patches to a control program mainly executed by the processor module 32 shown in FIG. 2. This control program is written in a special-purpose language and stored in the memory module 31, the HD 35 and the like.

It is to be noted that the system with n=32 and m=7 is assumed in FIG. 1 in the following description for the sake of convenience. That is, there is assumed a system which includes 32 ring networks and also includes 7 NODES for each ring network.

(Observation Display)

Figure 3:
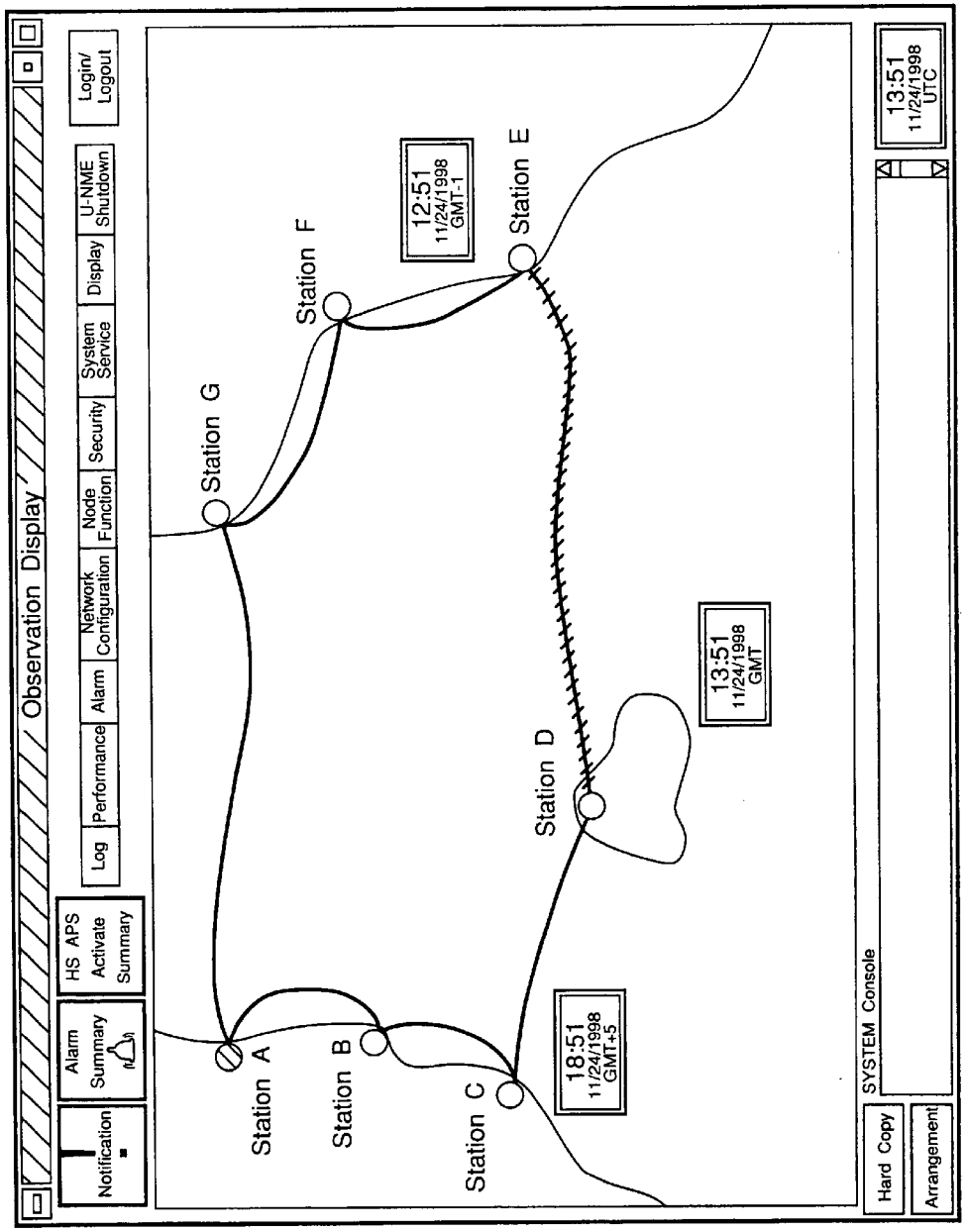
FIG. 3 is a view showing a main screen in a display 315 of the U-NME 3 illustrated in FIG. 2.

FIG. 3 shows a screen shown on the display 315 when the U-NME 3 is activated. This screen is referred to as "Observation Display" (a name of the screen is displayed in the uppermost part of the screen) and displayed as a background screen. Accordingly, it is determined that a window shown in FIG. 3 is referred to as a "main screen".

In the main screen, various settings which are enabled from the U-NME 3 or respective buttons for displaying supervisory information and others are displayed, and clicking these respective buttons displays various function screens (windows).

In order to facilitate visual comprehension of the entire network system structure, a map of areas in which the systems are set is displayed in the main screen shown in FIG. 3. In this main screen, respective station icons indicative of Station A to Station G and transmission path icons indicative of transmission paths (corresponding to the wavelength multiplex lines FL in FIG. 1) connecting the respective stations are graphically displayed so as to be superposed on the map. Each station icon is displayed as a sign (○) and each transmission path icon is displayed as a line. A time according to a time zone in an area in which a station is set is displayed in the vicinity of the corresponding station icon.

The present time indicated by the Universal Time Coordinated (UTC) is also displayed in this main screen. In such a system cutting across nations as shown in FIG. 1, when time information added to various information concerning the entire network is displayed in terms of the local time, the context of the occurrence time of each piece of information is hard to be grasped. In this embodiment, therefore, Universal Time Coordinated (UTC) is used.

Further, by changing display colors of the station icon and the transmission path icon displayed on the main screen in FIG. 3, presence/absence of occurrence of a failure and a degree of a failure can be indicated. For example, as to display colors when a failure occurs, if a level of the failure in the Station A is critical and that of the failure of the transmission path is minor, the icon of the Station A is displayed in red and the transmission path icon is displayed in yellow, respectively. Furthermore, a station and a cable with no failure are displayed in, for example, green.

It is assumed that, among 32 NODEs belonging to the Station A, failures are generated in any or a plurality of NODEs. Moreover, it is assumed that a failure is generated in the transmission path connecting the Station D and the Station E. The U-NME 3 grasps information that these failures are generated based on the notification information notified from each NODE. At this moment, the icon of the transmission path connecting Station D and Station E and the icon of Station A are displayed in display colors different from other colors in accordance with a degree of that failure on the main screen in FIG. 3.

Now, clickable function buttons are displayed on the main screen in FIG. 3. That is, there are displayed a Notification button, an Alarm Summary button, an HS APS Activate Summary button, a LOG button, a Performance button, an Alarm button, a Network Configuration button, a Node Function button, a Security button, a System Service button, a Display button, an U-NME shutdown button, and a Login/Logout button.

Among these buttons, the Notification button, the Alarm Summary button and the HS APS Activate Summary button in the upper left part and the Login/Logout button in the upper right part are constantly displayed in the active mode. On the contrary, another nine buttons are displayed in the active or inactive mode in accordance with a level of a login user.

Now, it is assumed that no one is currently logged-in to the U-NME 3 displaying the screen in FIG. 3. At this moment, the nine buttons consisting of the Log button, the Performance button, the Alarm button, the Network Configuration button, the Node Function button, the Security button, the System Service button, the Display button and the U-NME Shutdown button are displayed in the inactive manner. It is to be noted that the inactive display is a display mode in which a color of a character is thinned or a character is drawn with a dotted line and indicates the state which does not respond to the click operation.

(Login/Logout)

Description will be first given as to login and logout.

Figure 4:
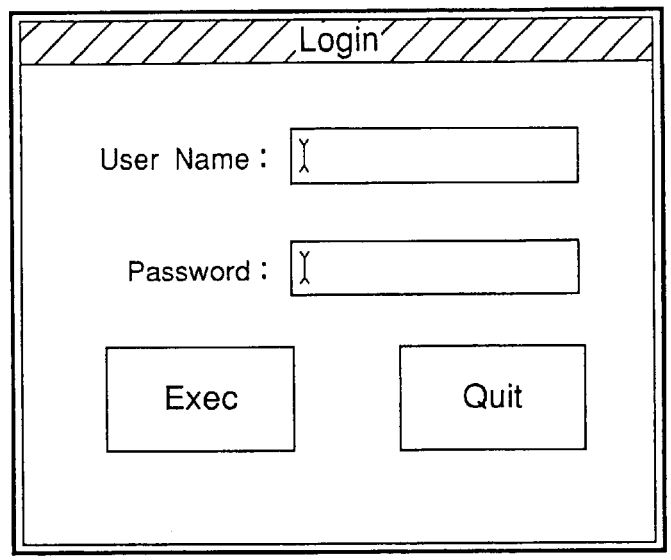
FIG. 4 is a view showing a Login window.

When the Login/Logout button in FIG. 3 is clicked, a Login window shown in FIG. 4 is displayed, and the login process is started. Input sections of a user name (User Name) and a password (Password) are provided in this login window. When a user inputs his/her name and password in the window in FIG. 4 and clicks an Exec button, he/she can login to the U-NME 3. On the contrary, when a Quit button is clicked, the login process is stopped.

Figure 5:
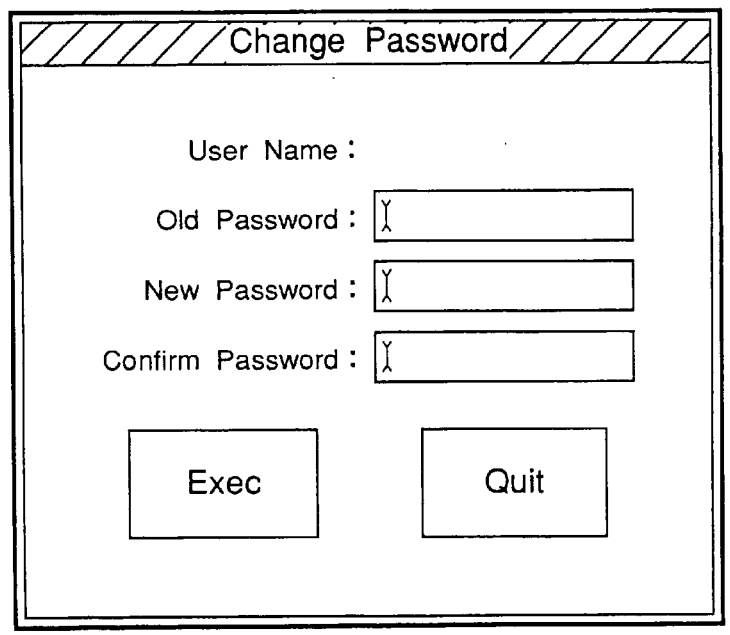
FIG. 5 is a view showing a Change Password window.

However, when a user who logs in for the first time performs the above-described operation, the Login window is closed after the Exec button is clicked, and a Change Password window shown in FIG. 5 is displayed. In this window, input sections for an old password (Old Password), a new password (New Password), password confirmation (Confirm Password) are displayed together with the inputted user name. When the Exec button is clicked in the window shown in FIG. 5 after inputting data in each section, setting of a password is completed. In addition, when the Quit button is clicked in the window shown in FIG. 5, the processing for changing the password is aborted, and the window is closed.

When the login processing is completed in this manner, some of the buttons shown in FIG. 3 are changed from the inactive display mode to the active display mode in accordance with a level of the login user.

On the other hand, in order to log out from the login state, the Login/Logout button shown in FIG. 3 is clicked. Then, a CAUTION window (not shown) indicating a message "Do you execute the logout processing? Click the OK button to execute or click the Cancel button to cancel" is displayed. In this way, the correct processing is urged upon user. When the user clicks the OK button or the Cancel button provided in this window, the appropriate operation is carried out.

However, when the Login/Logout button is clicked during execution of the operation which greatly influences the network system such as a path setting operation, the CAUTION window (not shown) showing a message "The path setting control function is executed. Logout cannot be accepted. Please retry after completion of the path setting control processing" is displayed, and this window indicates that the logout processing cannot be accepted.

With a number of function screens which can be opened on the main screen reaching a maximum number, when another screen is tried to be opened, the CAUTION window (not shown) showing a message "Exceeding the maximum simultaneous activation number" is displayed.

(U-NME Shutdown)

Description will now be given as to the U-NME Shutdown.

When the U-NME Shutdown button on the main screen is clicked, the U-NME 3 is shut down.

(Notification Display)

Description will now be given as to the Notification function for displaying a list of notification information from objects such as respective nodes and the like which are the supervisory target of the U-NME 3.

Figure 6:
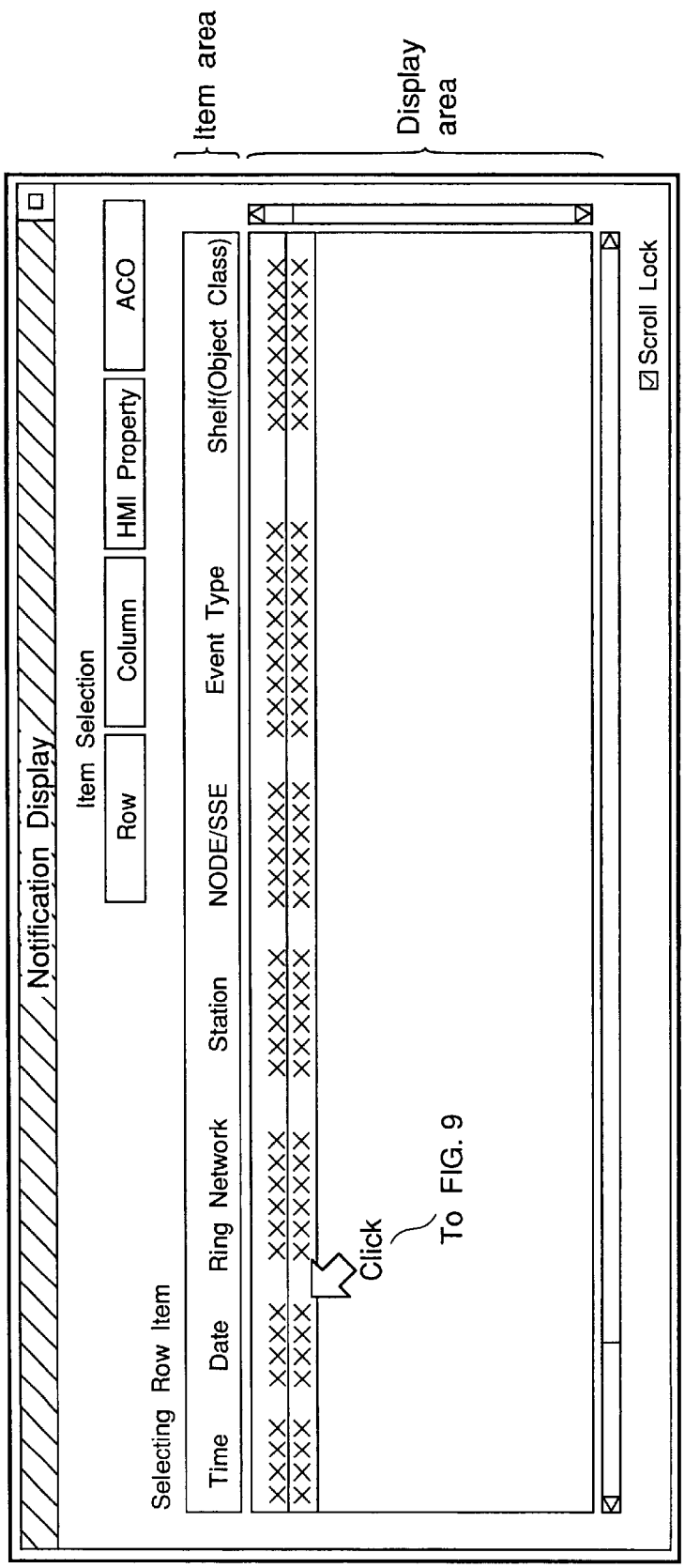
FIG. 6 is a view showing a Notification Display window.

When the Notification button is clicked in the main screen in FIG. 3, a Notification Display window shown in FIG. 6 is displayed. A list of information indicative of states of objects (for example, each NODE or transmission path) which are the supervisory target of the U-NME 3 is displayed in the text format in this window.

The above-described information includes alarm information generated in each node or performance data concerning the transmission quality of data. Such information is information notified from each NODE to the U-NME 3 as notification information (Notification).

Each node periodically monitors a value of performance data which is a numeric value indicative of the state in accordance with each performance event (which will be referred to as an event hereinafter) such as a bit error rate of transmission data or a number of times of occurrence of transmission path failures. The notification information is generated in each node based on this monitoring result.

The notification information notified from each NODE is displayed from the top in time series, for example, in the order of occurrence in the display area in FIG. 6. Since it is difficult to display data included in the notification information all at once, horizontal and vertical scroll buttons are provided in the window shown in FIG. 6. Additionally, a Scroll Lock check box for locking scrolling is provided in the FIG. 6 window. Checking this box can lock scrolling.

Attributes of the notification information consisting of Time, Date, Ring Network, Station, NODE/SSE, Event Type and Shelf (Object Class) are displayed in the item area in FIG. 6. Besides, although not shown in the drawing, there are more items on the right side of the Shelf (Object Class). This can be displayed in the window by operating the horizontal scroll button.

The items Time and Date indicate the time and date of occurrence of an event. The item Ring Network indicates an identifier of a ring network in which an event has occurred among the 32 ring networks. The item Station indicates an identifier of a station to which the NODE in which an event has occurred belongs among the seven stations. The item NODE/SSE indicates an inherent name (for example, a nickname) given to the NODE or SSE in which an event has occurred. The item Event Type indicates a type of an event. The item Shelf (Object Class) indicates a shelf in which an event has occurred in the NODE having that event.

It is to be noted that "a shelf" means one of the parts forming a NODE. Each NODE is formed by a plurality of shelves. Further, the shelf is configured to include a plurality of boards such as interface boards or control boards.

Figure 7:
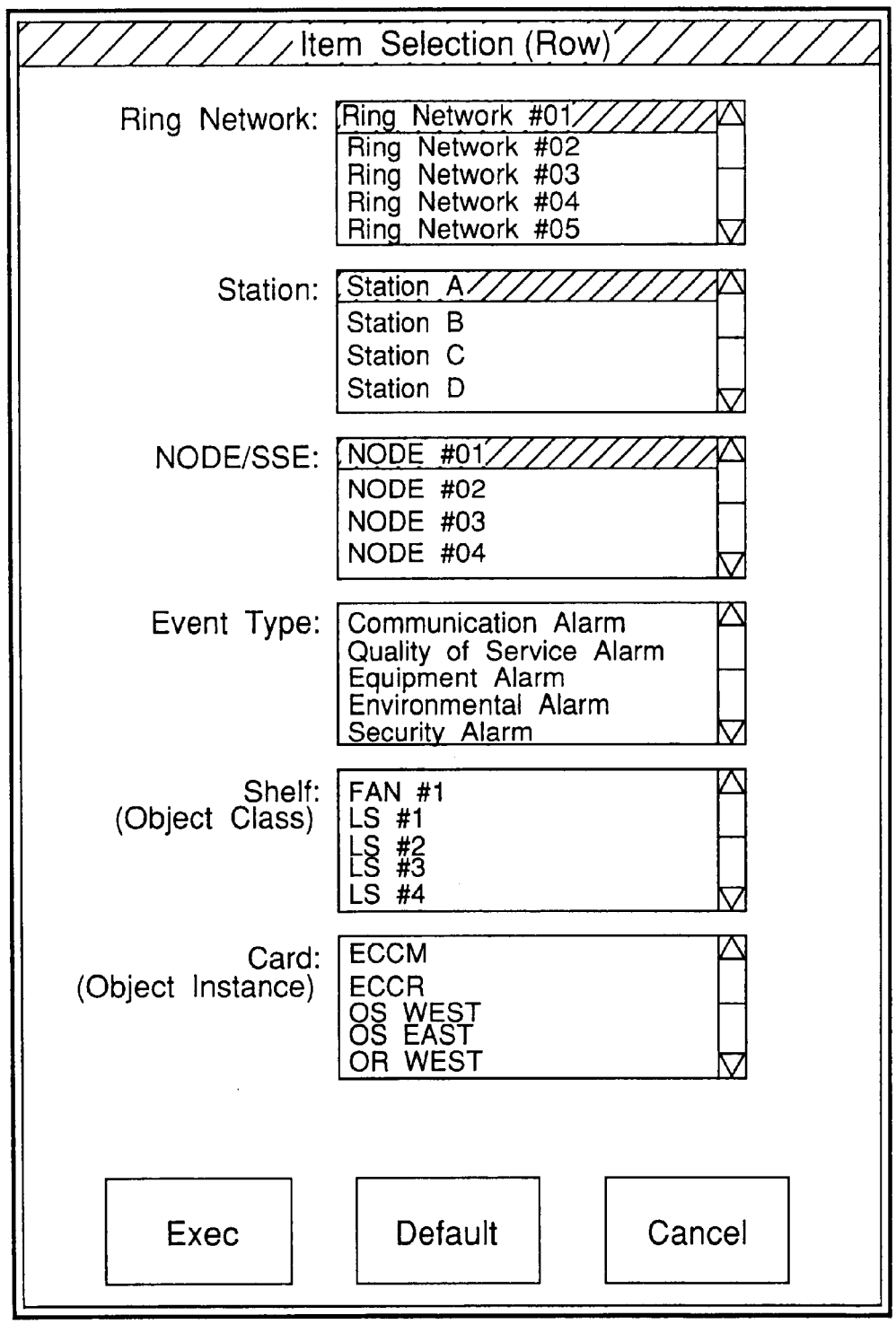
FIG. 7 is a view showing an Item Selection (Row) window.

There are two buttons indicated as Item Selection in the FIG. 6 window. That is, there are a Row button and a Column button. Of these buttons, when the Row button is clicked, an Item Selection (Row) window shown in FIG. 7 is displayed. This window is used for filtering in the display area in FIG. 6.

A plurality of scroll windows for specifying attributes of each item are displayed in the FIG. 7 window. After items shown in each scroll window are arbitrarily selected (selected lines are displayed inverted), when the Exec button is clicked, the content of each item is filtered based on the result of above-described selection. Then, display of the screen returns to the FIG. 6 window, and only the filtered content is displayed.

Furthermore, the Cancel button is displayed in the window shown in FIG. 7. When this Cancel button is clicked, setting is aborted. Moreover, a Default button is displayed in the FIG. 7 window. When this Default button is clicked, the set content is returned to the initial state (that is, the state that all the attributes of each item are selected).

Subsequently, when the Column button is clicked in FIG. 6, an Item Selection (Column) window shown in FIG. 8 is displayed. This window is used for changing the order of the displayed contents in FIG. 6 (sorting). As set items in the FIG. 8 window, there are (Common Item), (Alarm Notification), (State Change Notification), (Protection Switch Reporting Notification), and (Security Alarm Notification). A numeric figure indicative of the priority is shown on the right-hand side of each of these items. In FIG. 8, 1, 2, 3, 4 and 5 are shown from the left (Common Item) in the mentioned order.

That is, the items displayed in the item area in FIG. 6 are sequentially displayed from the left in accordance with the priority. Of course, the contents displayed in the display area also move in the right and left directions in accordance with the order of display of the items. This priority can be freely changed in the window shown in FIG. 8.

In addition, a check box is provided for each item in FIG. 8. Checking this check box can display only the checked item in the FIG. 6 window.

Incidentally, after each item is set in the FIG. 8 window, when the Exec button is clicked, the set content is validated, and the display format in FIG. 7 is changed. When the Cancel button shown in FIG. 8 is clicked, the operation using the FIG. 8 window is aborted, and the window shown in FIG. 8 is closed.

Figure 9:
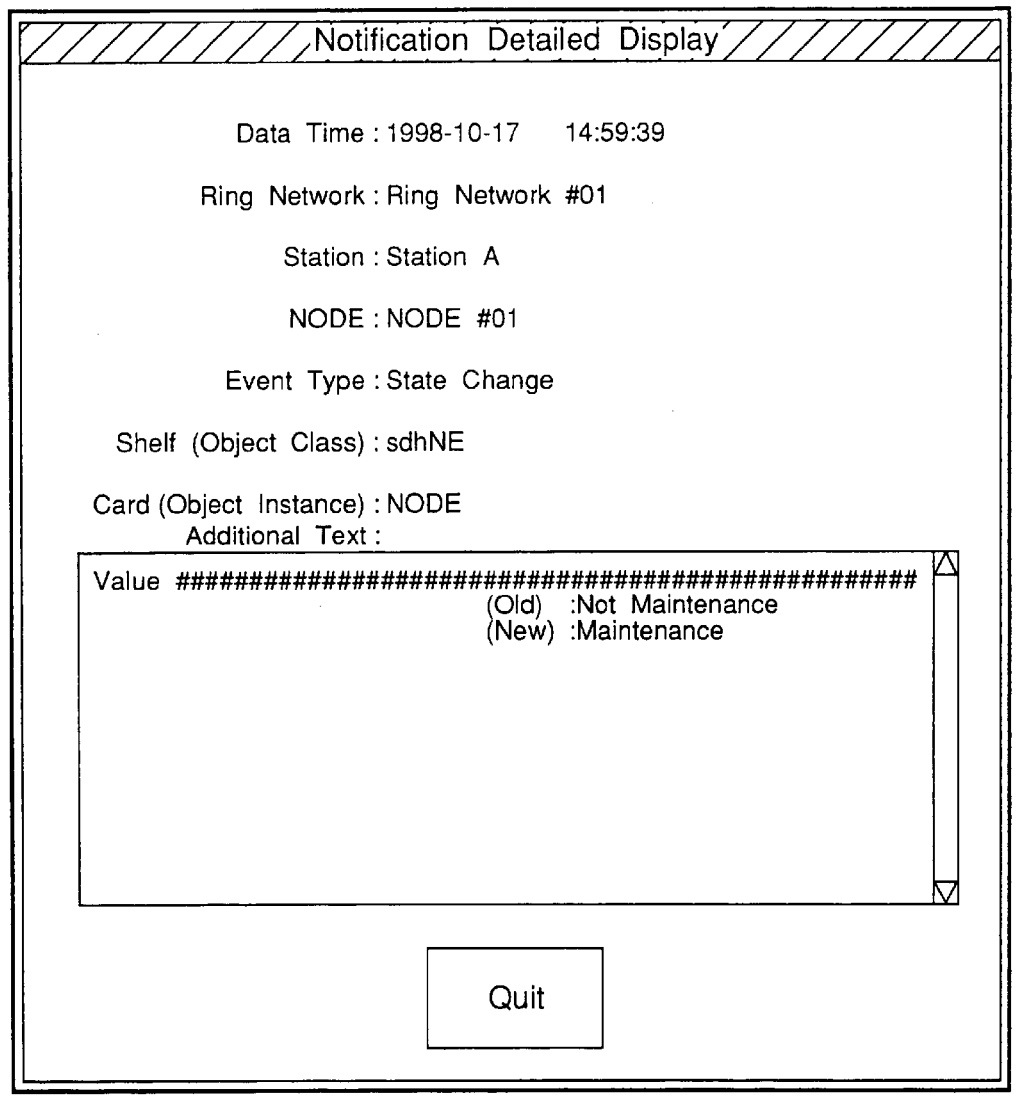
FIG. 9 is a view showing a Notification Detailed Display window.

Subsequently, when a specific line (for example, the second line from the top) in the display area is selected (clicked) in FIG. 6, a Notification Detailed Display window in FIG. 9 is displayed. This window displays the further detailed content of the notification information of the selected line in the text format. As a result, the further detailed information can be displayed in the clearly understandable manner in accordance with individual notification information. Additionally, although there are some specific events which cannot be shown in FIG. 6, all the information can be displayed without omission by using the FIG. 9 window.

Figure 10:
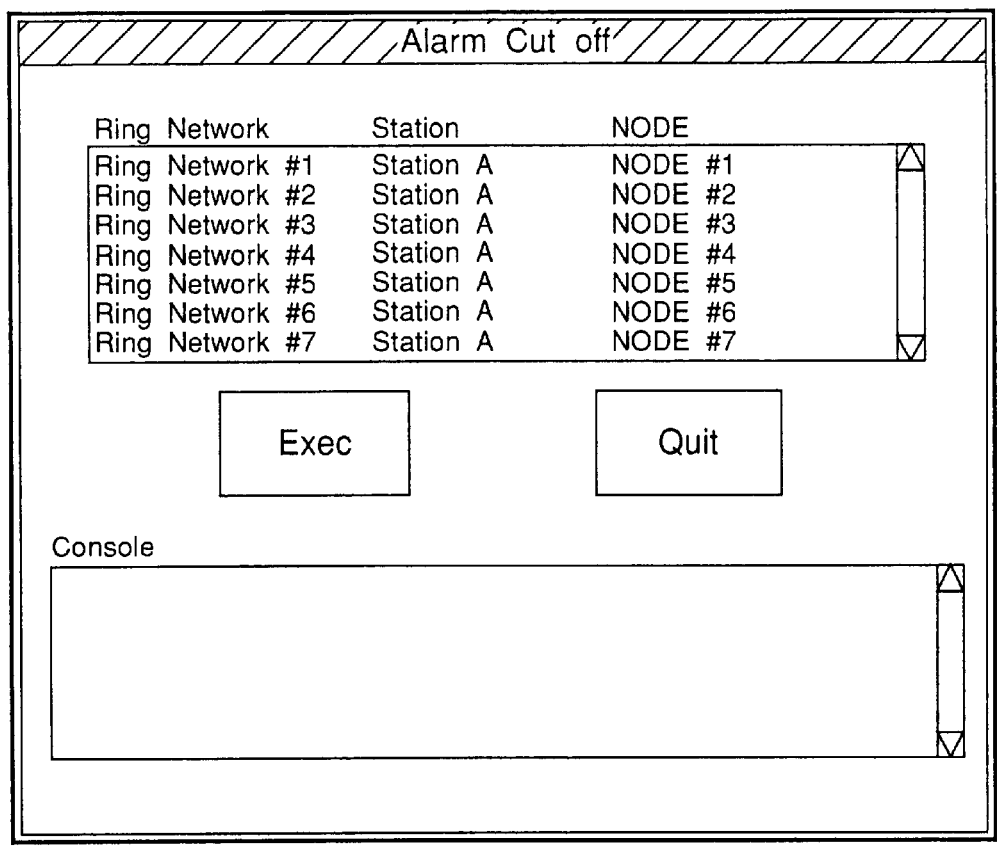
FIG. 10 is a view showing an Alarm Cut Off window.

Description will now be given as to a window displayed when an ACO (Alarm Cut Off) button is clicked in FIG. 6. When the ACO button in FIG. 6 is clicked, the Alarm Cut Off window in FIG. 10 is displayed. This window is a window used for selecting and specifying a NODE which should not accept the alarm notification (mask the alarm notification) among the NODEs which are the supervisory targets of the U-NME 3.

The window shown in FIG. 10 includes two scroll windows. All the NODEs which are the supervisory targets of the U-NME 3 at the present time are displayed in one scroll window (upper part in FIG. 10). When the Exec button is clicked after an arbitrary NODE is selected in this window, the setting for masking reception of the alarm is enabled for the selected NODE.

When the Quit button is clicked in the FIG. 10 window, the operation using this window is terminated, and the window shown in FIG. 10 is closed. Further, the content of accessing the selected NODE is displayed as, e.g., OK or NG (No Good) in the other scroll window (Console).

Figure 11:
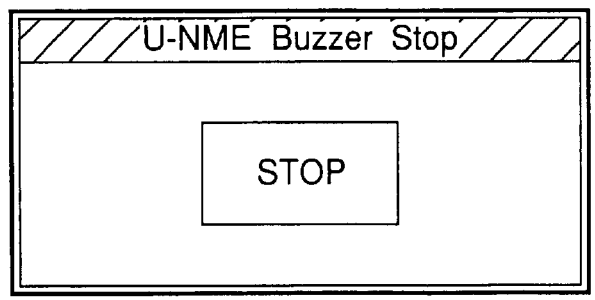
FIG. 11 is a view showing an U-NME Buzzer STOP window.

An U-NME Buzzer STOP window shown in FIG. 11 will now be described. In the U-NME 3, when a predetermined notification is received from the NODE, the buzzer 322 is sounded so that a user can be informed of reception of the notification. The FIG. 1 window is a window for stopping the sound of the buzzer 322. That is, when the STOP button shown in FIG. 11 is clicked, the sound of the buzzer is stopped, and this window is closed. Types of the notification to which the buzzer 322 should react and be sounded are set in a next HMI (Human Machine Interface) Property window shown in FIG. 12.

Figure 12:
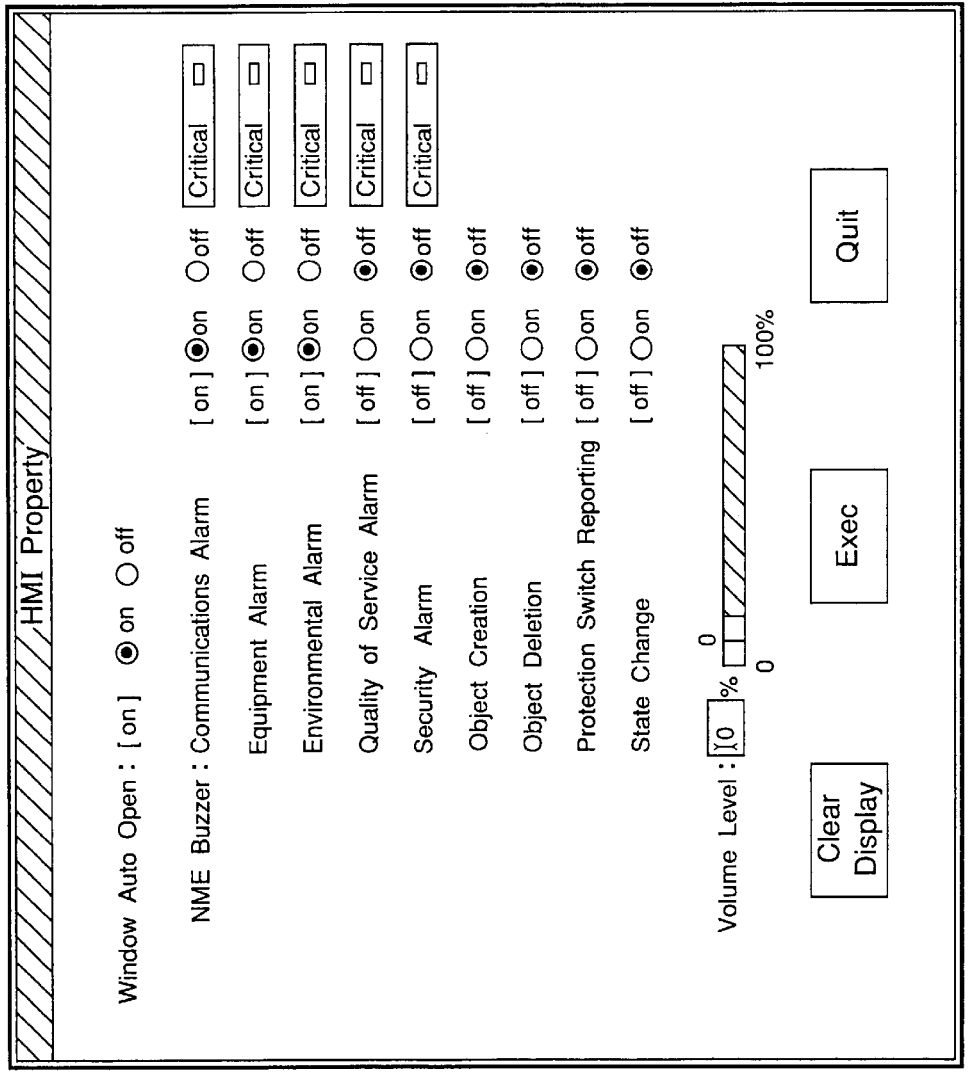
FIG. 12 is a view showing an HMI Property window.

The HMI Property window shown in FIG. 12 will now be explained. The HMI Property window depicted in FIG. 12 is displayed when the HMI Property button shown in FIG. 6 is clicked. This window is used for setting conditions for sounding the buzzer 322 and conditions for displaying the FIG. 11 U-NME Buzzer STOP window.

In the FIG. 12 window is provided a radio button for setting whether the Notification Display window shown in FIG. 6 is automatically opened as "Window Auto Open". If ON is checked by this radio button, when the notification is received from any NODE, the FIG. 6 Notification Display window is automatically opened (popped up).

Moreover, a radio button for specifying On/Off is displayed as the NME Buzzer in the FIG. 12 window in accordance with each event from the Communications Alarm to the State Change. By specifying On or Off by each radio button, it is possible to set conditions under which the buzzer 322 is sounded in accordance with each designated event. For example, in the FIG. 12 window, three events, i.e., the Communications Alarm, the Equipment Alarm and the Environmental Alarm are in the ON state. In this set state, only when the information of occurrence of any of these events is notified from any NODE, the buzzer 322 of the U-NME 3 is sounded.

Furthermore, in FIG. 12, the importance levels of the events Communications Alarm to Security Alarm can be specified. In FIG. 12, "Critical" (most important) is specified for all the events. When an event type with the highest importance level among the respective event types is notified, the buzzer 322 is sounded. That is, in the setting in FIG. 12, when any of the Communication Alarm on the Critical level, the Equipment Alarm on the Critical level and the Environmental Alarm on the Critical level is notified, the buzzer 322 is sounded.

When the Exec button is clicked in the FIG. 12 window, each setting mentioned above is enabled. Moreover, when the Quit button depicted in FIG. 12 is clicked, the setting operation is aborted, and the FIG. 12 window is closed.

Besides, in the window in FIG. 12, the volume level (Volume Level) of the buzzer 322 can be set in a range of 0 to 100%.

In addition, a Clear Display button is displayed in the FIG. 12 window. This button is used for clearing the display content of the Notification Display window illustrated in FIG. 6. That is, the items are accumulatively displayed in the display area in FIG. 6 every time an event is generated. If this remains untouched, it disadvantageously takes a time for user to reach desired information by scrolling the screen.

Thus, when the Clear Display button is clicked and the content in the display area in FIG. 6 is cleared from the screen, the above-described disadvantage can be eliminated.

Incidentally, even if the display content in FIG. 6 is cleared, the notification data stored in a data base (for example, a predetermined storage area in the hard disk 35) of the U-NME 3 is not erased but kept being accumulated.

(Alarm Summary Display)

Description will now be given as to an Alarm Summary function for setting display of the occurrence statuses of alarms or display conditions of alarms.

A window which is displayed when the Alarm Summary button shown in FIG. 3 is clicked will be explained. When the Alarm Summary button is clicked, a Network Alarm Summary Display window depicted in FIG. 13 is displayed. This window displays statuses of occurrence of alarms in the system shown in FIG. 1 in the text format and by graphical images. In FIG. 13, a position where an alarm is generated, an expected cause (Probable Cause), and an importance level (Severity) are displayed in the text format in accordance with each generated alarm. This window displays a position where an alarm is generated in detail. For example, this window displays which Ring Network, which Station, which NODE, which Shelf and which Card (board) caused the alarm.

A first characteristic of the FIG. 13 window is that a plurality of tabs are displayed and one of a plurality of the ring networks can be selected in association with each tab. That is, when any of a plurality of the tabs displayed on the left side of the window is clicked, one of the 32 ring networks is selected. It is to be noted that an ALL tab is selected in FIG. 13. When this tab is clicked, data concerning all the ring networks is displayed in the text format as shown in FIG. 13.

A second characteristic of the FIG. 13 window is that a tab corresponding to the ring network in which a failure exists is displayed in a color different from those of other tabs. For example, a display color of a tab corresponding to the ring network without a failure is green, and a tab corresponding to the ring network having a failure is displayed in red. It is to be noted that a color of the tab may be changed in accordance with a level of a failure. FIG. 13 shows a tab whose color is different from those of tabs of other types by hatching. FIG. 13 shows that failures are generated in the Ring Network #01, the Ring Network #02 and the Ring Network #14.

Figure 14:
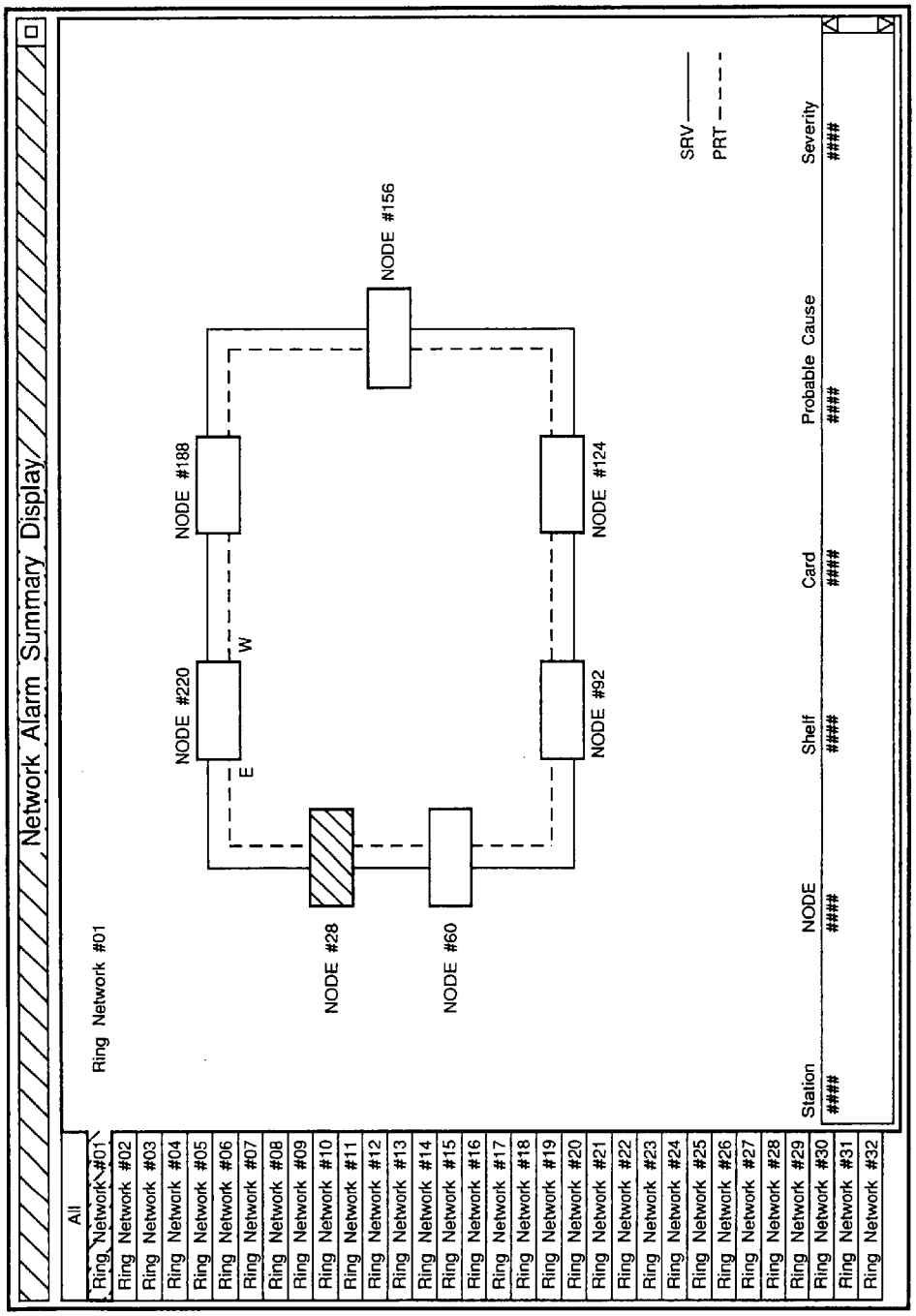
FIG. 14 is a view showing the state of a screen displayed when a Ring Network #01 tab is clicked in FIG. 13.

In FIG. 13, when the Ring Network #01 tab is clicked, display in the window is as shown in FIG. 14. This drawing typically shows a structure of the Ring Network #01. In FIG. 14, each square corresponds to the NODE, and lines connecting these NODEs correspond to the transmission paths. A working system (Service: SRV) transmission path is indicated by a solid line, and a preliminary system (Protection: PRT) transmission path is indicated by a dotted line.

In FIG. 14, the Ring Network #01 tab is displayed in red (hatching) and a message that a failure exists in the Ring Network #01 is displayed. In addition, a display color of the NODE #28 is different from those of other nodes (for example, it is displayed in red), and a message that a failure exists in this node is displayed. Incidentally, when there is a failure in the transmission path, a display color of that transmission path is different from those of other transmission paths. By displaying in this way, a user can easily grasp a position of a failure at a glance. Additionally, the status of a failure in the Ring Network #01 is displayed in the FIG. 14 window in the text formant. That is, the window depicted in FIG. 14 displays information obtained by taking out a part concerning the RING Network #01 in the text display section in FIG. 13. It is to be noted that E and W shown in the vicinity of the NODE #220 in FIG. 14 mean East and West, respectively. The term East used herein means the counterclockwise direction (Counter Clockwise: CW) seen from each Node and the term West means the clockwise direction (Clockwise: CW) seen from each Node, respectively.

Figure 15:
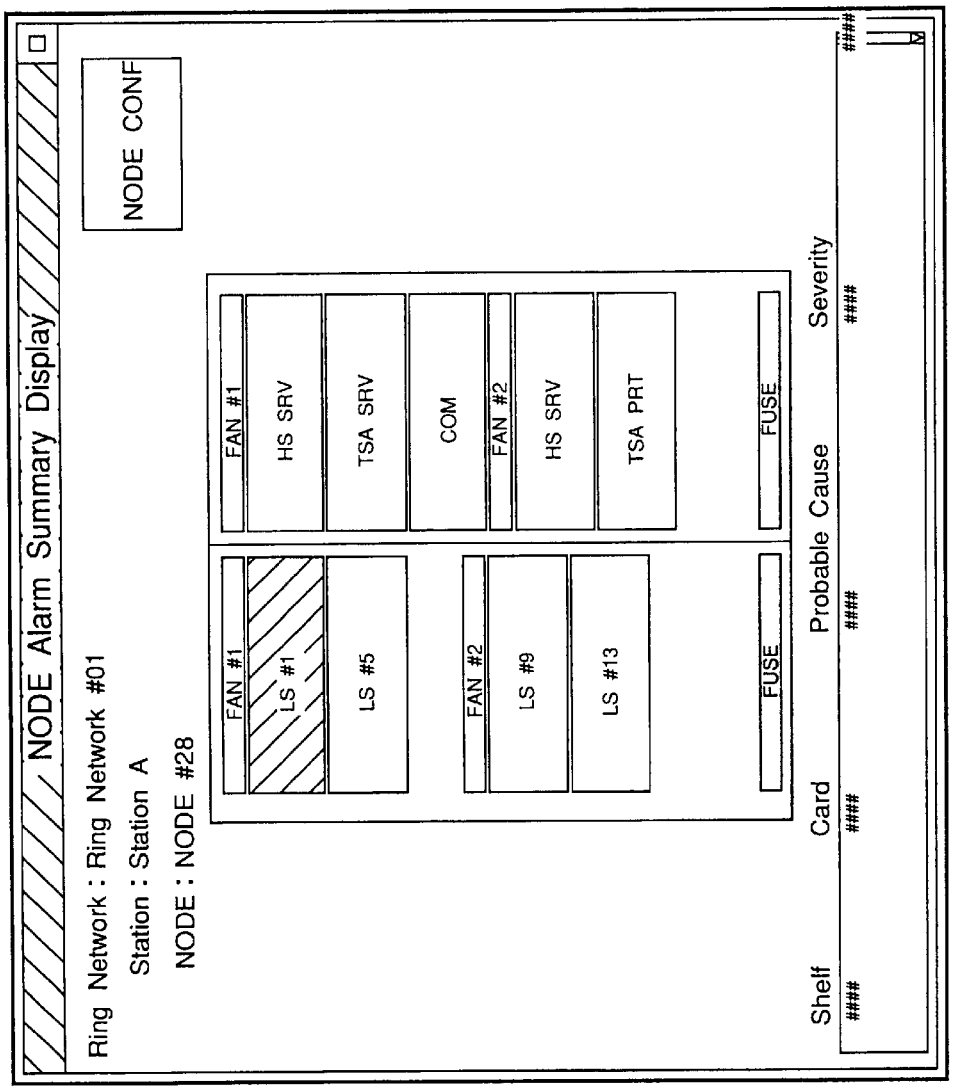
FIG. 15 is a view showing a Node Alarm Summary Display window.

When the NODE #28 is clicked from the window depicted in FIG. 14, a NODE Alarm Summary Display window shown in FIG. 15 is displayed. This window typically shows a shelf structure of the NODE selected in the FIG. 14 window. In FIG. 15, the structure of the NODE #28 is displayed. In FIG. 15, a display color of the low-speed side shelf #1 (LS #1) is different from those of other shelves (hatching part: it is actually displayed in red and the like). This means that a failure is generated in the LS #1 shelf.

Figure 16:
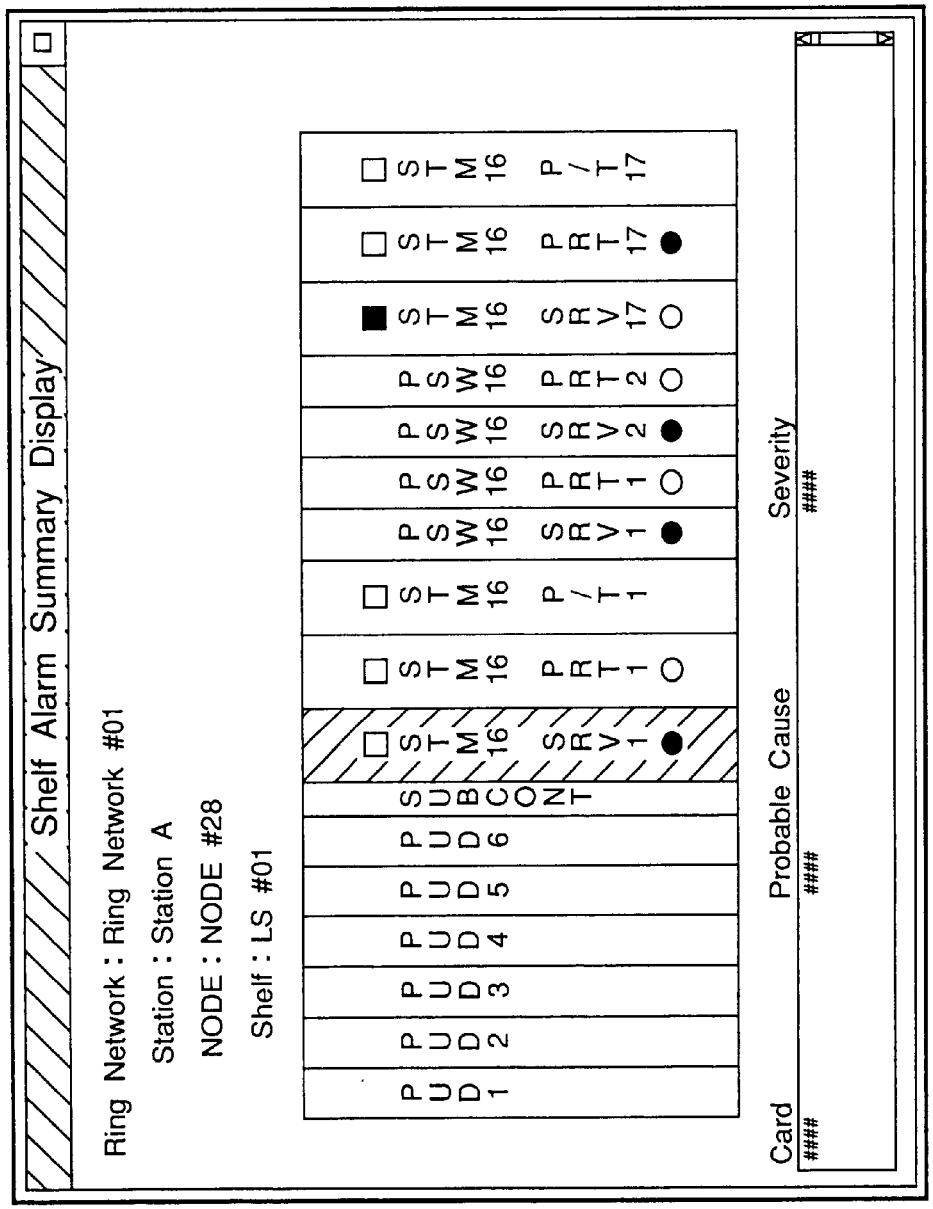
FIG. 16 is a view showing a Shelf Alarm Summary Display window.

When the LS #1 shelf is clicked in FIG. 15, the Shelf Alarm Summary Display window in FIG. 16 is displayed. This window schematically shows a structure of the shelf clicked in FIG. 15. FIG. 16 shows the state that various kinds of cards (boards) are mounted in a single horizontal row in the LS #1 shelf of the NODE #28. A name of each card is shown by a brevity code to a square indicative of each card.

In FIG. 16, there are squares with a character STM-16 being shown. These squares correspond to cards for inputting and outputting signals STM-16. Among these squares, a square indicative of a card STM-16 SRV1 is displayed in a color different from those of other squares (hatching part). This means that the Equipment Alarm (board failure) is generated in that card. In this case, since a failure is generated in this card itself, this board must be repaired or replaced.

On the other hand, in FIG. 16, a solid square mark (■) is shown on the STM-16 SRV17 card. This means that the Communications Alarm (transmission path failure) is generated in the STM-16 SRV17 card. That is, if the square mark is red (■ in FIG. 16), it is indicated that the Communications Alarm is generated. If the square mark is green (□ in FIG. 16), it is indicated that the Communications Alarm is not generated.

The Communications Alarm (transmission path failure) means a failure generated in the transmission path connected to the card. Therefore, in a case shown in FIG. 16, the transmission path connected to the STM-16 SRV17 card must be changed.

Further, in FIG. 16, there are squares having a mark (○) or (●) under a name of each card. This mark simulates an LED (light emitting diode), and a use condition of the board can be distinguished by the color of this mark. For example, when the mark is green (○ in FIG. 16), it is indicated that this board is used. If the mark is red (● in FIG. 16), it is indicated that this board is not used.

As described above, in FIG. 16, the color of the square indicative of the card can signify the presence/absence of the Equipment Alarm (board failure). Furthermore, in FIG. 16, a color of a small square mark added to the square indicative of the card shows that the Communication Alarm (transmission path failure) is generated. Moreover, in FIG. 16, whether the board is used can be distinguished by the color of the mark (○).

As a result, a user can grasp the detail of the state of the card at a glance.

A station Alarm Summary Display window depicted in FIG. 17 will now be described. In FIG. 3, this window is displayed when the station icon (○) is clicked by the left button of the mouse. This window displays all the NODEs belonging to the clicked station as icons (which will be referred to as node icons hereinafter) together with identification numbers.

Figure 19:
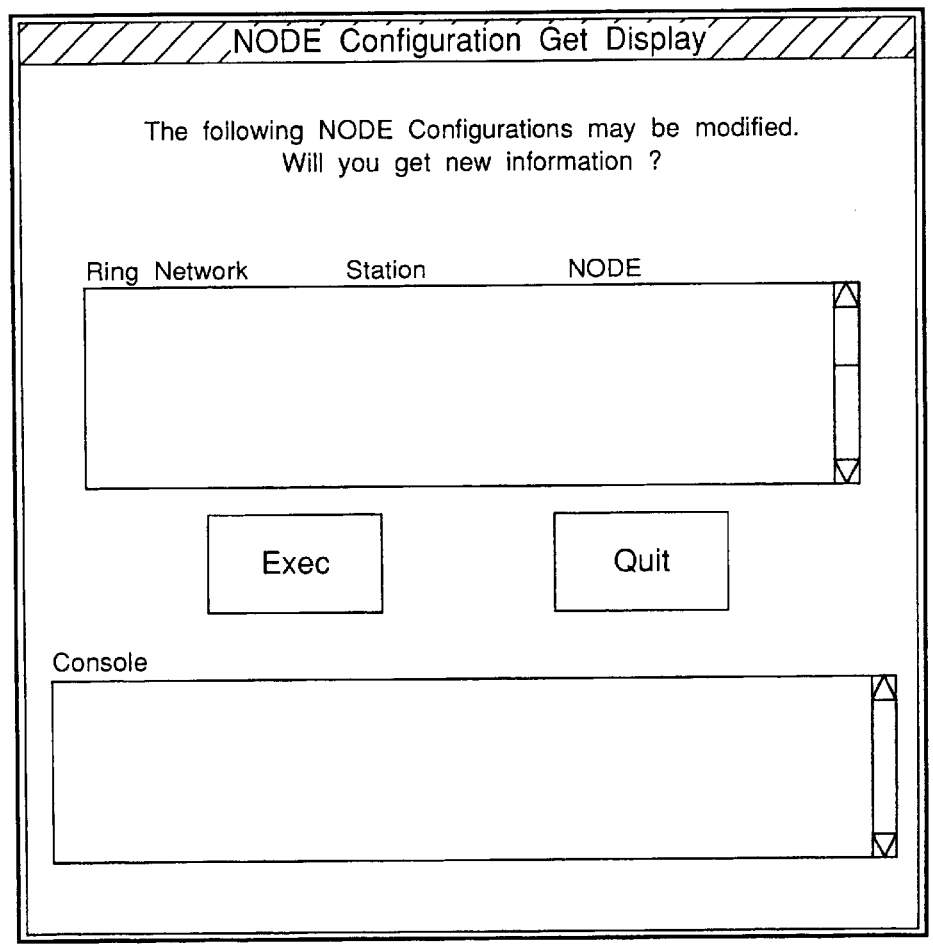
FIG. 19 is a view showing a NODE Configuration Get Display window.

Description will now be given as to a window displayed when a NODE CONF button shown in FIG. 15 is clicked. In FIG. 15, when the NODE CONF button is clicked, a NODE Configuration Get Display window illustrated in FIG. 19 is displayed. This window is used for acquiring new configuration information after the configuration of each NODE has been changed. The configuration information of the NODE includes configuration information of a shelf or information indicative of the mounting state of a card mounted to a slot of each shelf. The information indicating the mounting state of the card includes information indicative of whether each card is correctly mounted or erroneously mounted, whether there is a slot to which no card is mounted, or which slot if such a slot exists.

The FIG. 19 windows shows a message "The configuration information (configuration) of the following NODE has been changed. Do you want to acquire new information?". As a result, a user is urged to acquire the new configuration information. Furthermore, two scroll windows are displayed in the window depicted in FIG. 19. Names of all the NODEs whose configuration information has been changed are displayed in one scroll window.

When the Exec button in FIG. 19 is clicked, the procedure for reading the configuration information is executed with respect to each of the NODEs displayed in the above-described scroll window. When the Quit button is clicked, reading of the configuration information is aborted, and the window shown in FIG. 19 is closed. The result of communication between the NODE which has been accessed in order to get the configuration information and its own apparatus (U-NME) is displayed in another scroll window (Console).

Incidentally, the fact that the configuration information has been changed is notified from the NODE side, the window shown in FIG. 19 is usually automatically displayed (popped up). However, the NODE sometimes cannot inform the U-NME 3 of the fact that the configuration information has been changed for some reason. In such a case, the window shown in FIG. 19 cannot be popped up. Thus, by enabling active acquisition of information from the U-NME 3 side to the NODE by using the NODE CONF button, the information indicating that the configuration information has been changed can be fully acquired.

Incidentally, since there are multiple NODEs, a plurality of windows NODE Alarm Summary Display (FIG. 15) may be superposed and displayed in some cases. With a number of the opened windows shown in FIG. 15 reaching a maximum number, when the operation for opening an additional window is carried out, the CAUTION window showing a message "exceeding a maximum simultaneous activation number" is displayed.

[Another Method for Displaying Occurrence Status of Alarm]

Description will now be given as to another method for displaying the occurrence status of the alarm.

FIG. 3 shows that any failure is generated in the Station A. Then, when the Station A icon is clicked by the left button of the mouse, the window shown in FIG. 17 is displayed. A plurality of node icons are displayed in this window. Among these node icons, the icon #28 is displayed in a display color (hatching part) different from those of other icons.

When the #28 icon is clicked, the FIG. 15 window is opened. Subsequently, a position where a failure is generated is specified in the manner similar to the above. It is to be noted that a scroll window for displaying the state of a failure in the text format is provided in the FIG. 17 window.

Figure 17:
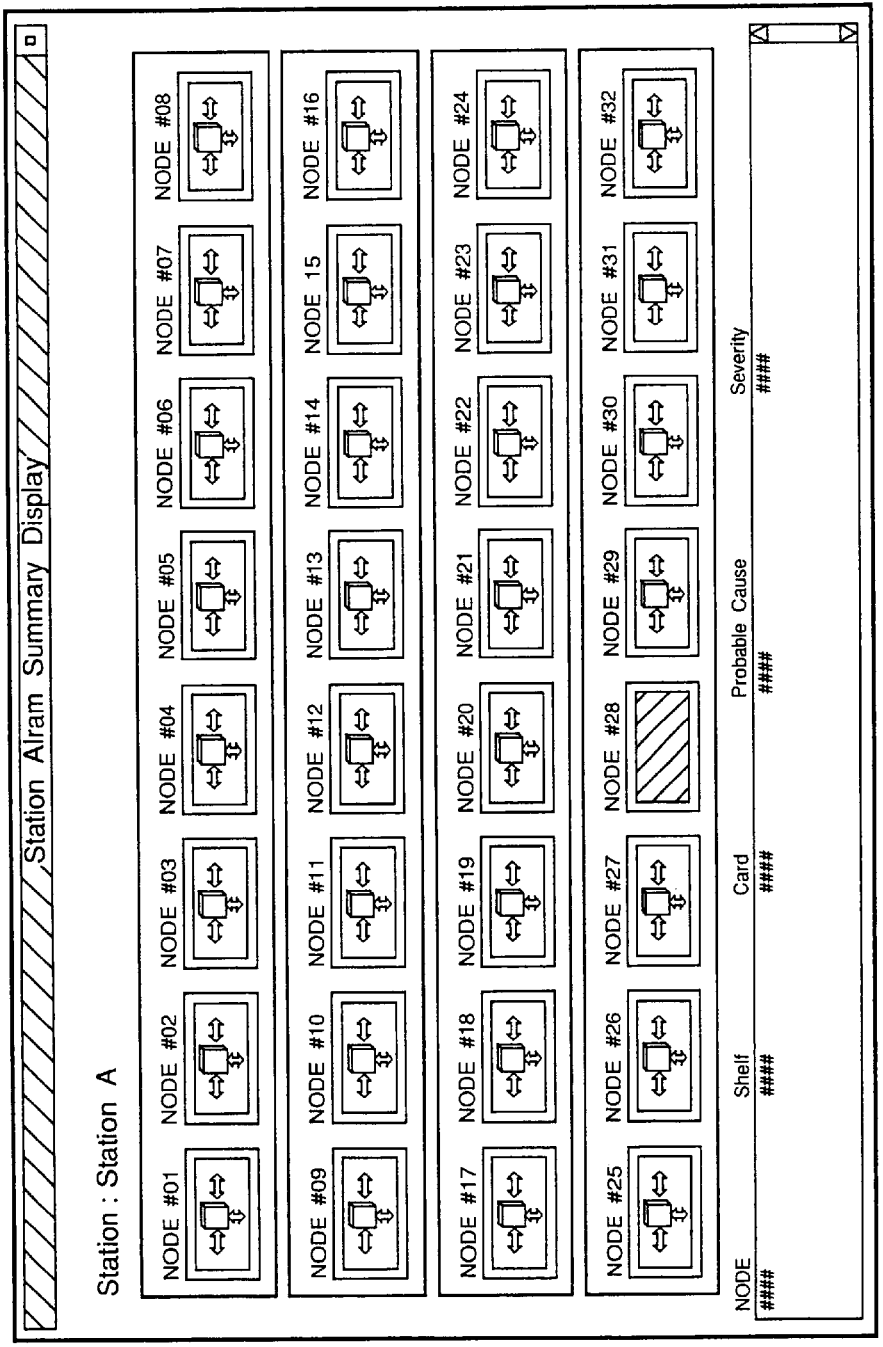
FIG. 17 is a view showing a Station Alarm Summary Display window.

By providing the FIG. 17 window, the procedure to reach the window of FIG. 16 can be shortened as compared with the case in which the operation is sequentially carried out from the Alarm Summary button shown in FIG. 3. As a result, the labor of a user can be reduced.

Figure 18:
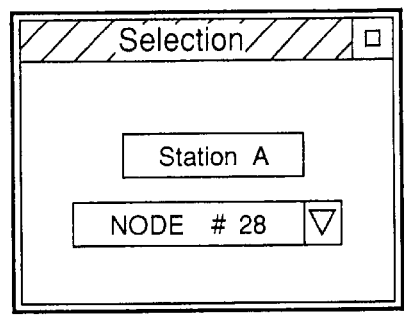
FIG. 18 is a view showing a Selection window.

With reference to FIG. 3, description will now be given as to a window which is displayed when any station icon is clicked by the right button of the mouse. In FIG. 3, for example, when the icon of the Station A is clicked by the right button of the mouse, a Selection window shown in FIG. 18 is displayed. This window is used for selecting the NODEs belonging to the clicked Station A.

In the FIG. 18 window, when an inverted triangle on the right horizontal side indicated as NODE #28 is clicked, names (identification numbers) of all the NODEs belonging to the Station A are displayed in the pull-down menu mode. For example, when the NODE #28 is selected from this menu, the window shown in FIG. 15 is opened. As described above, by enabling selection of the nodes in the menu mode, the procedure to reach the window of FIG. 16 can be further shortened.

In particular, the Selection window shown in FIG. 18 is effective if the node with a failure is known in advance. It is to be noted that a target selected in the above-described menu is stored in, e.g., a memory and applied in the next selection processing. For example, when the icon of the Station A is double-clicked by the left button of the mouse, display of the screen shown in FIG. 3 directly changes to the window shown in FIG. 15 (window selected in the previous time). By doing so, the labor for sequentially carrying out the operation in the respective screens can be further reduced. Moreover, as to the first click operation, a node set by default is selected.

(HS APS Activate Summary Display)

Figure 20:
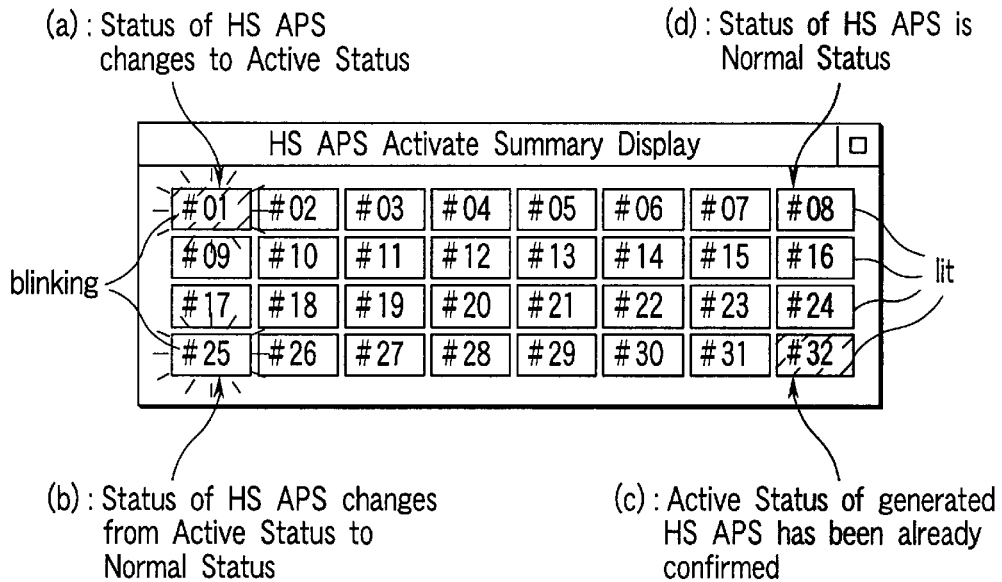
FIG. 20 is a view showing an HS APS Activate Summary Display window.

Description will now be given as to a function when the HS APS Activate Summary button in the main screen shown in FIG. 3 is clicked. When this button is clicked, the HS APS Activate Summary Display window shown in FIG. 20 is displayed. This window is displayed with a plurality of buttons being arranged, and each of these buttons corresponds to each single ring network. #1 to #32 given to the buttons represent identifiers of the individual ring networks.

Each button is displayed in a different color in accordance with the state of the HS APS of the corresponding ring network. The HS APS means an autonomous redundancy switching function (Automatic Protection Switching) for relieving the traffic flowing through the high-speed line OL. It is to be noted that FIG. 20 shows 32 buttons. This means that the U-NME 3 displaying the FIG. 20 window manages all the ring networks. On the contrary, the U-NME 3 managing some of the ring networks displays only the button corresponding to the ring network which a management target in the window in FIG. 20.

In the window of FIG. 20, a button corresponding to the ring network in which the HS APS is not activated is displayed in green (outline mark in the drawing), and a button corresponding to the ring network in which the HS APS is activated is displayed in red (hatching in the drawing). That is, FIG. 20 shows that the HS APS is activated in the #01 and #32 ring networks. It is to be noted that the state in which the HS APS is activated is referred to as (Active Status) and the state in which the same is not activated is referred to as (Normal Status) hereinafter.

Further, in the FIG. 20 window, the display mode of the buttons is changed depending on whether the status of the HS APS is confirmed by a user. That is, in FIG. 20, a button corresponding to the ring network that the status of the HS APS is confirmed by a user is displayed in the lit manner. Furthermore, a button corresponding to the ring network that the status of the HS APS is not confirmed by a user is displayed in the blinking manner. In FIG. 20, the #01 and #25 buttons are displayed in the blinking manner.

Figure 26:
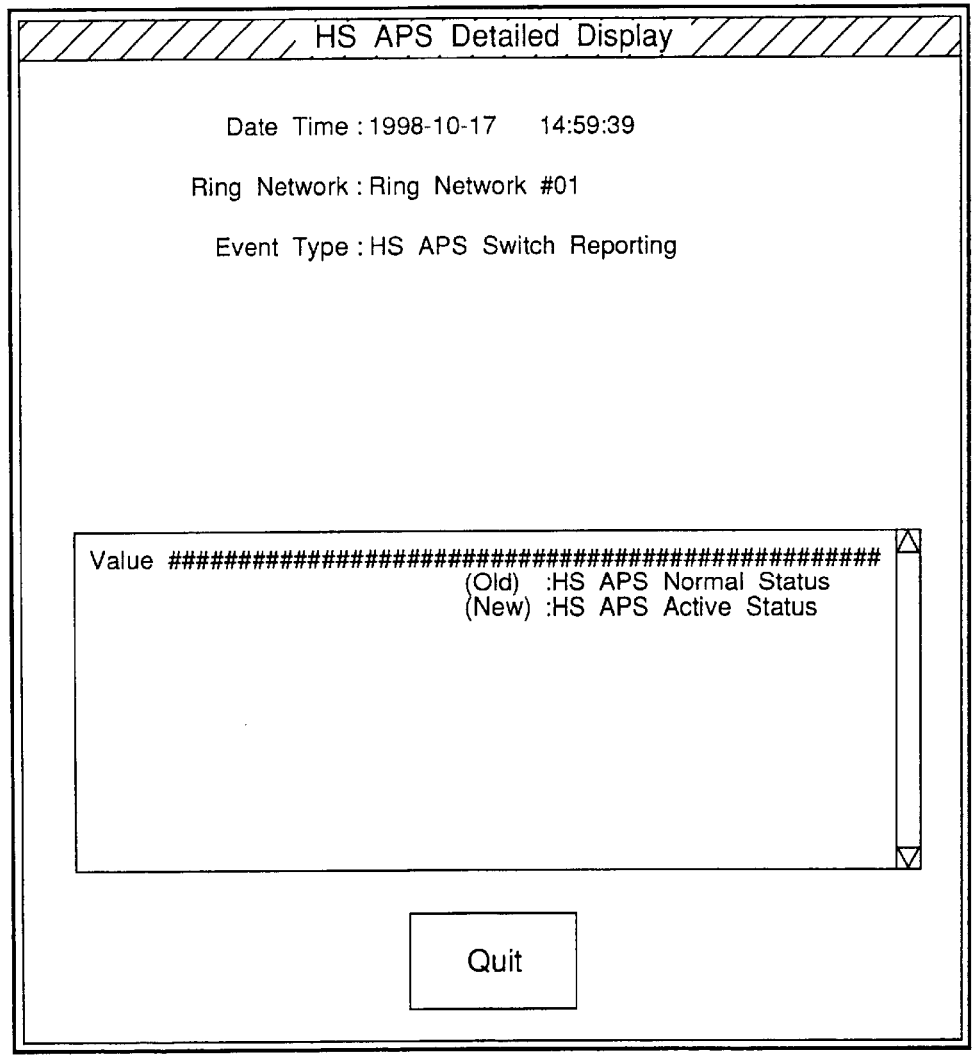
FIG. 26 is a view showing an HS APS Detailed Display window.
Figure 91:
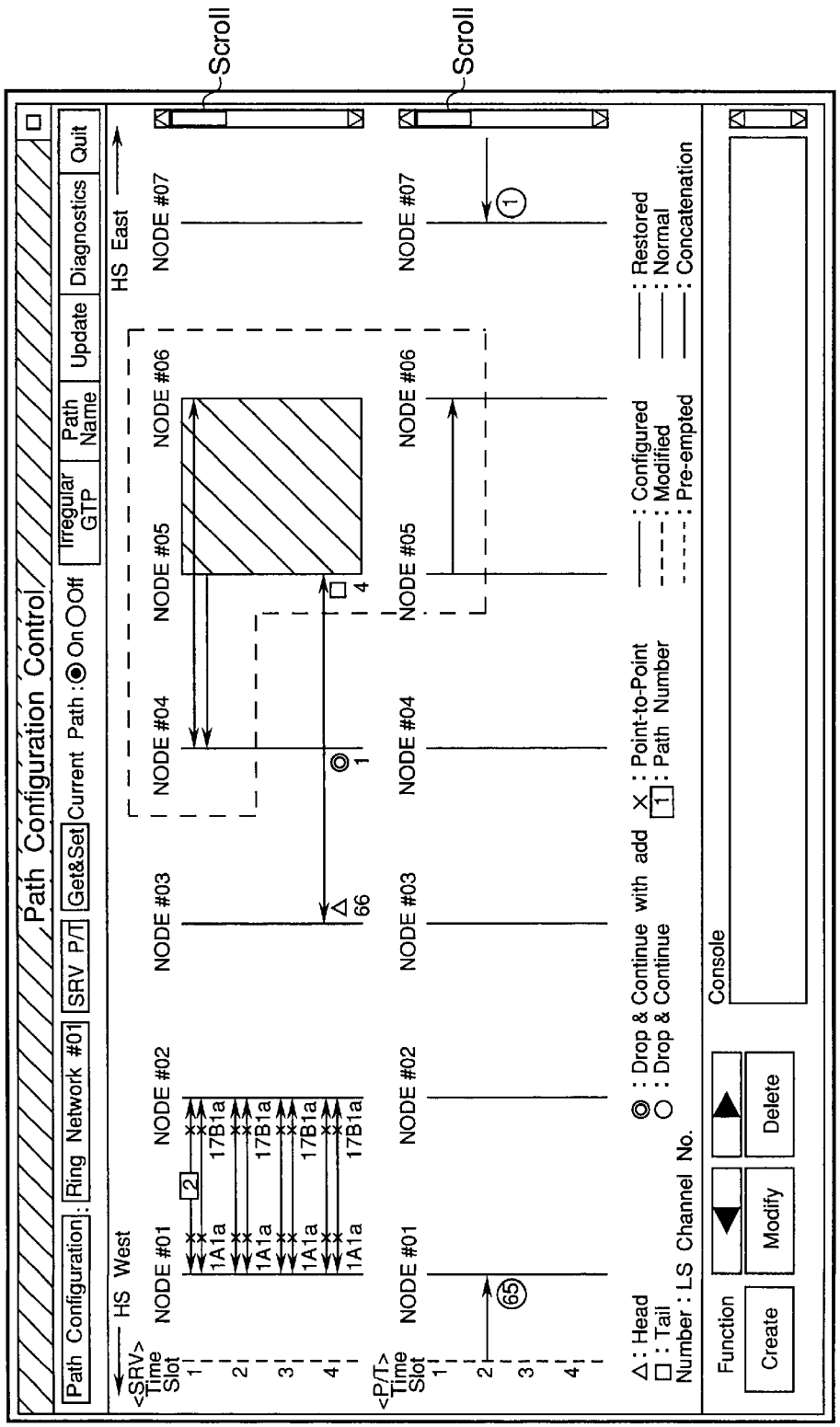
FIG. 91 is a view showing a Path Configuration Control window.

Incidentally, in order for a user to confirm the status of the HS APS, an HS APS Detailed Display window shown in FIG. 26 or a Path Configuration Control window shown in FIG. 91 are used. These windows will be described later.

To sum up, the buttons in the FIG. 20 window have four statuses, i.e., red blinking (a), green blinking (b), red lit (c) and green lit (d). In FIG. 20, the #01 button corresponds to (a), the #25 button corresponds to (b), the #32 button corresponds to (c) and any other button corresponds to (d).

Therefore, FIG. 20 shows that the status of the HS APS of the ring network #01 is newly changed to Active Status and this state is not confirmed by a user. Further, it shows that the status of the HS APS of the ring network #25 is newly changed to the Normal Status and this state is not confirmed by a user.

Furthermore, FIG. 20 shows the status of the HS APS of the ring network #32 is the Active Status and this state has been already confirmed by a user. Moreover, it shows that the HS APS is not activated in any other ring network.

Figure 21:
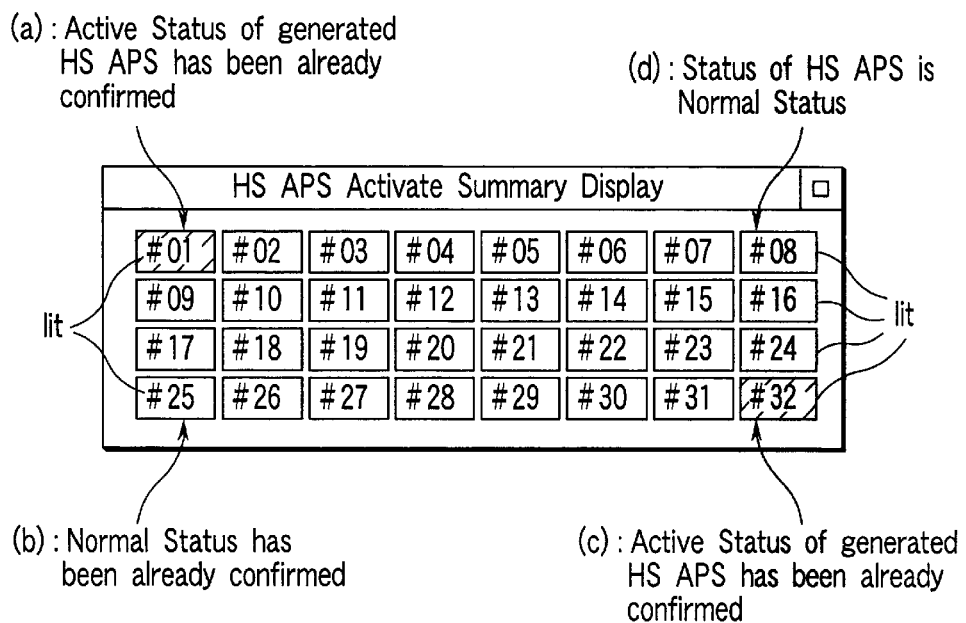
FIG. 21 is a view showing the state that display of the HS APS Activate Summary Display window is switched.

When the button #01 or #25 is clicked in the window shown in FIG. 20, the U-NME 3 regards that the active status of the HS APS in the ring network #01 or #25 has been confirmed. As a result, as shown in FIG. 21, the button #01 or the button #25 is switched from the blinking display mode to the lit display mode.

By such a display mode, distinction between the ring network that the active status of the HS APS has been already confirmed and the ring network that the same is not confirmed can be confirmed at a glance in one window.

It is to be noted that the HS APS Activate Summary Display window is changed in real time and displayed in accordance with the status of the HS APS. For example, when the switching back processing in terms of the HS APS is executed without confirming the status by a user, display of the corresponding button is changed from red blinking to green blinking. In other words, the state of display of each button in this window is changed when the status of the HS APS of the corresponding network varies.

Now, in the HS APS Activate Summary Display window (FIGS. 20 and 21), how each button is displayed is managed by using each table shown in FIGS. 22 to 24. These tables are stored in the memory module 31 or the hard disk 35 of the U-NME 3.

When opening the HS APS Activate Summary Display window, the U-NME 3 gets the activation status of the HS APS from all nodes (or nodes managed by its own apparatus) within the network system. A table shown in FIG. 22 is then created or updated based on information acquired by the U-NME 3 from the nodes.

In the table shown in FIG. 22, a flag "0" is associated with the Normal Status of the HS APS, a flag "1" is associated with the Active Status of the HS APS, and these statuses "0" or "1" are associated in accordance with each node. The activation status of the HS APS is distinguished between the West side and the East side in accordance with each node. The flags in FIG. 22 become "1" when either the West side or the East side is activated in each node.

It is to be noted that the table in FIG. 22 is constantly updated not only when the windows shown in FIGS. 20 and 22 are opened but also when the notification information concerning the HS APS is notified from the node. In short, the table shown in FIG. 22 is updated every time any change occurs in the status of the HS APS.

A table shown in FIG. 23 will now be described. In the table shown in FIG. 23, the content of the table in FIG. 22 is arranged in units of the individual ring networks. The table shown in FIG. 23 has an item representing the activation status of the HS APS and an item representing the status of confirmation by a user. Of these items, the HS APS activation status is used for distinguishing between the networks having the activated HS APS and the networks having the deactivated HS APS among the 32 ring networks. That is, if there is at least one node having the flag "1" in the table shown in FIG. 22, the flag of the HS APS activation status of the ring network to which that node belongs is "1". As shown in FIG. 22, both the ring network #01 and the ring network #32 have the node with the activated HS APS. In accordance with this, the flags of the HS APS active status of the respective ring networks #01 and #32 in the table shown in FIG. 32 are "1".

Moreover, if there is an item indicative of the confirmation status in FIG. 23, the flag "0" or "1" is added in this item in accordance with each ring network. In the confirmation status item, the flag "1" is added only to the ring network in which the status of the HS APS changes and which has not been confirmed by a user in the U-NME 3. The flag "0" indicating that confirmation has been made is added to any other ring network as default. Here, as to the ring network that the status of the HS APS has been confirmed, the flag is rewritten from "1" to "0" each time.

FIG. 24 shows a list of display patterns of the buttons in the HS APS Activate Summary Display window. That is, the button corresponding to the ring network having the HS APS Active Status in the FIG. 23 table is displayed in red in the HS APS Activate Summary Display window. In addition, the button corresponding to the ring network having the HS APS Normal Status in the FIG. 23 table is displayed in green in the HS APS Activate Summary Display window. Additionally, in any status (state), the button corresponding to the ring network whose status has not been confirmed is displayed in the flashing manner. The button corresponding to the ring network whose status has been confirmed is displayed in a lit manner.

It is to be noted that a display color of the button is not restricted to green or red but can be arbitrarily set. The display color of the button is set in a Display Control window shown in FIG. 138 or a Color Selection window shown in FIG. 139. These windows will be described later.

Figure 25:
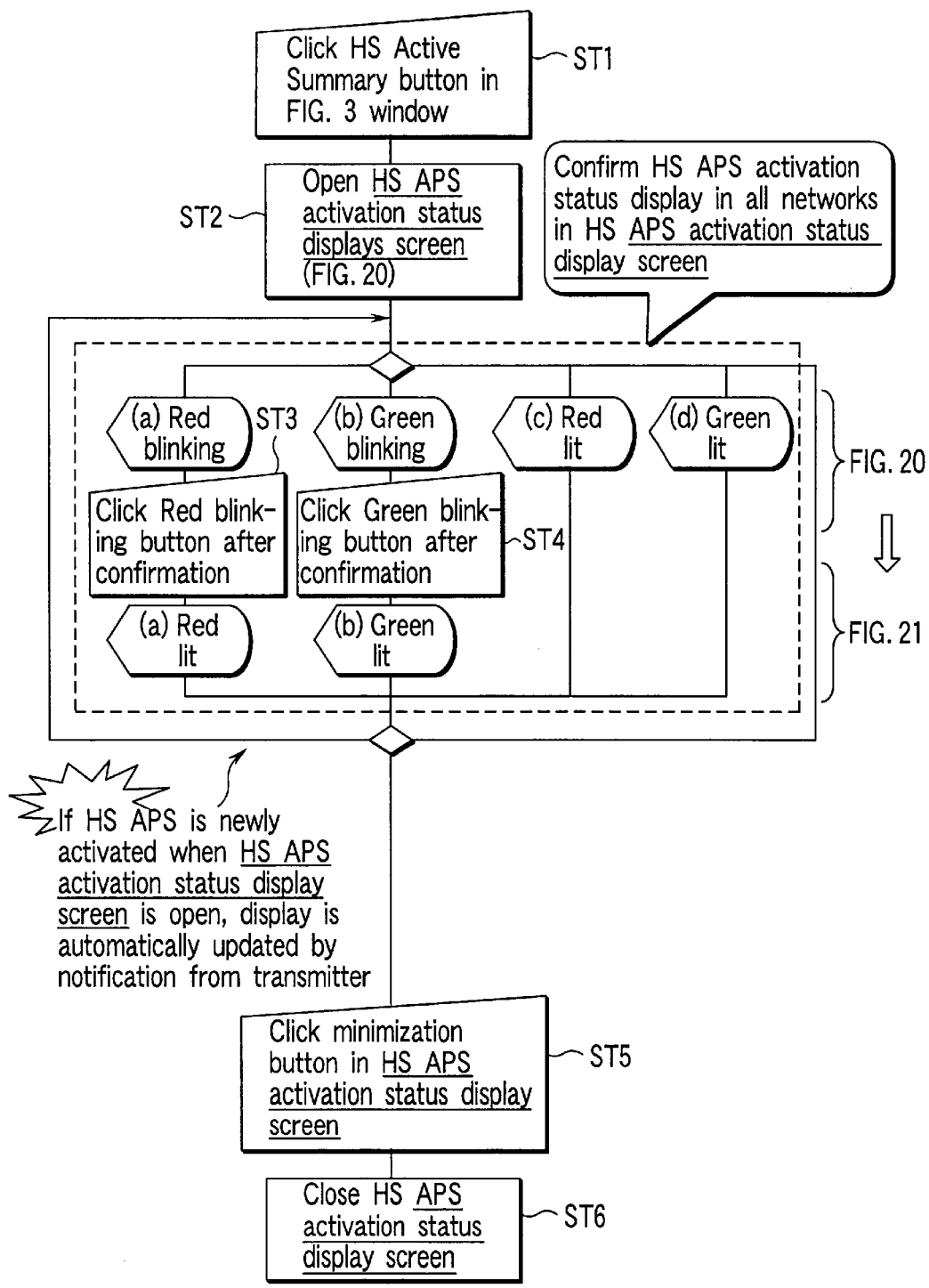
FIG. 25 is a flowchart for illustrating an operation procedure of a network manager (operator) in the HS APS Activate Summary Display window.

The operation procedure performed by a user utilizing the HS APS Activate Summary Display window is shown in a flowchart of FIG. 25. When the HS APS Activate Summary button shown in FIG. 3 is clicked (step ST1 in FIG. 25), the HS APS Activate Summary Display window shown in FIG. 20 is opened (step ST2).

In FIG. 20, in accordance with the activation status of the HS APS, each button is displayed in any mode of red blinking (a), green blinking (b), red lit (c) and green lit (d). In FIG. 20, when the button blinking in Red or the button blinking in Green is clicked after confirming the status of the corresponding ring network, the blinking display is changed to the lit display (steps ST3 and ST4). Incidentally, in the FIG. 20 window, even if the button displayed in the lit manner is clicked, the state of display does not change.

Further, with the FIG. 20 window being displayed, when the HS APS is activated in any node, display of the window that the U-NME 3 has detected activation of the HS APS is updated. At this moment, the contents of the tables shown in FIGS. 22 and 23 are also updated.

If the APS Activate Summary Display window is open, the steps S1 to S4 mentioned above are repeated. When the minimization button displayed in the APS Activate Summary Display window is clicked in this state (step ST5), this window is closed (step ST6).

As described above, providing the APS Activate Summary Display window enables a user to collectively monitor the activation status of the HS APS in the network system. That is, a user can rapidly decide which ring network has the HS APS activated, or whether the HS APS has been already confirmed or not, by referring to the display state of the button.

(Any other Display Mode)

Each button shown in FIGS. 20 and 21 is set to be clickable. By utilizing this fact, the following display can be performed. That is, it is possible to set the system so that a user can directly jump to a window showing the status of the HS APS of the ring network corresponding to a clicked button when this button shown in FIGS. 20 and 21 is clicked. As the window to which a user can jump, there is an HS APS Detailed Display window shown in FIG. 26. Alternatively, a user may jump to a Path Configuration Control window (described later) shown in FIG. 91.

The HS APS Detailed Display window shown in FIG. 26 is displayed when any button in the windows shown in FIGS. 20 and 21 is clicked. The FIG. 26 window shows in detail the activation status of the HS APS in the ring network corresponding to the clicked button in the windows shown in FIGS. 20 and 21 in the text format.

A time at which an event (HS APS in this example) is generated is written in a Date Time section of the window shown in FIG. 26. Further, "Ring Network #1" is written in a Ring Network section of this window, and it can be understood that the HS APS is generated in the ring network #01. Furthermore, "HS APS Switch Reporting" is written in an Event Type section of this window. This means that the U-NME 3 is informed of the notification information "HS APS Switch Reporting".

Moreover, "(Old): HS APS Normal Status" and "(New): HS APS Active Status" are written in the scroll window shown in FIG. 26. This means that the status of the HS APS is changed from Normal Status (Old: old status) to Active Status (New: new status).

(Log Control)

Description will now be given as to functions when the Log button in the main screen of FIG. 3 is clicked. In this chapter, functions concerning management of the log (Log) will be mainly explained. Log means a history having accumulated various notification information generated during operation of the network system. Most of the notification information is generated in the respective nodes 1-1 to 1-n and notified to the U-NME 3 through the SSE 2. Such notification information is stored in the storing means in the SSE 2 or the U-NME 3. Besides, there is notification information generated in the SSE 2 or the U-NME 3.

Figure 27:
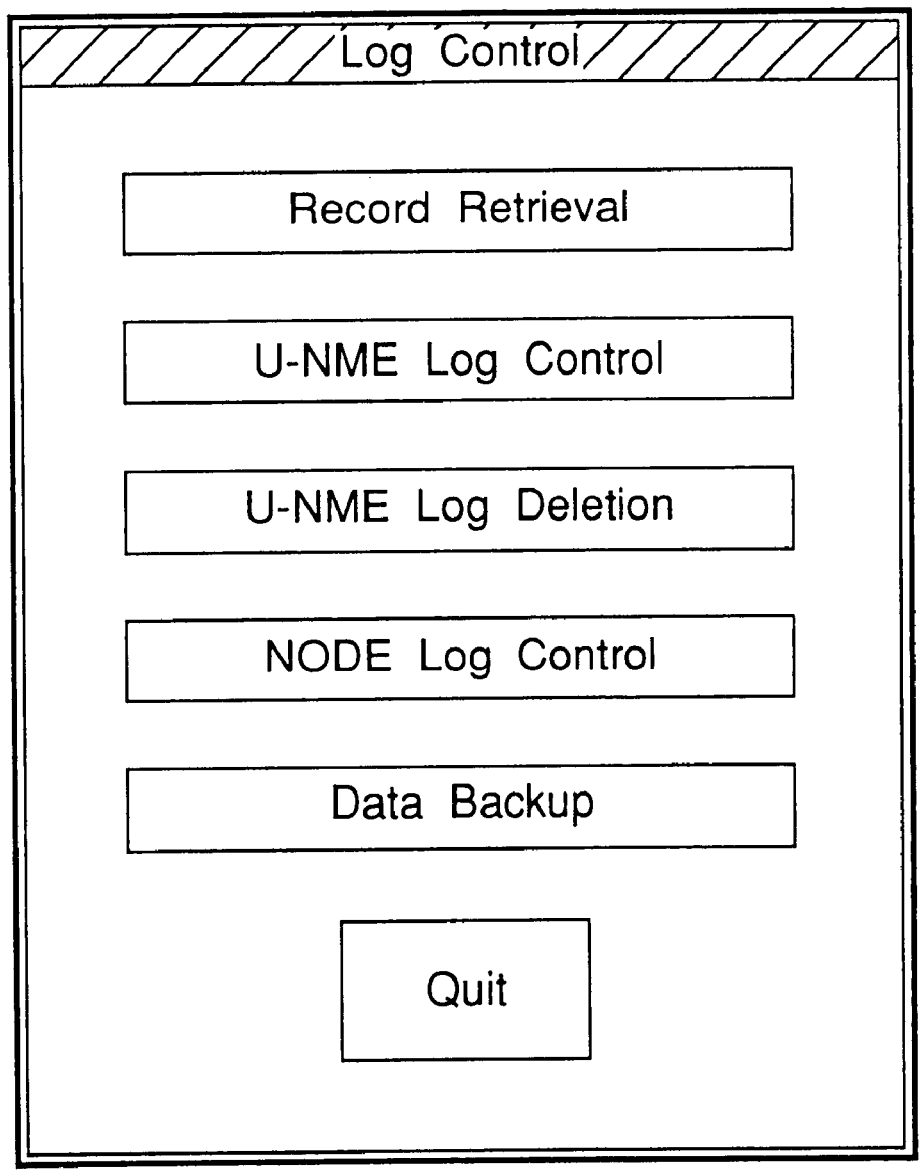
FIG. 27 is a view showing a Log Control window.

When the Log button is clicked in FIG. 3, a Log Control window shown in FIG. 27 is displayed. This window displays clickable buttons, i.e., a Record Retrieval button, an U-NME Log Control button, an U-NME Log Deletion button, a NODE Log Control button, a Data Backup button and a Quit button.

Figure 28:
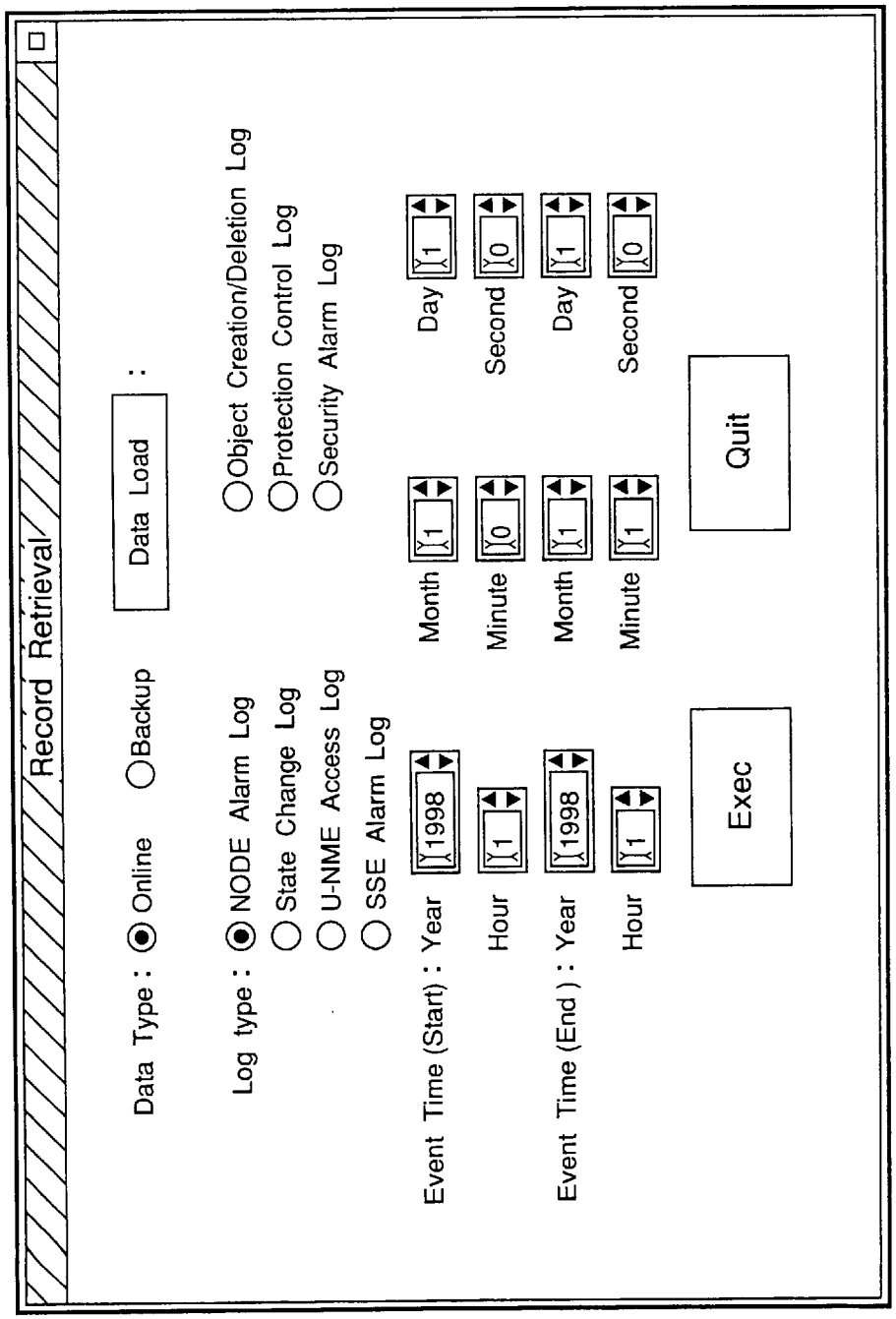
FIG. 28 is a view showing a Record Retrieval window.

When the Record Retrieval button is clicked in the window shown in FIG. 27, a Record Retrieval window shown in FIG. 28 is displayed. The FIG. 28 window is used for retrieving the log stored in the SSE 2 or the U-NME 3. A plurality of items such as (Data Type) are provided in this window in order to set log retrieval conditions.

Data Type is an item for specifying a log data acquisition mode. In this item, either of acquisition modes, i.e., a mode for acquiring the log data online (Online) or a mode for acquiring the log data by reading backup data (Backup) is specified. When the online mode is specified, the log data is retrieved from the data previously stored in the data base (HD 35) in the U-NME 3. When the backup mode is specified, the log data stored in an external medium is loaded to the U-NME 3, and the log data is retrieved from the loaded data. That is, when the backup is specified, the log data is retrieved from the restored data.

Figure 29:
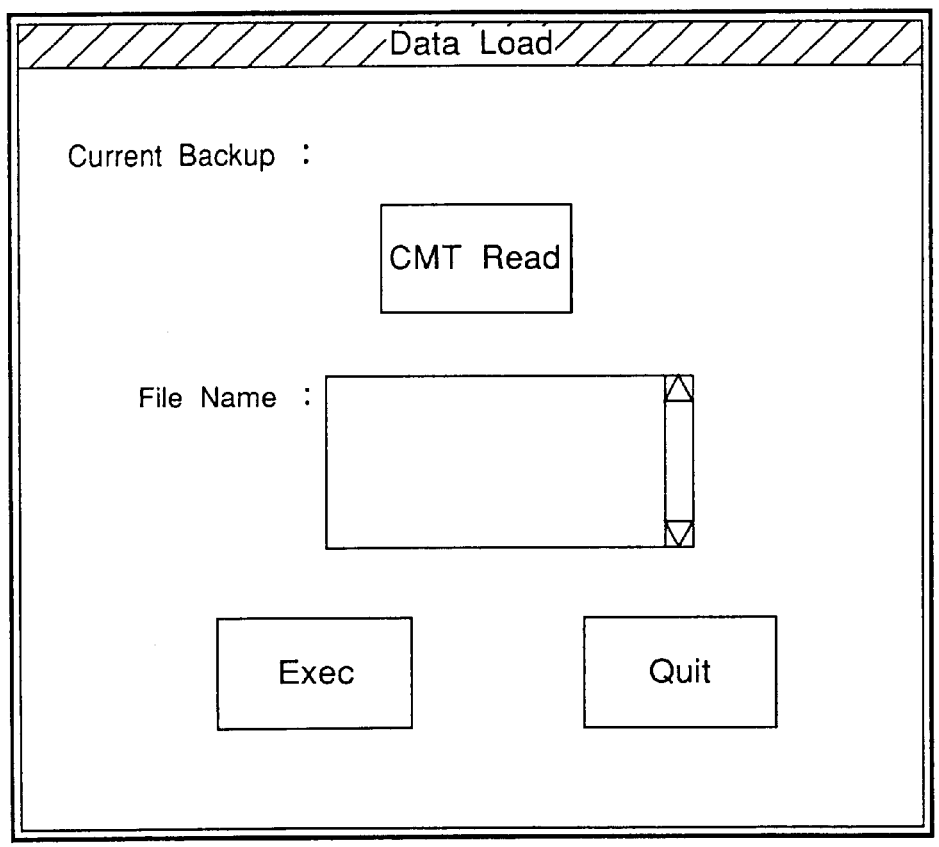
FIG. 29 is a view showing a Data Load window.

Incidentally, when Backup is specified in the FIG. 28 window, the Data Load button in FIG. 28 is clicked. Then, the Data Load window shown in FIG. 29 is opened, and an external medium for loading the data and a file name are specified in this window.

In FIG. 28, Log Type is an item for specifying the type of log to be retrieved. In order to specify Log Type, any one of types (NODE Alarm Log) to (SSE Alarm Log) shown in the drawing is selected.

NODE Alarm Log is a history of the notification information such as a card failure or a transmission path failure (both failures are detected in the respective nodes 1-1 to 1-n).

Object Creation/Deletion Log is a history of the notification information corresponding to attachment/removal of a card in each of the nodes 1-1 to 1-n.

State Change Log is a history of the notification information notified when the operation mode is switched in each of the nodes 1-1 to 1-n. As to switching of the operation mode, for example, there is switching from the regular operation mode to the maintenance mode and the like.

Protection Control Log is a log of the notification information concerning the working system/preliminary system switching operation in each of the nodes 1-1 to 1-n. That is, each node in the SDH system is generally provided with an autonomous redundancy switching function called APS (Automatic Protection Switching). Protection Control Log is a log of the notification information concerning this APS. It is to be noted that the detail relating to the APS is specified in, e.g., ITU-T recommendation G.841 in full.

U-NME Access Log is a log of the information generated when a user accesses the U-NME 3. This log includes the information concerning the time at which a user logs in/logs out to/from the U-NME 3, a name and a password of that user.

Security Alarm Log is a log of the notification information concerning the alarm generated at the time of remote access to the U-NME 3. That is, in the system according to the present invention, it is possible to access functions provided to each U-NME 3 from any other U-NME 3. However, in this type of system, functions to which access can be made are generally limited for the reason of security. The Security Alarm Log is a log concerning the alarm generated when an access request is generated to the access-limited functions.

SSE Alarm Log is a log of the notification information generated when the alarm is generated to the SSE 2 itself.

These logs are accumulated in different places depending on their types. That is, the U-NME Access Log is accumulated in each U-NME 3 itself to/from which a user logs in/logs out. The SSE Alarm Log is accumulated in the U-NME 3 of the station to which the SSE 2 as a generation source of the notification information is set.

As to logs other than the U-NME Access Log and the SSE Alarm Log, a generation source of the notification information to which each of these logs concerns is a node, and such notification information is transmitted through the SSE 2 before the U-NME 3 is notified. Therefore, logs other than the U-NME Access Log and the SSE Alarm Log are accumulated in the SSE 2. Accordingly, when the Log Type of these logs is specified by the FIG. 28 window, each of these logs is retrieved from the data base of the SSE 2.

Further, a section for specifying a time at which the notification information is generated (to be more accurate, a time at which an event concerning the notification information is generated) as an Event Time (Start) and an Event Time (End) is provided to the window shown in FIG. 28. In this section, a time range to be specified can be divided into year, month, date, hour, minute and second and specified.

Figure 30:
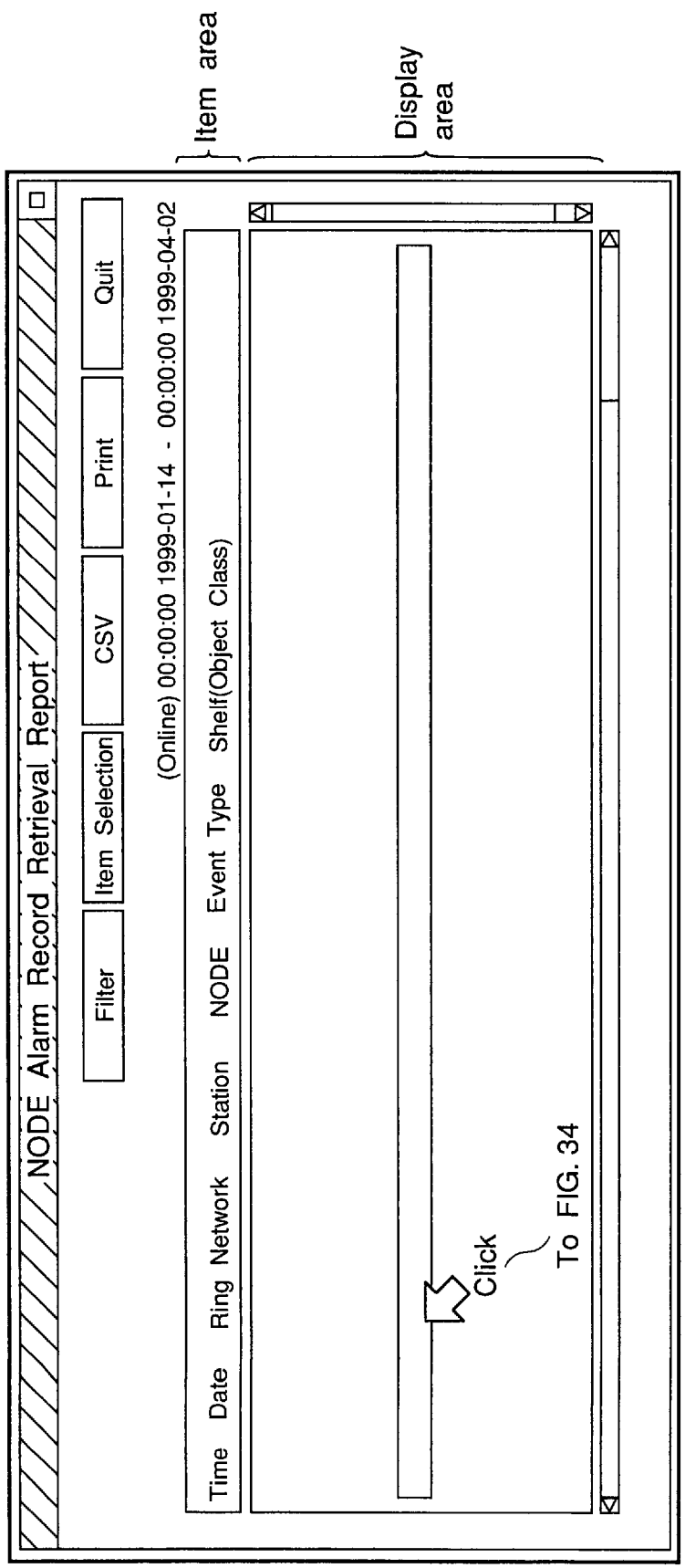
FIG. 30 is a NODE Alarm Record Retrieval Report window.
Figure 35:
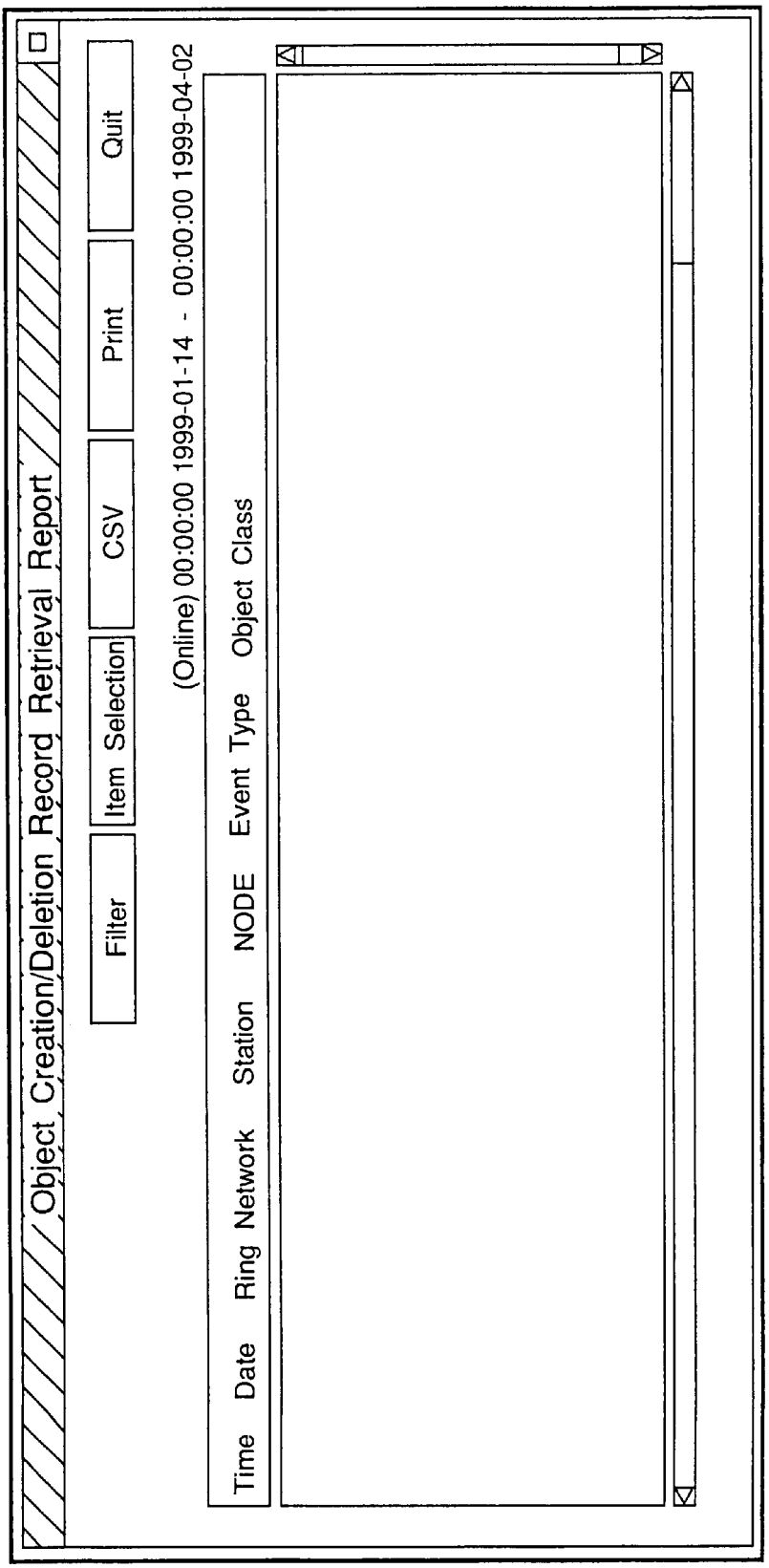
FIG. 35 is a view showing an Object Creation/Deletion Record Retrieval Report window.
Figure 38:
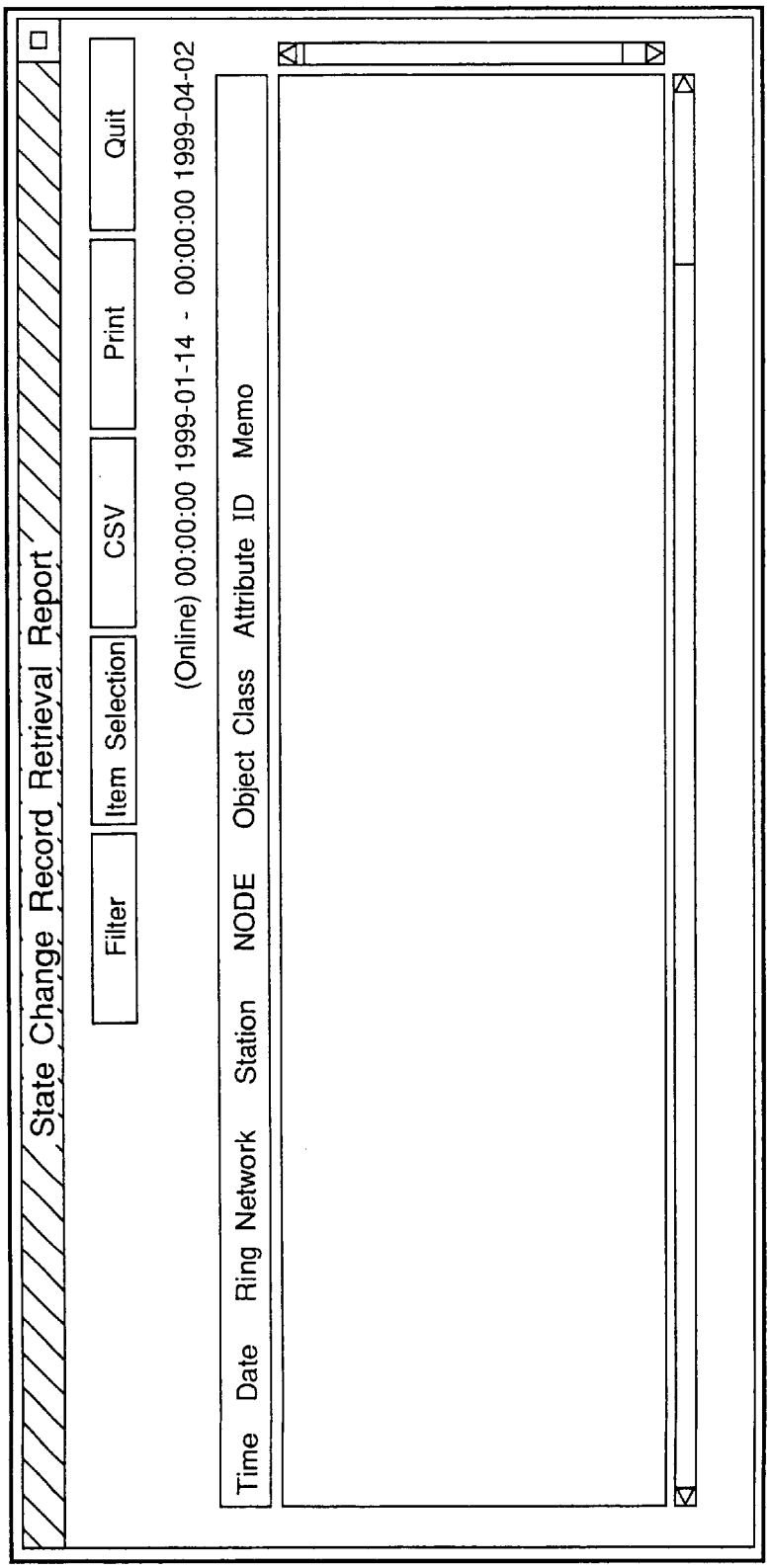
FIG. 38 is a view showing a State Change Record Retrieval Report window.
Figure 41:
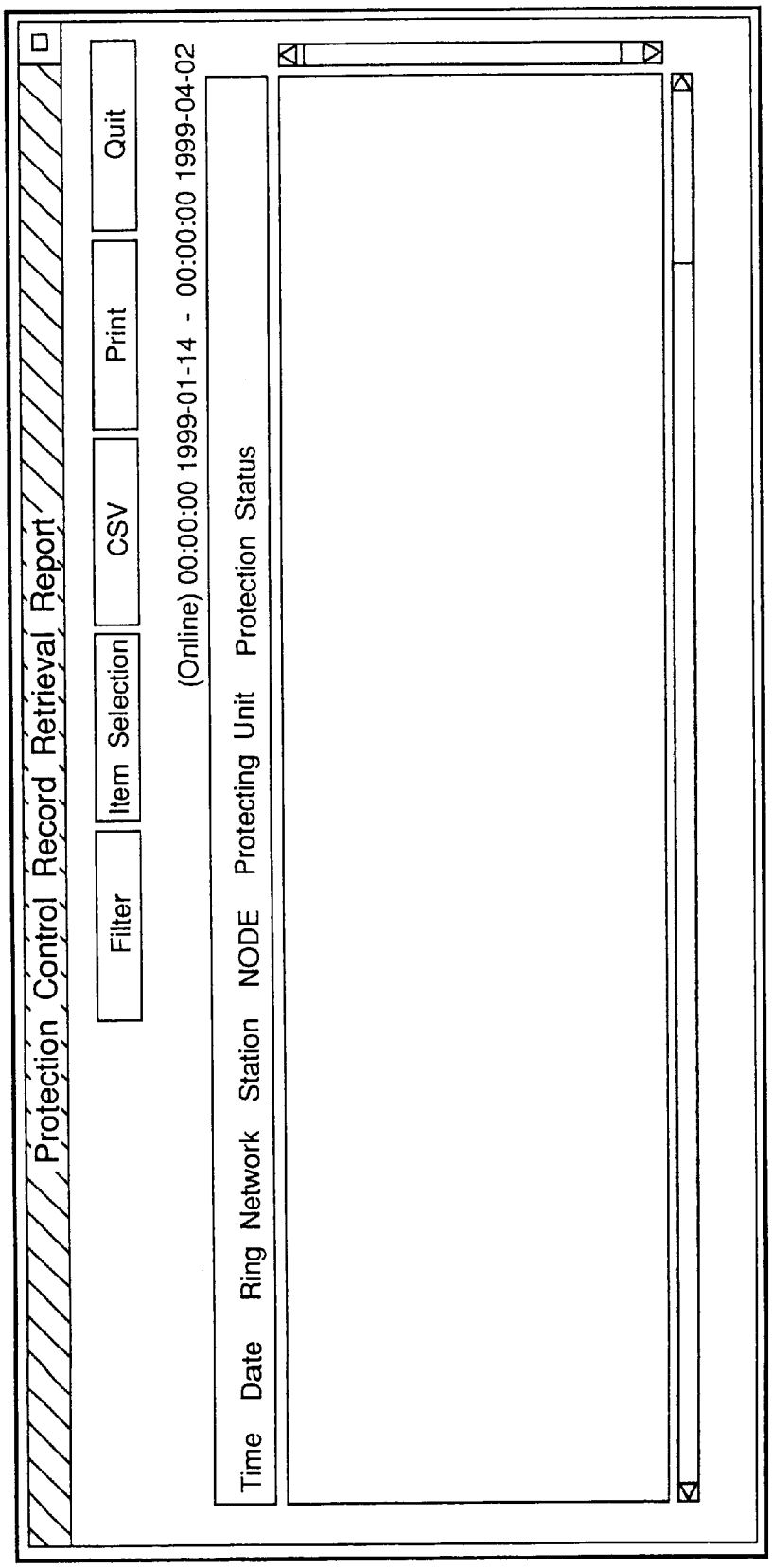
FIG. 41 is a view showing a Protection Control Record Retrieval Report window.
Figure 44:
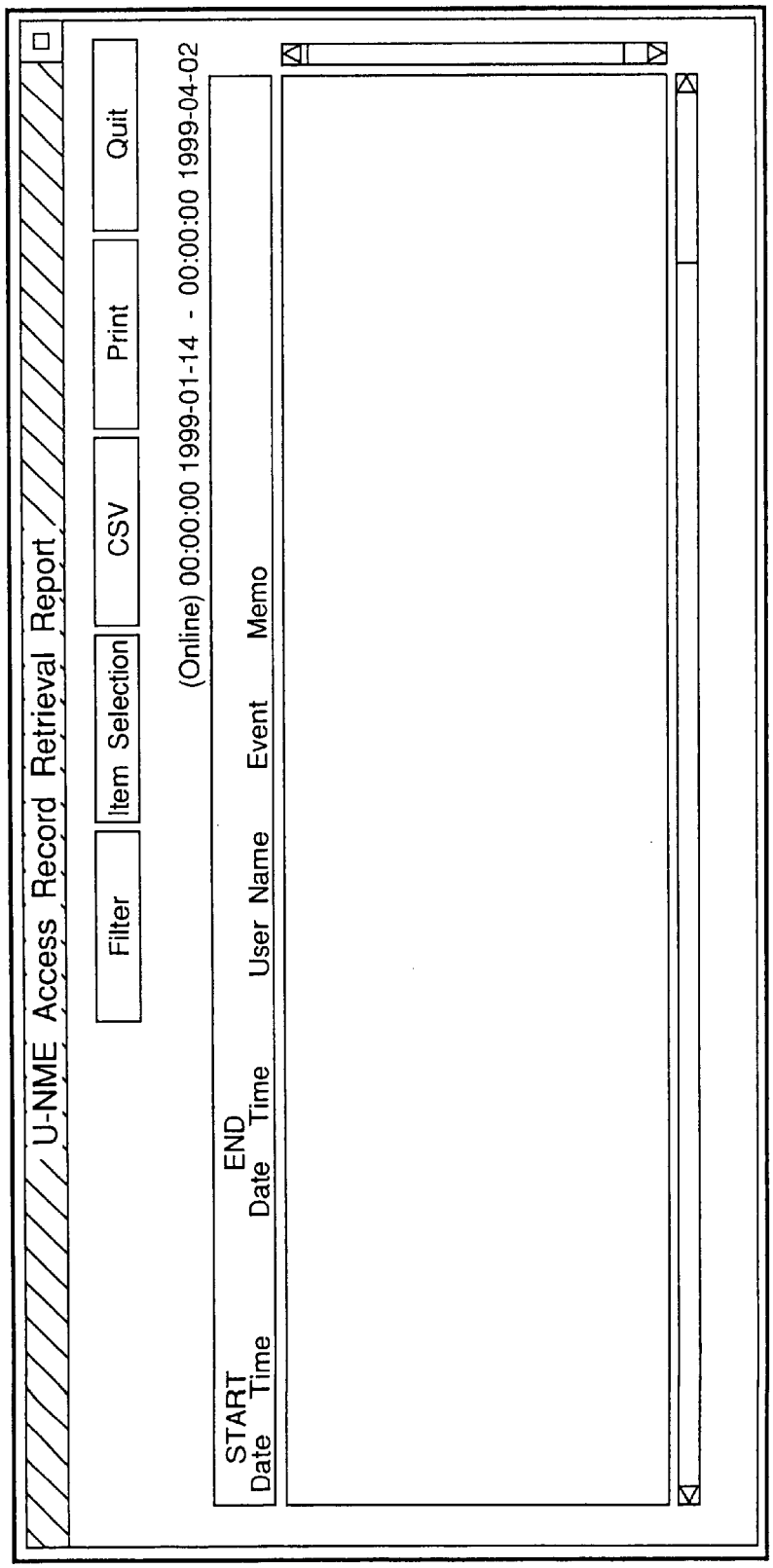
FIG. 44 is a view showing an U-NME Access Record Retrieval Report window.
Figure 47:
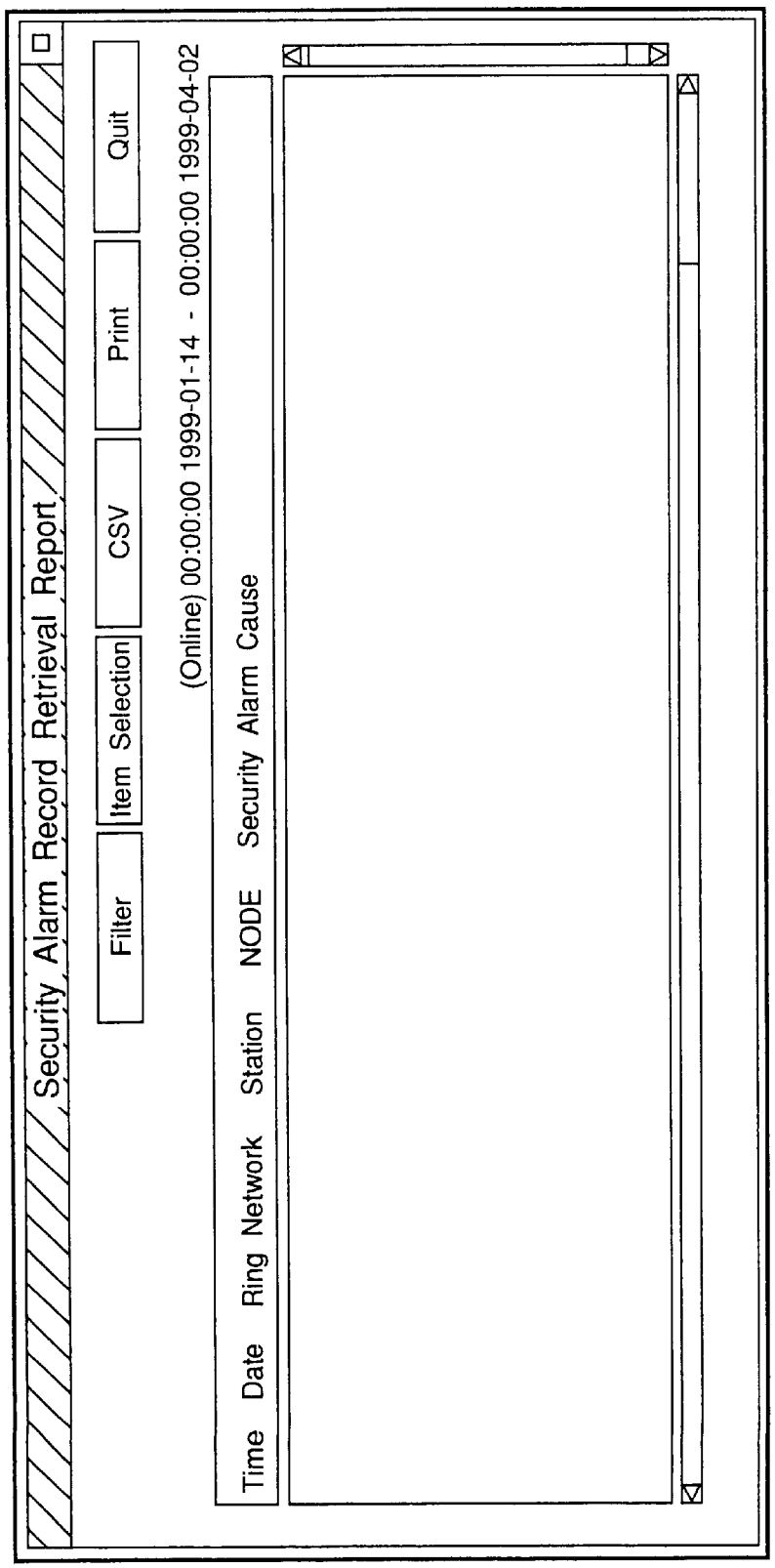
FIG. 47 is a view showing a Security Alarm Record Retrieval Report window.
Figure 50:
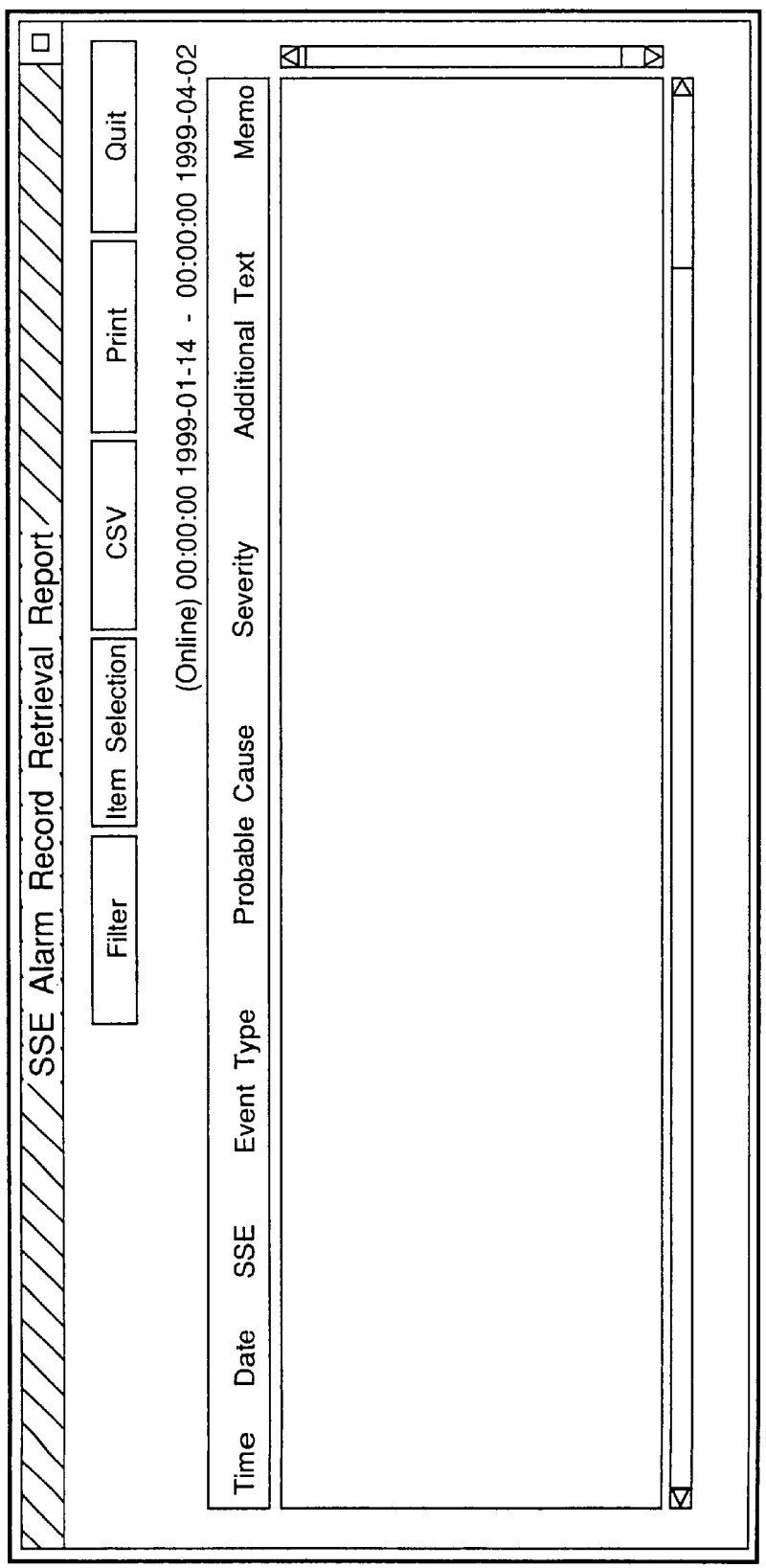
FIG. 50 is a view showing an SSE Alarm Record Retrieval Report window.

In FIG. 28, when the Exec button is clicked after the respective items of the Data Type, the Log Type, the Event Time (Start) and the Event Time (End) are specified, retrieval according to the content of this specification is executed. Then, in accordance with specification in the Log Type, Record Retrieval Report windows shown in FIGS. 30, 35, 38, 41, 44, 47 and 50 are displayed. That is, when the NODE Alarm Log is specified in the Log Type shown in FIG. 28, a window illustrated in FIG. 30 is displayed. When the Object Creation/Deletion Log is specified in the Log Type shown in FIG. 28, a window depicted in FIG. 35 is displayed. When the State Change Log is specified in the Log Type shown in FIG. 28, a window shown in FIG. 38 is displayed. When the Protection Control Log is specified in the Log Type illustrated in FIG. 28, a window depicted in FIG. 41 is displayed. When the U-NME Access Log is specified in the Log Type depicted in FIG. 28, a window shown in FIG. 44 is displayed. When the Security Alarm Log is specified in the Log Type illustrated in FIG. 28, a window shown in FIG. 47 is displayed. When the SSE Alarm Log is specified in the Log Type depicted in FIG. 28, a window shown in FIG. 50 is displayed.

The window shown in FIG. 30 will now be described. The window shown in FIG. 30 displays in the display area a list of the notification information retrieved from the history in connection with the alarm in the text format. This window is different from the window shown in FIG. 6 in that a result of retrieval with respect to the notification information accumulated in various mediums as a history is displayed. The window shown in FIG. 6 displays the notification information acquired in the U-NME 3 in real time. On the contrary, the window depicted in FIG. 30 insistently displays a result of retrieval from the data log. This is also true to the respective windows shown in FIGS. 35, 38, 41, 44, 47 and 50.

Meanwhile, to the window shown in FIG. 30 are provided function buttons indicated as "Filter", "Item Selection", "CSV", "Print" and "Quit".

When the Filter button is clicked among these function buttons, a NODE Alarm Record Retrieval Filter window shown in FIG. 31 is displayed. This window is used for setting filtering conditions in order to further narrow down (filtering) a retrieval result depicted in FIG. 30. Although the specification content in this window is substantially the same as that illustrated in FIG. 7, the conditions specified in the respective scroll windows are combined with each other under the AND condition in the FIG. 31 window.

It is to be noted that a plurality of items may be specified in accordance with each scroll window in FIG. 31. In this case, when a plurality of items are specified, these items may be combined with each other under the OR condition.

Furthermore, in the window illustrated in FIG. 31 are provided sections "Event Type", "probable Cause", "Severity", "Specific Problems" as attributes characterizing the alarm. When the Exec button is clicked after each illustrated item is selected, a result narrowed down under the specified conditions is again shown in FIG. 30.

In FIG. 30, when the Item Selection button is clicked, a NODE Alarm Record Retrieval Item Selection window shown in FIG. 32 is displayed. This window is used for narrowing down items shown in the item area illustrated in FIG. 30. In FIG. 32, when the check box of each item is arbitrarily checked and executed (clicking the Exec button), the attributes of the log data shown in FIG. 30 can be filtered and displayed. The respective items shown in FIG. 32 correspond to the Common Item and the Alarm Notification depicted in FIG. 8. Incidentally, as an item shown in FIG. 32, there is Memo (lower right part in FIG. 32). This Memo item indicates memo data arbitrarily given to each set of the notification information, and it will be described in detail later.

Figure 33:
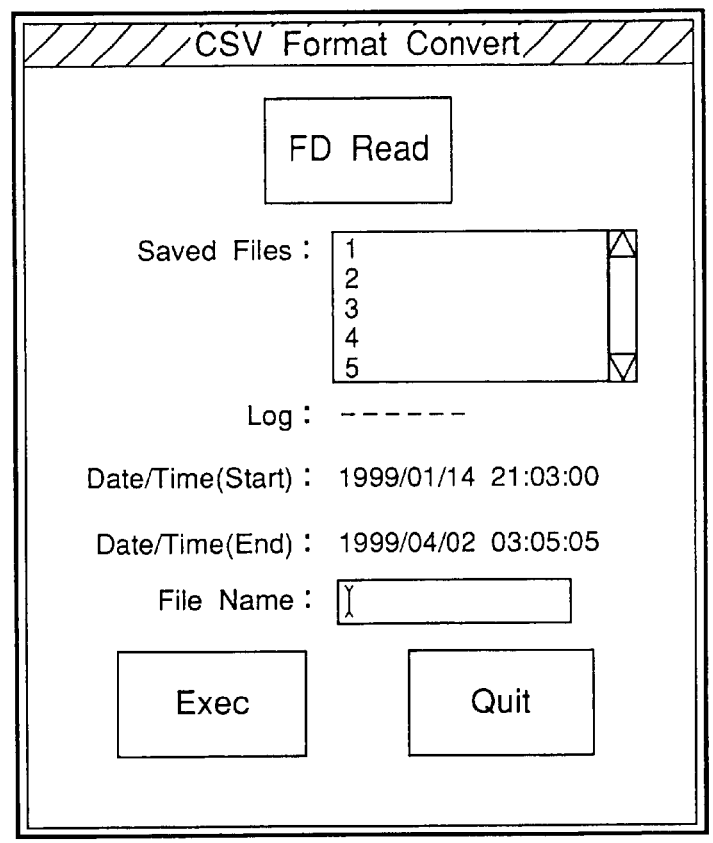
FIG. 33 is a view showing a CSV Format Convert window.

In FIG. 30, when the CSV button is clicked, a CSV Format Convert window shown in FIG. 33 is displayed. This window is used for saving a retrieval result shown in FIG. 30 in the CSV (Comma Separated Value) format. The CSV format is well known in application software and the like for personal computers.

The FIG. 33 window displays a log type corresponding to the retrieval result depicted in FIG. 30, its start time and end time in sections "Log", "Date/Time (Start)" and "Date/Time (End)". When an FD Read button is clicked in the window illustrated in FIG. 33, a name of a file stored in the FDD 310 shown in FIG. 2 is displayed in a section "Saved Files" in FIG. 33. A user takes note of the file name displayed in this section, types a saved file name in the section "File Name", and then clicks the Exec button. Consequently, the retrieval result shown in FIG. 30 is saved in the FDD 310 in the CSV format irrespective of the filtering conditions and the display item conditions.

By doing so, the retrieval result can be saved as an electronic file. Moreover, since this saved file can be utilized in general application software, the convenience for a user can be improved. Incidentally, when an existing file name is inputted to the FDD 310 from the window illustrated in FIG. 33, the CAUTION window showing a message "This file already exists. Do you want to overwrite it?" is displayed, and a user is urged to perform an appropriate operation.

When the Print button is clicked in FIG. 30, the retrieval result illustrated in FIG. 30 is printed out by the printer 318 shown in FIG. 2. In addition, the Quit button shown in FIG. 30 means cancellation of the setting.

Figure 34:
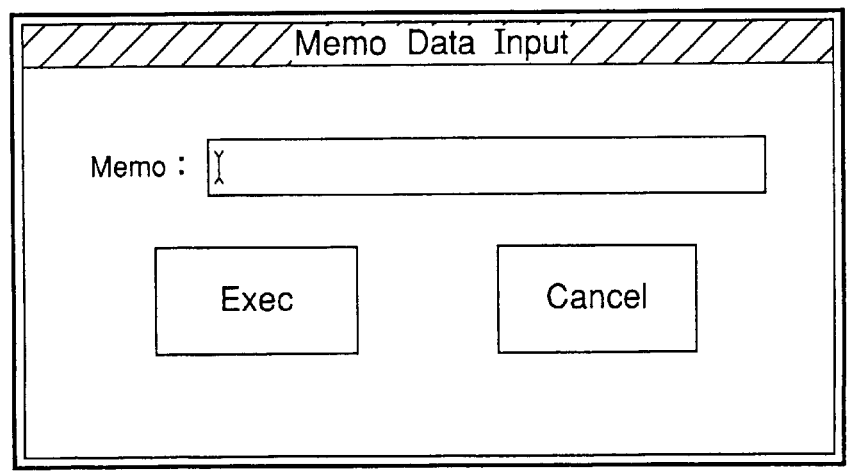
FIG. 34 is a Memo Data Input window.

In FIG. 30, when a specific line in the display area is selected and clicked, a Memo Data Input window shown in FIG. 34 is displayed. This window is used for inputting the memo data in connection with the notification information selected in FIG. 30. When a comment is inputted in the section "Memo" in the window shown in FIG. 34, this comment is added to the clicked notification information. The memo data is remarks and the like written by a user in the form of a comment, and its content is not restricted. The memo data is utilized for tracking a failure, for example.

A window shown in FIG. 35 will now be described. The window shown in FIG. 35 is displayed when the Object Creation/Deletion Log is specified in the Log Type depicted in FIG. 28. The FIG. 35 window displays in the display area a list of the notification information retrieved from a history in connection with the Object Creation/Deletion in the text format.

When the Filter button is clicked in the window shown in FIG. 35, an Object Creation/Deletion Record Retrieval Filter window illustrated in FIG. 36 is displayed. The window shown in FIG. 36 is provided with check items for specifying Creation or Deletion as an Event Type. These check items correspond to insertion/removal of a card in each node. When the Exec button is clicked after each item is selected in the FIG. 36 window, the Log according to the selected content is retrieved, and its result is displayed in the FIG. 35 window.

When the Item Selection is clicked in the FIG. 35 window, an Object Creation/Deletion Record Retrieval Item Selection window shown in FIG. 37 is displayed. When the Exec button is clicked after an arbitrary item is selected in the FIG. 37 window, the item selected in this window is reflected in the display of the window depicted in FIG. 35.

Figure 39:
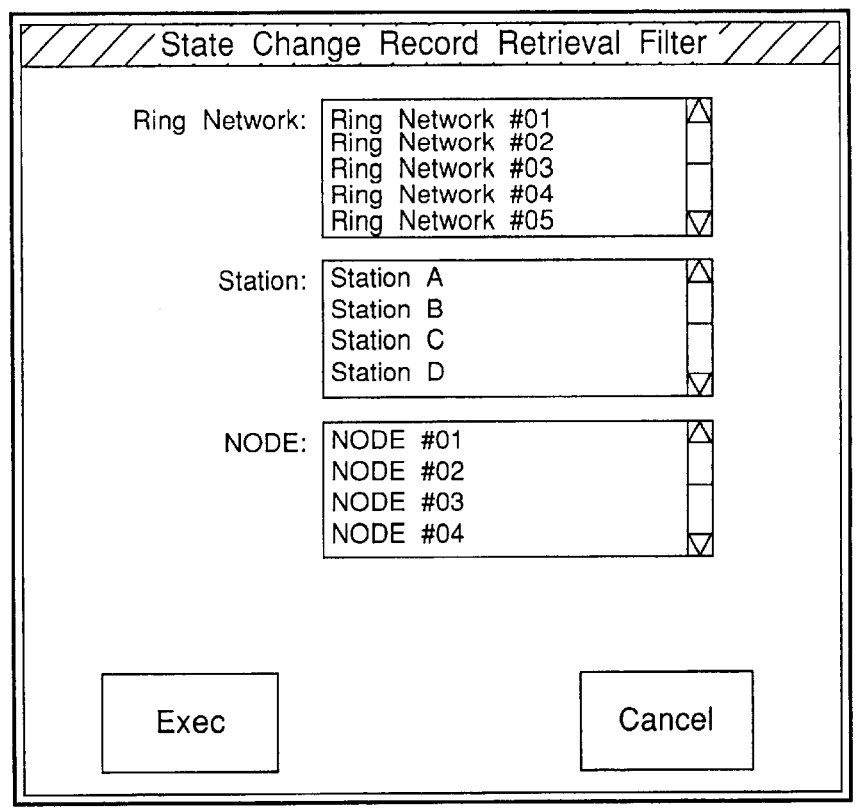
FIG. 39 is a view showing a State Change Record Retrieval Filter window.

A window shown in FIG. 38 will now be described. The window shown in FIG. 38 is displayed when the State Change Log is specified in the Log Type in FIG. 28. In the window illustrated in FIG. 38, a list of the notification information retrieved from the history in connection with the State Change is displayed in the display area in the text format. When the Filter button is clicked in this window, a State Change Record Retrieval Filter window shown in FIG. 39 is displayed. When the Exec button is clicked after each item is selected in the window illustrated in FIG. 39, the Log according to the selected content is retrieved, and its result is displayed in the window depicted in FIG. 38.

Figure 40:
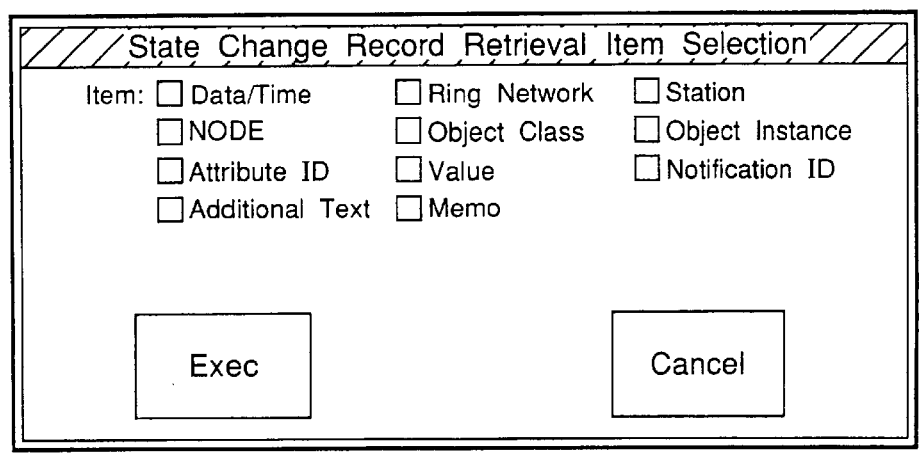
FIG. 40 is a view showing a State Change Record Retrieval Item Selection window.

When the Item Selection is clicked in the window illustrated in FIG. 38, a State Change Record Retrieval Item Selection window depicted in FIG. 40 is displayed. When the Exec button is clicked after an arbitrary item is selected in the FIG. 40 window, the item selected in this window is reflected in the display of the window shown in FIG. 38.

A window shown in FIG. 41 will now be described. The window illustrated in FIG. 41 is displayed when the Protection Control Log is specified in the Log Type in FIG. 28. In the window illustrated in FIG. 41, a list of the notification information retrieved from the history in connection with the Protection Control is displayed in the display area in the text format.

When the Filter button is clicked in the FIG. 41 window, a Protection Control Record Retrieval Filter window shown in FIG. 42 is displayed. The window illustrated in FIG. 42 is provided with check items for specifying HS, Equipment or LS as a Protecting Unit. The item HS corresponds to high-speed line (transmission path) system switching. The item Equipment corresponds to in-equipment switching. The item LS corresponds to low-speed line system switching. When the Exec button is clicked after each item is selected in the FIG. 42 window, the Log according to the selected content is retrieved, and its result is displayed in the FIG. 41 window.

When the Item Selection button is clicked in the window illustrated in FIG. 41, a Protection Control Record Retrieval Item Selection window shown in FIG. 43 is displayed. When the Exec button is clicked after an arbitrary item is selected in the FIG. 43 window, the item selected in this window is reflected in the display of the FIG. 41 window.

Figure 45:
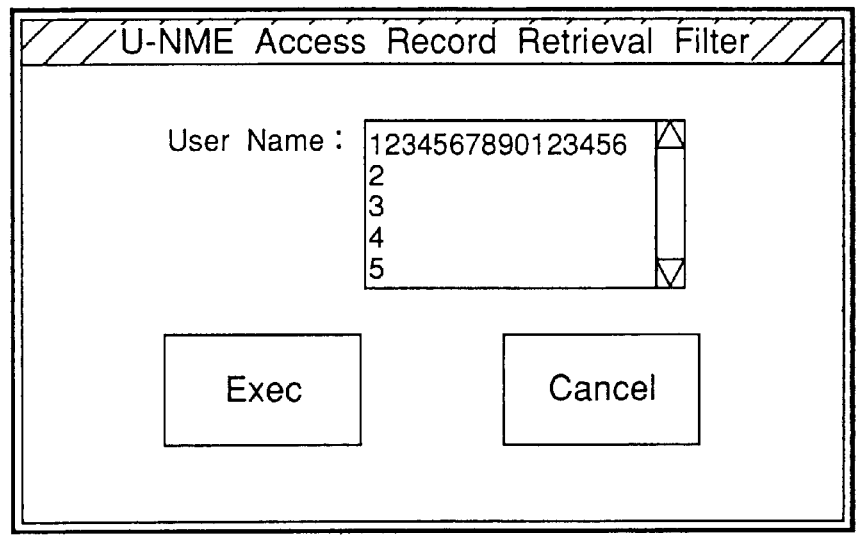
FIG. 45 is a view showing an U-NME Access Record Retrieval Filter window.

A window shown in FIG. 44 will now be described. The window depicted in FIG. 44 is displayed when the U-NME Access Log is specified in the Log Type in FIG. 28. The FIG. 44 window displays in the display area a list of the notification information retrieved from the history in connection with the U-NME Access in the text format. When the Filter button is clicked in this window, an U-NME Access Record Retrieval Filter window shown in FIG. 45 is displayed. When an arbitrary user name (User Name) is selected and then the Exec button is clicked in the FIG. 45 window, the FIG. 44 windows displays from what time (START) to what time (END) the selected user has been accessing the UNME 3.

Figure 46:
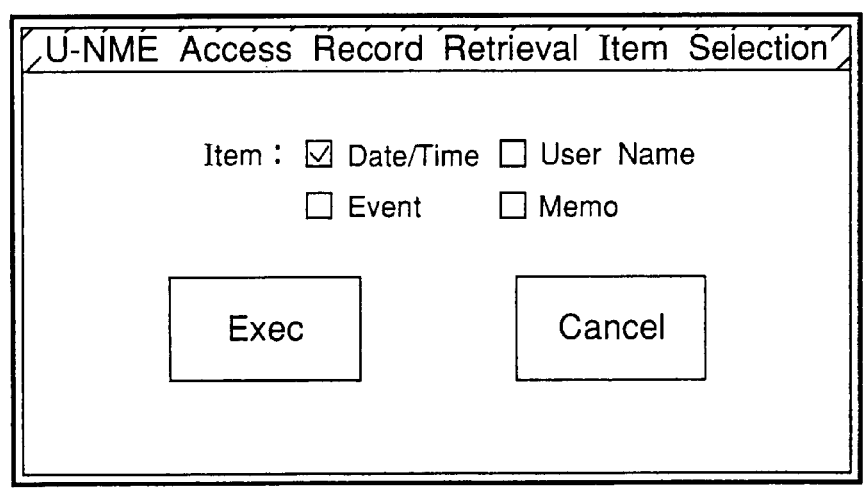
FIG. 46 is a view showing an U-NME Access Record Retrieval Item Selection window.

When the Item Selection button is clicked in the FIG. 44 window, an U-NME Access Control Record Retrieval Item Selection window shown in FIG. 46 is displayed. Each check item displayed in the FIG. 46 window reflects a property of the U-NME Access, and the User Name is characteristic. When an arbitrary item is selected and then the Exec button is clicked in the FIG. 46 window, the item selected in the FIG. 46 window is reflected in the display of the FIG. 44 window.

A window illustrated in FIG. 47 will now be described. The FIG. 47 window is displayed when the Security Alarm Log is specified in the Log Type in FIG. 28. In the window shown in FIG. 47, a list of the notification information retrieved from the history in connection with the Security Alarm is displayed in the text format.

When the Filter button is clicked in the FIG. 47 window, a Security Alarm Record Retrieval Filter window shown in FIG. 48 is displayed. This window includes a section "Security Alarm Cause", and a cause of occurrence of the Security alarm can be specified. When each item is selected and the Exec button is then clicked in the window shown in FIG. 48, the Log according to the selected content is retrieved, and its result is displayed in the FIG. 47 window.

When the Item Selection button is clicked in the FIG. 47 window, a Security Alarm Control Record Retrieval Item Selection window illustrated in FIG. 49 is displayed. Each check item in this window reflects the property of the Security Alarm. In the window shown in FIG. 49 are provided items "Managed Object", "Security Alarm Cause", "Security Alarm Severity", "Security Alarm Detector", "Service User", and "Service Provider", and these items are characteristic. When an arbitrary item is selected and the Exec button is then clicked in the FIG. 49 window, the item selected in this window is reflected to display in the window shown in FIG. 41.

A window illustrated in FIG. 50 will now be described. The window shown in FIG. 50 is displayed when the SSE Alarm Log is specified in the Log Type in FIG. 28. The window depicted in FIG. 50 displays a list of the notification information retrieved from the history in connection with the SSE Alarm in the text format. When the Filter button is clicked in this window, an SSE Alarm Record Retrieval Filter window illustrated in FIG. 51 is displayed.

Figure 51:
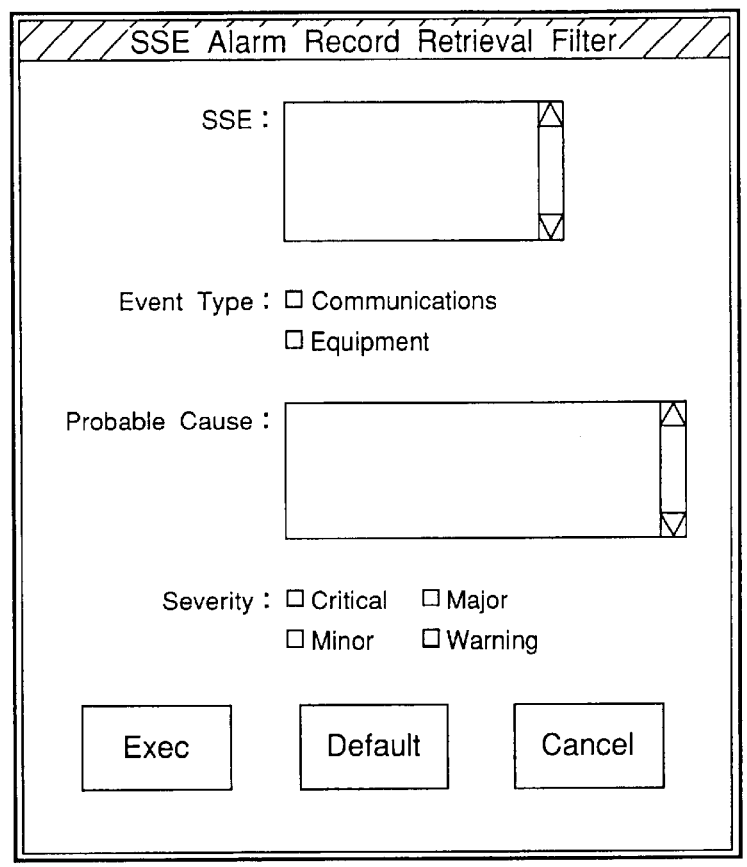
FIG. 51 is a view showing an SSE Alarm Record Retrieval Filter window.

The window shown in FIG. 51 includes a section in which the SSE 2 is specified, a section in which the Event Type is specified as the Communications or the Equipment, a section in which the Probable Cause is selected, and a section in which the Severity (importance level of the alarm) is specified as any of Critical, Major, Minor and Warning. When each item is selected and the Exec button is then clicked in the window shown in FIG. 51, the Log according to the selected content is retrieved, and its result is displayed in the window depicted in FIG. 50.

Figure 52:
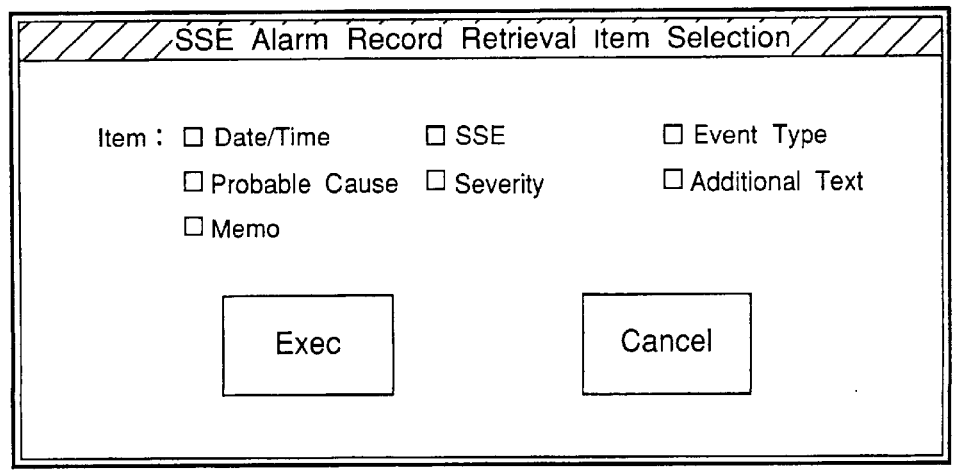
FIG. 52 is a view showing an SSE Alarm Record Retrieval Item Selection window.

When the Item Selection button is clicked in the window shown in FIG. 50, an SSE Alarm Control Record Retrieval Item Selection window depicted in FIG. 52 is displayed. When the Exec button is clicked after an arbitrary item is selected in the window shown in FIG. 52, the item selected in this window is reflected in the display of the FIG. 50 window.

Incidentally, each function of the CSV button, the Print button and the Quit button displayed in the respective windows shown in FIGS. 35, 38, 41, 44, 47 and 50 is the same as that in FIG. 30, and hence its explanation is omitted.

An U-NME Log Control window shown in FIG. 53 will now be described. This window is opened when the U-NME Log Control button depicted in FIG. 27 is clicked. The window shown in FIG. 53 is used for setting conditions under which data is written in the log (the U-NME Access Log and the SSE Alarm Log) accumulated in the U-NME 3.

Figure 53:
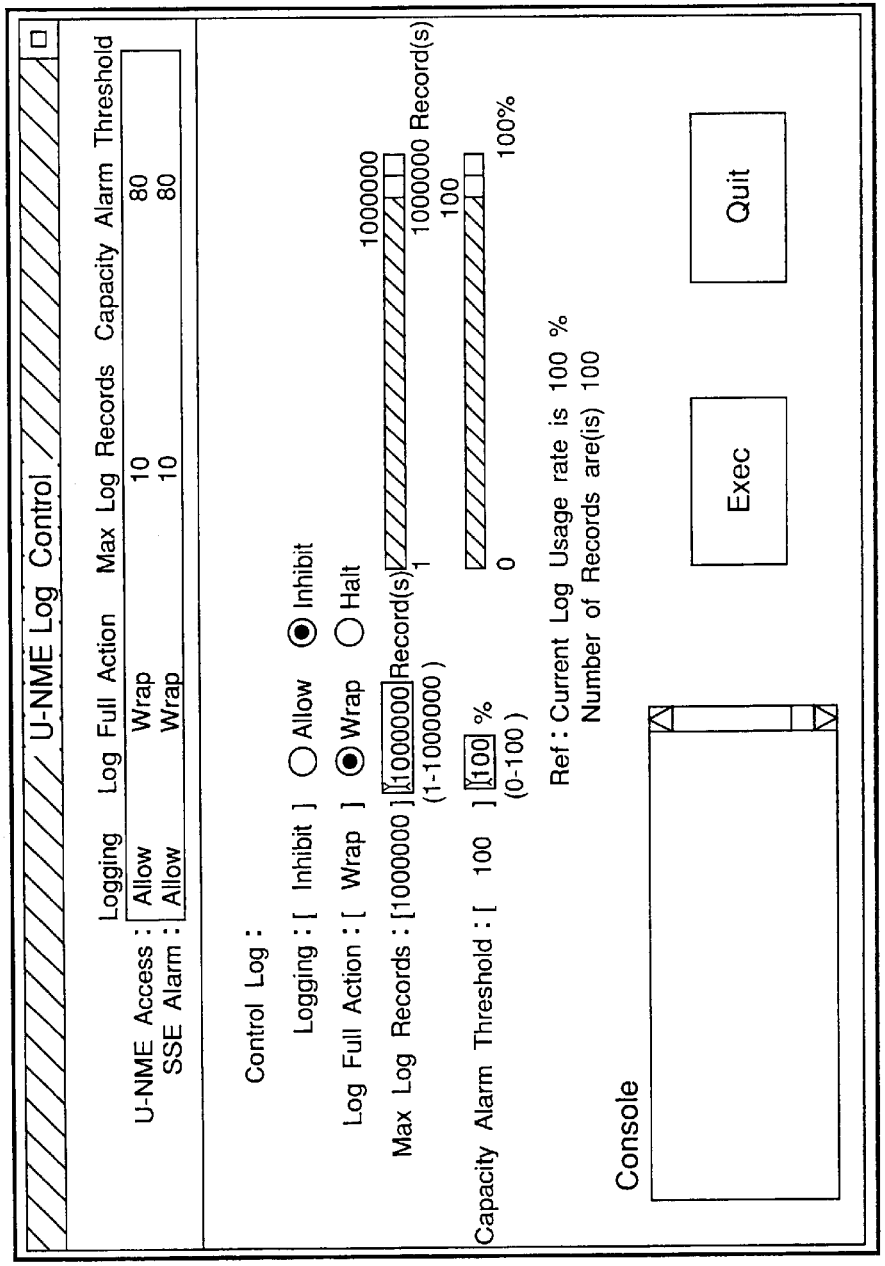
FIG. 53 is a view showing an U-NME Log Control window.

In the window shown in FIG. 53, setting items "Logging", "Log Full Action", "Max Log Records", and "Capacity Alarm Threshold" are provided with respect to two log types, i.e., the U-NME Access Log and the SSE Alarm log. The current set states of these setting items are displayed on the upper side in the window shown in FIG. 53. A section for arbitrarily setting these setting items is provided to the lower side in the window depicted in FIG. 53.

Among the setting items, in the item Logging is set whether writing in the log is allowed. When the check box Allow is checked, writing in the log is allowed. When the check box Inhibit is checked, writing in the log is not allowed. In the item Log Full Action, processing performed in when data area (storage resource area) allocated to each log type is full is selected. When Wrap is selected, overwriting data in the data area is allowed. When Halt is selected, overwriting data in the data area is not allowed.

In the item Max Log Records, a data area allocated to each log type is specified by a number of sets of the notification information. In FIG. 53, a number of sets of the notification information can be arbitrarily set within a range from one to 1,000,000. In the item Capacity Alarm Threshold, a threshold value of the alarm generated when a capacity of the data area is almost full is set. In FIG. 53, a value of the Capacity Alarm Threshold can be set within a range from 0% to 100%. For example, if the Capacity Alarm Threshold is set to 80%, the alarm is generated when 80% of the data area is filled with the log. As a result, a user is urged to perform the operation such as backup of data.

An U-NME Log Deletion window shown in FIG. 54 will now be described. This window is opened when the U-NME Log Deletion button shown in FIG. 27 is clicked, and used for setting conditions for deleting log data stored in the U-NME 3.

Figure 54:
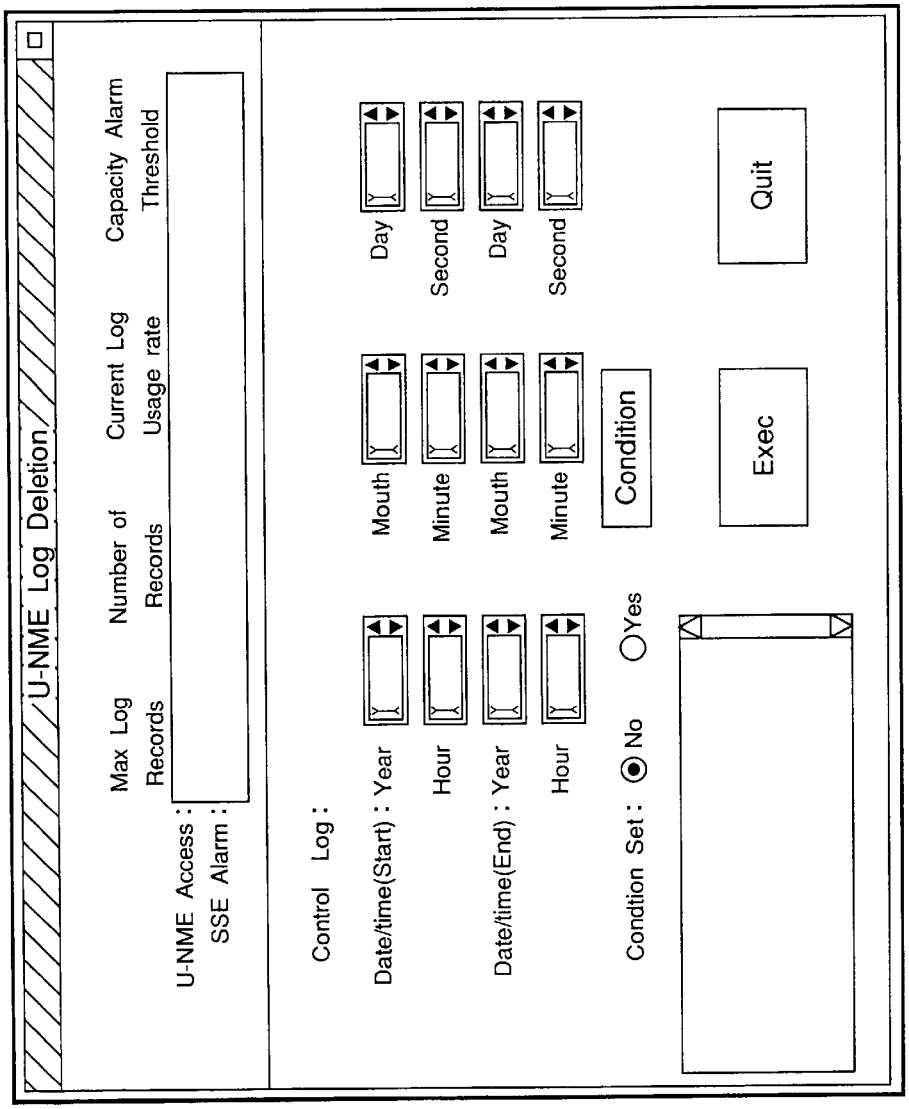
FIG. 54 is a view showing an U-NME Log Deletion window.

In the window illustrated in FIG. 54, setting items "Max Log Records", "Number of Records", "Current Log Usage rate" and "Capacity Alarm Threshold" are provided with respect to two log types, i.e., the U-NME Access Log and the SSE Alarm Log. The current set statuses of these setting items are displayed on the upper side in the window depicted in FIG. 54. A section for arbitrarily setting these setting items is provided on the lower side in the window shown in FIG. 54.

In the FIG. 54 window, the log to be deleted is specified by a time from Date/Time (Start) to Date/Time (End). In particular, an item Condition Set is provided to the window shown in FIG. 54. This item is provided in order to select whether another condition is specified in addition to the specified time range. When Yes is checked in this item, an U-NME Log Deletion Condition window depicted in FIG. 55 is displayed.

Figure 55:
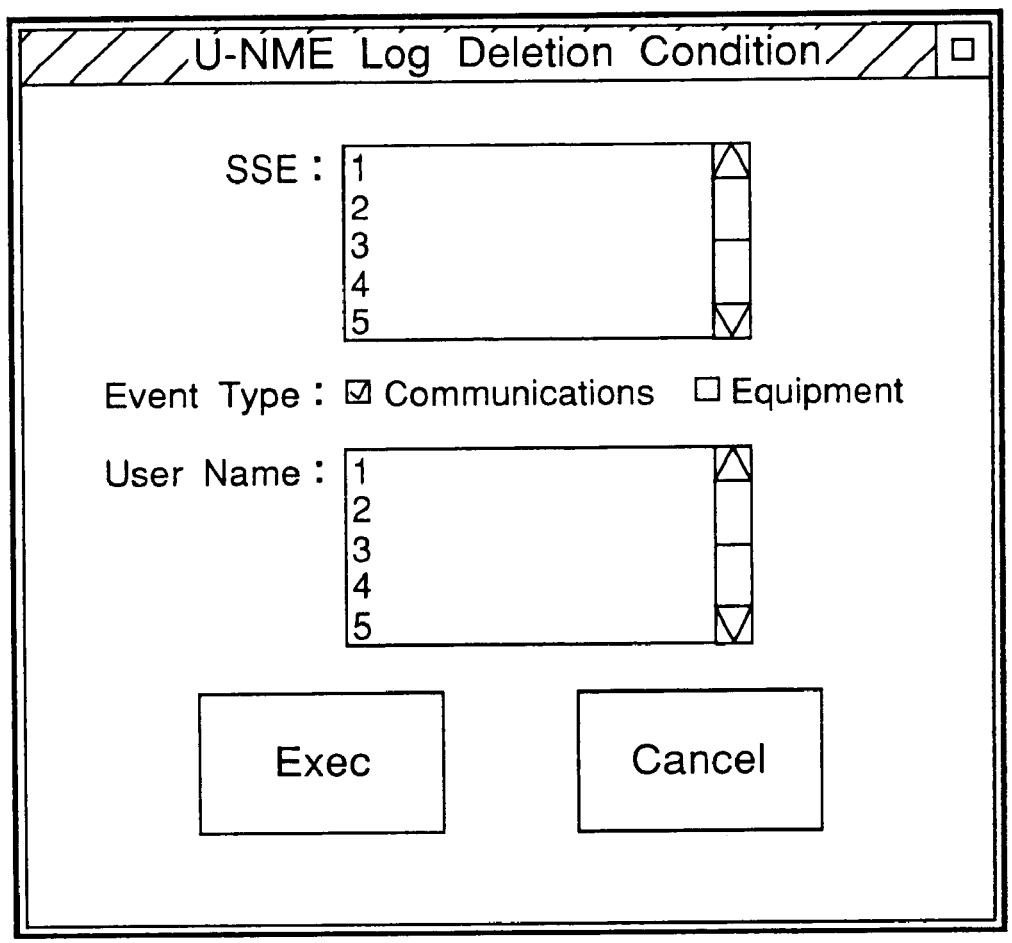
FIG. 55 is a view showing an U-NME Log Deletion Condition window.

The window illustrated in FIG. 55 is used for setting conditions when deleting the log. In this window, the SSE 2 which accumulates the log to be deleted is specified in a scroll window with a notation "SSE". In the window shown in FIG. 55, when either Communications or Equipment is checked in the item Event Type, the Event Type to be deleted is specified. In a scroll window with a notation "User Name" in the FIG. 55 window, a user name is specified. When the Exec button is clicked after each of these items is specified, the log data according to the conditions specified in the respective items is deleted.

Incidentally, when the Exec button is clicked in the FIG. 55 window, the CAUTION window is displayed so that a user is asked if data should be deleted or not.

A NODE Log Control window illustrated in FIG. 56 will now be described. This window is opened when the NODE Log Control button illustrated in FIG. 27 is clicked, and used for operating the log accumulated in each NODE.

As shown in the drawing, the log having a plurality of items "Alarm", "Object Creation/Deletion", "State Change", "Protection Control" and "Security Alarm" is accumulated in the data base of the NODE.

Figure 56:
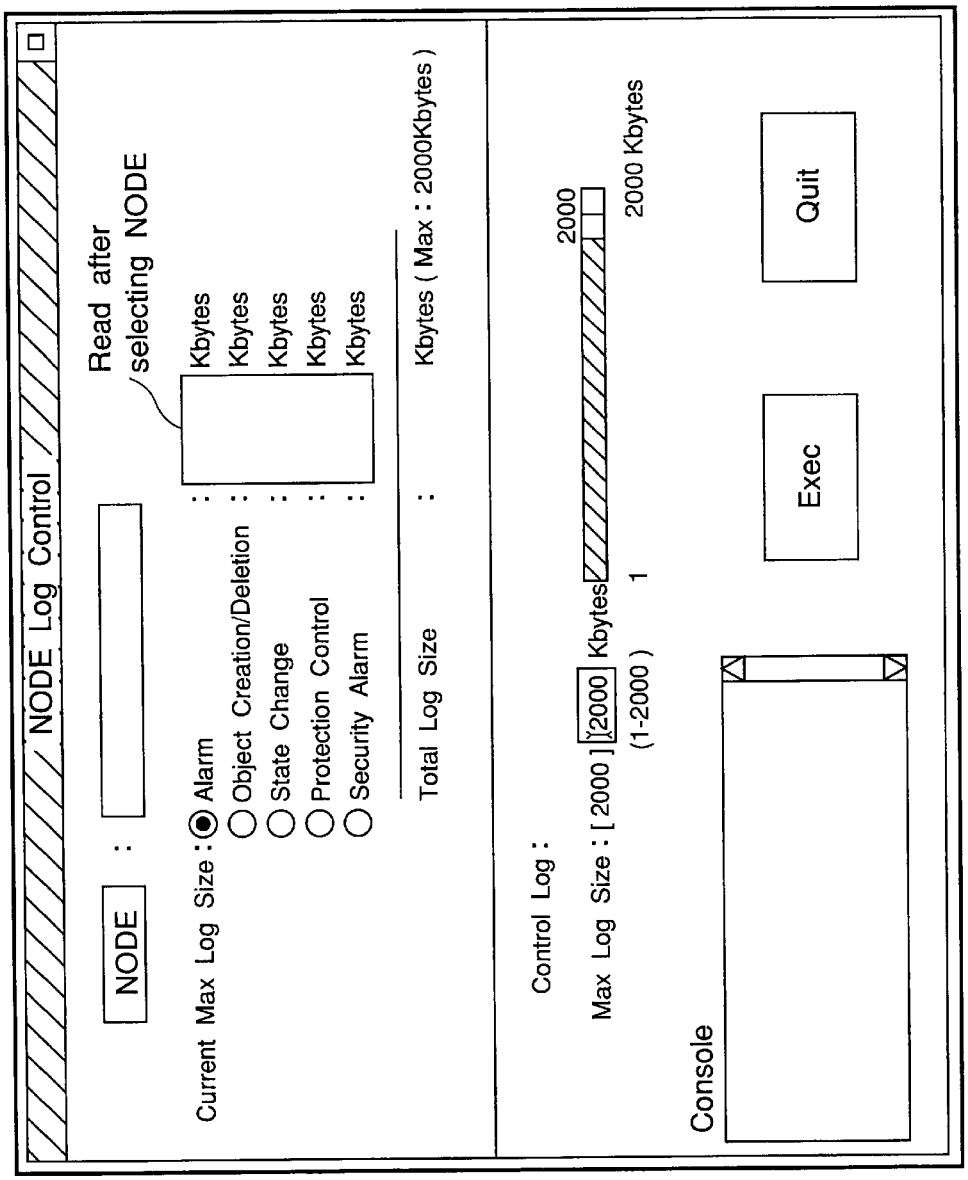
FIG. 56 is a view showing a NODE Log Control window.
Figure 57:
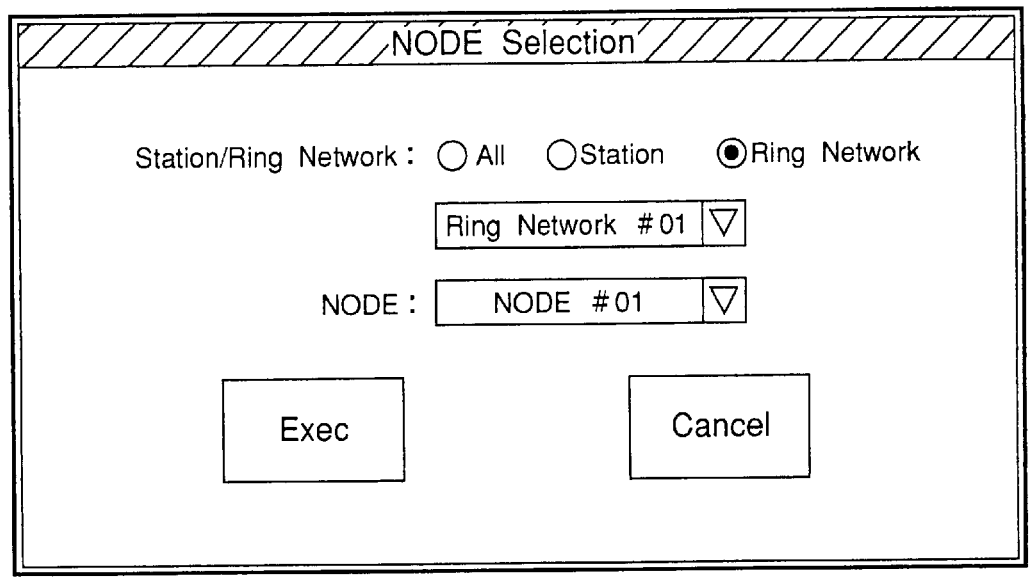
FIG. 57 is a view showing a NODE Selection window.

In the window illustrated in FIG. 56, a maximum value of a size of a storage resource allocated for accumulation in the data base is set in accordance with each item. In FIG. 56, when the NODE button is clicked, a NODE Selection window illustrated in FIG. 57 is opened. In the window shown in FIG. 57, an arbitrary NODE within the network system is selected. In FIG. 57, any one of items "All Station" and "Ring Network" is selected in the Station/Ring Network.

In FIG. 57, when the item All is selected, all the NODEs are the setting targets. When the item Ring Network is selected, a pull-down menu for selecting any Ring Network can be operable, and an arbitrary Ring Network is selected from this menu, and any NODE belonging to the selected Ring Network is then selected in the pull-down menu. When the item Station is selected, an arbitrary NODE is selected by the similar procedure. In this manner, when the Exec button is clicked after any NODE is selected in the FIG. 57 window, display returns to the window shown in FIG. 56. At this moment, the NODE which is the operation target enters the state that it is set in the FIG. 56 window.

When returning from the window shown in FIG. 57 to the window illustrated in FIG. 56, a maximum size of the log in each item is first read from a target NODE. A read result is displayed in a section "Current Max Log Size" in FIG. 56. Subsequently, a maximum log size (Max Log Size) is set in accordance with each item (Alarm to Security Alarm) by a user in the window shown in FIG. 56. In this manner, the maximum size of each log item in each NODE is set.

According to the window depicted in FIG. 56, a maximum capacity of a storage resource can be individually set in accordance with each log item. This enables the setting for allocating the maximum capacity of the storage resource in accordance with, e.g., a frequency of occurrence of an event. For example, since a number of times that an event Creation/Deletion may occur is small as compared with other events, the allocated log size should be small. On the other hand, as to the event Alarm whose frequency of occurrence is relatively high, assuring many storage resources may suffice. By doing so, it is possible to obtain an advantage that the storage resources of the apparatus can be effectively utilized.

Incidentally, in the case of setting using the FIG. 56 window, all the previously accumulated logs are deleted. Therefore, when the Exec button is clicked in FIG. 56, the alarm window showing a message "All the log records are deleted. Click the OK button to execute, or click the Cancel button to abort" is displayed to draw the user's attention.

A Data Backup window shown in FIG. 58 will now be described. This window is opened when the Data Backup button shown in FIG. 27 is clicked, and used for backing up data to the CMT 36. When the CMT Read button is clicked in the FIG. 58 window, file names currently stored in the CMT 36 are displayed in a scroll window with a notation "Saved Files".

Figure 58:
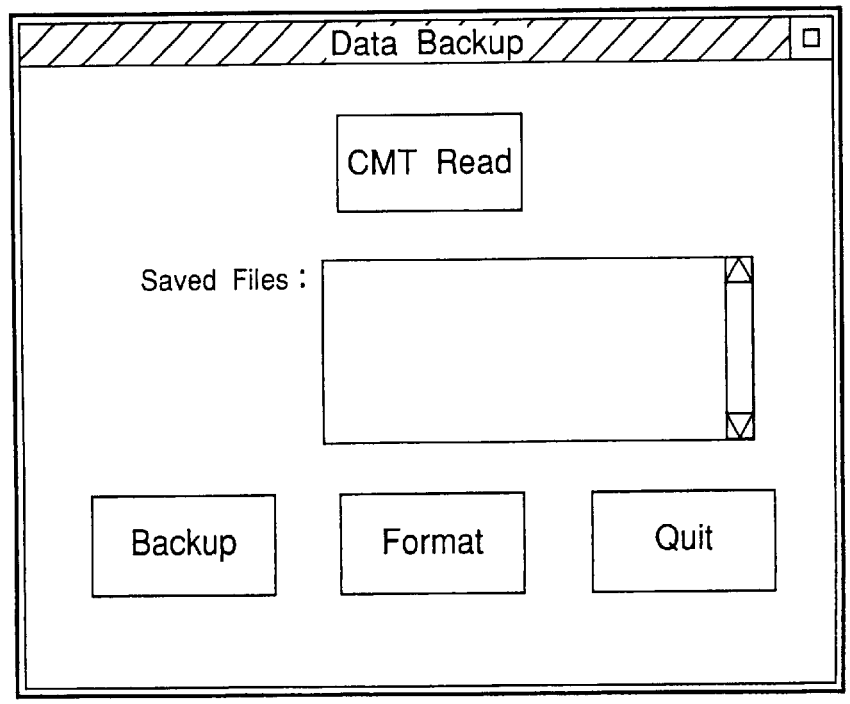
FIG. 58 is a view showing a Data Backup window.
Figure 59:
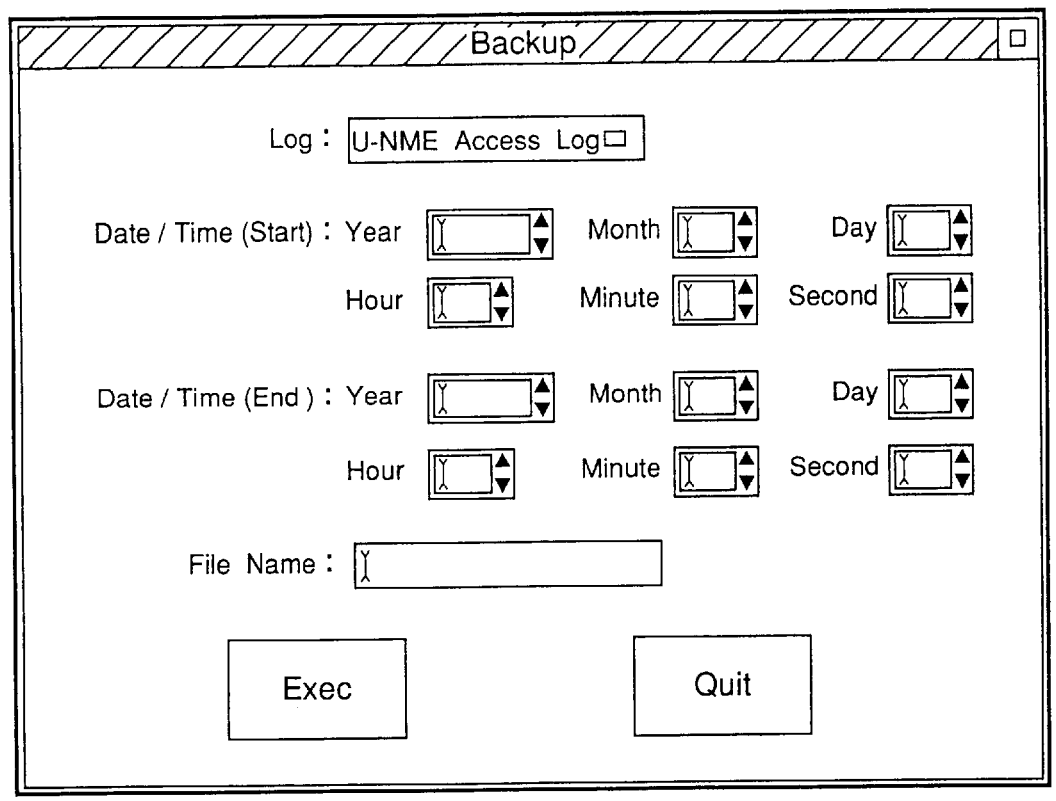
FIG. 59 is a view showing a Backup window.

When the Backup button is clicked in FIG. 58, a Backup window shown in FIG. 59 is displayed. In FIG. 59, after any one of the U-NME Access Log and the SSE Alarm Log is specified in the Log, the type of a log to be backed up is selected. Further, in the FIG. 59 window, a time range of the log to be backed up is specified. Furthermore, when the Exec button is clicked after a file name is inputted in this window, data is backed up in the CMT 36.

Moreover, when a Format button is clicked in FIG. 58, a CAUTION window showing a message "All the backup files stored in this CMT are deleted. Click the OK button to execute formatting, or click the Cancel button to cancel" is displayed to draw the user's attention. Then, if OK, formatting of the CMT 36 is executed.

(Performance Control)

Figure 60:
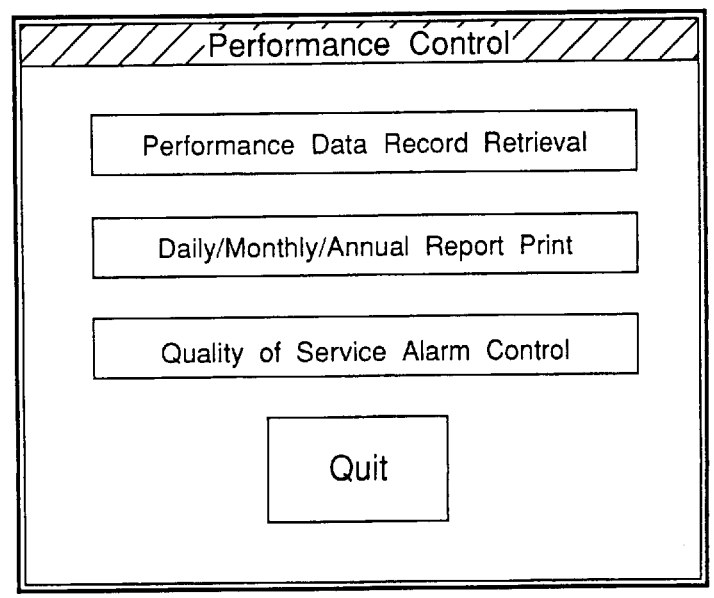
FIG. 60 is a view showing a Performance Control window.

Description will now be given as to functions when a Performance button is clicked in the main screen shown in FIG. 3. When the Performance button is clicked, a Performance Control window shown in FIG. 60 is displayed. This window displays a menu of functions concerning management of the network performance. This window is provided with function buttons indicated as "Performance Data Record Retrieval", "Daily/Monthly/Annual Report Print" and "Quality of Service Alarm Control".

Figure 61:
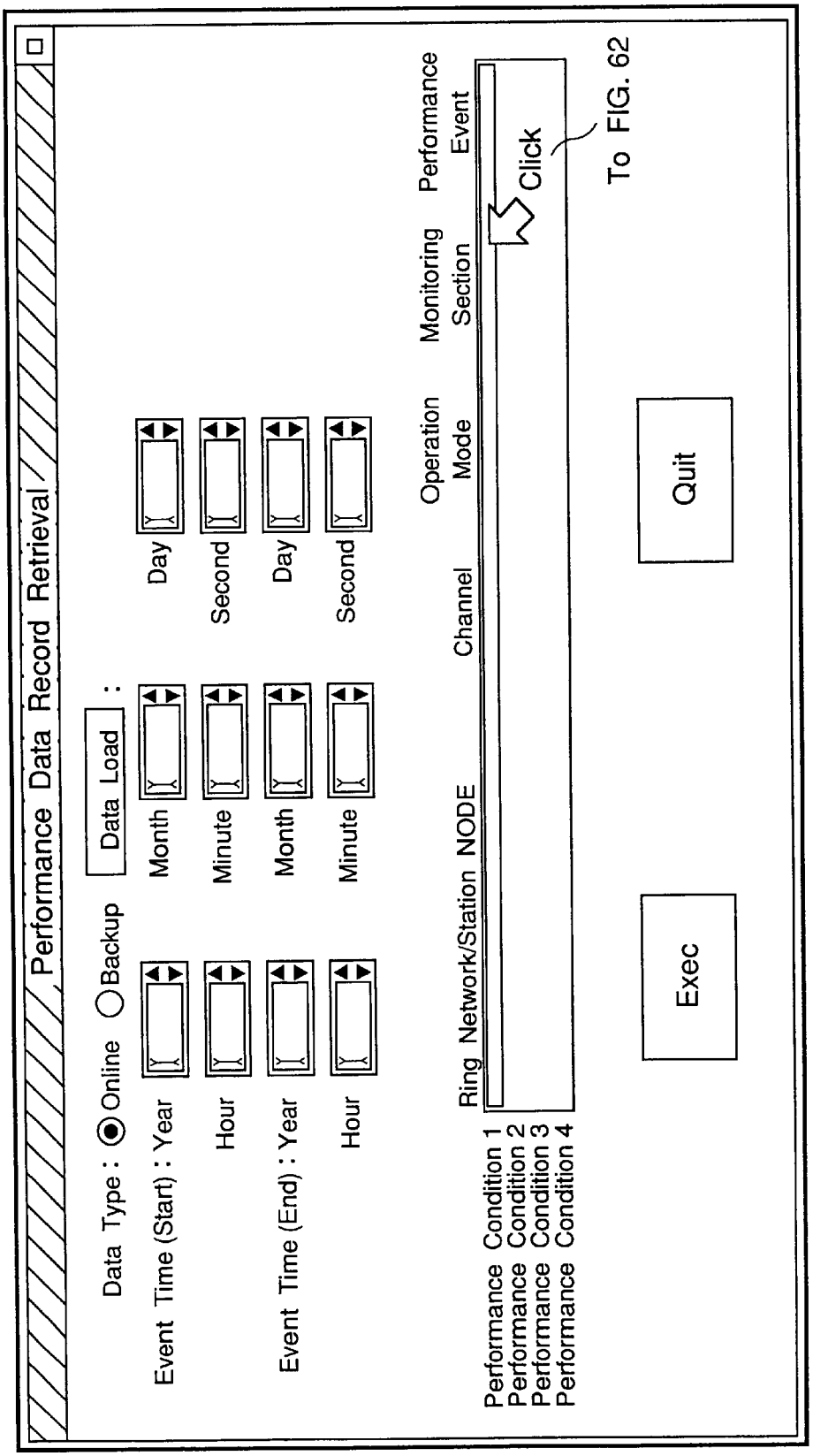
FIG. 61 is a view showing a Performance Data Record Retrieval window.

In FIG. 60, when the Performance Data Record Retrieval button is clicked, a Performance Data Record Retrieval window shown in FIG. 61 is displayed. The window shown in FIG. 61 is used for retrieving a quality log concerning the network system from the data base in the U-NME 3 or the files in the CMT 36. As retrieval conditions specified in the FIG. 61 window, there are a time range including date and time and conditions specified as Performance Conditions 1 to 4. The Performance Conditions 1 to 4 are characterized by specification items consisting of the Ring Network/Station, the NODE, the Channel, the Operation Mode, the Monitoring Section, and the Performance Event.

Figure 63:
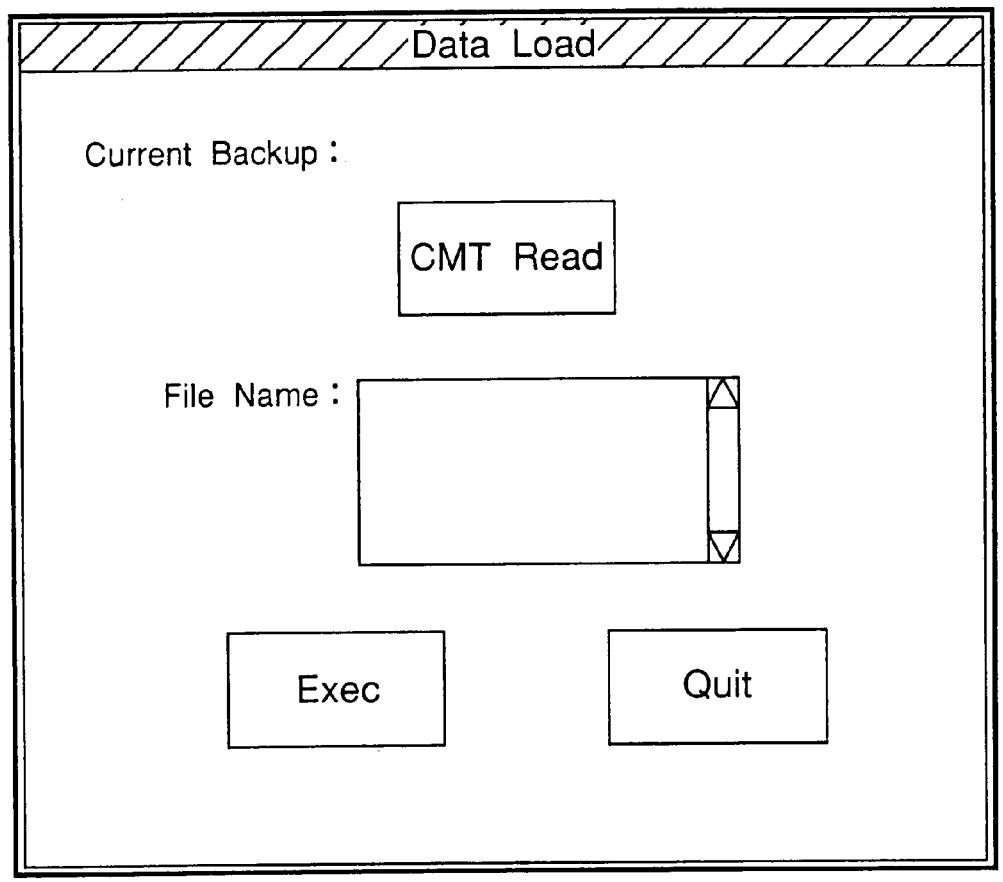
FIG. 63 is a view showing a Data Load window.

The window depicted in FIG. 61 is similar to the Record Retrieval window shown in FIG. 28. However, the window shown in FIG. 61 is different from the window illustrated in FIG. 28 in that it specializes in retrieval of quality information (performance information). In the FIG. 61 window, the Data Type is specified as similar to FIG. 28. When the Backup is specified, a Data Load window shown in FIG. 63 is opened. When a name of a file to be loaded and the like is specified in the window illustrated in FIG. 63, desired data is read in the data base in the U-NME 3.

Subsequently, in FIG. 61, after the time range (year/month/day/hour/minute/second) of data to be read is specified, up to four retrieval conditions are specified as the Performance Conditions 1 to 4. When any area (corresponding to the Performance Conditions 1 to 4) in a small window displayed beside the Performance Conditions 1 to 4 is clicked, the Performance Data Record Retrieval Condition window illustrated in FIG. 62 is opened. In the window shown in FIG. 62, detailed retrieval conditions of the performance data are specified.

In FIG. 61, when the Performance Condition 1 is clicked, the FIG. 62 window in which 1 is shown in the section "Performance Condition" is opened. In the window shown in FIG. 62, a node as a retrieval target is specified in the sections Station/Ring Network and NODE. These sections are displayed in the pull-down menu format, and the NODEs which can be selected in the section NODE vary in accordance with the selected ring network.

In FIG. 62, any channel of LS (low-speed side) or HS (high-speed side) is selected in the section Channel. In the section Operation Mode, any one of SRV (service system) or PRT (standby system) is selected. In the section Monitoring Section, either or both (namely, all the sections) of R-Section (Regenerator Section) or M-Section (Multiplexer Section) are specified (checked). Specification performed herein corresponds to specification of a time slot in an SOH (Section Over Head) of an SDH frame. That is, the type of information which should be written is previously specified in association with each of the time slots in the SOH, and there are places where data concerning the R-Section and data concerning the M-Section are written. The quality information associated with each section is collected. Therefore, the range of data to be retrieved differs depending on the content specified in the window shown in FIG. 62.

Figure 74:
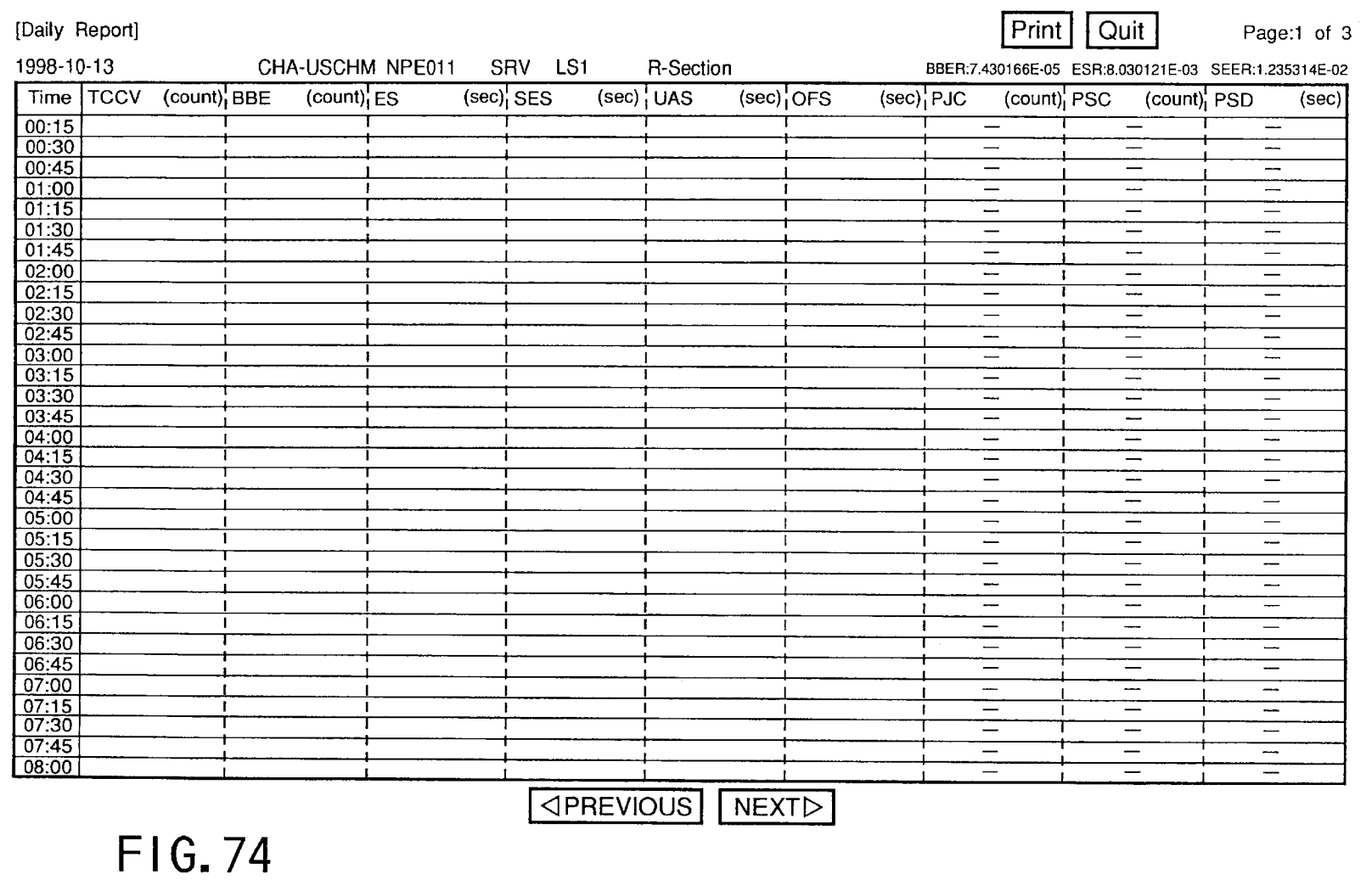

In the Performance Event shown in FIG. 62, a type of quality information to be retrieved is specified. As the quality information, as shown in FIG. 74, there are TCCV (Total Count of Code Violation), BBE (Background Block Error), ES (Errored Second), SES (Severely Errored Seconds), UAS (Unavailable Seconds), OFS (Out of Frame Second), PJC (Pointer Justification Count), PSC (Protection Switch Count), PSD (Protection Switch Duration) and others.

When the Exec button is clicked after each item is specified in the FIG. 62 window, display returns to FIG. 61, and the set content is displayed. As described above, each Performance Condition is set. In the FIG. 61 window, only one condition may be specified according to needs, or up to four conditions may be independently set.

Figure 64:
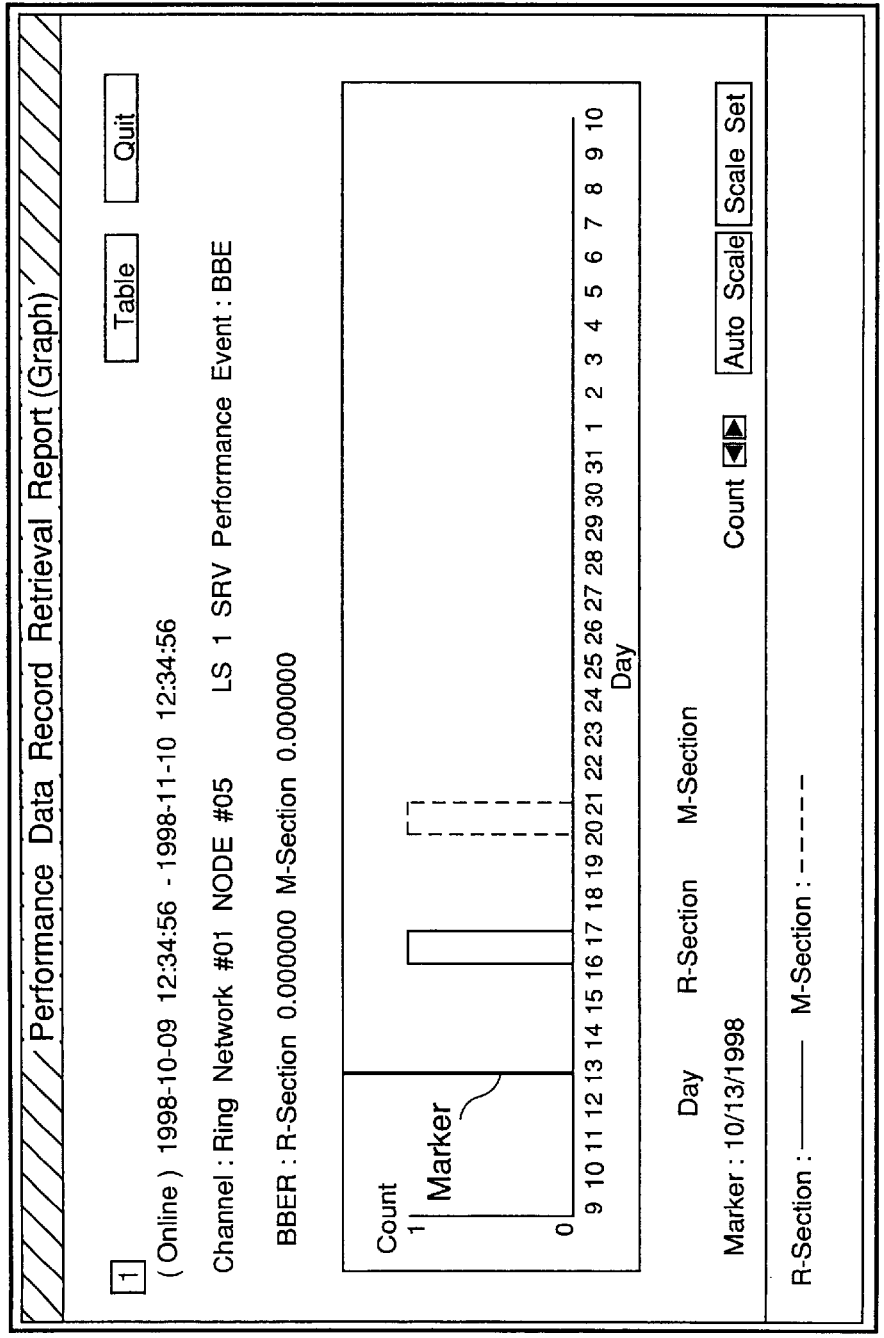
FIG. 64 is a view showing a Performance Data Record Retrieval Report (Graph) window.
Figure 65:
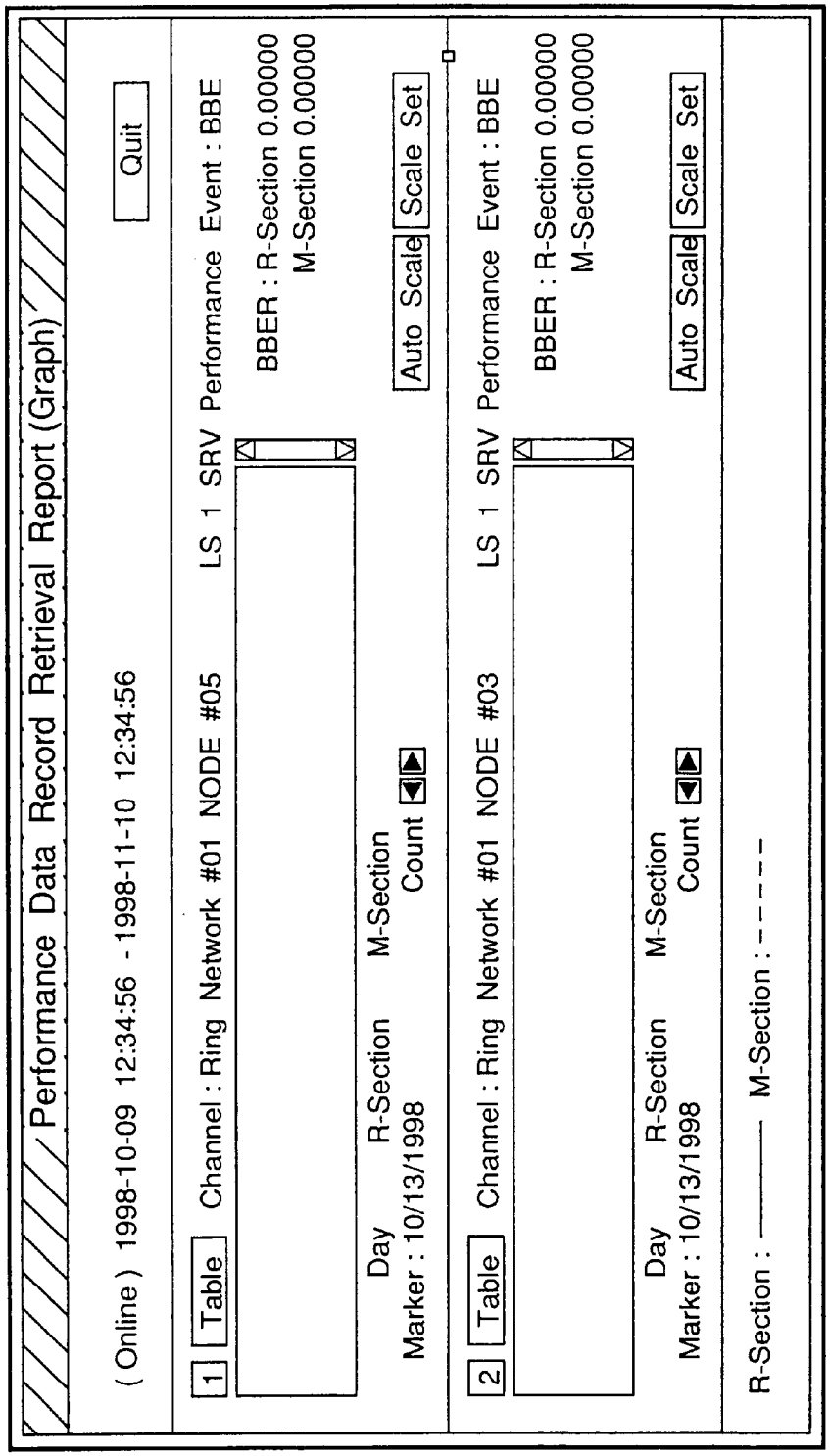
FIG. 65 is a view showing a Performance Data Record Retrieval Report (Graph) window.
Figure 66:
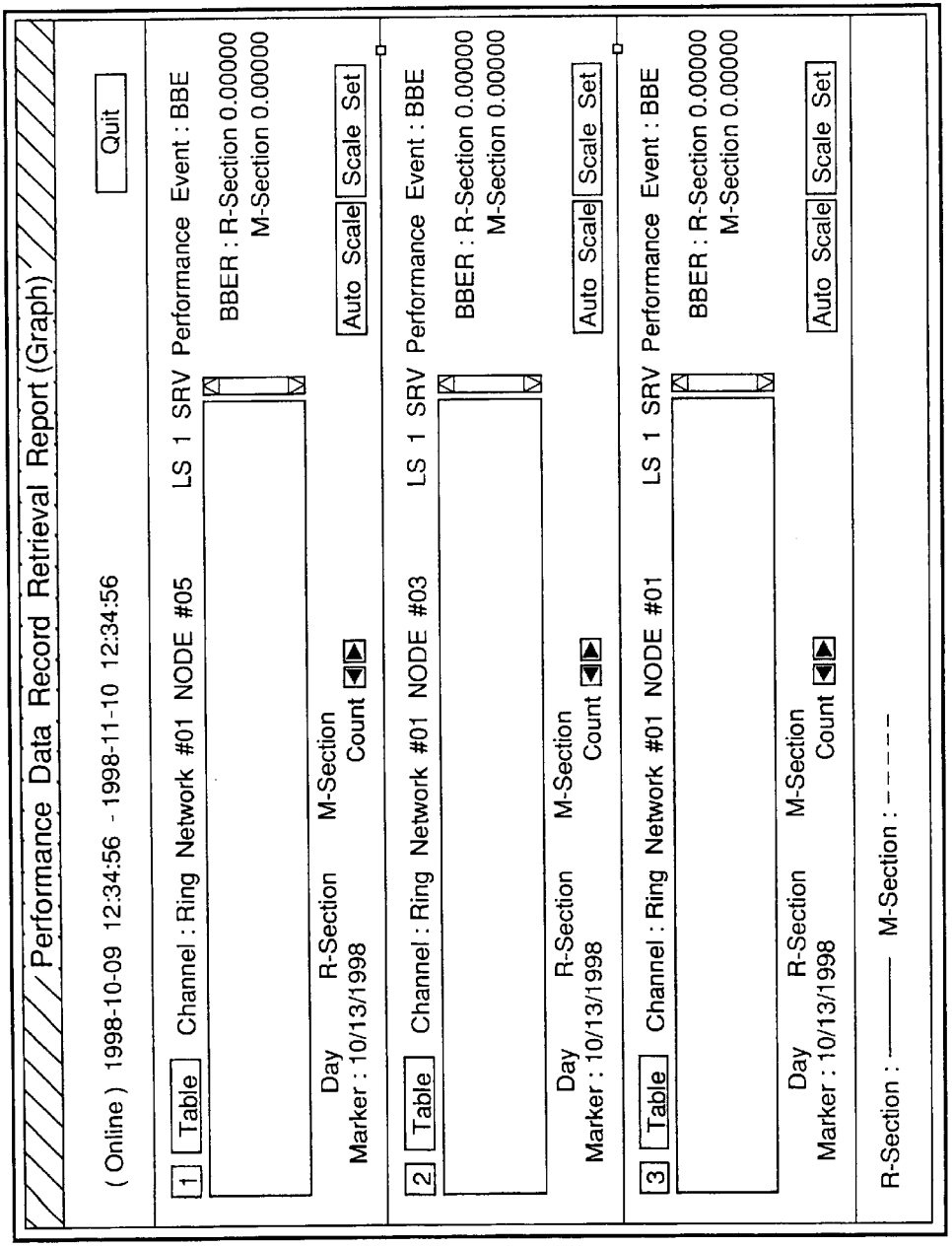
FIG. 66 is a view showing a Performance Data Record Retrieval Report (Graph) window.

When the Exec button is clicked with the setting being completed in FIG. 61, the data base is looked up, and its result is displayed as shown in FIGS. 64 to 66. FIGS. 64 to 66 are referred to as Performance Data Record Retrieval Report (Graph) windows, and a result of retrieval of quality information is displayed in the graph form. Graphs whose number corresponds to a number of Performance Conditions specified in the FIG. 61 window are displayed in one window as shown in FIG. 64 (one), FIG. 65 (two) and FIG. 66 (three). In FIGS. 64 to 66, the Performance Conditions are distinguished by each numeric figure in a square.

As a typical example, the graph shown in FIG. 64 will be explained. This is similar to FIGS. 65 and 66. In the graph of FIG. 64, the content of the specified Performance Condition is displayed as a text sentence. In this example, as an event which is a target of retrieval, BBE (Background Block Error) is displayed.

In a section where the graph is displayed, a graph showing a count value (Count) of BBER (generation ratio of BBE) in the vertical axis and date (Day) in the horizontal axis is displayed. That is, a number of times of observation of BBER per day from October 9 to November 10 is aligned and displayed in accordance with the R-Section (solid line) and the M-Section (dotted line).

Figure 67:
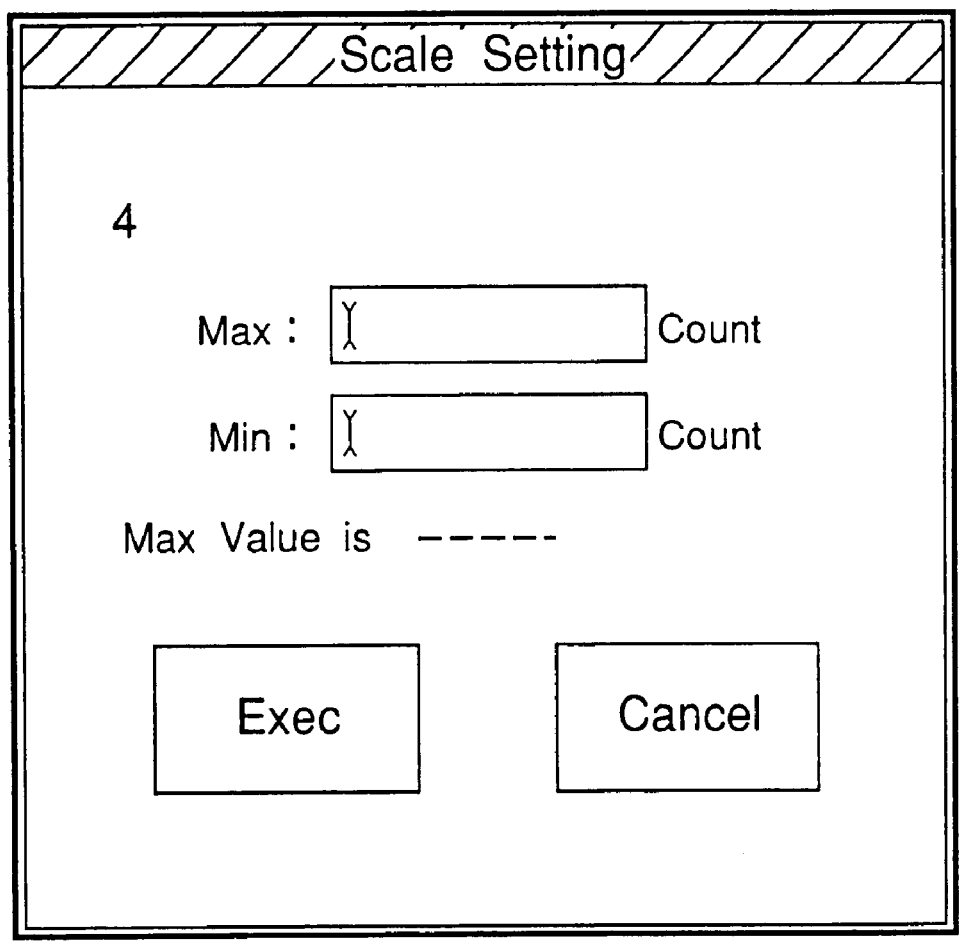
FIG. 67 is a view showing a Scale Setting window.

In the FIG. 64 window, buttons "Auto Scale" and "Scale Set" are provided on the lower right side. When the Auto Scale button is clicked, a scale of the vertical axis is automatically changed so that a maximum value of the count becomes approximately 80% of a length of the vertical axis. When the Scale Set button is clicked, a Scale Setting window shown in FIG. 67 is displayed, and a maximum value and a minimum value of the vertical axis are set in the window depicted in FIG. 67. By doing so, the graph can be easily seen when irregularities in the count values are large.

In addition, a marker which can be moved in the horizontal direction and displayed in the graph is shown in the window depicted in FIG. 64. This marker is shown as a vertical line, and clicking a Count button in FIG. 64 can move the marker in the horizontal direction in accordance with each date on the horizontal axis. A count value according to the date where the marker is set is displayed in a section (BEER: R-Section, M-Section) immediately above the graph in the form of a numeric figure. This numeric figure also varies when the marker moves. This is effective when a count value is large. For example, a count value 99 is easily mistakenly seen as a count value 100 depending on how the scale of the vertical axis is set. As a countermeasure, the retrieved count value can be accurately grasped by utilizing this marker.

Figure 68:
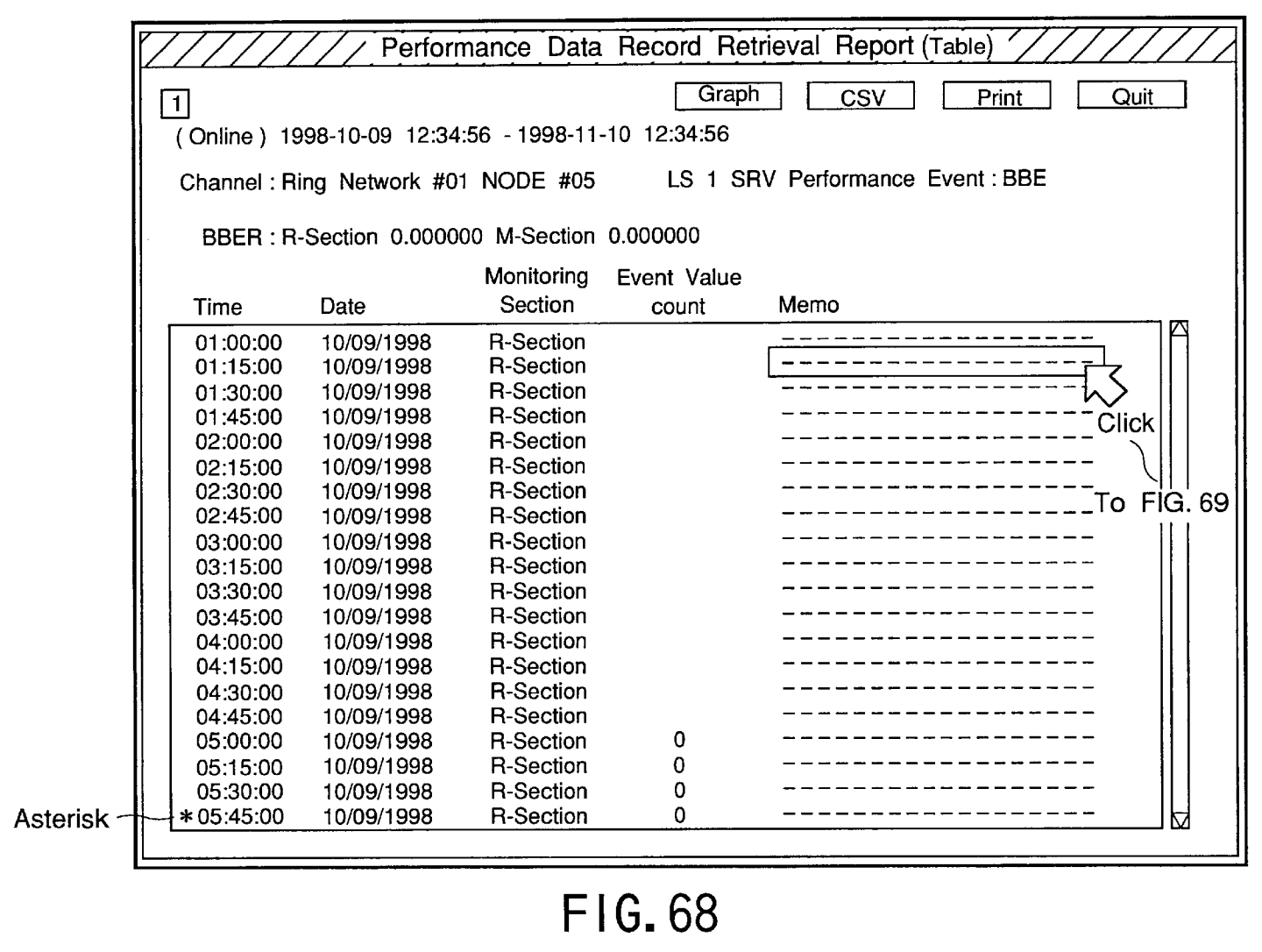

Additionally, a function button "Table" is provided in the window shown in FIG. 64. When this Table button is clicked, a Performance Data Record Retrieval Report (Table) window depicted in FIG. 68 is displayed. A result of retrieval of quality information is displayed in the FIG. 68 window in the table form. That is, the content shown in the graphs illustrated in FIGS. 64 to 66 is displayed in the FIG. 68 window as text data.

Figure 69:
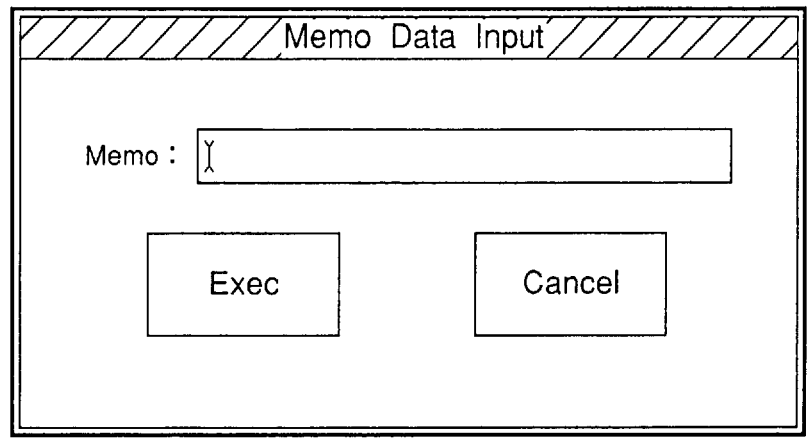
FIG. 69 is a view showing a Memo Data Input window.

In the FIG. 68 window, memo data can be added in accordance with an event at each time. When a notation section of the memo data is arbitrarily clicked in the window illustrated in FIG. 68, a Memo Data Input window shown in FIG. 69 is displayed. The memo data is inputted by using the FIG. 69 window.

A Graph button for returning to the window in which an original graph is displayed is provided in the window illustrated in FIG. 68. By respectively clicking the Graph button and the Table button in the windows shown in FIGS. 64 to 66, the graph display and the table display of the quality data can be alternately shown. It is to be noted that the Graph button may be provided according to needs.

Figure 70:
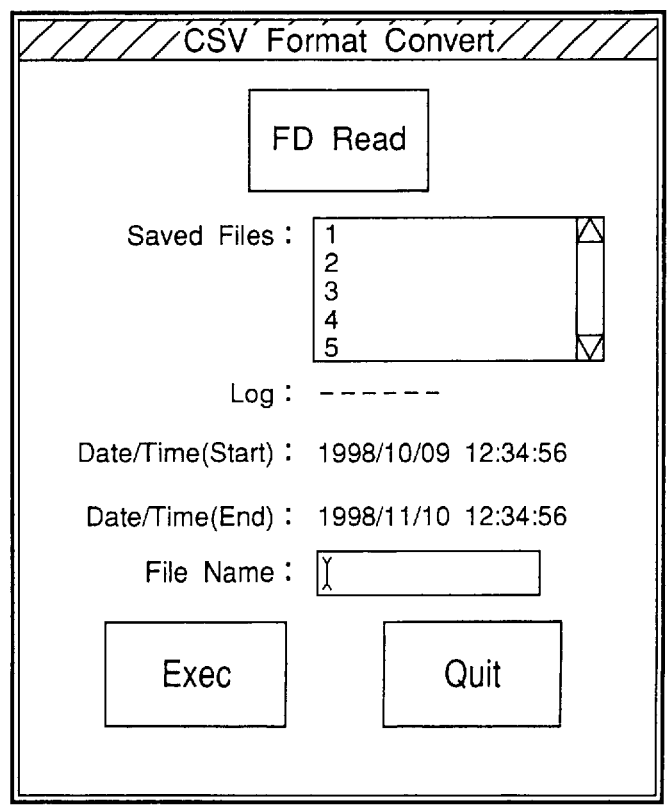
FIG. 70 is a view showing a CSV Format Convert window.

A CSV button is provided in the FIG. 68 window. When this button is clicked, a CSV Format Convert window shown in FIG. 70 is displayed. The window depicted in FIG. 70 is used for setting recording of a retrieval result of quality information in the FDD 310 and the like in the CSV format, and its operation procedure is similar to that shown in FIG. 33. A retrieval result can be also saved as an electronic file by using this window illustrated in FIG. 70, which is convenient. Further, a Print button is provided in the window shown in FIG. 68. When this button is clicked, a result of retrieval can be printed out.

Further, in FIG. 68, an asterisk (*) is shown to the quality information to which a suspect flag is given. The suspect flag is an attribute given to the quality information which can be considered to have low reliability. For example, there are the following factors lowering the reliability of the quality information.

That is, the quality information is generated with a predetermined cycle in each NODE based on a result of measuring the state of the transmission path and the like. However, immediately after startup of the NODE or when the operation time of the NODE is reset, the time required for measuring the transmission path state may be shorter than usual in some cases. Since such a thing can occur, the suspect flag is given to the quality information transmitted to the U-NME 3 in each NODE based on judgment by the NODE itself in order to draw the attention to the reliability of the quality information. It is to be noted that the detail concerning the suspect flag is described in, for example, ITU-T recommendation G.822.

Displaying an asterisk together with the quality information having the suspect flag given thereto can be of assistance to a user for determination, and the memo input function shown in FIG. 69 can be effectively used. There is a utilization method such that a user jots a cause of ON of the suspect flag in order to accommodate other users. Incidentally, a sign indicating the suspect flag is not restricted to the asterisk, and "!" or "?" may be used.

A Daily/Monthly/Annual Report Print window shown in FIG. 71 will now be described. This window is opened when a Daily/Monthly/Annual Report Print button is clicked in the Performance Control window illustrated in FIG. 60. This window is used for printing out a daily report, a monthly report or an annual report concerning the quality information.

Figure 71:
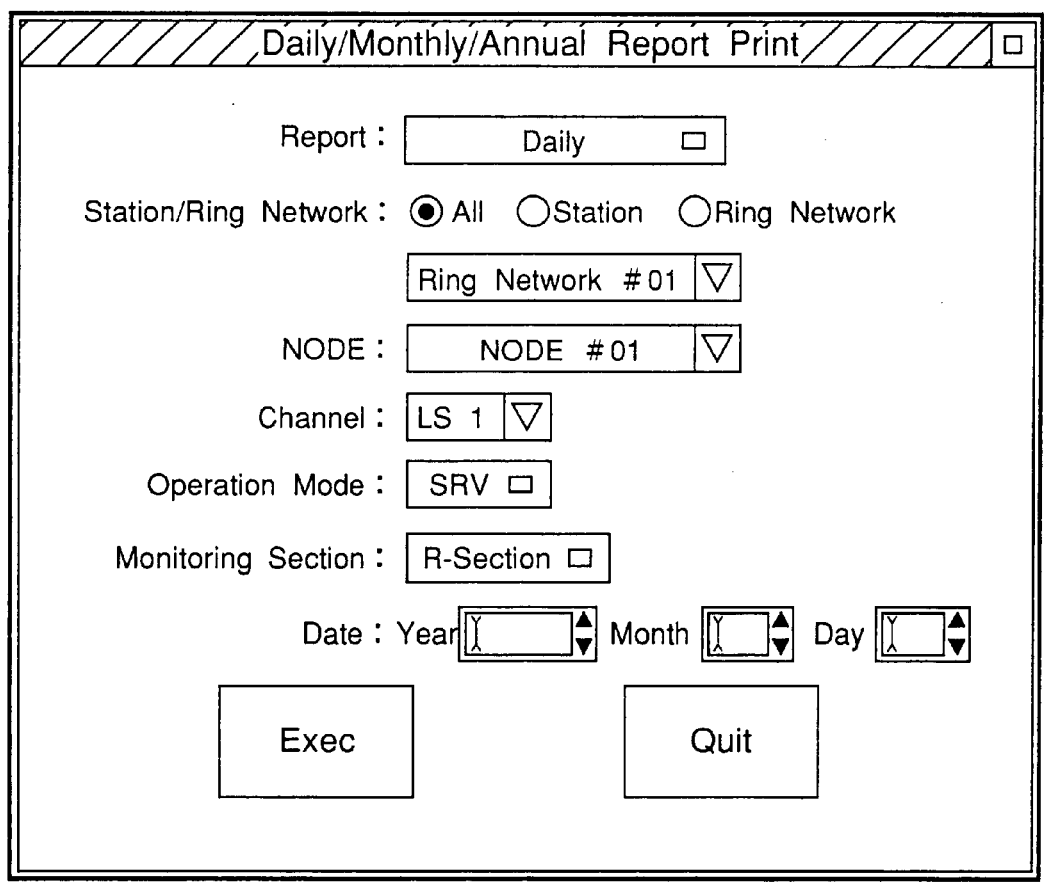
FIG. 71 is a view showing a Daily/Monthly/Annual Report Print window.

In the window shown in FIG. 71, any one of Daily (daily report), Monthly (monthly report) or Annual (annual report) is first selected in a section Report. Further, sections "Station/Ring Network", "NODE", "Channel", "Operation Mode", "Monitoring Section" and "Date" are respectively specified in accordance with, e.g., FIG. 62. When the Exec button is clicked after each item is specified, a result of retrieving the quality information under the specified conditions is outputted in the form of printout or monitor display as shown in FIG. 74. FIG. 74 is a view showing an example of a daily report of the quality information. A PREVIOUS button (previous page) and a NEXT button (next page) are provided in this window, and these buttons are prepared for a case where a result to be outputted consists of a plurality of pages.

In the window shown in FIG. 61, retrieval conditions are specified in units of time. On the contrary, in the window illustrated in FIG. 71, since units for setting the retrieval conditions can be specified as a daily base, a monthly base or an annual base, the convenience for users can be further improved.

Figure 72:
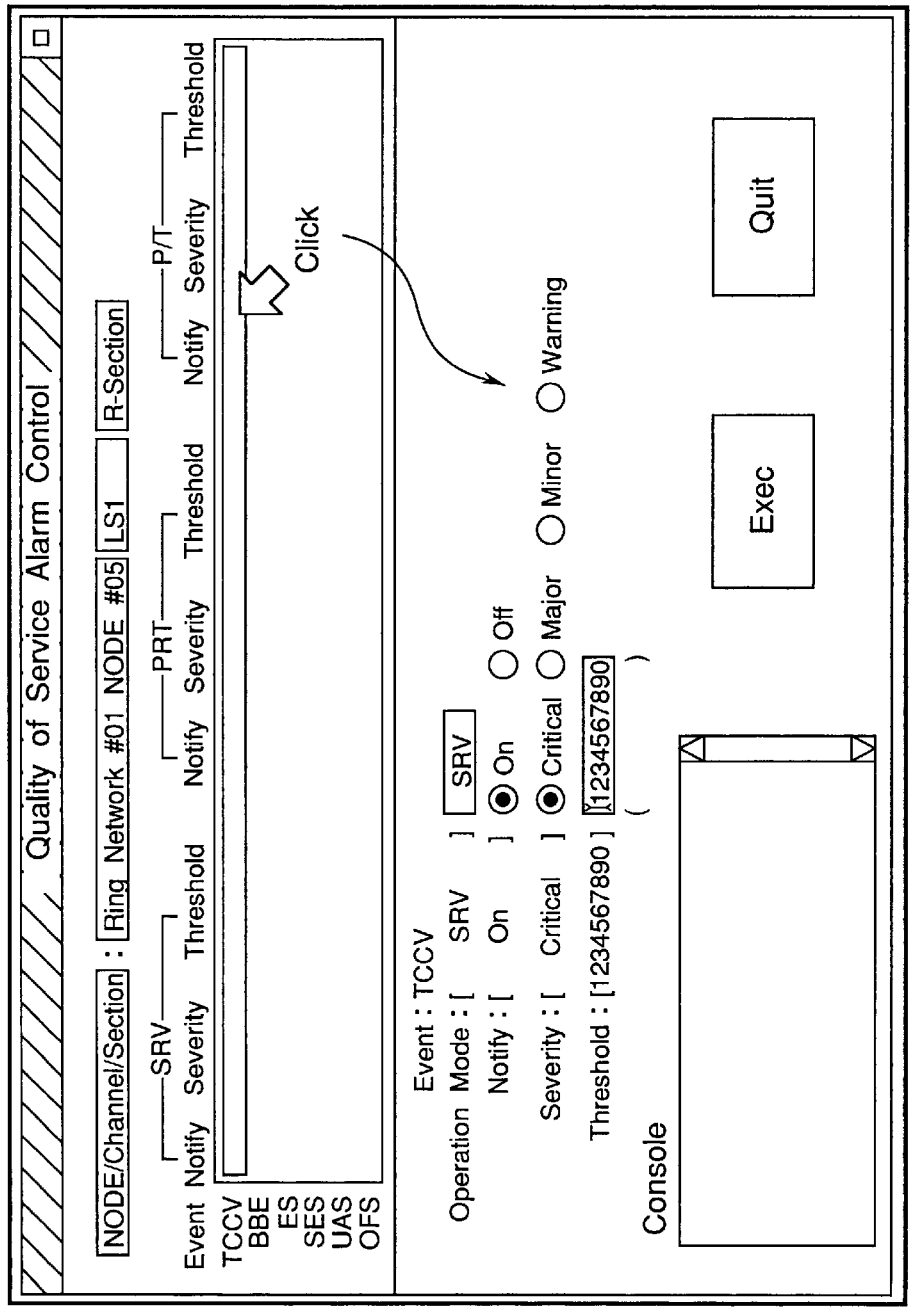
FIG. 72 is a view showing a Quality of Service Alarm Control window.

A Quality of Service Alarm Control window shown in FIG. 72 will now be described. This window is opened when a Quality of Service Alarm Control button is clicked. In this system, when the quality information measured in each NODE demonstrates excessive reduction in quality, an alarm representing that fact is notified from each NODE. The window shown in FIG. 72 is used for setting conditions under which this type of alarm information is generated. A condition set in this window is notified to a NODE as a target. The NODE which has been notified of this condition operates in accordance with this condition.

Figure 73:
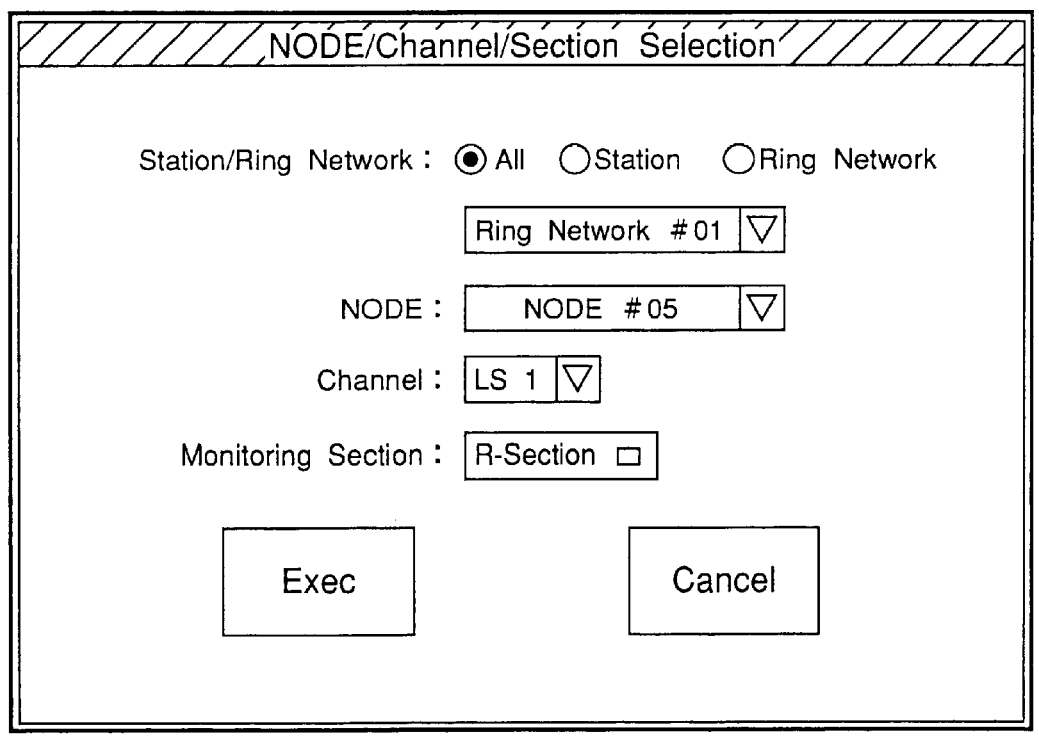
FIG. 73 is a view showing a NODE/Channel/Section Selection window.

When a NODE/Channel/Selection button on the upper left side in FIG. 72 is clicked, a NODE/Channel/Section Selection window shown in FIG. 73 is displayed. In the window illustrated in FIG. 73, a ring network, a node, a channel and a section in which the quality information is targeted are set in accordance with the operation using the window depicted in FIG. 71. Consequently, the set content is displayed on the right side of the item with ":" therebetween in FIG. 72. Subsequently, the detailed content is set in accordance with each set (TCCV to OFS) of the quality information (Event) in the window illustrated in FIG. 72.

For example, when the window is clicked for TCCV, the setting item at the lower part of the window functions, and the states of Operation Mode, Notify, Severity and Threshold concerning TCCV are set. In the Operation Mode, any one of SRV, PRT, P/T (part time) is selected. Incidentally, when HS is selected in the Channel, P/T is not included in the alternatives.

Then, when On or Off is selected in the Notify, notification or non-notification of the alarm to the U-NME 3 is set. In the Severity, any one of Critical, Major, Minor and Warning is selected, and ranking of the alarm to be notified to the U-NME 3 is set. In the Threshold, a threshold value used when performing notification is set by inputting a numeric figure.

When each item is set in accordance with each Event and the Exec button is then clicked, the set content is notified to the NODE as a target. The NODE which has been informed of the set content notifies the alarm in accordance with the set content. As a result, using the above-described functions can improve the convenience when managing the communication quality.

(Alarm Control)

Figure 75:
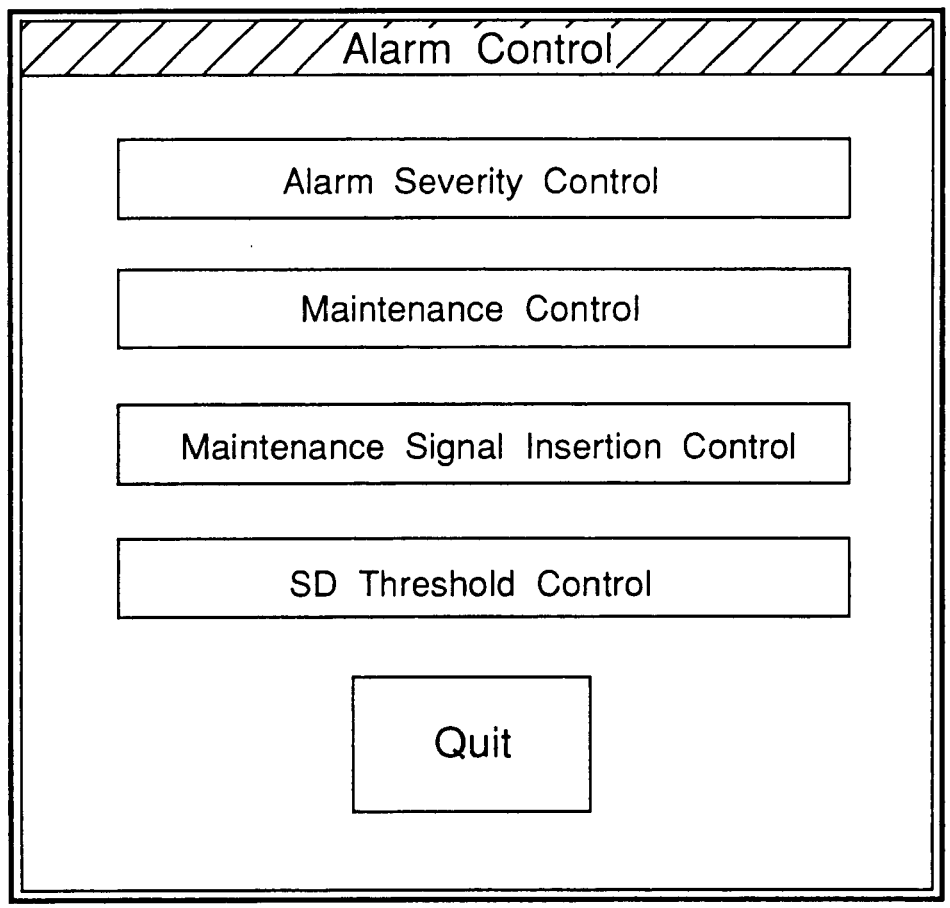
FIG. 75 is a view showing an Alarm Control window.

Description will now be given as to functions when an Alarm button is clicked in the main screen shown in FIG. 3. When the Alarm button is clicked, an Alarm Control window shown in FIG. 75 is displayed. This window displays a menu of functions concerning management of the alarm. This window is provided with functions indicated as "Alarm Severity Control", "Maintenance Control", "Maintenance Signal Insertion Control" and "SD Threshold Control".

Figure 76:
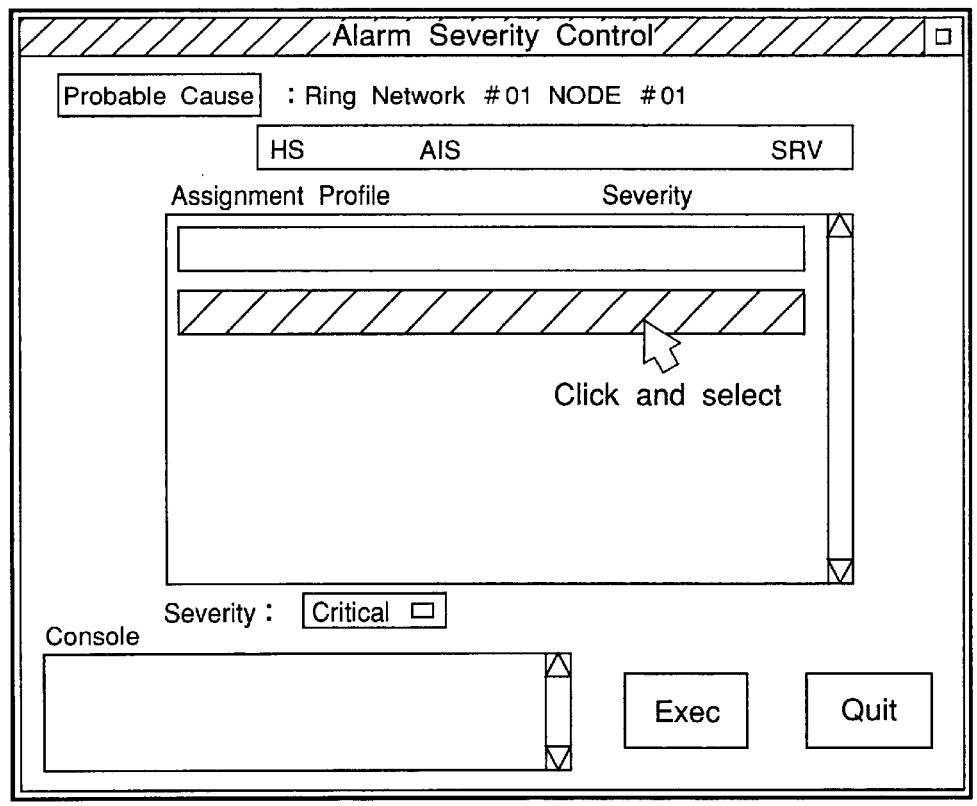
FIG. 76 is a view showing an Alarm Severity Control window.

In FIG. 75, when the Alarm Severity Control button is clicked, an Alarm Severity Control window shown in FIG. 76 is displayed. This window is used for arbitrarily specifying a NODE and setting an importance level (or an severity level) of alarm information notified from that NODE to the U-NME 3 in accordance with each alarm type.

Figure 77:
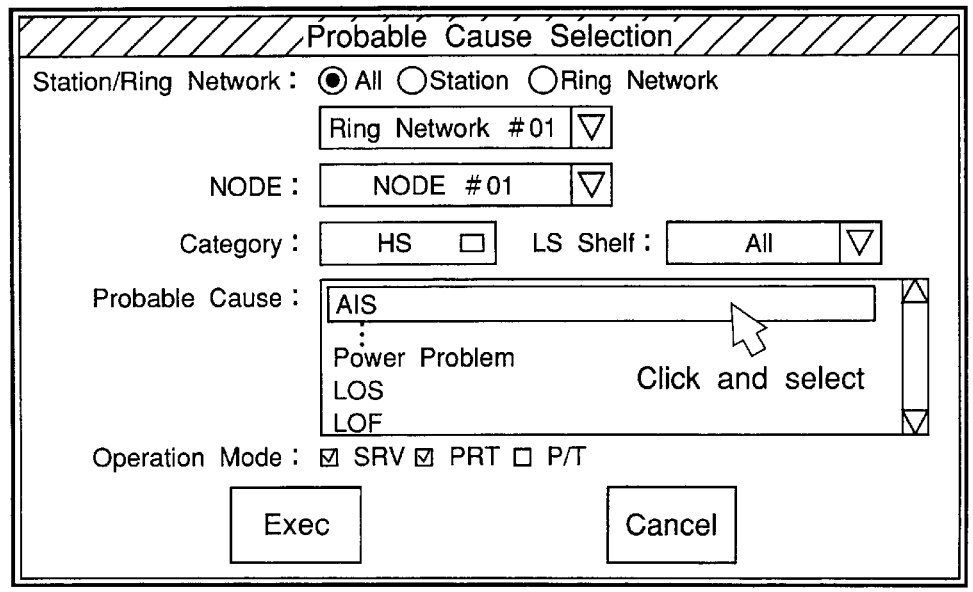
FIG. 77 is a view showing a Probable Cause Selection window.

When a Probable Cause button shown in FIG. 76 is clicked, a Probable Cause Selection window illustrated in FIG. 77 is displayed. In this window, a NODE which is an operation target in sections Station/Ring Network and NODE is specified. Moreover, in this window, a category (HS, LS, Clock, DCC, Equipment, Environment and others) of the specified NODE is designated in a section Category. In particular, when the LS is selected in this section, a section LS Shelf is displayed in the active mode, and a shelf of the NODE selected by using the section LS Shelf is selected.

In the section Probable Cause of a window shown in FIG. 77, a factor of occurrence of an alarm which is previously registered as the operation target is clickably displayed in a scroll window. Any factor is clicked and selected in this scroll window. As factors of occurrence of the alarm, there are AIS (Alarm Indication Signal), Power Problem, LOS (Loss of Signal), LOF (Loss of Frame) and others. In addition, when the Exec button is clicked after an arbitrary section is checked in the Operation Mode in the FIG. 77 window, the screen display returns to FIG. 76.

When the Exec button is clicked in the FIG. 77 window, the current state concerning the content set in the window shown in FIG. 77 is read from the NODE as the operation target. This read content is reflected to display of FIG. 76. That is, the NODE as the operation target and its category, the Probable Cause and the Operation Mode are displayed in the window depicted in FIG. 76. Additionally, in the FIG. 76 window, a list of the current states read from the node is clickably displayed in a section Assignment Profile.

In the Assignment Profile, an arbitrary item is clicked, and the severity is individually set in the section Severity with respect to the clicked item. As the Severity, there are Critical, Major, Minor, Warning, Non Alarm and others.

When setting in the FIG. 76 window is completed and the Exec button is then clicked, the NODE specified as the operation target is informed of the set content. In the NODE which has been informed of the setting content, conditions concerning notification of the alarm are newly set. Information representing whether setting has been normally completed (OK) or not been normally completed (NG) is displayed in the section Console shown in FIG. 76.

As described above, the severity of the alarm notified from the NODE can be arbitrarily set from the U-NME 3 side. As a result, the following things can be enabled. For example, when operations such as an operation test of the NODE, a setting operation or card replacement are performed, a large quantity of various kinds of alarm is generated on the NODE side. If all of these alarms are notified to the U-NME 3, the communication resource is consumed in order to notify the alarms, which may adversely affect the system operation. In particular, this affection is prominent to AIS (Alarm Indication Signal).

As a countermeasure, such a window as shown in FIG. 76 is provided so that the severity can be arbitrarily set in accordance with each alarm. Consequently, setting that required minimum alarms can be generated during testing is enabled. As a result, the system operation can be facilitated. Further, if the severity of the alarm can be arbitrarily set, distinction by using different colors in the screen can be performed in accordance with the severity.

Figure 78:
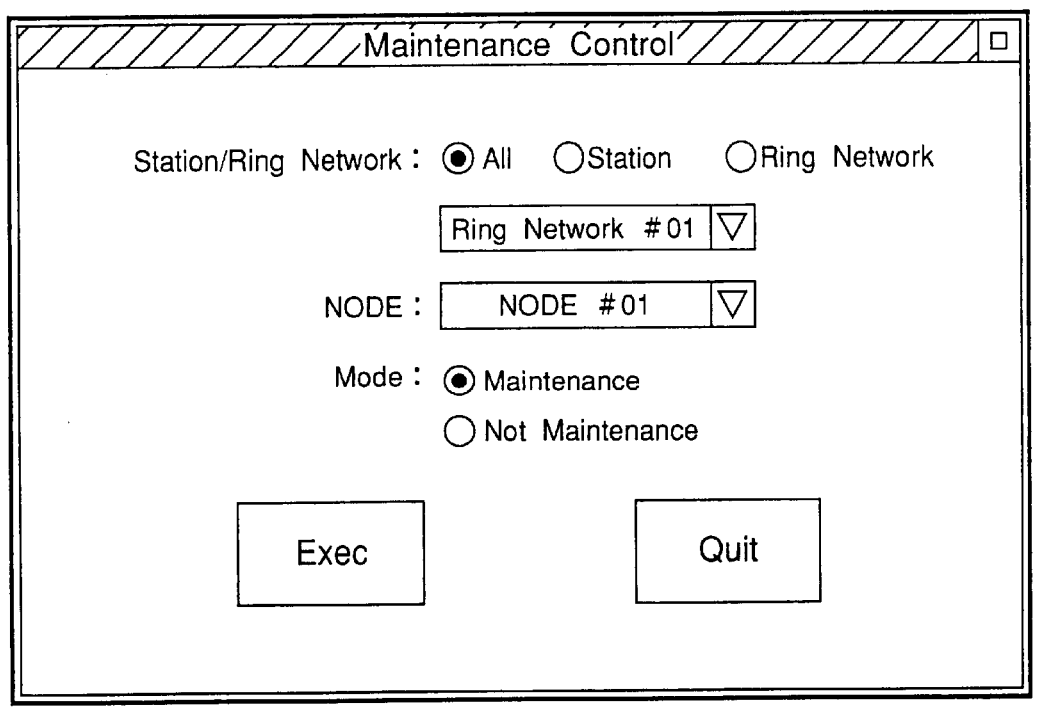
FIG. 78 is a view showing a Maintenance Control window.

A Maintenance Control window shown in FIG. 78 will now be described. The window illustrated in FIG. 78 is displayed when a Maintenance Control button is clicked in the window illustrated in FIG. 75. This window is sued for changing an operation mode of the NODE. As the operation mode in the NODE, there is Maintenance (maintenance mode) or Not Maintenance (non-maintenance mode). In the FIG. 78 window, the NODE as an operation target is selected similarly as in FIG. 77. Then, when either Maintenance or Not Maintenance is checked and thereafter the Exec button is clicked, the NODE is informed of the set content.

Description will now be given as to a Maintenance Signal Insertion Control window illustrated in FIG. 79. The FIG. 79 window is displayed when a Maintenance Signal Insertion Control button in FIG. 75 is clicked. This window is used for arbitrarily specifying a NODE and setting permission or non-permission of transmission of a signal (Maintenance Signal) concerning maintenance in particular among various kinds of alarm information. As the maintenance signal, there is AIS mentioned above, for example.

Figure 79:
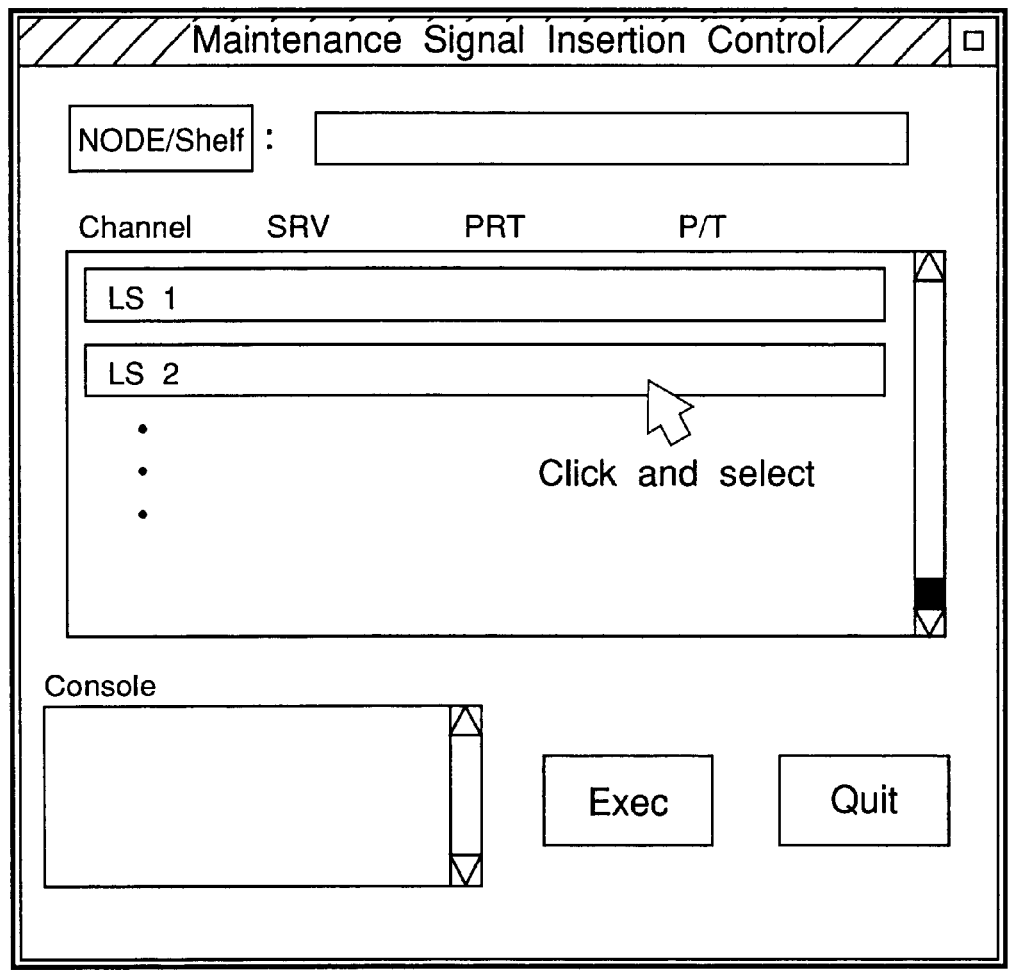
FIG. 79 is a view showing a Maintenance Signal Insertion Control window.
Figure 80:
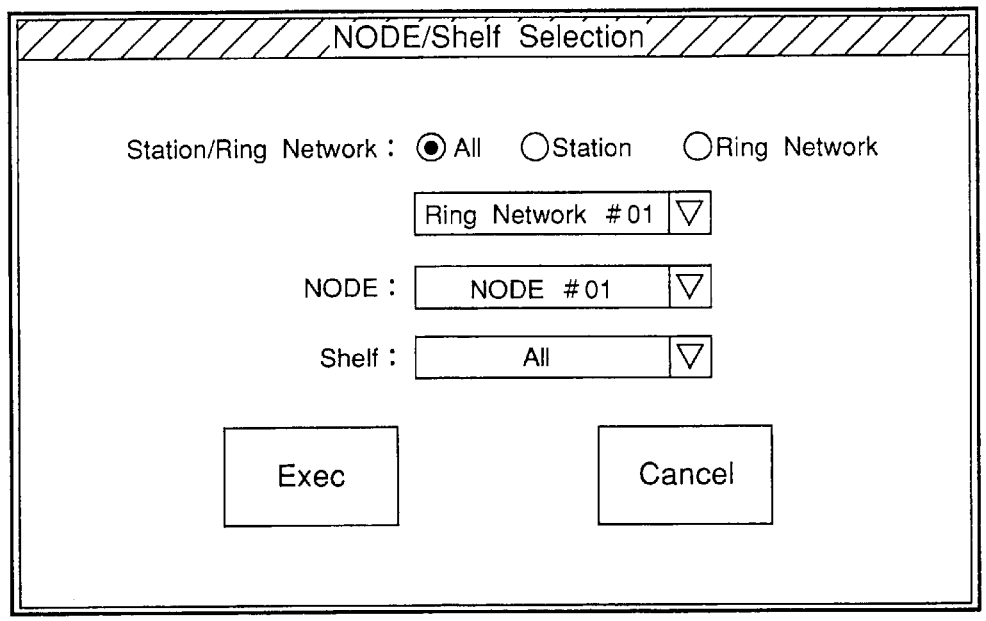
FIG. 80 is a view showing a NODE/Shelf Selection window.

In the window shown in FIG. 79, when the NODE/Shelf button is clicked, a NODE/Shelf Selection window illustrated in FIG. 80 is opened. In the FIG. 80 window, a NODE as an operation target and its shelf are selected. When the Exec button is clicked in the FIG. 80 window, display returns to the window shown in FIG. 79. At this moment, a result selected in the FIG. 80 window is displayed in the window shown in FIG. 79. Furthermore, the current state is read from the NODE as the operation target is read and displayed in a scroll window in FIG. 79.

Figure 81:
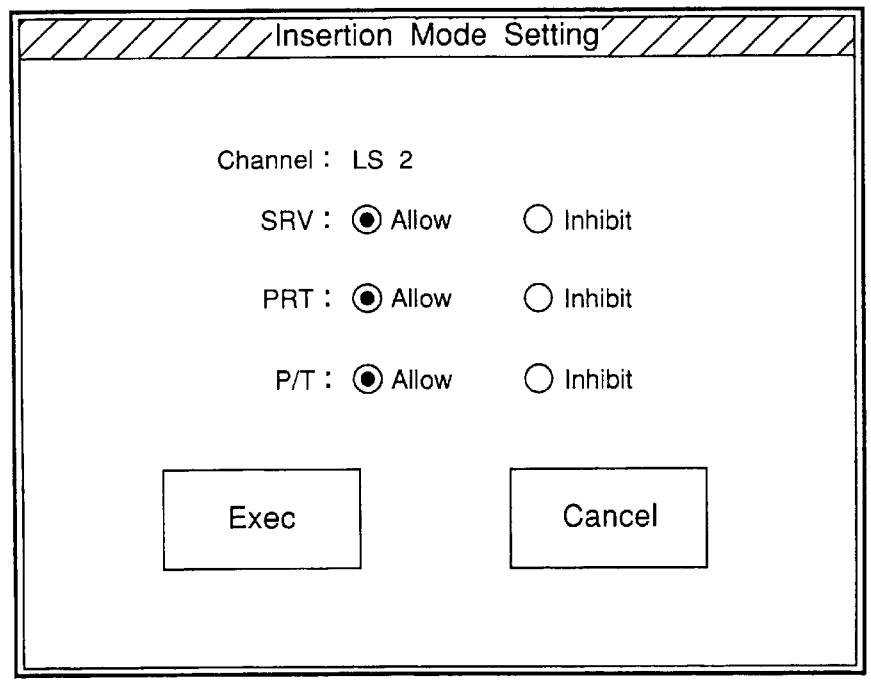
FIG. 81 is a view showing an Insertion Mode Setting window.

When an arbitrary item (channel) is clicked in the FIG. 79 scroll window, an Insertion Mode Setting window illustrated in FIG. 81 is opened. In the FIG. 81 window, either Allow (allowance) or Inhibit (inhibition) is selected for each Operation Mode (SRV, PRT, P/T). In the FIG. 81 window, when the Exec button is clicked, the screen display returns to the FIG. 79 window.

Then, when the Exec button is clicked in the FIG. 79 window, the selected NODE is informed of the set content. The NODE which has been notified of the set content transmits the maintenance signal in accordance with the set content.

Figure 82:
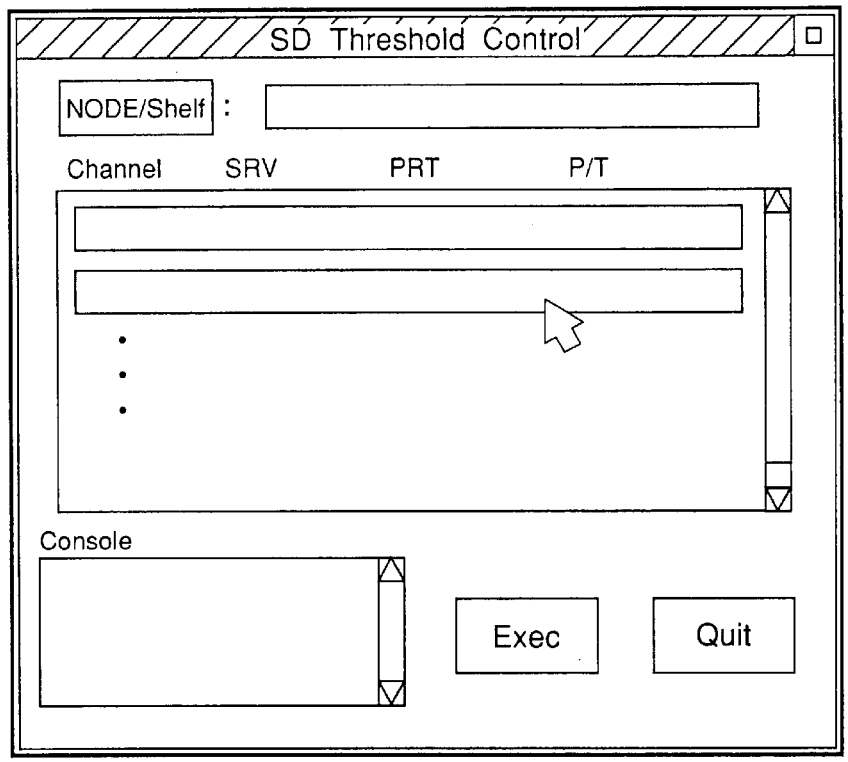
FIG. 82 is a view showing an SD Threshold Control window.

Subsequently, an SD Threshold Control window shown in FIG. 82 will now be described. This window is displayed when an SD Threshold Control button shown in FIG. 75 is clicked. The window depicted in FIG. 82 is used for performing the setting concerning SD (Signal Degrade) of the alarm information in particular. That is, in the FIG. 82 window, a threshold value is set when an SD alarm is generated.

Figure 83:
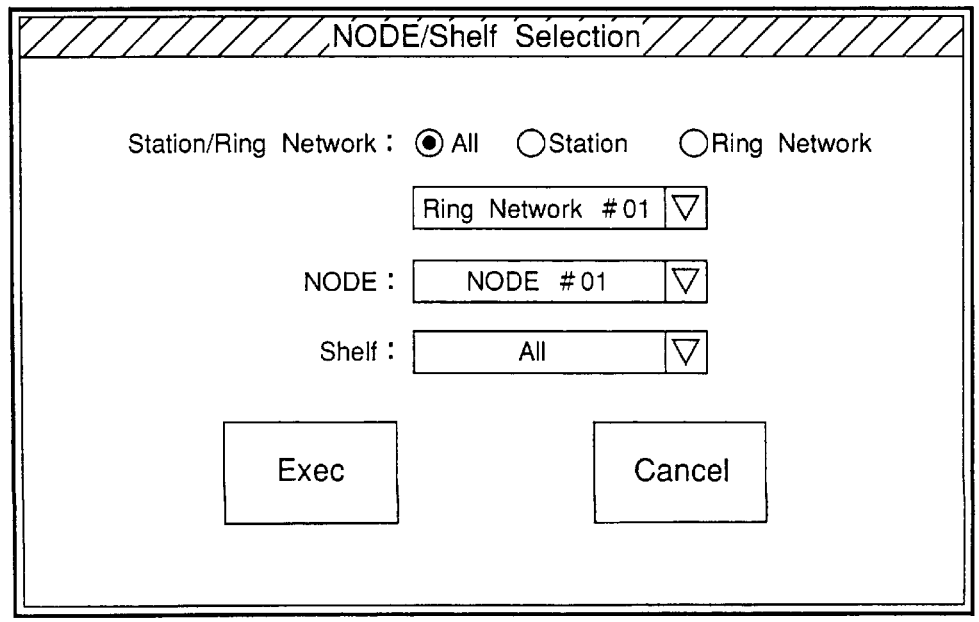
FIG. 83 is a view showing a NODE/Shelf Selection window.

In the FIG. 82 window, FIG. 83 NODE/Shelf Selection window is opened when the NODE/Shelf button is clicked. In the FIG. 83 window, a NODE as an operation target and its shelf are selected. When the Exec button is clicked in FIG. 83, display returns to the window shown in FIG. 82. At that moment, a result selected in the window shown in FIG. 83 is displayed in the window depicted in FIG. 82. Moreover, the current state is read from the NODE as an operation target and displayed in a scroll window illustrated in FIG. 82.

Figure 84:
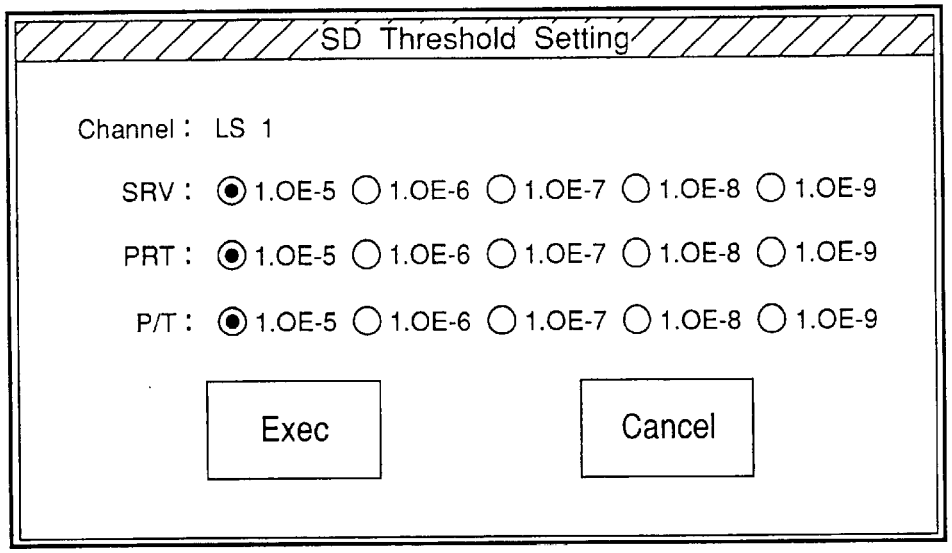
FIG. 84 is a view showing an SD Threshold Setting window.

When an arbitrary item (channel) is clicked in the FIG. 82 scroll window, an SD Threshold Setting window shown in FIG. 84 is opened. In this window shown in FIG. 84, a threshold value used when the SD alarm is transmitted is set for each Operation Mode (SRV, PRT, P/T). When the Exec button is clicked in the FIG. 84 window, the screen display returns to the FIG. 82 window.

Then, when the Exec button is clicked in the FIG. 82 window, the selected NODE is informed of the set content. The NODE which has been informed of the set content transmits the SD alarm in accordance with the set content.

(Network Configuration)

Figure 85:
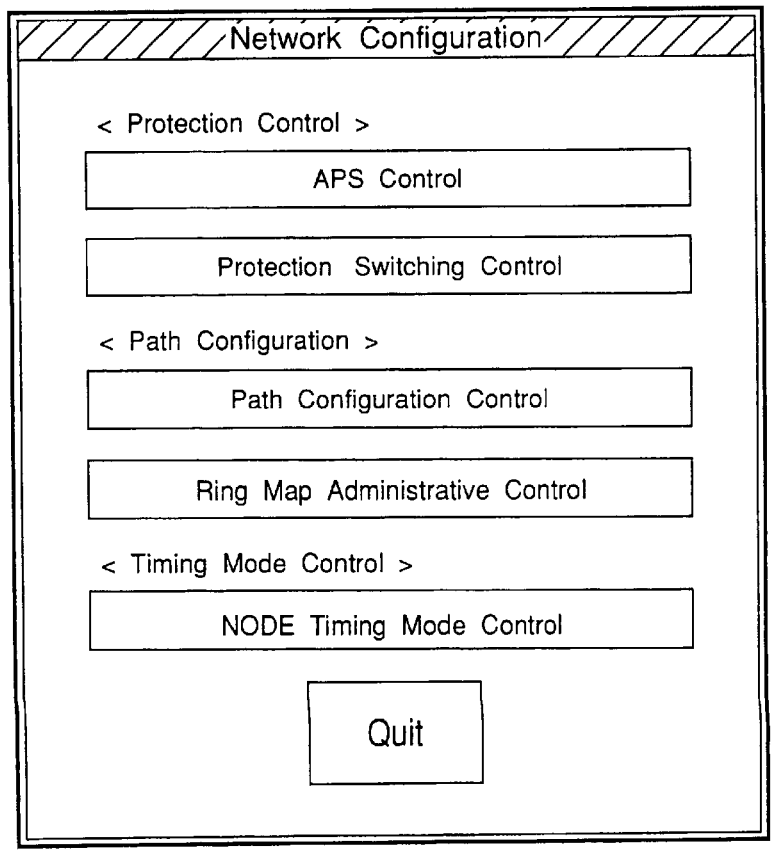
FIG. 85 is a view showing a Network Configuration window.

Description will now be given as to functions when a Network Configuration button is clicked in the main screen in FIG. 3. When the Network Configuration button is clicked, a Network Configuration window illustrated in FIG. 85 is displayed. This window displays a menu of functions concerning the network configuration. This window includes function buttons "APS Control", "Protection Switching Control", "Path Configuration Control", "Ring Map Administrative Control", and "NODE Timing Mode Control".

Figure 86:
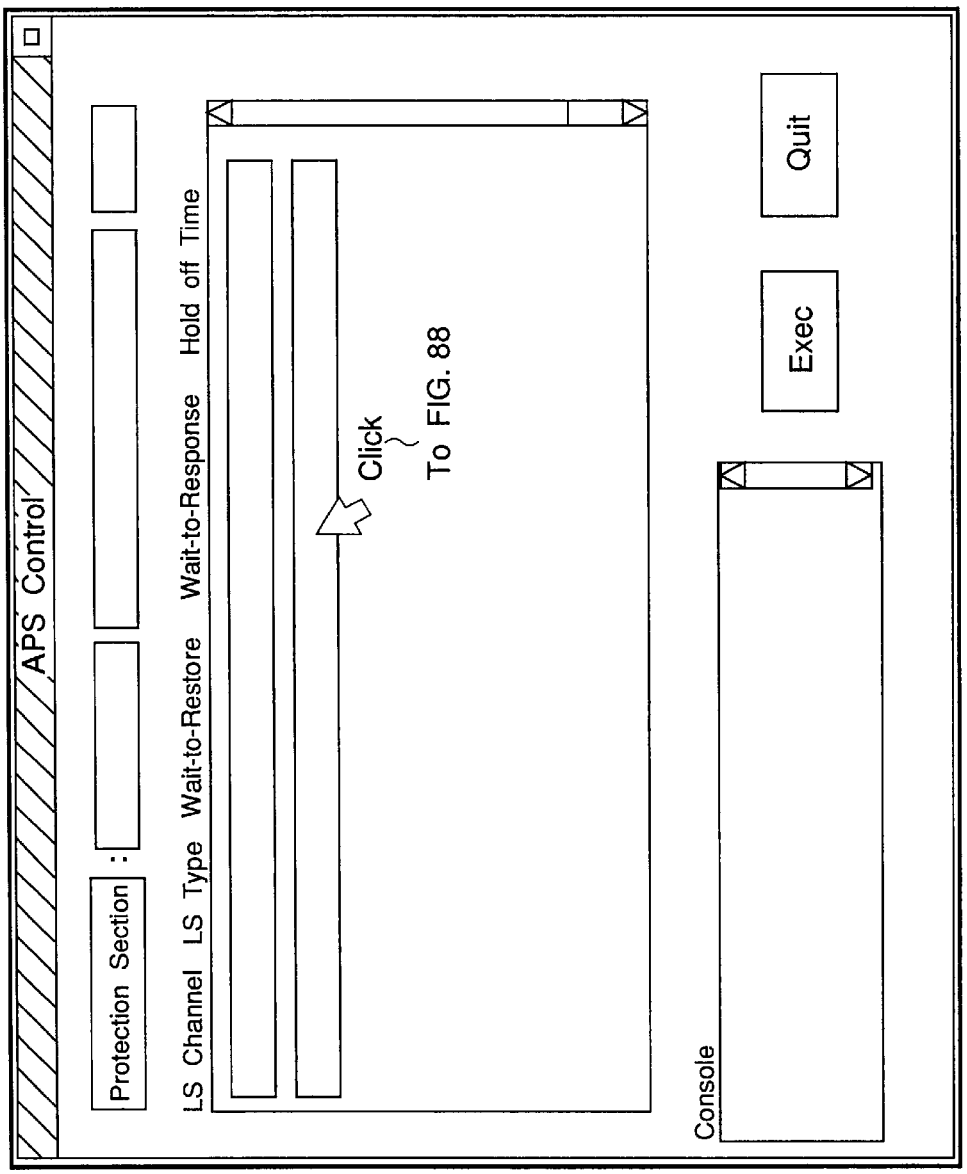
FIG. 86 is a view showing an APS Control window.

In FIG. 85, when an APS Control button is clicked, an APS Control window shown in FIG. 86 is displayed. The window depicted in FIG. 86 is used for setting various parameters concerning the APS function. When a Protection Section button is clicked in this window, a Protection Section Selection window illustrated in FIG. 87 is displayed.

Figure 87:
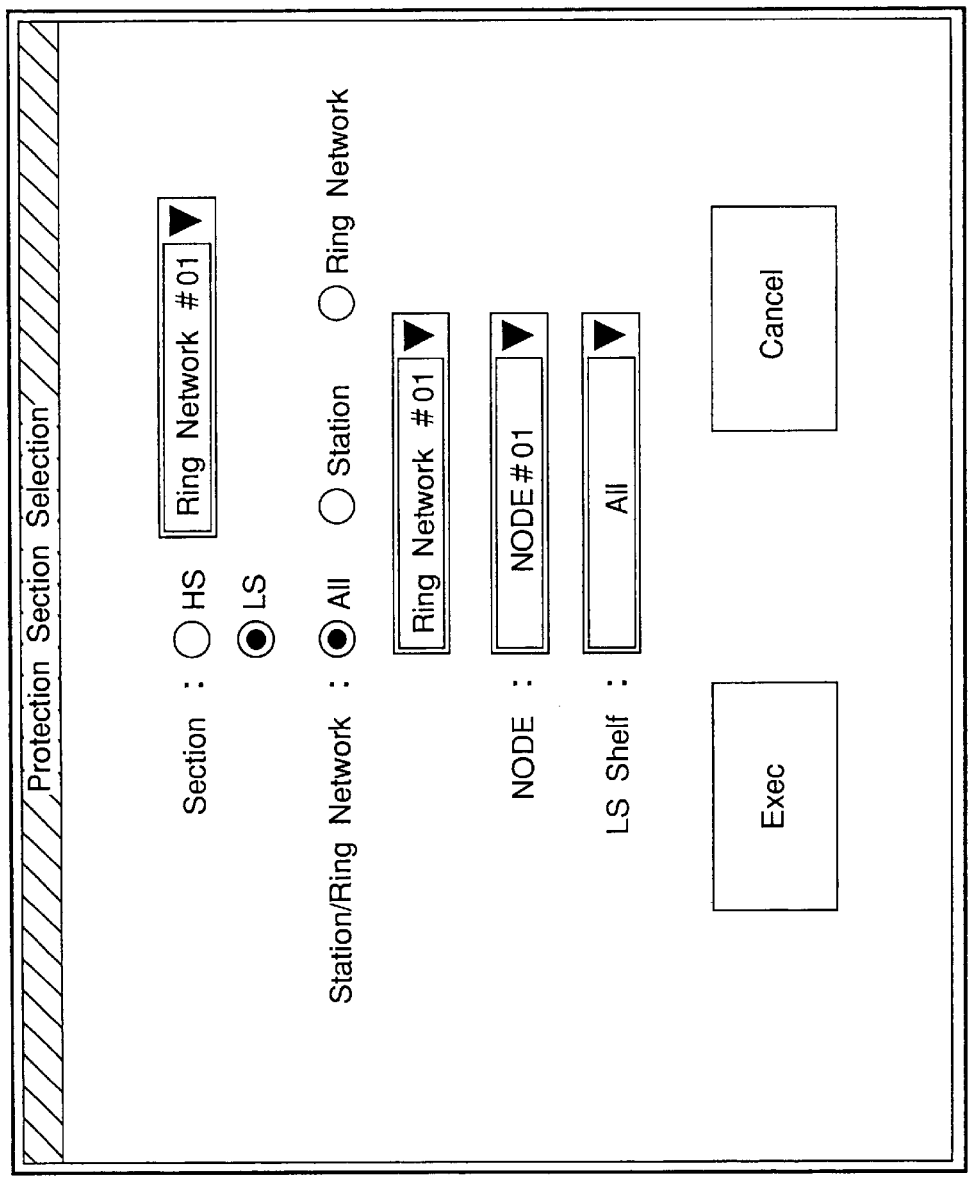
FIG. 87 is a view showing a Protection Section Selection window.

The window shown in FIG. 87 is a screen for setting an operation target, and HS or LS is first selected in a Section option. Here, when LS is selected, a node and its shelf are specified. When HS is selected in Section, Station/Ring Network and the following options become inactive. When setting is carried out and the Exec button is then clicked in this window, the screen display returns to FIG. 86.

When the screen display returns from FIG. 87 to the window depicted in FIG. 86, the current set state of a target selected in FIG. 87 is displayed in a scroll window in the FIG. 86 window. In the scroll window shown in FIG. 86, a plurality of lines are vertically aligned and displayed. Each line corresponds to each shelf of the selected target. The states LS Channel, LS Type, Wait-to-Restore, Wait-to-Response and Hold off Time in each shelf are displayed in the respective lines. The display mode in this scroll window corresponds to the fact that LS is selected in FIG. 87.

Figure 88:
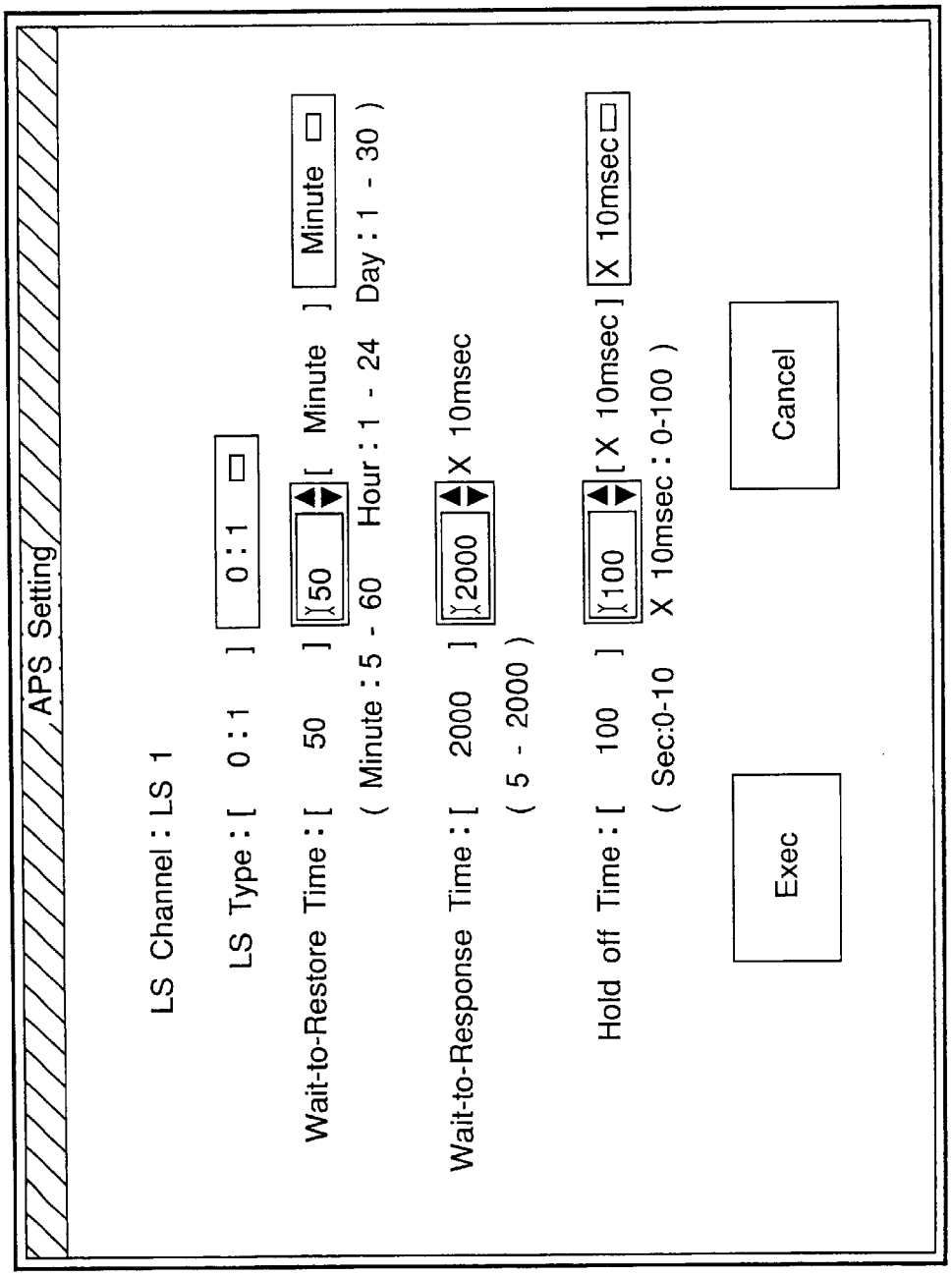
FIG. 88 is a view showing an APS Setting window.

Now, when an arbitrary line is clicked and selected in the scroll window shown in FIG. 86, an APS Setting window illustrated in FIG. 88 is displayed. In the FIG. 88 window, various parameters are inputted for the selected target in the form of numeric figures. In FIG. 88, the APS is specified for the LS Type. Here, a switching mode of 0:1 is selected. Besides, a switching mode of 1+1 and the like can be selected in the window illustrated in FIG. 88.

The items Wait-to-Restore Time, Wait-to-Response Time and Hold off Time in the FIG. 88 window are all time parameters concerning the APS. When the Exec button is clicked after the input operation in the FIG. 88 window, the screen display returns to FIG. 86, and the set content in the window depicted in FIG. 88 is reflected in the set content of the window in FIG. 86.

Incidentally, when the HS (Section) is selected as an operation target in the window shown in FIG. 87, the Station/Ring Network and the following sections become inactive, and the individual NODEs cannot be specified. In response to this fact, the display content in FIGS. 86 to 88 is also changed. That is because the NODEs belonging to the same ring must have the same setting concerning the APS of the HS.

Figure 89:
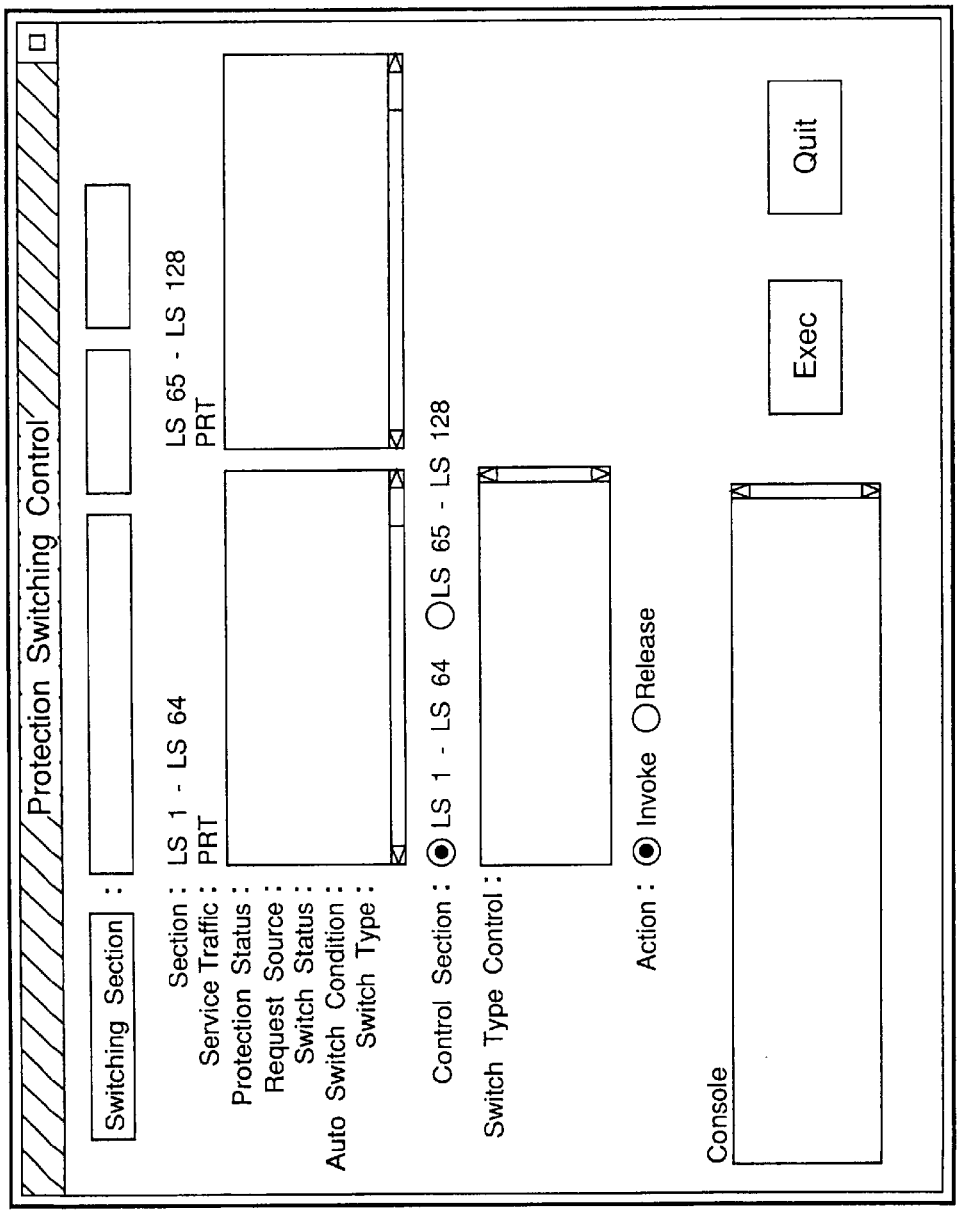
FIG. 89 is a view showing a Protection Switching Control window.

Subsequently, when the Protection Switching Control button is clicked in the FIG. 85 window, a Protection Switching Control window illustrated in FIG. 89 is displayed. This window is used for performing the redundancy switching processing upon a command input by a user.

Figure 90:
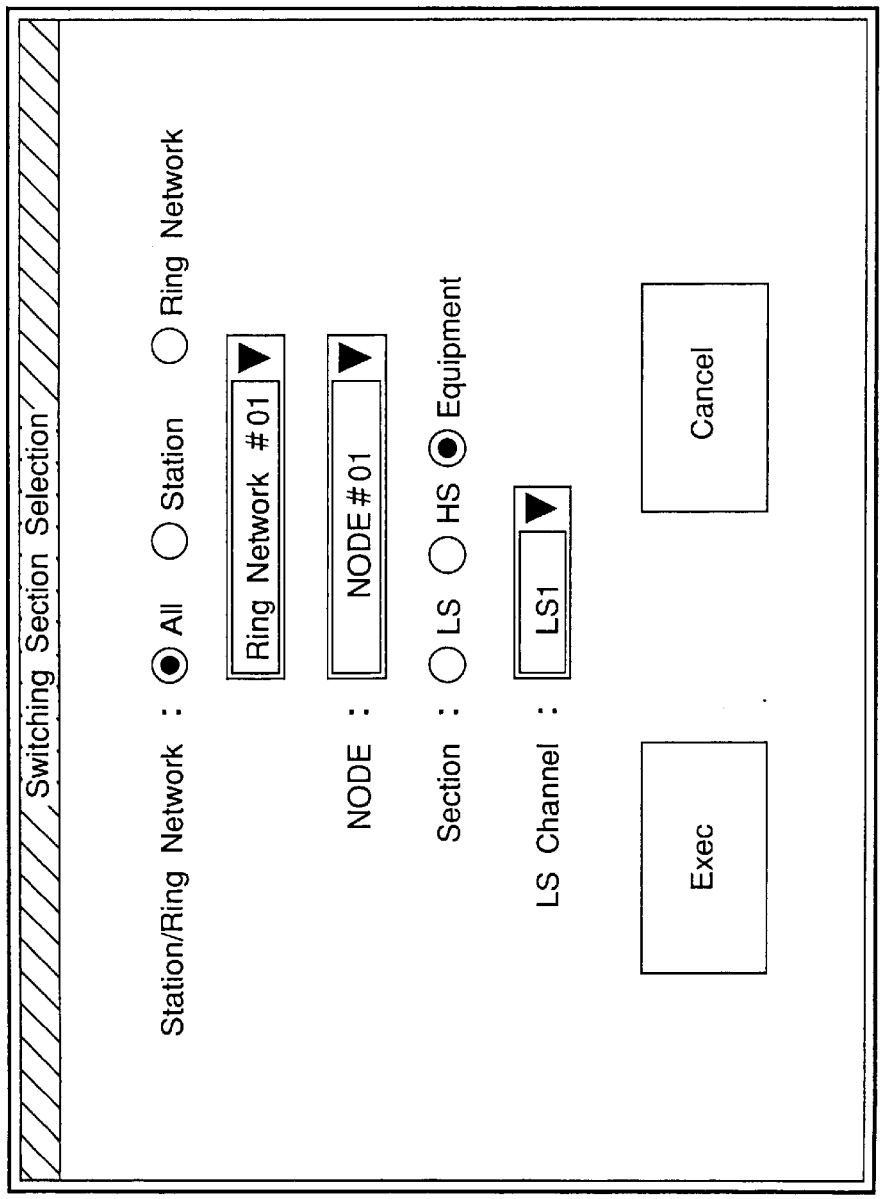
FIG. 90 is a view showing a Switching Section Selection window.

When a Switching Section Selection button is clicked in FIG. 89, a Switching Section Selection window shown in FIG. 90 is displayed. The window depicted in FIG. 90 is used for setting a target which carries out the redundancy switching. In this window, item Equipment is provided as well as LS and HS in the Section option so that selection can be made including switching in the apparatus.

When the Exec button is clicked after a target is selected in the FIG. 90 window, the screen display returns to FIG. 89, and the current state of the target selected in the FIG. 90 window is reflected in the display of FIG. 89. It is to be noted that the display form in FIG. 89 also varies in accordance with the selection content in FIG. 90. FIG. 89 shows a display form that the Equipment selects in the FIG. 90 window.

In FIG. 89, the Section selected in the window of FIG. 90 is displayed to the right of the word Section. A system in which the service traffic flows at the present point in time (in this example, the preliminary system: PRT) is displayed in the section Service Traffic. In the scroll window below that section are displayed the current states of the parameters Protection Status, Request Source, Switch Status, Auto Switch Condition and Switch Type.

Incidentally, since the Equipment is specified in the Section of FIG. 89, two scroll windows are opened, and settings can be separately made in each of the scroll windows. This corresponds to the fact that there exists switching in two directions, i.e., East and West in connection with the Equipment and the HS. On the other hand, when the LS is specified, one scroll window is opened.

Meanwhile, when the HS option is chosen in the Section of the FIG. 90 window, items EAST and WEST are displayed at positions indicated as LS1–LS64 and LS65–LS128 in the FIG. 89 window.

To the right of the words Control Section in the window of FIG. 89, either a radio button provided beside the LS1–LS64 or a radio button provided beside the LS65–LS128 is checked, and either the section LS1–LS54 or the section LS65–LS128 is selected. The type of switching (Forced Switch, Manual Switch and others) is selected from the scroll window named as Switch Type Control. Then, when either Invoke (execution of switching) or Release (returning from the switched state) is specified in Action and the Exec button is then clicked, the selected NODE is informed of the set content. In the NODE which has been informed of the set content, a new switching state is set. As described above, it is possible to control the switching state with respect to an arbitrary NODE from the U-NME 3 side.

Subsequently, when the Path Configuration Control button shown in FIG. 85 is clicked, the Path Configuration Control window illustrated in FIG. 91 is displayed. This window is used for operating a path set in the network.

Figure 92:
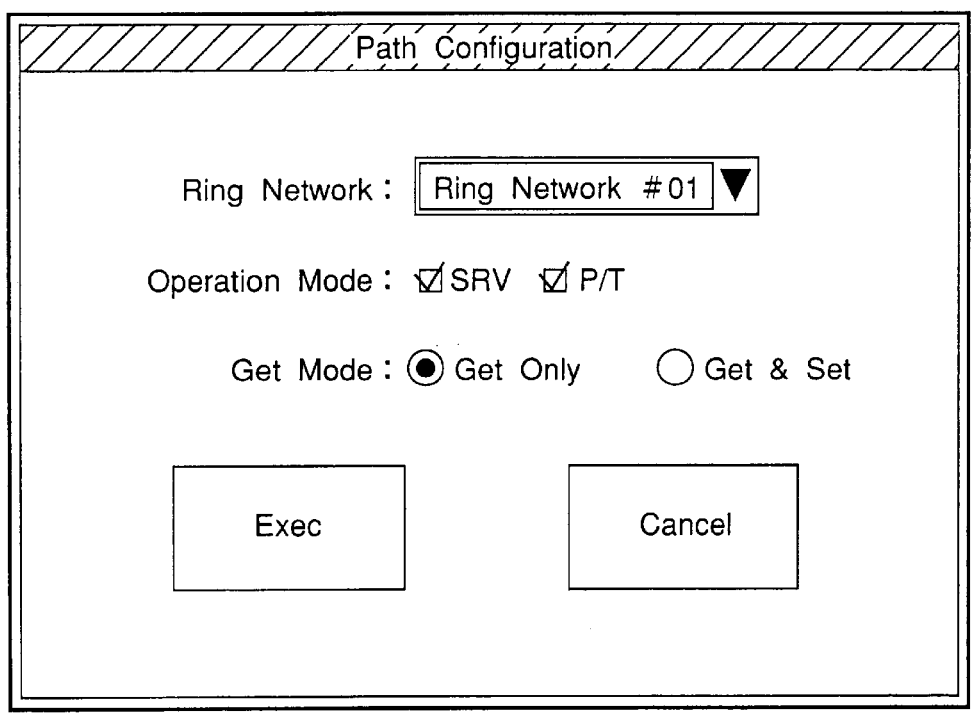
FIG. 92 is a view showing a Path Configuration window.

The set state of a current path must be first known before operating the path. Then, when the Path Configuration Button is clicked in the FIG. 91 window, the Path Configuration window shown in FIG. 92 is displayed. The window illustrated in FIG. 92 is used for specifying a ring network which acquires the set state information of the path. Further, in the FIG. 92 window, the mode used for acquiring the set state information of the path is also specified.

In the FIG. 92 window, an arbitrary ring network is selected in a section Ring Network. Furthermore, in a section Operation Mode, either or both of the Operation Modes, i.e., SRV and P/T are specified for the selected ring network. In a section Get Mode, either a mode Get Only or a mode Get & Set is specified.

In the mode Get Only, the set state information of a current path is acquired. In the mode Get & Set, the set state of a current path is acquired, and the state of a new path can be thereafter set. In particular, in the mode Get & Set, since the state of the path is changed, the APS function must be temporarily stopped in each NODE during the processing. At this point, the mode Get & Set is distinguished from the mode Get Only.

When each section is specified and the Exec button is then clicked in the FIG. 92 window, the set state information of the path is read from the NODE as an operation target, and this read information is reflected in the display content of FIG. 91.

In the window shown in FIG. 91, since the SRV and the P/T are specified in the window illustrated in FIG. 92, the state in the SRV system and that in the P/T system are separately displayed in the upper and lower parts in the window. In the window depicted in FIG. 91, a scroll button is provided for each of the SRV and the P/T, and the display area can be scrolled in the vertical direction. As a result, a user can grasp the state of all the time slots (Time Slot).

Meanwhile, in the window depicted in FIG. 91, a path existing in the network is symbolically displayed as an arrow. It is to be noted that the arrow indicates that the path is dropped to the LS side in the NODE.

Moreover, two arrows are displayed with respect to each path. One arrow is a symbol indicating that this path exists. The other arrow indicates the current state of this path and, in particular, this is referred to as a current path (Current Path). This current path (Current Path) indicates which route that the current path takes.

There is a section indicated as Current Path in the window illustrated in FIG. 91, and On or Off can be selected by using a radio button in this section. This section is used for specifying whether the current path is displayed in the FIG. 91 window. On is checked in FIG. 91, and the display function of the current path is in the On state.

As a result, the arrow as a symbol indicative of existence of the path and the arrow indicative of the state of the path whose existence is indicated by the former arrow are displayed as a pair in accordance with each path in the drawing. Incidentally, when Off is selected in the section Current Path, the current path is not displayed in FIG. 91, and only the arrow as a symbol indicative of existence of the path is displayed.

A part surrounded by a dotted line in FIG. 91 indicates the state of a path between the NODE #04 and the NODE #06 in the time slot 1. Inside are a pair of arrows, one of which (unbroken) indicates a range of the SRV, and that a patch exists in the time slot 1 between the NODE #04 and the NODE #06. The other arrow of the pair (broken) is drawn from the NODE #5. That is, this arrow is drawn on the service system (SRV) side between the NODE #04 and the NODE #05 and drawn on the part time system (P/T) side between the NODE #5 and the NODE #06. This arrow indicates the current path.

By displaying the current path in this manner, the following facts are indicated. That is, this path is set to the time slot 1 in the working system interval between the NODE #04 and the NODE #05, and set to the time slot 1 in the preliminary system interval between the NODE #05 and the NODE #06. That is, this path is switched from the working system transmission path to the preliminary transmission path between the NODE #05 and the NODE #06.

Additionally, between the NODE #05 and the NODE #06 in the service system, a display color in the screen is, for example, gray (hatching portion in the drawing). Consequently, this indicates that a failure exists in the working system transmission path in this interval. This backs up the fact that the above-described path is switched to the preliminary system transmission path. Further, when the failure is repaired and the current path is returned to the working system transmission path, display in the window also returns to the original state in response to this.

Since display is carried out in the above-described manner, it is possible to grasp the state of the current path (Current Path) and presence/absence of a failure in each interval at a glance.

FIG. 91 shows that a path is set in a time slot 4 of the SRV system in an interval between the NODE #3 and the NODE #5. Symbols (Δ), (◎) and (□) are shown as well as the arrows. The symbol (Δ) is shown at a position of the NODE #3; the symbol (◎), at a position of the NODE #4; and the symbol (□), at a position of the NODE #5. These symbols indicate that a path corresponding to the arrows is a dual homing path (Dual Homing Path).

The symbol (Δ) indicates that the node having this symbol is a "head Node". The symbol (◎) indicates that the node having this symbol is a "Drop & Continue with Add Node". The symbol (□) indicates that the node having this symbol is a "Tail Node".

These symbols imply the following facts. That is, the path added to the LS side in the NODE #3 is dropped to the LS side in the NODE #05 and also dropped to the LS side in the NODE #4 between these nodes. Further, the backward path is added from the LS side in the NODE #4, and this backward path is dropped to the LS side in the NODE #3.

Furthermore, in the window shown in FIG. 91, numbers "66", "1" and "4" are shown in associated with the respective symbols. Each of these numbers represents a low-speed side channel number of a NODE to which the path is dropped.

In FIG. 91, a pair of arrows are shown at each position of the time slots 1 to 4 (eight arrows in total) in the SRV interval between the NODE #01 and the NODE #02. Arrows indicative of the current path are shown to the lower side of each pair. A numeric FIG. 2 in a square is shown together with these arrows. This numeric figure "2" indicates a path number (Path Number). The path number is a serial number which is given in order to distinguish each path for the sake of convenience. Since this is a serial number, if a number of paths in the network varies, a numeric figure representing the path number also changes in accordance with this variation.

The four pairs of the arrows indicate that the paths form one concatenation (Concatenation) path as a whole. That is, one path is formed in four time slots. "1A1a" or "17B1" shown in this example indicates the drop state of the path. For example, when "17B1" is shown, this indicates a channel number on the low-speed side to which the path is dropped in the first "17". The subsequent "B" indicates a type of a board on the LS side to which the path is dropped. "B" means an STM-16 board, and "A" means an STM-4 board. The subsequent figure "1" indicates a time slot number in the low-speed side channel. The last figure "a" indicates a type of the concatenation, and also indicates that a concatenation signal indicated by this arrow is an AU-4-4c signal corresponding to STM-4.

Figure 93:
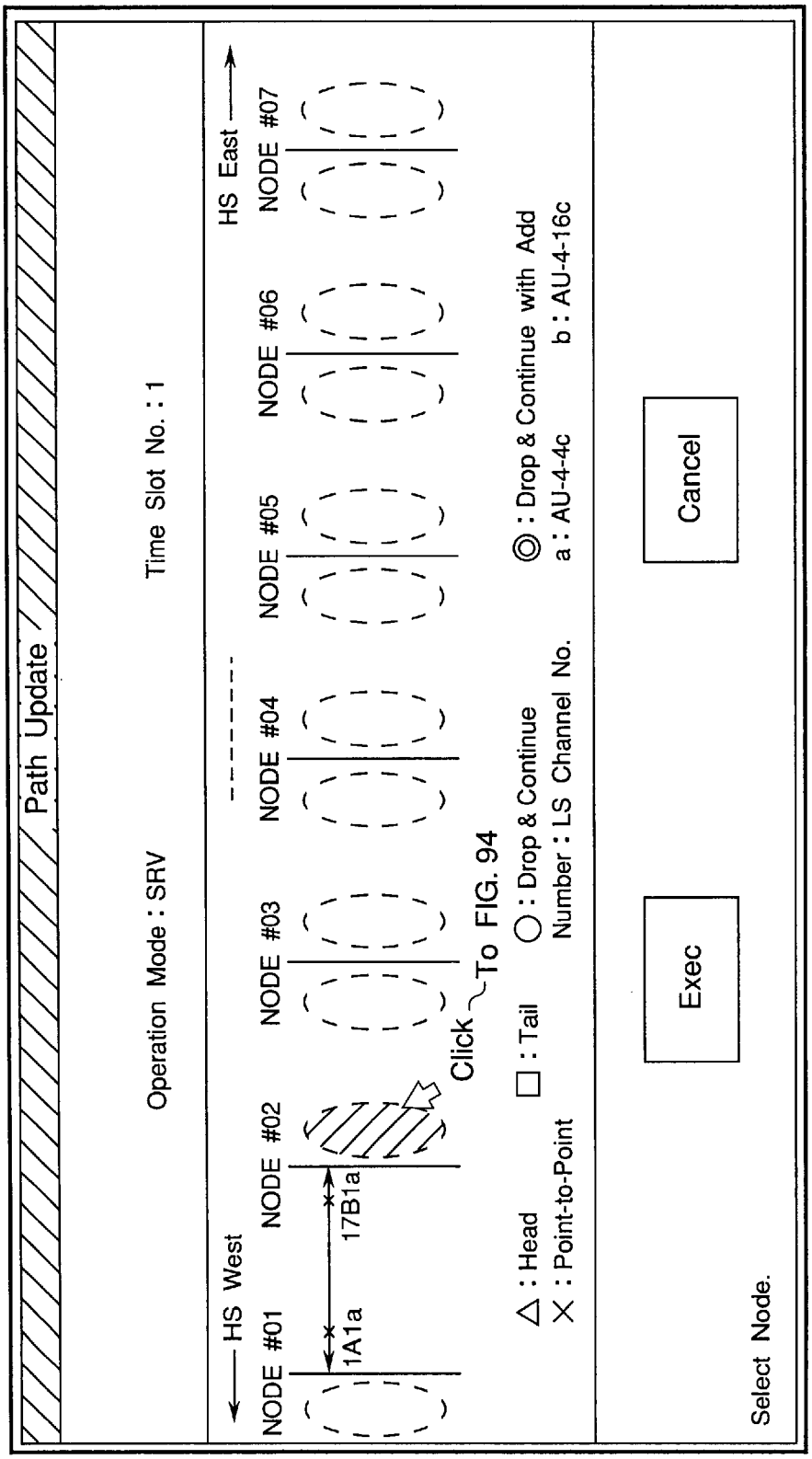
FIG. 93 is a view showing a Path Update window.

A procedure for generating a new path in the window illustrated in FIG. 91 will now be described. After an arbitrary time slot is clicked in FIG. 91, a Create button or a Modify button (lower left side in the drawing) is clicked. Then, a Path Update window shown in FIG. 93 is displayed. The FIG. 93 window abstracts and displays only a specified time slot. A path is set by using this window.

Figure 94:
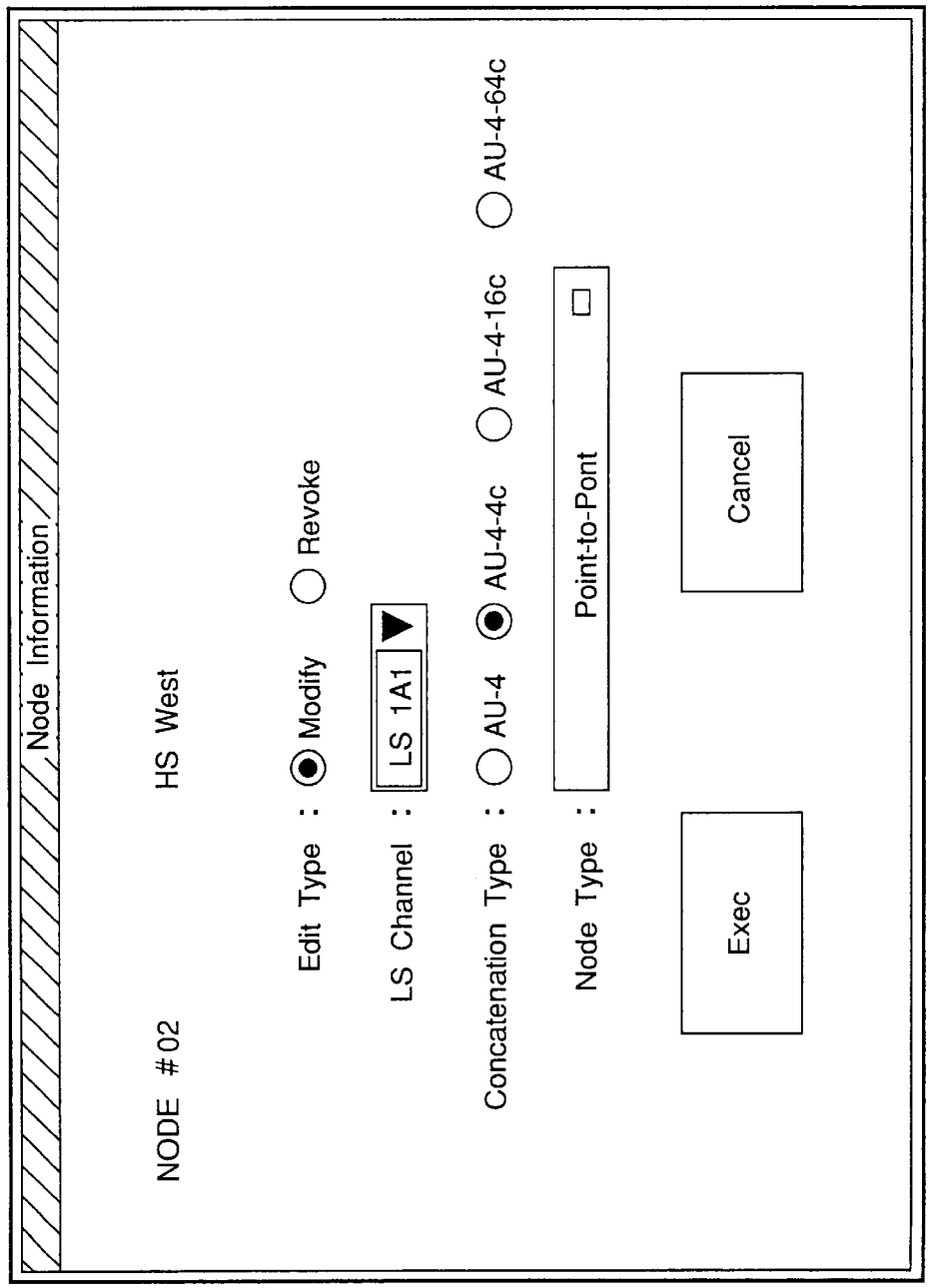
FIG. 94 is a view showing a Node Information window.

In the window shown in FIG. 93, a start point and an end point of a path to be set are first specified by a user. For example, when a part surrounded by a dotted line (the dotted line is not displayed in the actual screen) in FIG. 93 is clicked, a Node Information window illustrated in FIG. 94 is opened. In this example, it is assumed that a hatching portion is clicked in FIG. 93.

FIG. 94 shows the state of a NODE corresponding to a clicked portion. That is, the hatching portion in FIG. 93 corresponds to the HS West of the NODE #2. In FIG. 94, a section Edit Type is used for selecting a type of the operation which is performed by using the FIG. 94 window, and modification is selected by Modify and deletion is selected by Revoke. In a section LS Channel, a channel which is a start point or an end point of the path is selected by a pull-down menu. In this example, "1A1" is shown. The first figure "1" indicates a channel number. The subsequent figure "A" indicates a type of a board (STM-4). The further subsequent figure "1" indicates a time slot of the LS.

In a section Concatenation Type in FIG. 94, the type of concatenation of a path to be set is specified. In FIG. 94, it is possible to select either AU-4 corresponding to STM-1, AU-4-4c corresponding to STM-4, AU-4-16c corresponding to STM-16, or AU-4-64c corresponding to STM-64. In a section Node Type, a drop type of a signal is selected. In FIG. 94, Point-to-Point is selected, and this is indicated by a symbol X in FIG. 93. Besides, Head (Δ), Tail (□), Drop & Continue (○), and Drop & Continue with Add (◎) used for setting the dual homing path can be selected.

When the Exec button is clicked in the FIG. 94 window, each item set in this window is enabled. When the above-described procedure is executed for the start point and the end point of the path, arrows associated with the path to be set are displayed. It is to be noted that a similar setting must be made with respect to the intermediate node for the dual homing path, and the related setting of Drop & Continue, Head, Tail and the like.

Now, when the operation for setting the path is completed in FIG. 93, a user clicks the Exec button. Then, a predetermined CAUTION screen is displayed. If OK relative to the alarm, the screen display returns to FIG. 91, and the content set in the FIG. 93 window is reflected to display in FIG. 91. In the window shown in FIG. 91, the path in the setting procedure is indicated by, e.g., a dotted like in order to distinguish it from other paths (not shown in FIG. 91. However, the type of drawing line is indicated as Modified on the lower right side). Besides, when the type of drawing line (dotted line, dashed line or other) is changed using different colors, the types of path, such as Configured, Modified, Pre-empted, Restored, Normal, and Concatenation can be distinguished from each other.

The above-described procedure is repeatedly carried out with respect to each path to be set. It is to be noted that a path is not generated in the network by the procedure mentioned above.

After all the operations for setting a desired path is completed, an Update button shown in FIG. 91 is clicked. Then, a message for generating a path with respect to each NODE is transmitted, and a new or modified path is generated in the network system. Then, the set content of a new path is also reflected in FIG. 91.

Here, when the Update button is clicked in FIG. 91 to set a path, the APS function in the ring network is locked so that the redundancy system switching cannot be executed even if a failure occurs. This is a required procedure because erroneous connection and the like occurs when the APS functions during the path setting operation. Further, after the setting of the TSA in each NODE, which is required for setting a new path, is completed, the APS function is unlocked.

A procedure for deleting a path will now be described. In order to delete a path, a Delete button in FIG. 91 is clicked after an arbitrary path is clicked in the window illustrated in FIG. 91. Then, the clicked path is not displayed. At this stage, this path exists in the network. Further, when the Update button shown in FIG. 91 is clicked, this path is deleted from the network.

Figure 95:
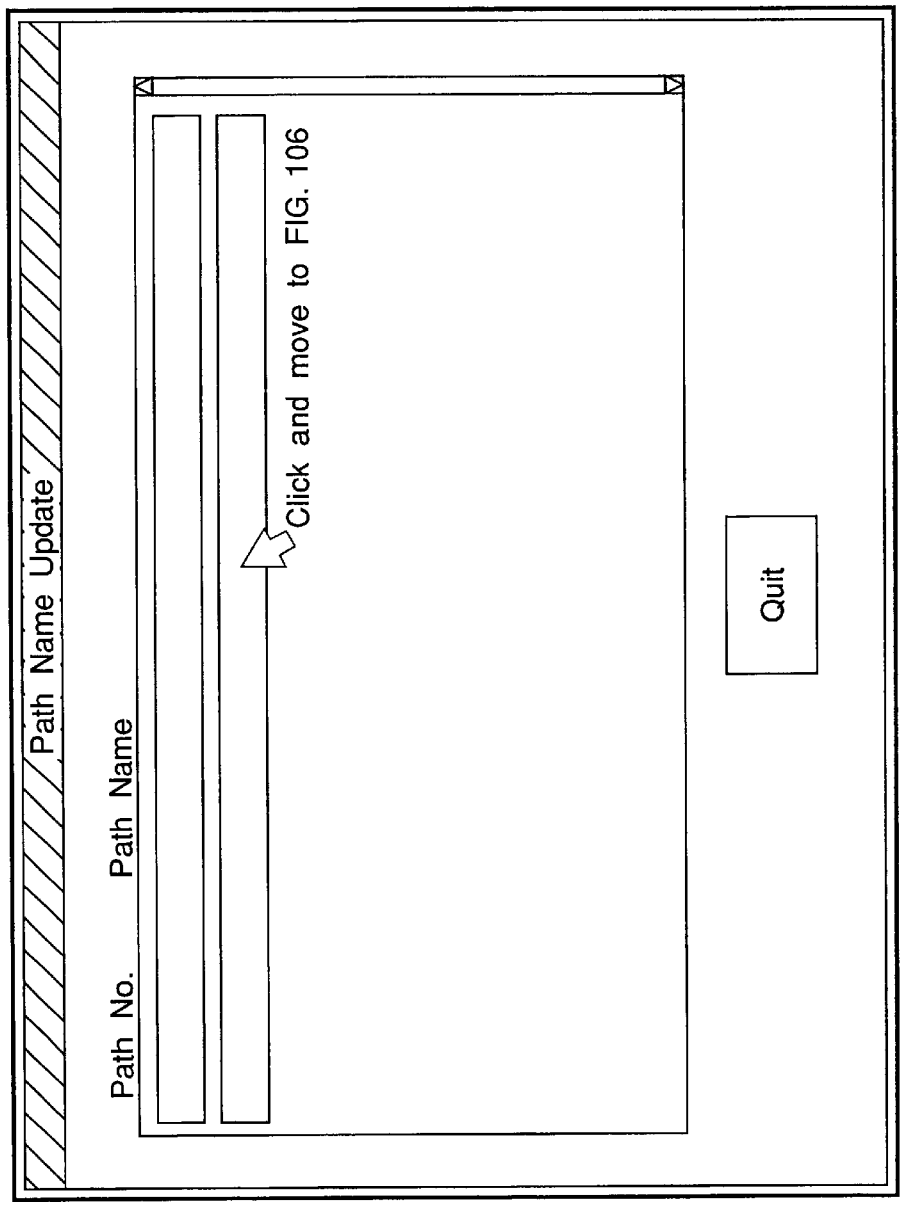
FIG. 95 is a view showing a Path Name Update window.
Figure 96:
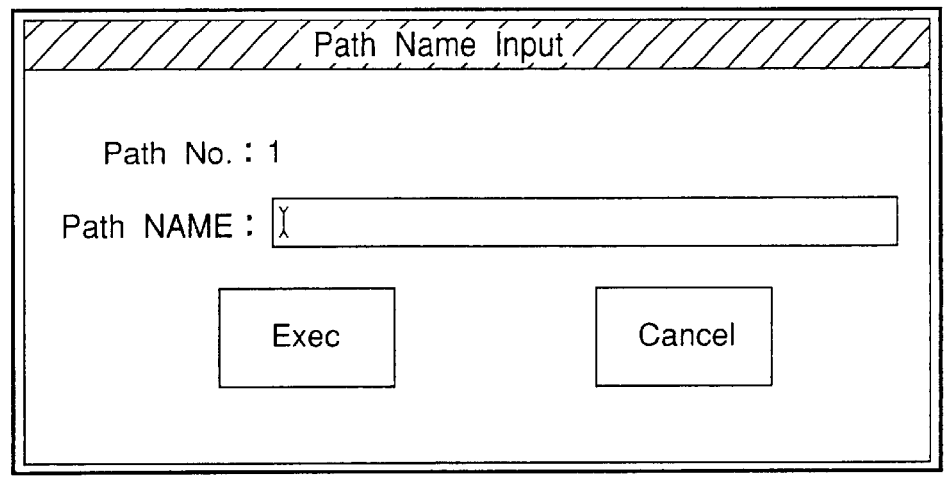
FIG. 96 is a view showing a Path Name Input window.

Description will now be given as to functions used when a Path Name button shown in FIG. 91 is clicked. When the Path Name button is clicked, a Path Name Update window illustrated in FIG. 95 is displayed. In the window depicted in FIG. 95, a list of paths shown in a GUI (Graphical User Interface) in FIG. 91 is displayed in a text format. In FIG. 95, the name of each path (in the case of a path having no name, the Path Name is blank) is displayed in association with a path number of that path. When an arbitrary path is clicked in this window, a Path Name Input window illustrated in FIG. 96 is displayed. In the window shown in FIG. 96, an arbitrary name (a nickname, an end user name or other) can be given to the clicked path. This is useful for the management of paths.

Figure 97:
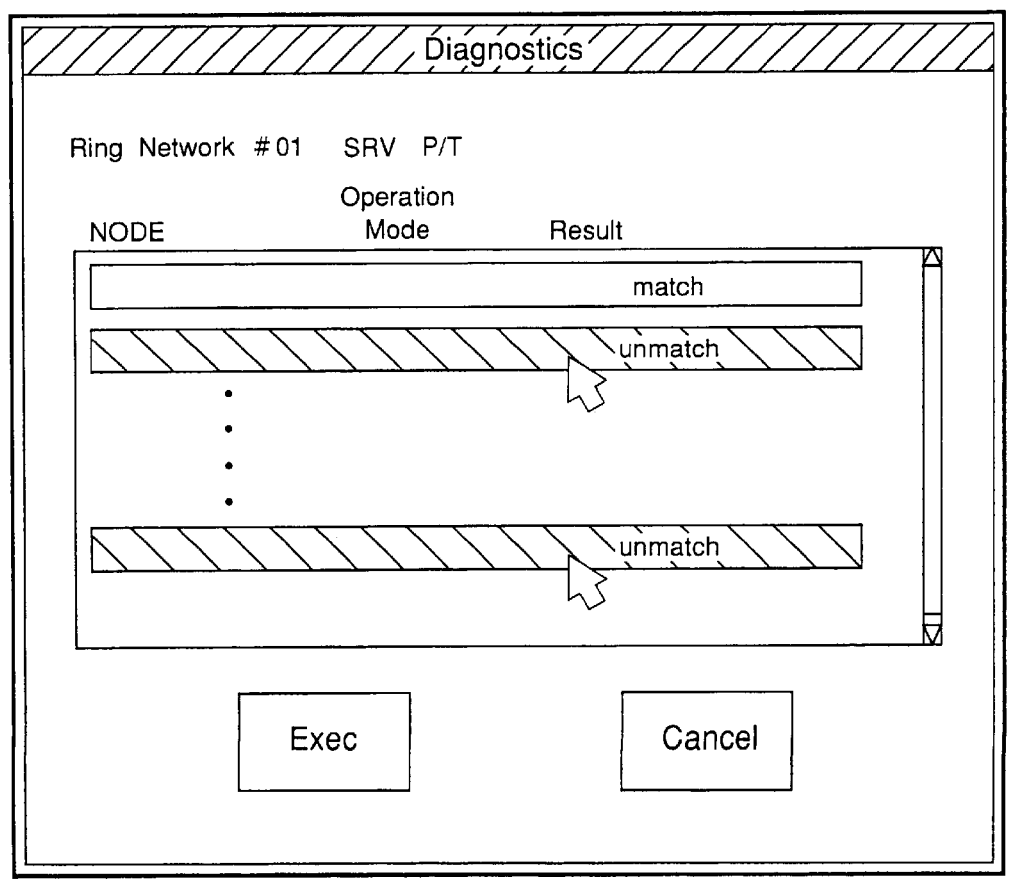
FIG. 97 is a view showing a Diagnostics window.

Description will now be given as to functions used when a Diagnostics button shown in FIG. 91 is clicked. When the Diagnostics button is clicked, a Diagnostics window shown in FIG. 97 is displayed. The FIG. 97 window is used when executing a function (Diagnostics) for matching data referred to as a ring map (Ring Map) stored in each NODE with data referred to as fabric (Fabric).

The ring map is a data base arranging detailed information (an extending interval, a node to be dropped and its channel, a slot and others) in units of ring network, and is stored in each NODE. When the ring maps do not coincide with each other between the respective NODEs in each ring network, an inconsistency may occur in redundancy switching and an erroneous connection may be made. Therefore, the ring maps must be constantly matched with each other between the respective NODEs during the system operation or rapidly when solving a failure.

The fabric is, in brief, information indicating which time slot on the high-speed side is connected with which channel on the low-speed side. As to this information, each NODE stores only information concerning its own apparatus. When the U-NME 3 opens the window shown in FIG. 91, it acquires the fabric from each NODE and draws the window shown in FIG. 91 based on this fabric.

As information concerning the state of a path, each NODE has only information concerning its own apparatus (i.e., only the fabric). Therefore, the NODE cannot be aware of the set state of all the paths in the network. This is a factor causing the ring maps to conflict with each other between the respective NODEs.

On the contrary, the U-NME 3 capable of acquiring the fabric from all the NODEs can be aware of the set state of all the paths in the network. In order to implement the Diagnostics function, this fact is utilized. When the Diagnostics button is clicked, the U-NME 3 reads the ring map in accordance with each NODE, and compares it with the previously read fabric. Further, it makes judgment upon whether the both sets of the data match each other.

A result of this judgment is displayed in a window illustrated in FIG. 97. In FIG. 97, if they match with each other, "Match" is displayed. Furthermore, if they do not match with each other, "Unmatch" is displayed. Here, when "Unmatch" is clicked and the Exec button is then clicked, the U-NME 3 generates a new ring map based on the fabric. Then, it informs the NODE in which inconformity was found of the newly generated ring map, and updates the data base.

Figure 98:
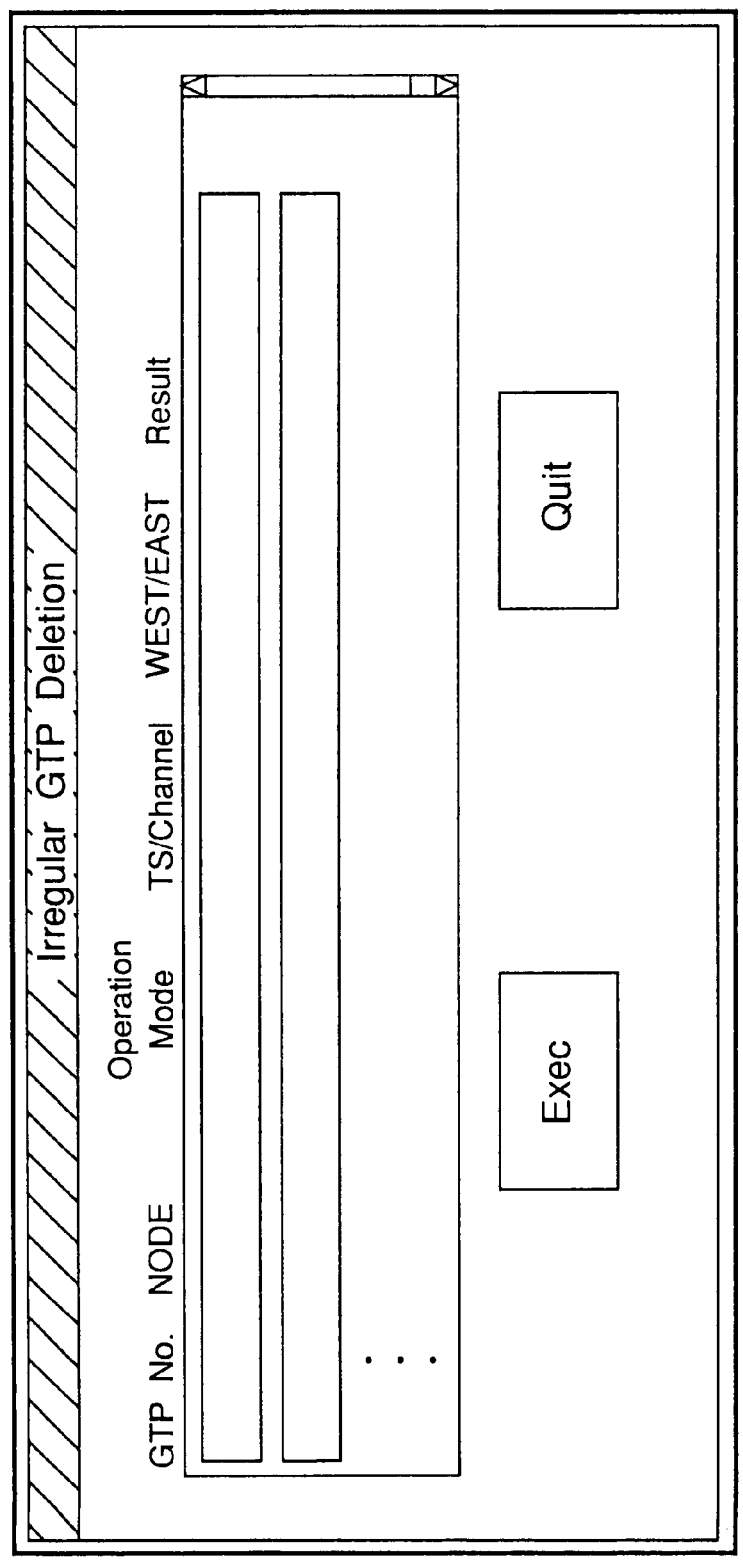
FIG. 98 is a view showing an Irregular GTP Deletion window.

Functions used when an Irregular GTP button shown in FIG. 91 is clicked will now be described. When the Irregular GTP button is clicked, an Irregular GTP Deletion window illustrated in FIG. 98 is displayed. When a resource which is not used in NODEs is generated, the window depicted in FIG. 98 is used to leave that resource open so that that resource can be effectively utilized.

Here, the GTP (Group Termination Point) is a concept concerning a concatenation path. The GTP will now be briefly explained. For example, a concatenation path indicated as AU-4-4c is obtained by connecting four consecutive time slots with each other. In order to generate such a path, there is executed a procedure for ① putting together the high-speed side time slots (generating a first GTP), ② putting together the low-speed side channels (generating a second GTP) and ③ associating the first GTP with the second GTP.

Moreover, in order to delete a concatenation path, the procedure which is opposite to the above procedure is executed. That is, there is executed a procedure for ④ breaking up the association of the first GTP and the second GTP, ⑤ breaking up the lump of the low-speed side channels (releasing the second GTP), ⑥ and breaking up the lump of the high-speed side time slots (releasing the first GTP).

At this moment, the step ⑥ may not be normally completed due to the occurrence of a failure and the like in some cases. In such a case, although the lump of the high-speed side time slots is not broken up, the lump is not used, and a so-called resource vacancy occurs. A window shown in FIG. 98 is used for solving this state.

The window illustrated in FIG. 98 displays the number of the GTP which is the cause of the resource vacancy and a position where this GTP exists in sections of the NODE, the Operation Mode (SRV or P/T), the time slot, the channel (TS/Channel), the West side, and the East side. When the Exec button is clicked in the state shown in FIG. 98, a request for releasing an unused resource in the NODE is transmitted to the NODE, and its result is shown in a section Result depicted in FIG. 98.

[Supplementary Explanation]

Supplementary explanation will now be given as to the functions concerning the Network Configuration.

Figure 99:
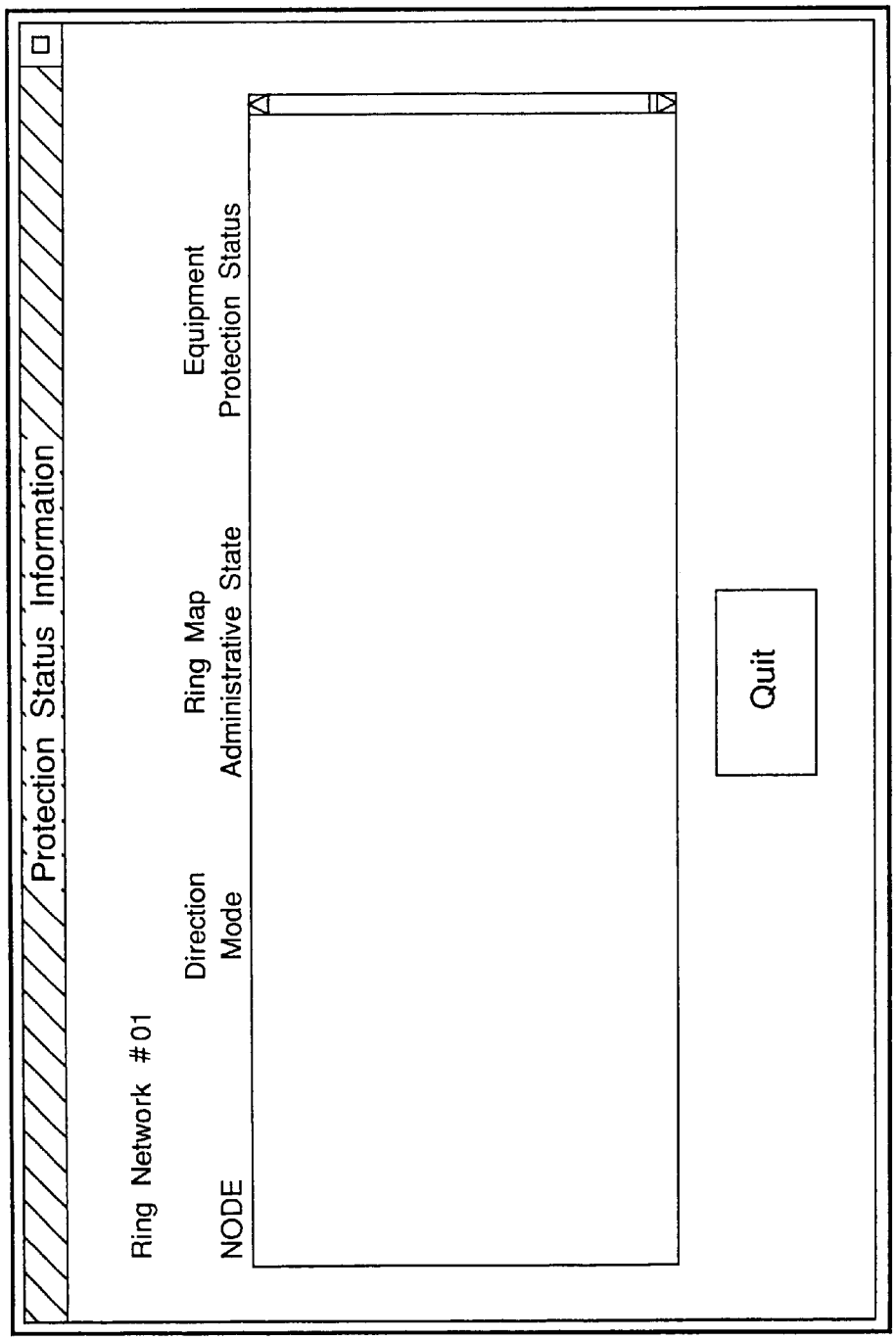
FIG. 99 is a view showing a Protection Status Information window.

A window illustrated in FIG. 99 is referred to as a Protection Status Information window, and displayed when the Quit button is clicked in the FIG. 91 window. That is, although the APS function is unlocked by clicking the Quit button, locking may be continued without releasing the function for some reason. In such a case, since the FIG. 91 window is closed, a window depicted in FIG. 99 is opened, and the releasing state of the protection function of the NODE is displayed. If the fact that the locked state is completely canceled is confirmed in the FIG. 99 window, the Quit button is clicked, thereby terminating the path setting operation.

Figure 100:
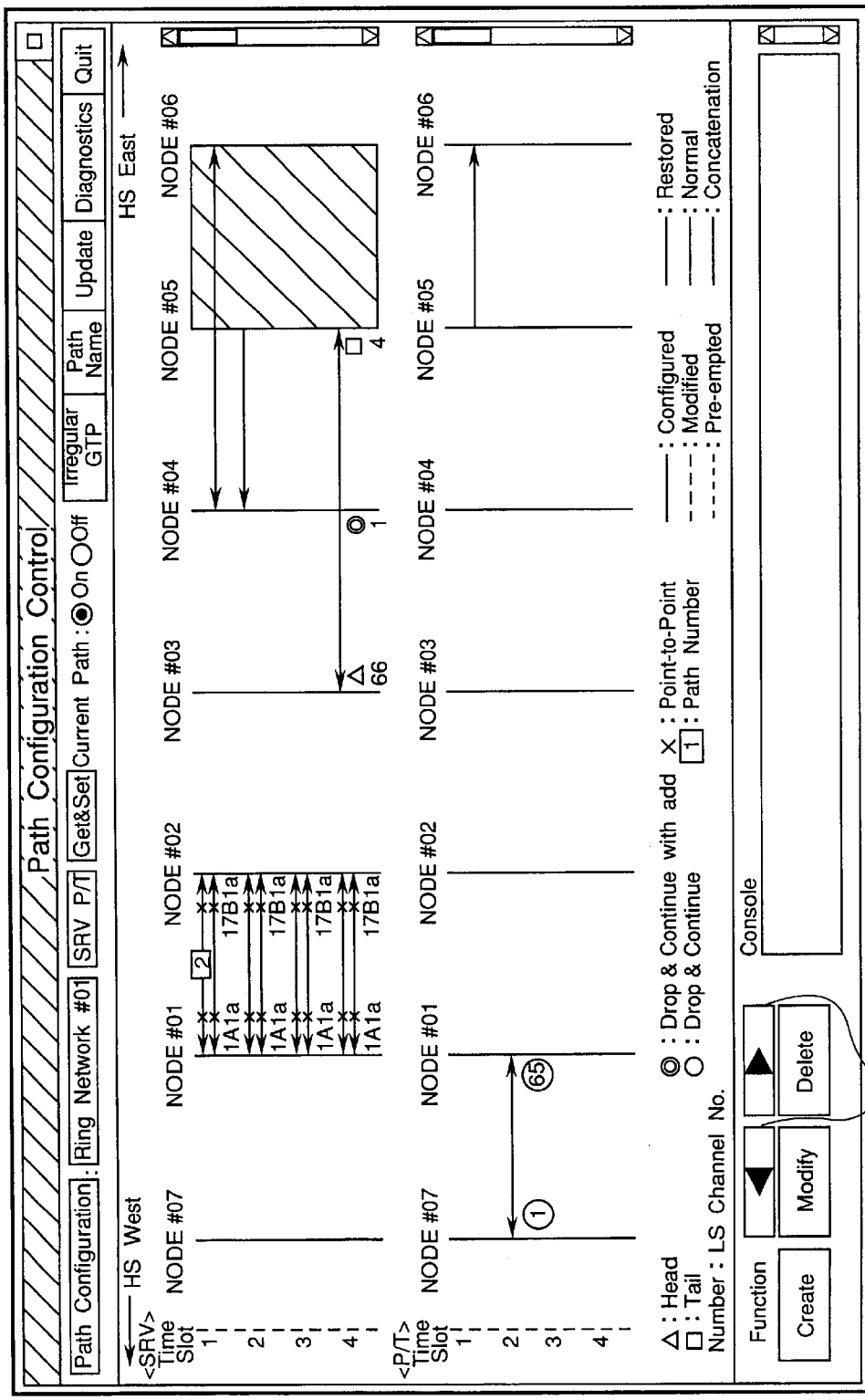
FIG. 100 is a view showing a display example of a Path Configuration Control window.

FIG. 100 is a view showing another display example of the window depicted in FIG. 91. The horizontal scroll buttons in the window of FIG. 100 are highlighted to illustrate that a part of the screen display can be scrolled in the horizontal direction. FIG. 100 is that obtained by directly scrolling a part of the window of FIG. 91 in the right-hand direction. The display contents of both the drawings are completely the same.

As shown in FIG. 91, when a path is provided to the P/T system time slot 2 between the NODE #07 and the NODE #01, it is hard to see this path because the screen is divided into right and left parts. In this case, the screen display can be scrolled in the horizontal direction. As a result, the arrows divided into right and left parts can be displayed as one arrow, which makes the contents easy to understand.

Figure 101:
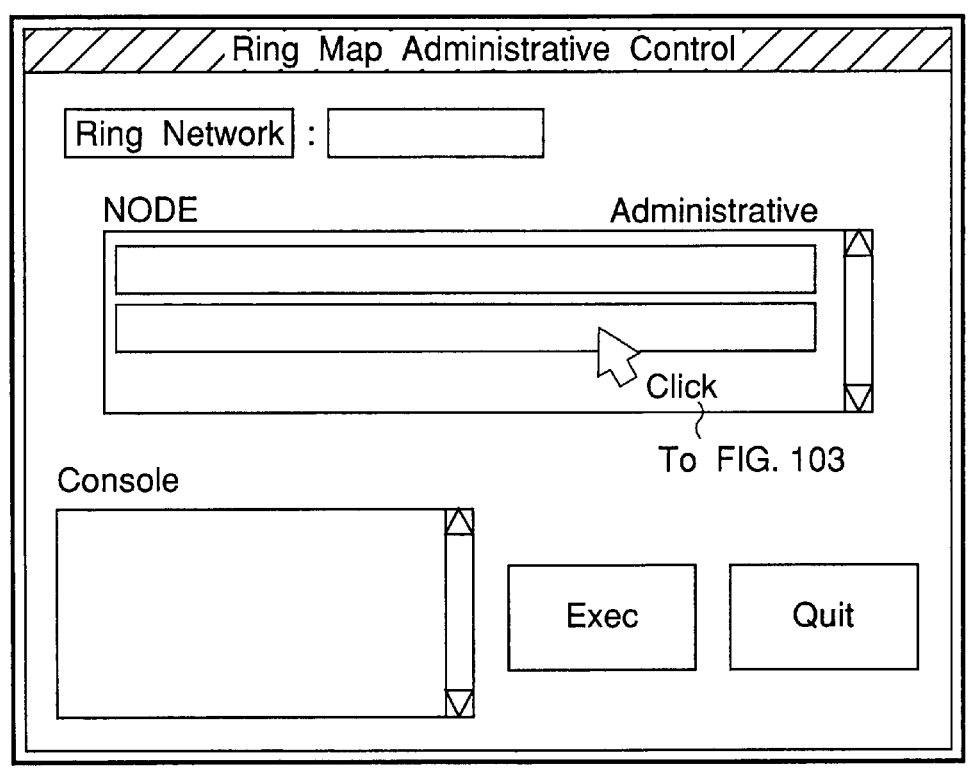
FIG. 101 is a view showing a Ring Map Administrative Control window.

Description will now be given as to functions used when a Ring Map Administrative Control button shown in FIG. 85 is clicked. When the Ring Map Administrative Control button is clicked, a Ring Map Administrative Control window depicted in FIG. 101 is displayed. The window illustrated in FIG. 101 is used for separately setting locking (Lock) or unlocking (Unlock) of the APS function in units of NODE. When the locked (Lock) APS function is not unlocked for some reason, this window is used for manually unlocking the APS function.

Figure 102:
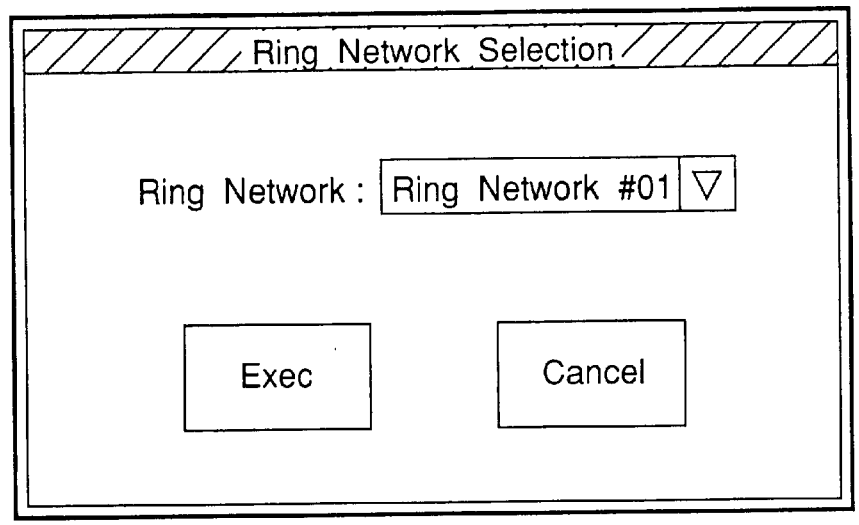
FIG. 102 is a view showing a Ring Network Selection window.
Figure 103:
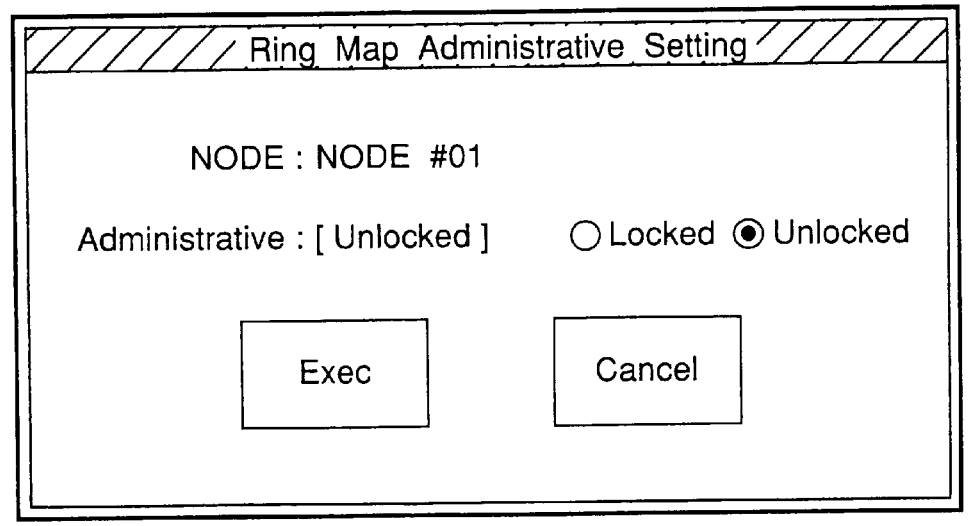
FIG. 103 is a view showing a Ring Map Administrative Setting window.

In FIG. 101, when a Ring Network button is clicked, a Ring Network Selection window illustrated in FIG. 102 is opened. When a desired ring network is selected and the Exec button is clicked in this window, the screen display returns to FIG. 101. At this moment, a list of NODEs belonging to this selected ring network and a list of their APS states (Administrative States) are displayed in the window illustrated in FIG. 101. When a desired NODE is clicked in the FIG. 101 window, a Ring Map Administrative Setting window shown in FIG. 103 is displayed. In the FIG. 103 window, either the state Locked (locking) or the state Unlocked (releasing) is selected. When the Exec button is clicked in the FIG. 103 window, the screen window returns to that of FIG. 101, and the content selected in the FIG. 103 window is indicated here.

In this manner, when the Administrative State is individually set for the desired NODE and the Exec button shown in FIG. 101 is then clicked, a message is transmitted to the selected NODE, and the state of the APS is set to Locked or Unlocked.

Figure 104:
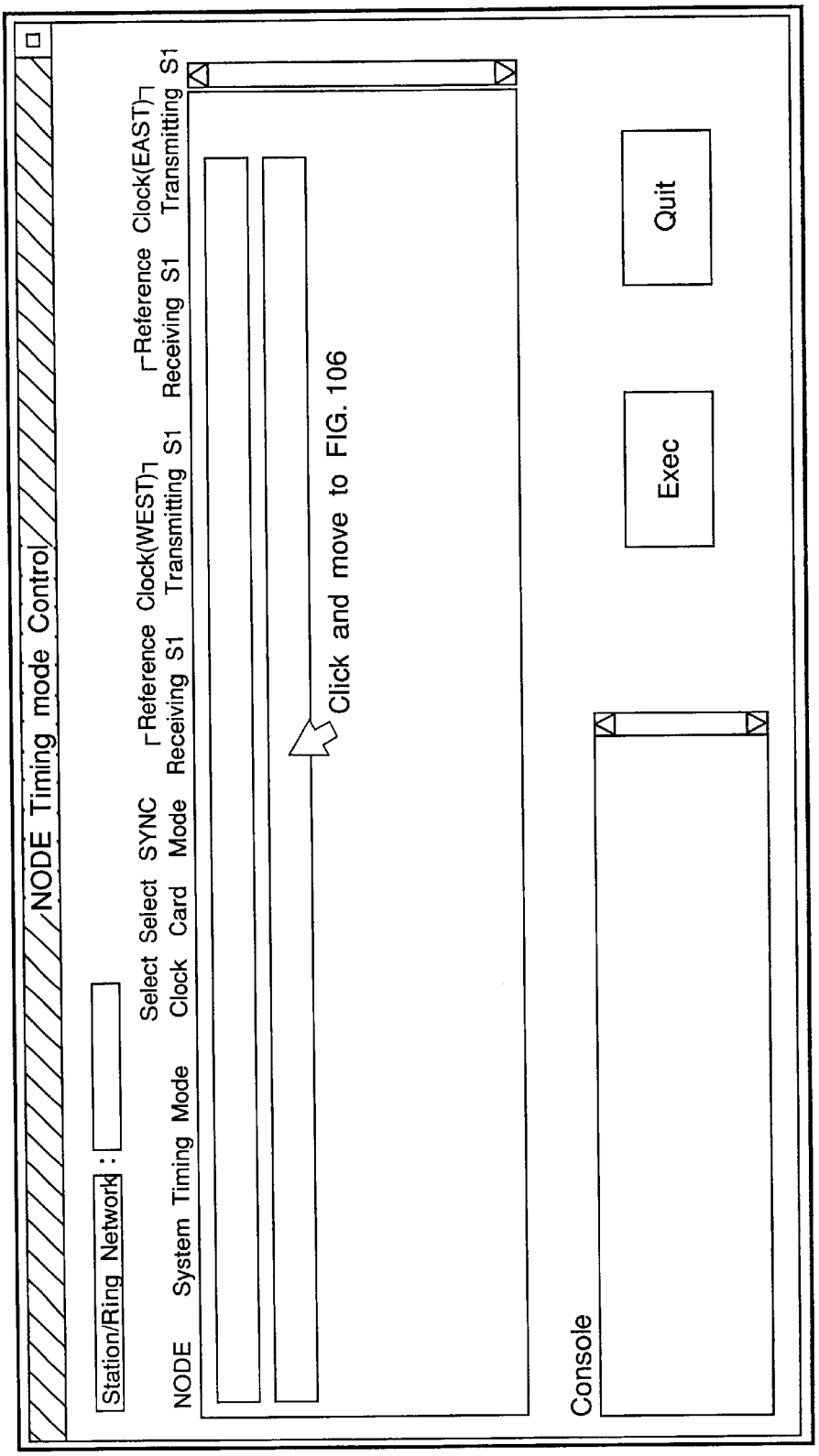
FIG. 104 is a view showing a NODE Timing mode Control window.

Description will now be given as to functions used when a NODE Timing mode Control button shown in FIG. 85 is clicked. When the NODE Timing mode Control button is clicked, a NODE Timing mode Control window depicted in FIG. 104 is displayed. The window shown in FIG. 104 is used for setting the operation clock (Timing Mode) in accordance with each NODE by the manual operation.

Figure 105:
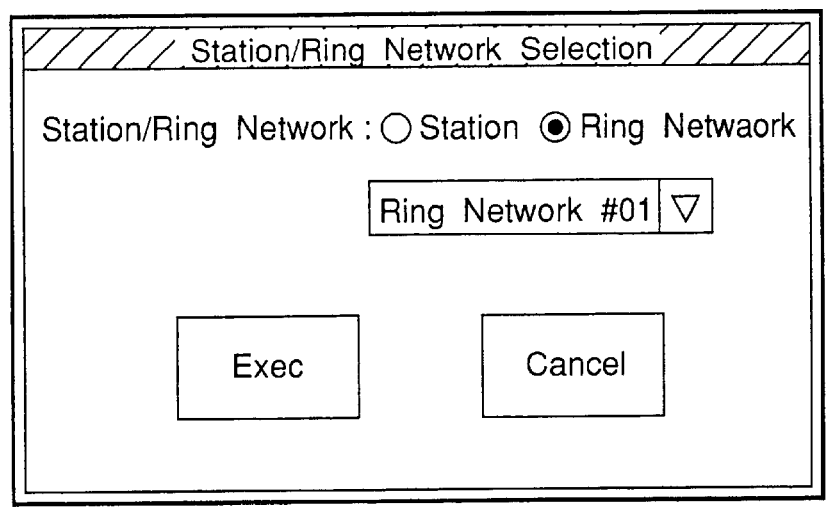
FIG. 105 is a view showing a Station/Ring Network Selection window.

When a Station/Ring Network button is clicked in the FIG. 104, a Station/Ring Network Selection window shown in FIG. 105 is opened. In the FIG. 105 window, a station or a ring network is selected. FIG. 104 shows a list of current clock supply states of NODEs belonging to the station or the ring network selected by this window.

Figure 106:
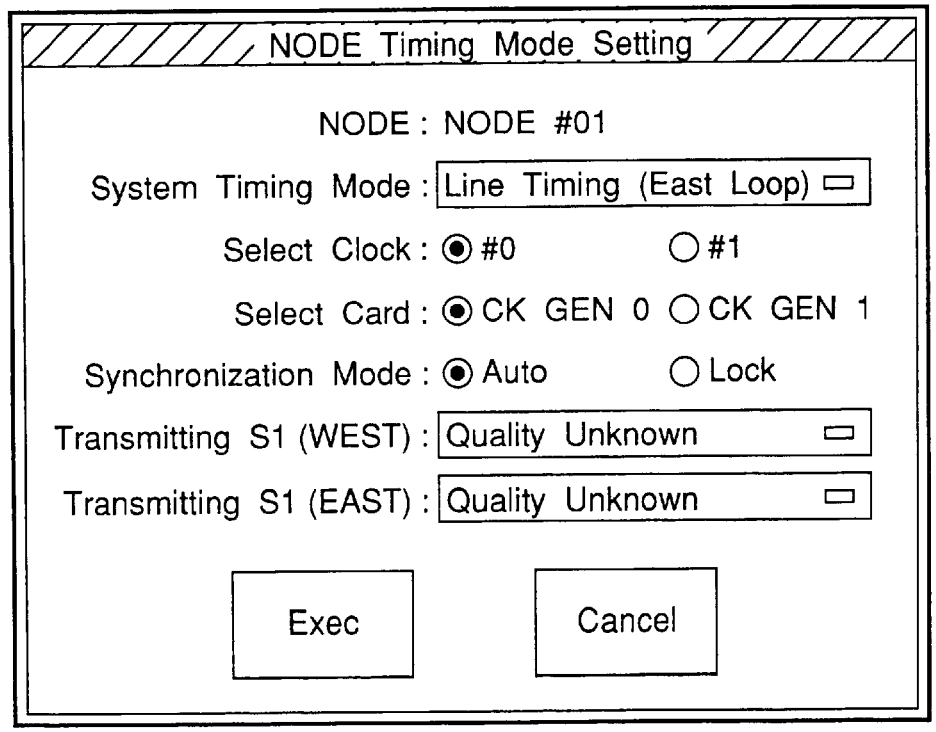
FIG. 106 is a view showing a NODE Timing Mode Setting window.

In the FIG. 104 window, when an arbitrary NODE is clicked and selected, a NODE Timing Mode Setting window shown in FIG. 106 is displayed. In the window illustrated in FIG. 106, when the Exec button is clicked after each item, i.e., System Timing Mode, Select Clock, Select Card, Synchronization Mode (SYNC Mode) and Transmitting S1 (WEST and EAST), the screen display returns to FIG. 104, and the content specified in the FIG. 106 window is reflected. When the Exec button shown in FIG. 104 is clicked after such an operation is completed with respect to NODEs desired by a user, a message is transmitted to the set NODEs, and the clock is synchronized.

(NODE Function)

Figure 107:
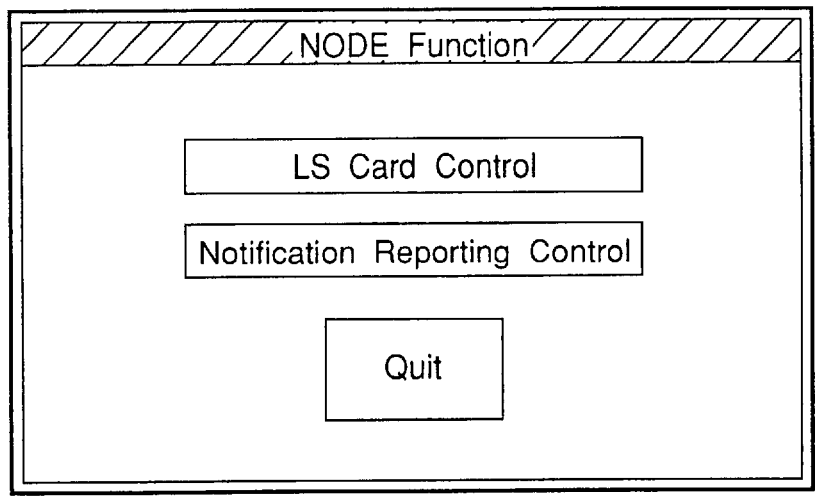
FIG. 107 is a view showing a NODE Function window.

Description will now be given to functions used when a NODE Function button in the main screen shown in FIG. 3 is clicked. When the NODE Function button is clicked, a NODE Function window depicted in FIG. 107 is displayed. This window displays items concerning a supervisory control function of the low-speed (LS) interface of the NODE and items concerning an information notification function of the NODE in the form of a menu. This window is provided with the function buttons "LS Card Control" and "Notification Reporting Control".

Figure 108:
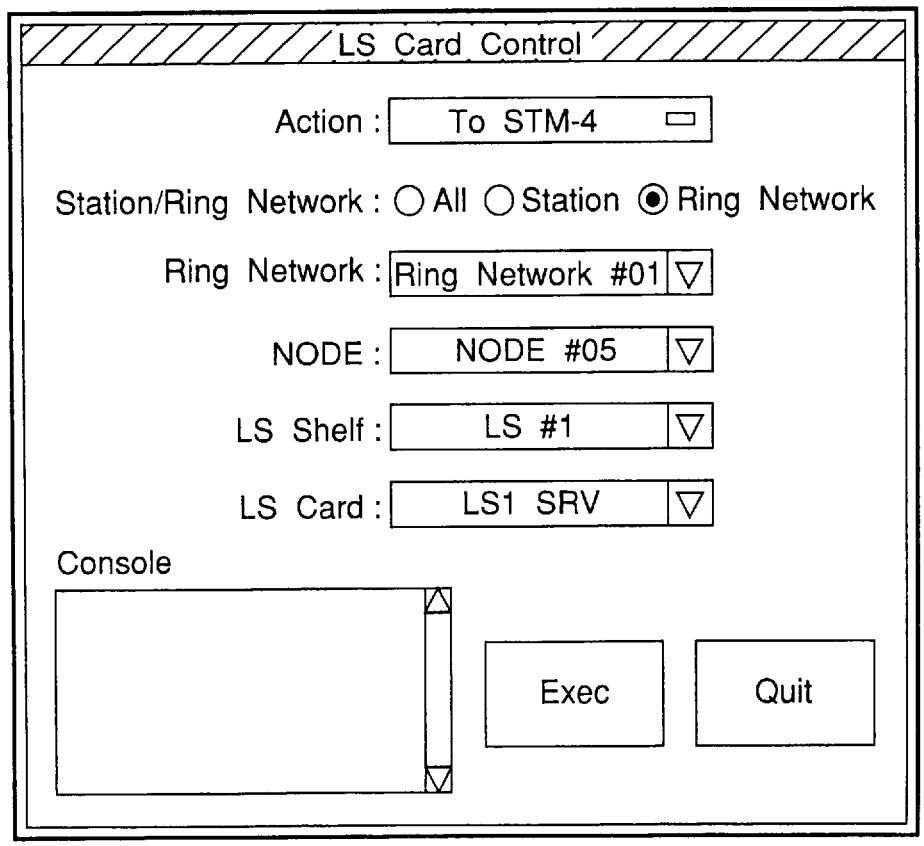
FIG. 108 is a view showing an LS Card Control window.

When the LS Card Control button is clicked in FIG. 107, an LS Card Control window shown in FIG. 108 is displayed. This window is used for individually setting whether a plurality of cards (boards) mounted to each NODE are respectively determined as targets of monitoring by the U-NME 3.

That is, in the respective NODEs 1-1 to 1-n, the low-speed side board (LS Card) can be freely removed/inserted. It is required to fully grasp in the U-NME 3 that the card mounting state changes due to replacement or expansion of the cards in order to operate the system. In the window depicted in FIG. 108, there is performed setting for deleting a board, which is no longer mounted because it is removed from the NODE, from the target of monitoring by the U-NME 3.

In FIG. 108, a section Action is provided in order to select whether the type of board to be mounted has been changed. In this section, any of STM-1, STM-4 and STM-16 boards can be selected.

In sections other than the section Action in the window shown in FIG. 108, cards of the NODE as the target are specified. In a section Station/Ring Network among these sections, any one of All (entire network system), Station (units of station) or Ring Network (ring network) is specified by a radio button. When Station is specified in this section, a pull-down menu for selecting any one of Stations A to G is displayed. When Ring Network is specified, a pull-down menu for selecting any one of Ring Networks #01 to #32 is displayed. When ALL is specified, respective sections Ring Network, NODE, LS Shelf and LS Card are displayed in the inactive mode, and they cannot be clicked. That is because all the NODEs in the system become the operation targets in the window depicted in FIG. 108 when ALL is specified.

In the window illustrated in FIG. 108, a list (not shown) for selecting any one of Ring Networks #01 to #32 is displayed in the section Ring Network in the form of a pull-down menu. A ring Network desired by a user is selected by using this menu. The section NODE displays a list of NODEs belonging to the ring network specified in the section Ring Network in the form of a pull-down menu. The NODEs desired by a user are selected by using this menu.

The section LS Shelf displays a list of low-speed shelves provided to the NODE selected in the section NODE in the form of a pull-down menu. The low-speed shelves desired by a user are selected by using this menu. The section LS Card displays a list of low-speed interface cards mounted to the shelf selected in the section LS Shelf in the form of a pull-down menu. The cards desired by a user are selected by using this menu.

When the Exec button is clicked after the above-described respective sections are specified, a message indicating that the specified board is deleted from the monitoring target is transmitted to the specified NODE. The NODE which has received this message then deletes that board from the monitoring target.

By doing so, the following effects can be obtained. Now, it is assumed that four STM-1 boards are substituted by one STM-4 board having the similar throughput capacity. Then, three out of four slots into which the STM-1 boards have been inserted become empty, and an alarm representing that the boards are not mounted to the slots is detected. An alarm representing that the wrong substrate is mounted to the slot into which the SMT-4 board is inserted is also detected. If this state is kept untouched, these alarms are continuously notified to the U-NME 3, and this can be an obstacle to the system operation.

Thus, messages are given to the NODEs, removed boards or slots from which the boards are removed are not determined as targets for monitoring, and the type of the mounted board is changed. As a result, the above-described problem can be avoided.

Figure 109:
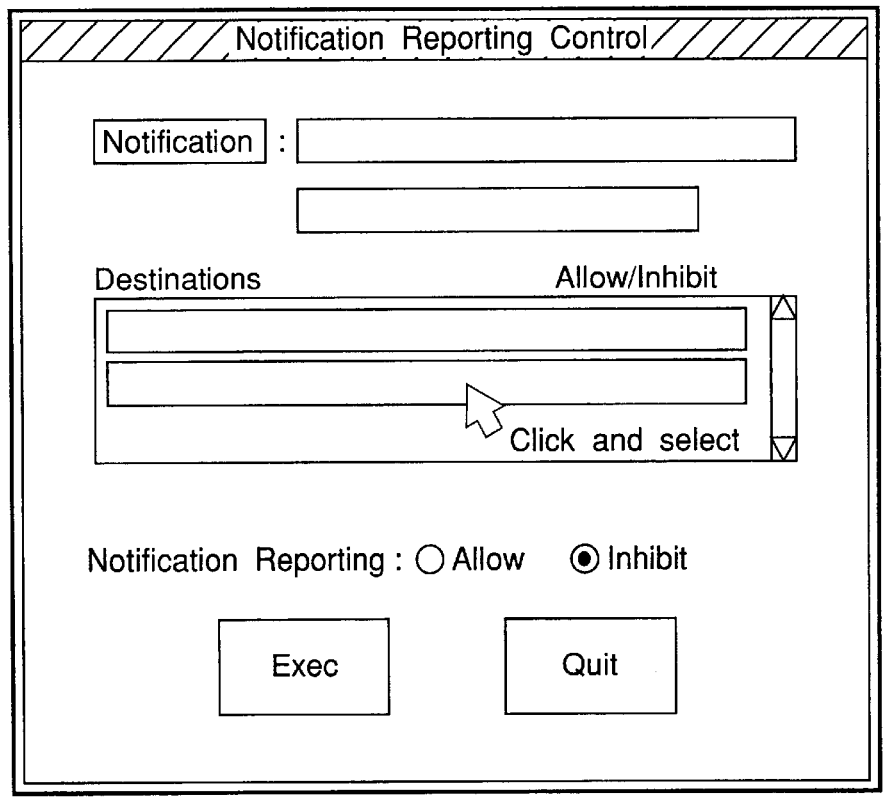
FIG. 109 is a view showing a Notification Reporting Control window.

When a Notification Reporting Control button shown in FIG. 107 is clicked, a Notification Reporting Control window illustrated in FIG. 109 is displayed. The FIG. 109 window is used to set from the U-NME 3 side a destination to which the notification information is notified with respect to an arbitrary NODE. That is, this window is used to rewrite an EFD (Event Forwarding Discriminator) of each NODE by a manual operation.

Figure 110:
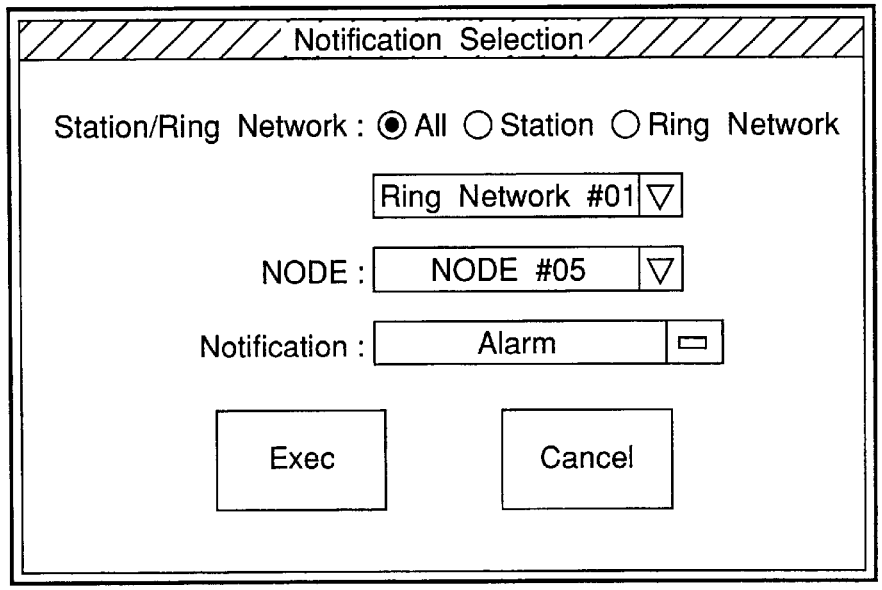
FIG. 110 is a view showing a Notification Selection window.

When a Notification button in FIG. 109 is first clicked, a Notification Selection window in FIG. 110 is displayed. In this window, a NODE which is a target is specified by the procedure similar to, e.g., that shown in FIG. 108. Then, a type of notification information for rewriting the EFD is specified in a section Notification. In FIG. 110, Alarm is selected as the type of notification information. When the Exec button is clicked after setting in FIG. 110 is completed, the screen display returns to FIG. 109. Upon returning from FIG. 110 to FIG. 109, the set content in the window shown in FIG. 110 is displayed next to the Notification button with ":" therebetween.

In the FIG. 109 window, a list of the U-NMEs 3 which are destinations of the notification information of the NODE selected in the window depicted in FIG. 110 at the present time is displayed in the section Destinations in the FIG. 109 window. An arbitrary U-NME 3 is selected in this section, and either Allow (allowance) or Inhibit (inhibition) is specified in a section Notification Reporting. As described above, whether the notification information is informed is individually set for each of the U-NMEs 3 shown in the list. When the Exec button is clicked, a message for notifying the set content is transmitted to the NODE which is an operation target. The NODE which has received this message operates in accordance with the set content.

By doing so, the following effect can be obtained. If any U-NME 3 fails to operate properly, informing the faulty U-NME 2 of the notification information leads to a disadvantage of the system operation. That is because the informed notification information is lost in the faulty U-NME 3. Thus, by rewiring the EFD in the above-described manner, it is possible to avoid a disadvantage such as loss of important data. Further, the traffic when informing the U-NME 3 of the notification information occupies a relatively large band. Therefore, setting so that only the necessary minimum U-NME 3 is informed of the notification information enables notification of the notification information with the necessary minimum traffic, thereby reducing the network load.

(Security Control)

Figure 111:
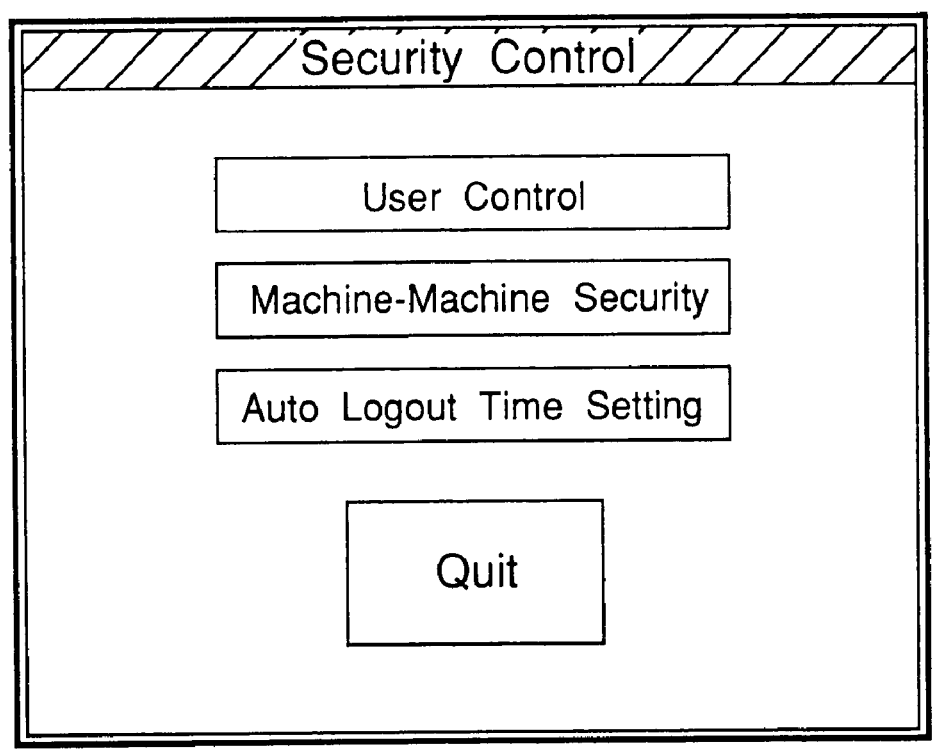
FIG. 111 is a view showing a Security Control window.

Description will now be given as to functions used when a Security button in the main screen shown in FIG. 3 is clicked. When the Security button is clicked, a Security Control window illustrated in FIG. 111 is displayed. The FIG. 111 window displays a menu of functions concerning the security management of the system. This window includes the function buttons "User Control", "Machine-Machine Security" and "Auto Logout Time Setting".

Figure 112:
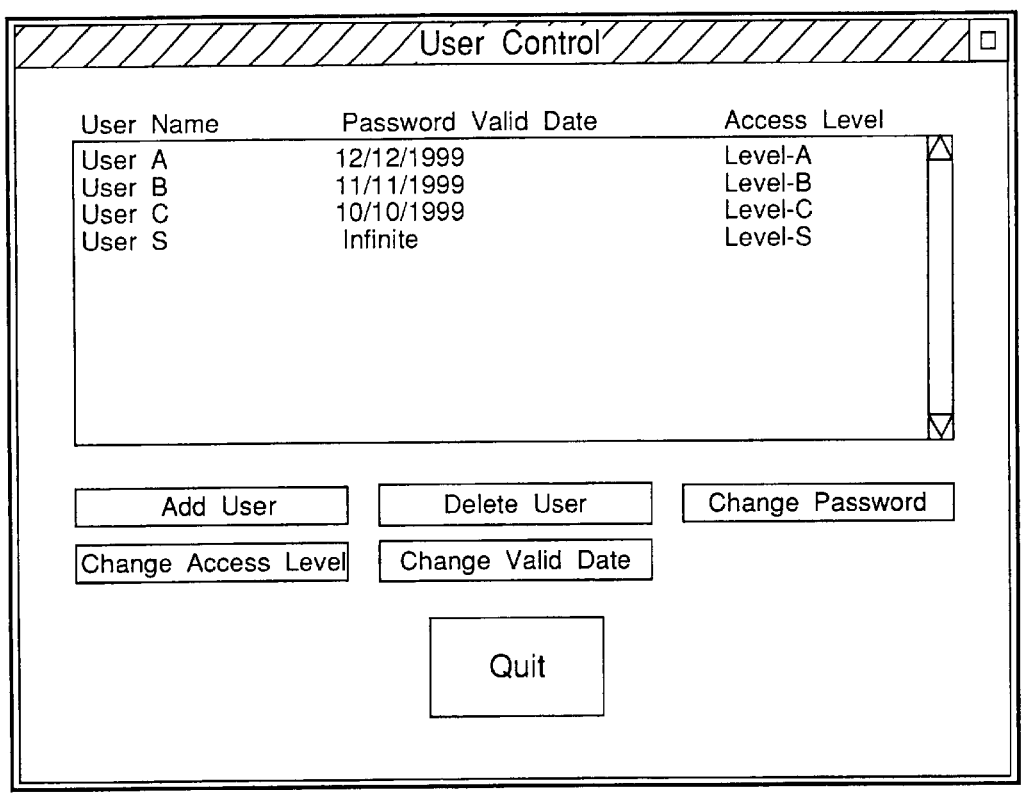
FIG. 112 is a view showing an User Control window.

When a User Control button is clicked in the FIG. 111 window, a User Control window depicted in FIG. 112 is displayed. The FIG. 112 window displays a list of user names (operator names) currently registered in the U-NME 3.

Each user has his/her unique password, and this password is utilized when the user logs in to the U-NME 3. The window shown in FIG. 112 displays an expiration date of the password of each user in a section "Password Valid Date". A rank indicative of "levels of the possible operation of various functions in the system" which is referred to as Access Level is set to each user. The ranks level A, B, C and S are displayed in the FIG. 112 window.

Figure 113:
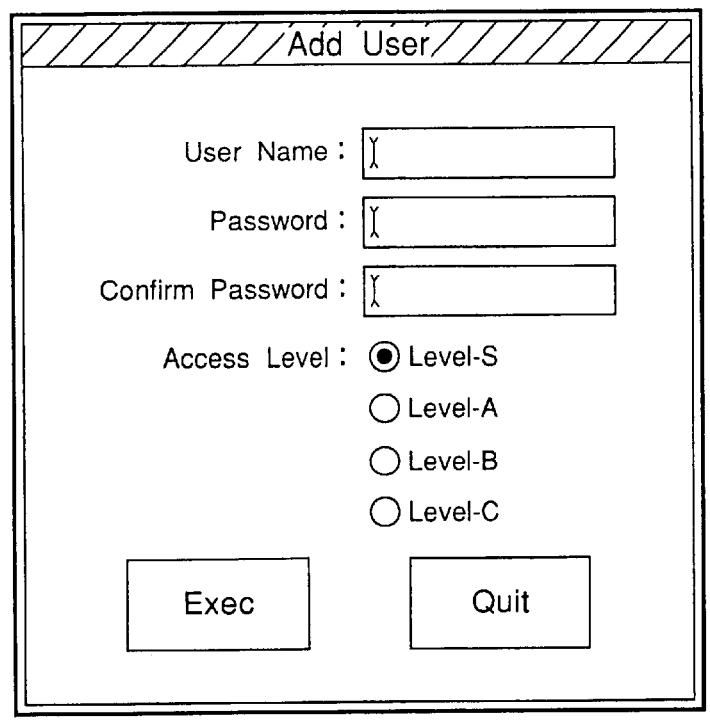
FIG. 113 is a view showing an Add User window.

When an Add User button is clicked in the FIG. 112 window, an Add User window shown in FIG. 113 is displayed. The FIG. 113 window is used for newly registering a user who accesses the U-NME 3. This window is provided with a user name input section, a password input section, a section for reconfirming the password, and a section for setting an access level.

When a Delete User button is clicked after an arbitrary user is selected in the FIG. 112 window, registration of the selected user can be deleted. When deleting registration of the user, the U-NME 3 displays the CAUTION window (not shown) showing a message "Do you want to delete the following use? User name: XXXXXXX Click the OK button to delete, or click the Cancel button to cancel", as a safety measure for the user.

Furthermore, when the user who is logged onto the U-NME 3 selects himself/herself for deletion of registration in the FIG. 112 window, the U-NME 3 displays the CAUTION window (not shown) showing a message "User Name: XXXXXXX You cannot delete yourself" and prevents the erroneous operation of the user.

Figure 114:
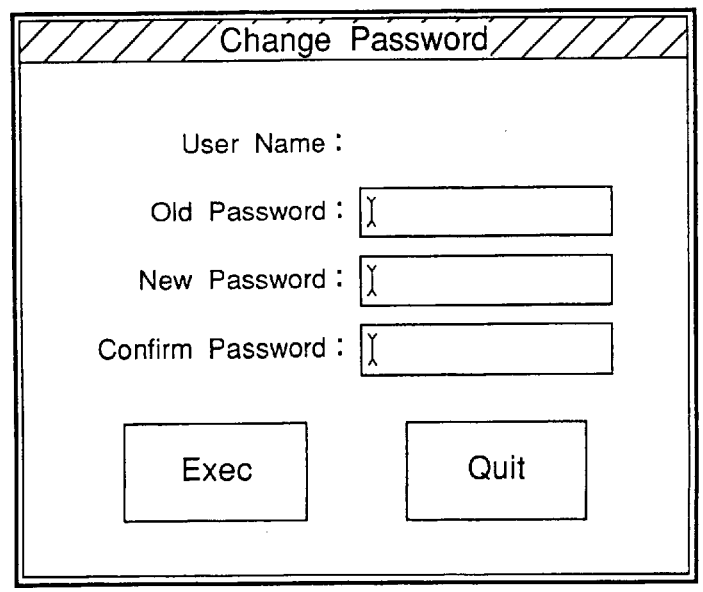
FIG. 114 is a view showing a Change Password window.

When a Change Password button is clicked after an arbitrary user is selected in the FIG. 112 window, a Change Password window illustrated in FIG. 114 is opened. The FIG. 114 window is used for changing a password of the selected user. The FIG. 114 window is provided with a section showing a selected user name, a section in which an old password (namely, a password at the present time) of that user is inputted, a section in which a newly set password is inputted, and a section for reconfirming the newly set password.

Figure 115:
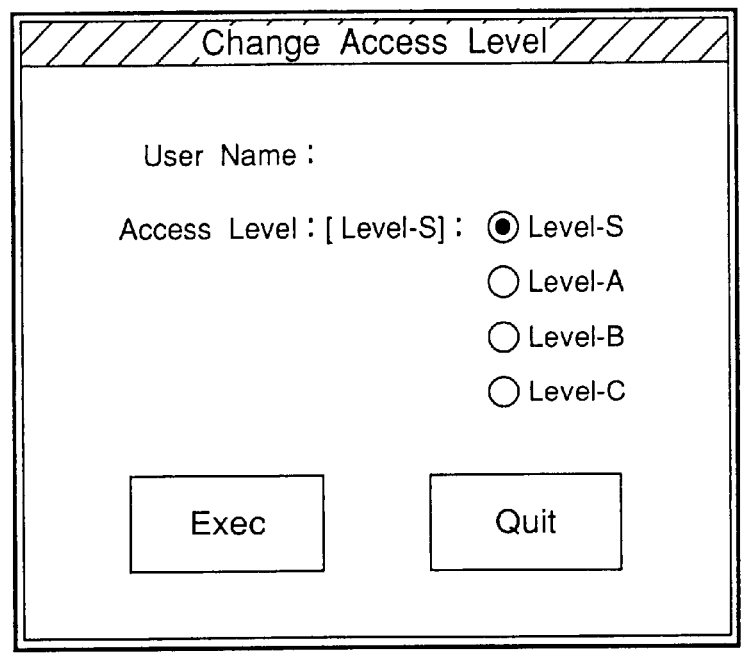
FIG. 115 is a view showing a Change Access Level window.

When a Change Access Level button is clicked after an arbitrary user is selected in the FIG. 112 window, a Change Access Level window shown in FIG. 115 is displayed. The FIG. 115 window is used for changing an access level of the selected user. When a radio button of this window is checked and the Exec button is clicked after any access level is specified, an access level of the user is newly set.

Figure 116:
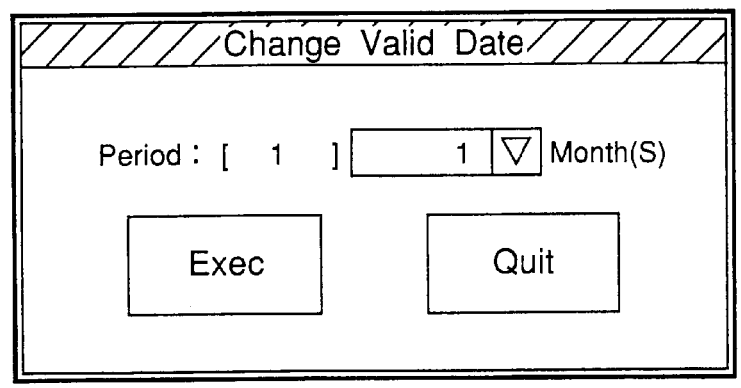
FIG. 116 is a view showing a Change Valid Date window.

When an arbitrary user is selected and a Change Valid Date button is thereafter clicked in the FIG. 112 window, a Change Valid Date window illustrated in FIG. 116 is displayed. This window is used for setting an expiration date of a password of the selected user. In the FIG. 116 window, the expiration date of a password can be specified on any of daily basis, monthly basis, 12-or-lower-month basis, and limitless basis.

Figure 117:
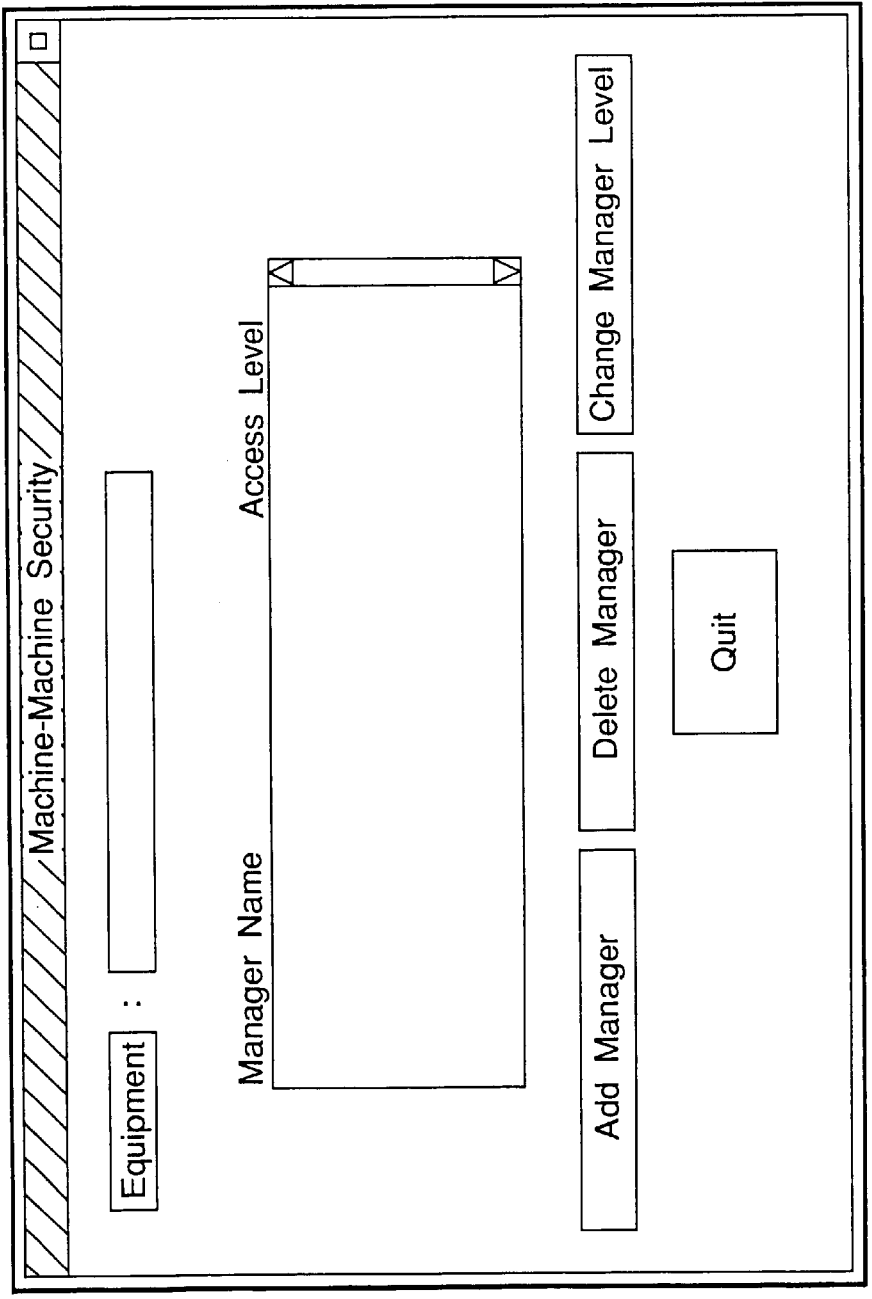
FIG. 117 is a view showing a Machine-Machine Security window.

Description will now be given as to functions used when a Machine-Machine Security button is clicked in the window illustrated in FIG. 111. When the Machine-Machine Security button is clicked, a Machine-Machine Security window depicted in FIG. 117 is displayed. The FIG. 117 window is used for managing an access level from the supervisory apparatus in the system to a monitored apparatus. In the windows illustrated in FIGS. 112 to 116, the access authority of a person to an apparatus is managed. On the contrary, in the window shown in FIG. 117, the access authority of an apparatus with respect to another apparatus is managed. It is to be noted that a supervisory apparatus includes the U-NME 3 and the SSE 2 as well as a simplified network management equipment which is referred to as a CPT.

Figure 118:
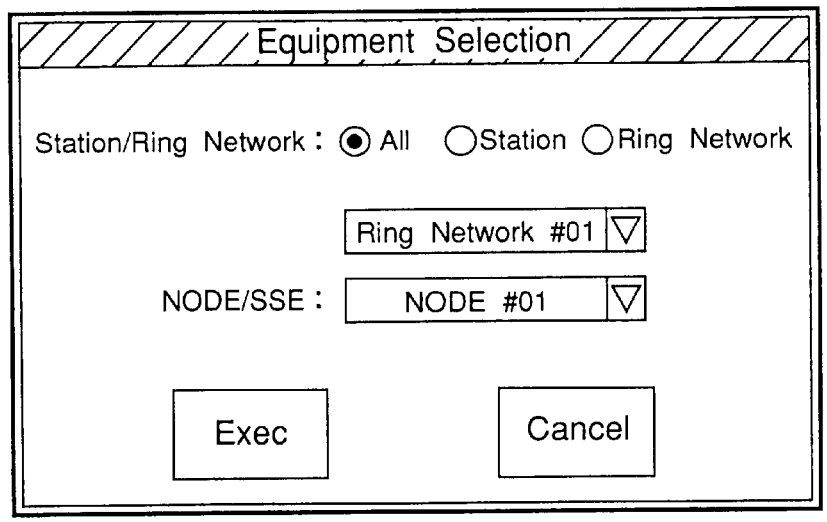
FIG. 118 is a view showing an Equipment Selection window.

When the Equipment button is clicked in the FIG. 117 window, an Equipment Selection window depicted in FIG. 118 is opened. In the FIG. 118 window, an apparatus which is a target of setting is selected. In the FIG. 118 window, the procedure similar to that described in connection with, e.g., FIG. 57 is used to select NODEs (NODEs 1-1 to 1-n) belonging to an arbitrary ring network or the SSE 2.

Upon completing the selection operation in the FIG. 118 window, a name of a selected monitored apparatus (for example, NODE #01) is displayed beside the Equipment button shown in FIG. 117. An apparatus (namely, the U-NME 3 or the SSE 2) for monitoring and controlling this selected monitored apparatus is previously set. A name of the apparatus which monitors and controls the selected monitored apparatus is read from the selected monitored apparatus, and the read name is displayed in a scroll window at the center of the FIG. 117 window. This scroll window displays the read name of the supervisory apparatus (Manager Name) and its access level.

Figure 119:
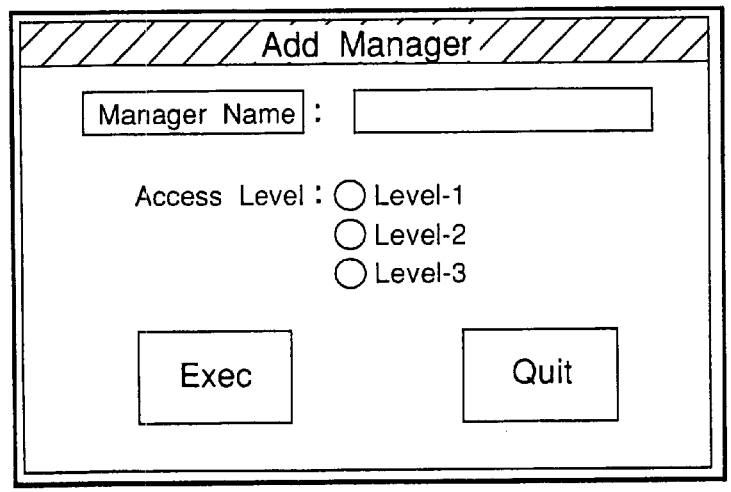
FIG. 119 is a view showing an Add Manager window.
Figure 120:
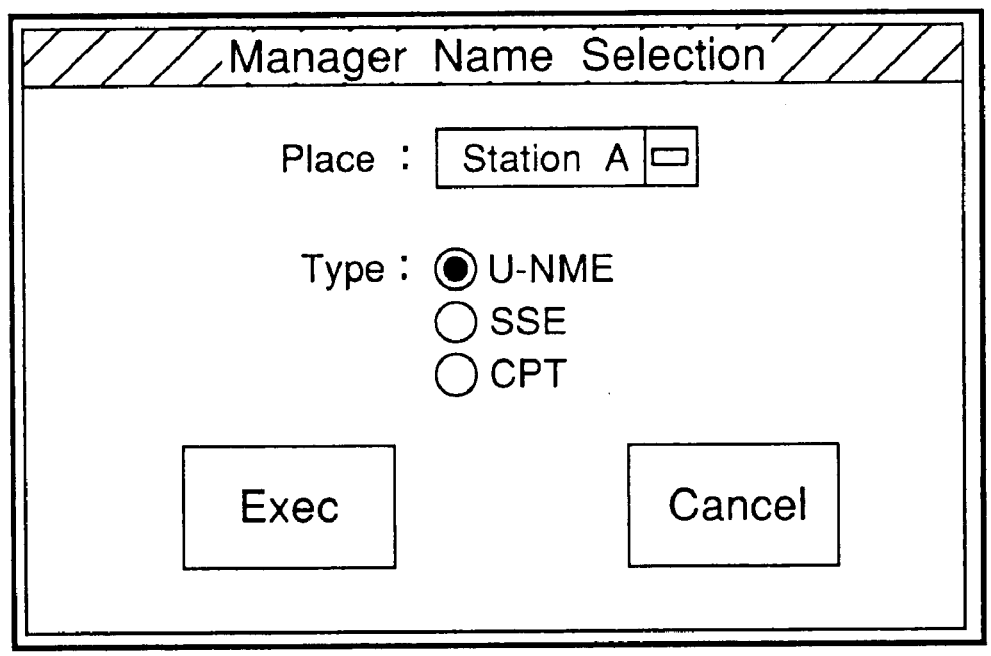

When an Add Manager button is clicked in the FIG. 117 window, an Add Manager window shown in FIG. 119 is displayed. The FIG. 119 window is used for newly adding and registering the supervisory apparatus with respect to the monitored apparatus selected in FIG. 117. When a Manager Name button is clicked in the FIG. 119 window, a Manager Name Selection window shown in FIG. 120 is opened. In the FIG. 120 window, one supervisory apparatus is arbitrarily selected. In this window, by specifying a station in which the supervisory apparatus is set and a type of the supervisory apparatus (Type: U-NME, SSE or CPT), the supervisory apparatus is designated. An access level of the designated supervisory apparatus is also set in this window. Types of functions and a number of monitored apparatuses that the supervisory apparatus can access differ depending on each access level.

In the FIG. 117 window, when any one of the supervisory apparatuses displayed in the scroll window is selected and a Delete Manager button is clicked, registration of this selected supervisory apparatus is deleted.

Figure 121:
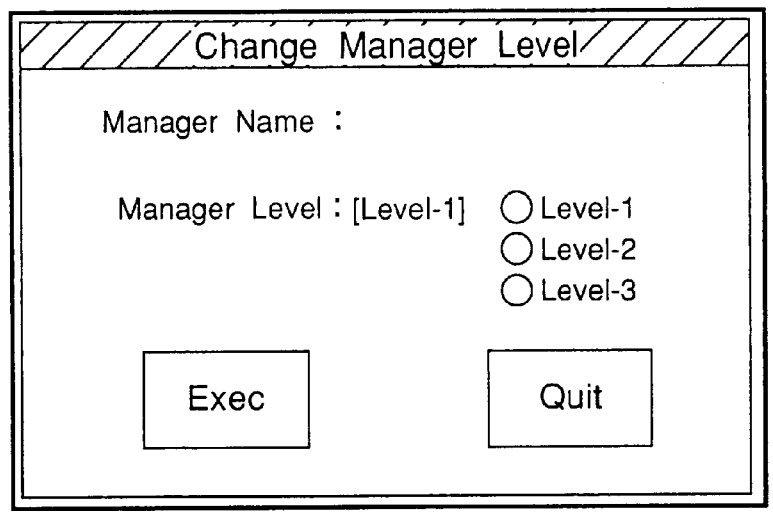

In the FIG. 117 window, when any one of the supervisory apparatuses displayed in the scroll window is selected and a Change Manager Level button is clicked, a Change Manager Level window shown in FIG. 121 is displayed. The FIG. 121 window is used for changing an access level of the selected supervisory apparatus. When an arbitrary access level is selected and the Exec button is clicked in this window, new setting is enabled.

Figure 122:
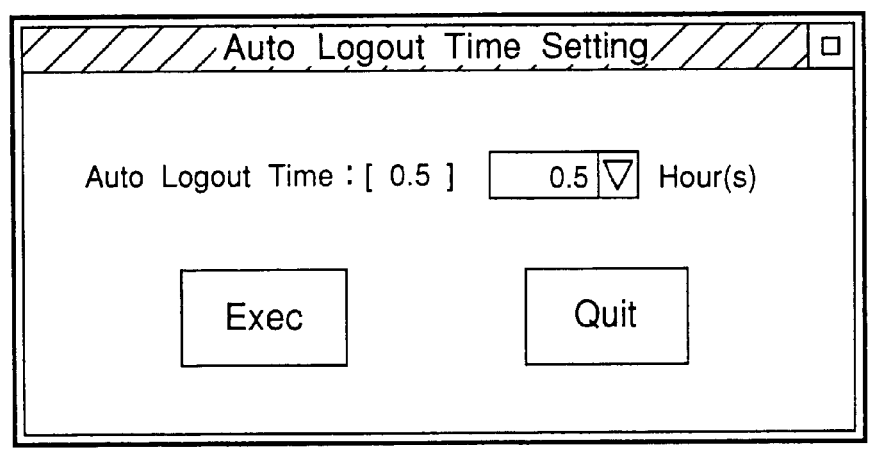

Description will now be given as to functions used when an Auto Logout Time Setting button is clicked in FIG. 111. When the Auto Logout Time Setting button is clicked, an Auto Logout Time Setting window shown in FIG. 122 is displayed. The window depicted in FIG. 122 is used for setting an auto logout time in an auto logout function.

The auto logout function automatically performs logoff when any operation is not performed for a predetermined time in the U-NME 3 (or the SSE 2) to which a user has logged in. This type of function is well known as being effective for assuring the security. In the window depicted in FIG. 122, a time from the last operation to the logoff (i.e., an auto logout time) is set.

In FIG. 122, as the Auto Logout Time, 0.5 Hour(s), i.e., 30 minutes are set. As a result, logoff from the U-NME 3 is automatically executed when 30 minutes have passed from the last operation.

(System Service)

Figure 123:
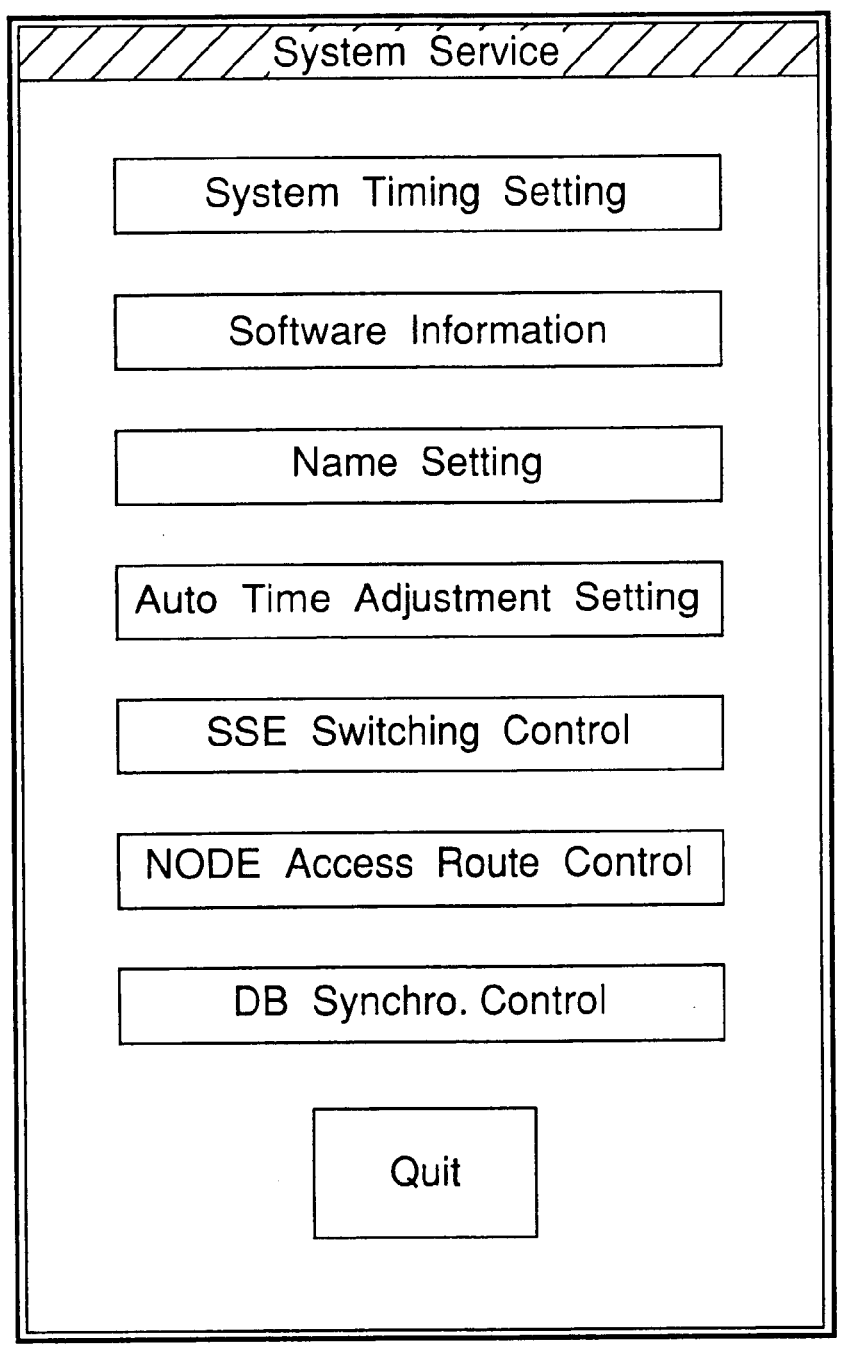

Description will now be given as to functions used when a System Service button is clicked in the main screen illustrated in FIG. 3. When the System Service button is clicked, a System Service window illustrated in FIG. 123 is displayed. The FIG. 123 window displays a menu of functions concerning various kinds of system setting such as setting of a time in the U-NME 3. This window is provided with the function buttons "System Timing Setting", "Software Information", "Name Setting", "Auto Time Adjustment Setting", "SSE Switching Control", "NODE Access Route Control", and "DB Synchro Control".

Figure 124:
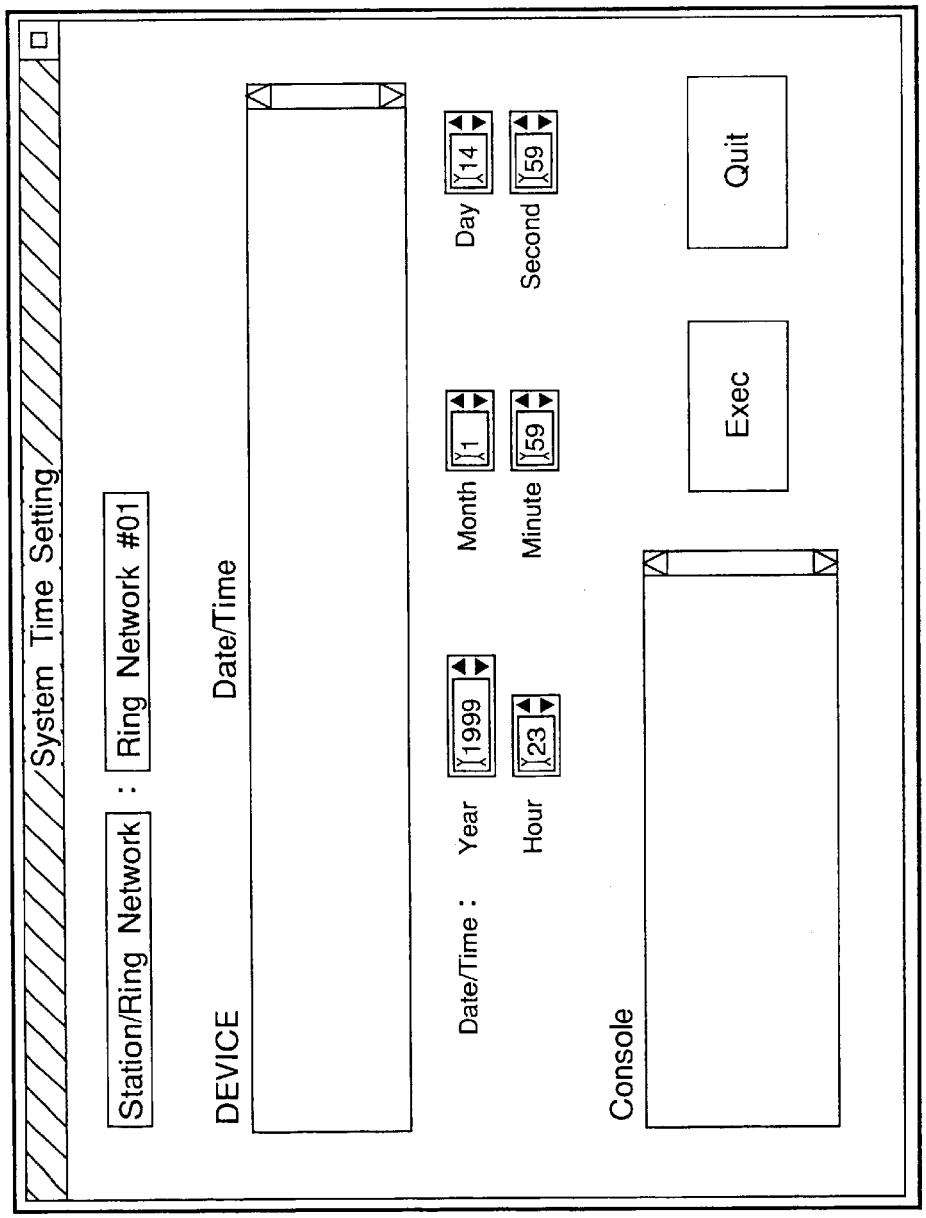

When the System Time Setting button is clicked in the FIG. 123 window, a System Time Setting window illustrated in FIG. 124 is displayed. The FIG. 124 window is used for specifying any apparatus in the network system and setting an operation reference time of that apparatus.

Figure 125:
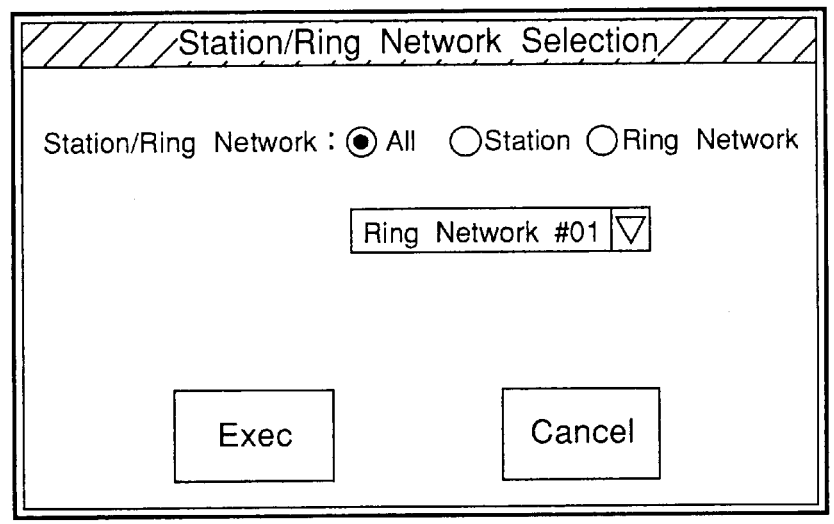

When a Station/Ring Network button is clicked in the FIG. 124 window, a Station/Ring Network Selection window shown in FIG. 125 is displayed. In the FIG. 125 window, an apparatus whose operation time is to be set is specified. When ALL is checked in this window, all the NODEs 1-1 to 1-n in the network system become targets of setting. When Station is checked in the FIG. 125 window, 32 NODEs set in a specific station become targets of setting. When Ring Network is checked in the FIG. 125 window, seven NODEs belonging to a specific ring network become targets of setting.

When the Exec button is clicked in the FIG. 125 window, the screen display returns to a window illustrated in FIG. 124, and a set state (Date/Time) of an operation time at the present point in time is read from each selected device (DEVICE). This read state is displayed in a scroll window at the center of the FIG. 124 window. A section Console in the FIG. 124 window displays a result of reading or a result of setting.

After an arbitrary device is clicked and selected in the scroll window in the FIG. 124 window, an operation time is set in the section Date/Time. Subsequently, when the Exec button is clicked, setting of the operation time relative to the selected device is enabled.

By setting the operation time relative to an arbitrary device as described above, all the devices existing in the network system can be synchronously operated at the same time. As a result, if the network system is set across areas having a difference in time, it is possible to make setting such that the operation time of each time is matched with the Universal Time Coordinated (UTC). Of course, different operation times can be also set for respective devices according to needs.

Figure 126:
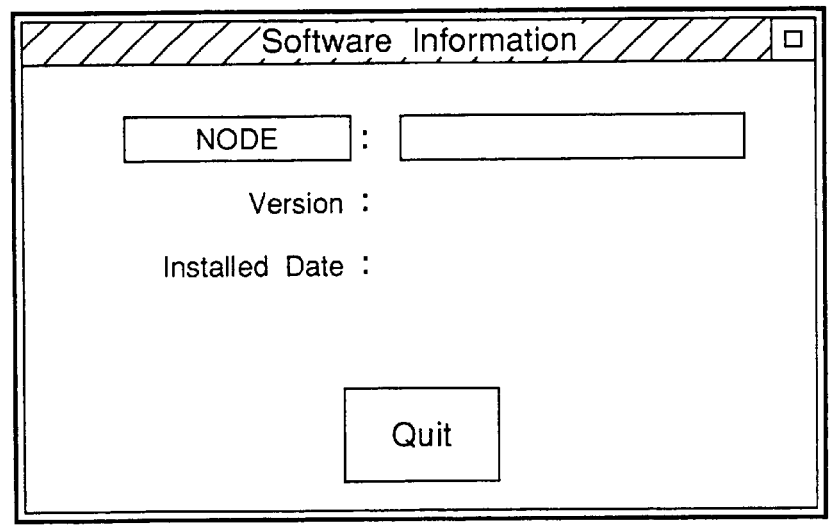
Figure 127:
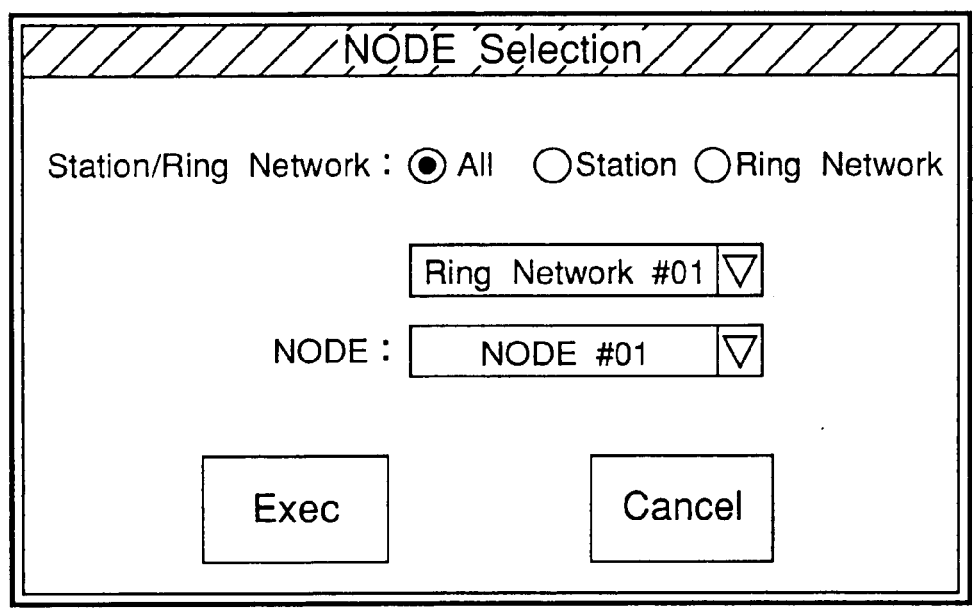

When a Software Information button is clicked in the window shown in FIG. 123, a Software Information window depicted in FIG. 126 is displayed. The FIG. 126 window is used for specifying any NODE and displaying information concerning software installed in that NODE. When a Node button is clicked in the FIG. 126 window, a NODE Selection window shown in FIG. 127 is opened. When a NODE as a target is specified in the FIG. 127 window, version information of the software and a date of installation of the software are read from that NODE. The read content is displayed in the FIG. 126 window together with a name of the NODE.

Figure 128:
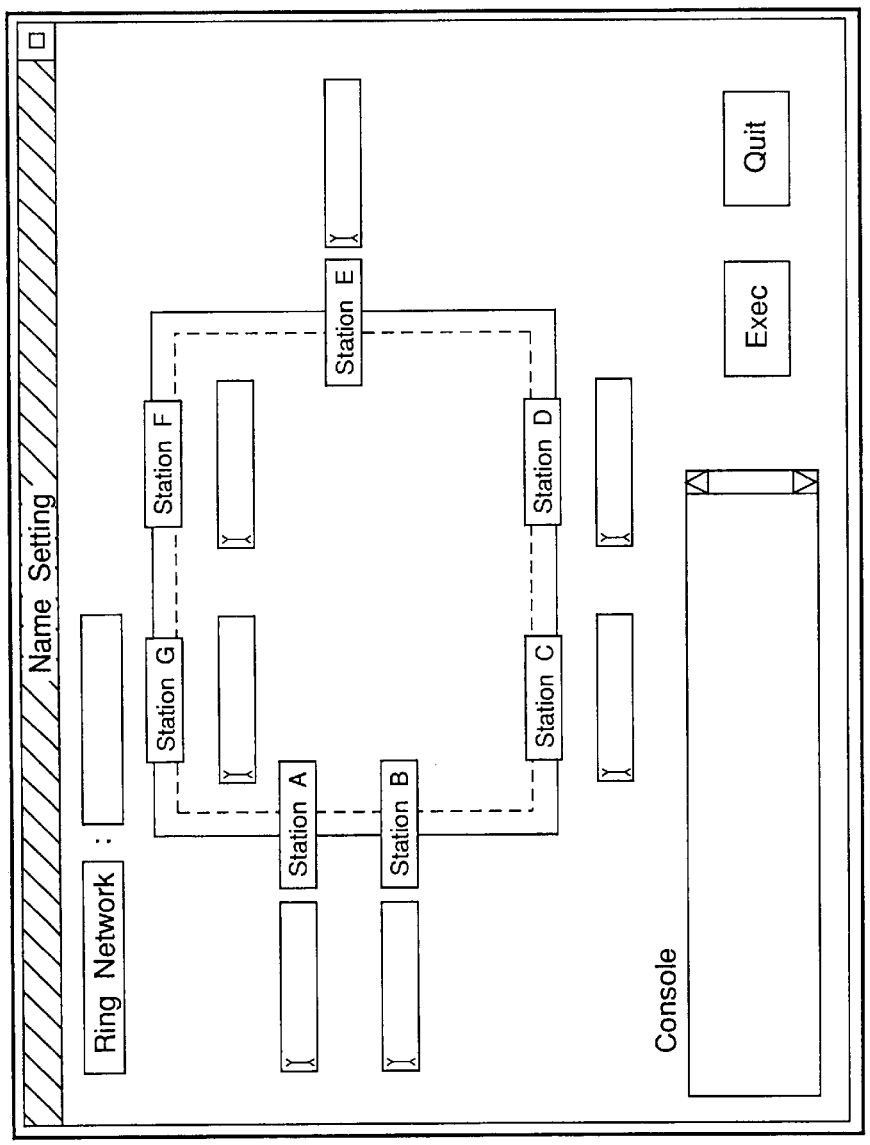

When a Name Setting button is clicked in a window illustrated in FIG. 123, a Name Setting window shown in FIG. 128 is displayed. The FIG. 128 window is used for reading and displaying a name of each NODE in the ring network. Further, this window is used for setting a name of each NODE. The term "name of each NODE" used herein is not restricted to a number such as #01, #02, . . . and could be a name such as a nickname.

Figure 129:
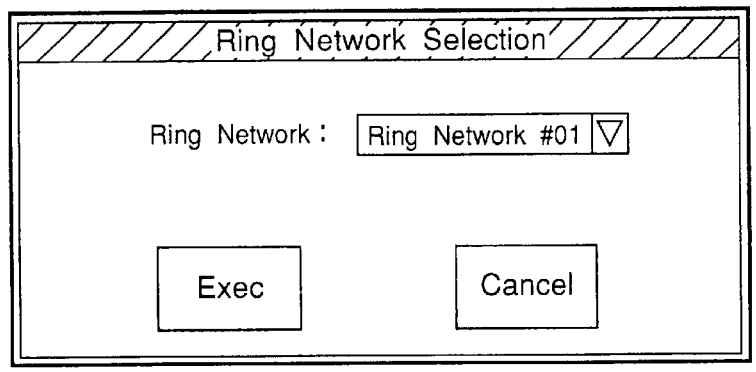

When a Ring Network button is clicked in the window illustrated in FIG. 128, a Ring Network Selection window depicted in FIG. 129 is opened. In the FIG. 129 window, a ring network to which a NODE as a target of operation belongs is specified. When the Exec button is clicked in the FIG. 129 window, the window illustrated in FIG. 128 displays a type drawing of the specified ring network as well as current names of NODEs belonging to that ring network.

The window shown in FIG. 128 displays a caret (vertical bar mark) is displayed in a section showing a name of a NODE and urges input of a new name. When a name is given to an arbitrary node and the Exec button is thereafter clicked, the name given to that node becomes valid. The FIG. 128 window is characterized in that setting of names of a plurality of NODEs can be collectively executed in accordance with each ring network. The name given in this window is also reflected to display in other windows.

Figure 130:
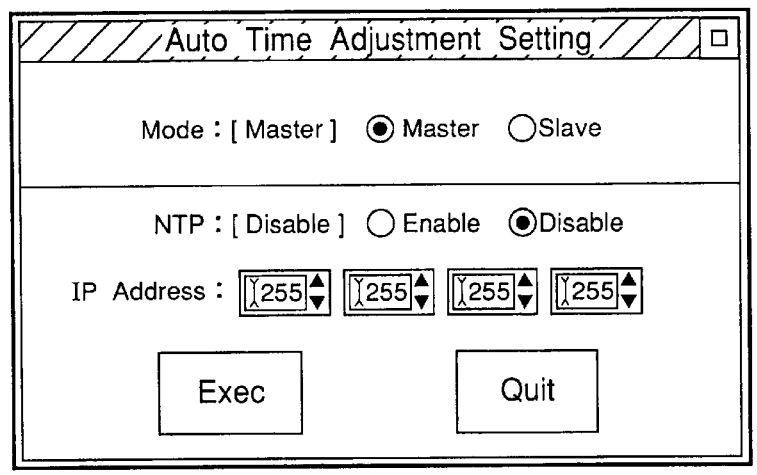

When an Auto Time Adjustment Setting button is clicked in the FIG. 123 window, an Auto Time Adjustment Setting window shown in FIG. 130 is displayed. The network system in this embodiment is provided with a function for enabling a master device to automatically set the operation time of a slave device to, e.g., a daily fixed time. This type of function is referred to as Auto Time Adjustment. The window shown in FIG. 130 is used for setting each parameter concerning this function.

In the FIG. 130 window, a master or a slave that the U-NME 3 in the login mode is operated as is selected in a section Mode. The U-NME 3 set as a master sets the operation time of each of the other NODEs or the SSE 2 to, for example, an activation time or a daily fixed time. The U-NME 3 set as a slave receives supply of the operation clock from the master U-NME 3 and operates in accordance with this operation clock.

In the FIG. 130 window, whether a network time protocol (NTP) is used (Enable) or not (Disable) is set in a section NPT. The NTP is a protocol for synchronizing the operation times with each other between a plurality of the U-NMEs 3. In a section IP Address, an IP address of an NTP server, i.e., a U-NME 3 as a master is set.

Figure 131:
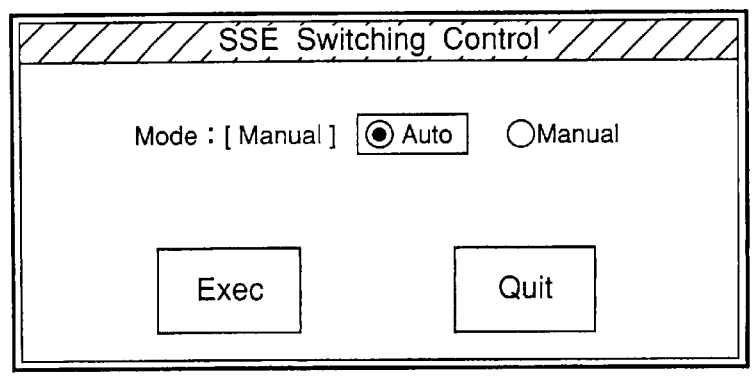

When an SSE Switching Control button is clicked in the FIG. 123 window is clicked, an SSE Switching Control window shown in FIG. 131 is opened. The FIG. 131 window concerns setting of an access route when a failure is generated in the SSE 2. Either Auto (automatic) or Manual (manual) is selected in this window.

As shown in FIG. 1, the communication between the U-NME 3 and the NODEs 1-1 to 1-n in a station is carried out through the SSE 2. Therefore, when a failure occurs in the SSE 2, the communication between the U-NME 3 and the NODEs 1-1 to 1-n is interrupted. Thus, an access route making a detour to another adjacent station is set in such a case so that the communication between the U-NME 3 and the NODEs 1-1 to 1-n cannot be interrupted.

When Auto is set in the FIG. 131 window, a bypass route is automatically set upon the occurrence of a failure. As the bypass route, there are two routes, i.e., a route running through a station on the WEST side and a route running through a station on the EAST side. Fixed setting that either route is used is advantageous for the system design. Of course, the bypass route may be dynamically set in accordance with the network configurations of the time. It can be said that there is virtually no difference in the communication time due to the bypass.

With Auto being set in the FIG. 131 window, when a failure occurs in any SSE 2, the U-NME 3 is informed of this fact. The U-NME 3 which has received this notification displays the CAUTION window (not shown) showing a message having the following content on the screen:

"A rerouting mechanism for detouring around a faulty SSE 2 is operating.

Failure occurrence time: year; month; day hour; minute; second

Cause: XXXXXXXXXX"

By displaying such a message, an operator can be informed of the fact that setting of a bypass route has been completed.

For example, when a failure is generated in the SSE 2 in the station ST-1, the U-NME 3 of this station sets a bypass route extending to the station ST-m. In such a case, the access route from the U-NME 3 of the station ST-1 to the NODE 1-1 of the same station is a path extending through (the U-NME 3 of the ST-1, a router 4 of the ST-1, a router 4 of the ST-m, the SSE 2 of the ST-m, the NODE 1 of the ST-m, and the NODE 1-1 of the ST-1) in the order mentioned.

On the other hand, with Manual being set in the window illustrated in FIG. 131, when a failure is generated in the SSE 2 in the station, the U-NME 3 which has received the notification of this fact displays the CAUTION window (not shown) showing a message having, e.g., the following content:

"A report informing a failure has been notified from is the SSE. Immediately activate the bypass route resetting mechanism.

Failure occurrence time: year; month; day hour; minute; second

Cause: XXXXXXXXXX

The bypass route resetting mechanism is activated when you click the OK button.

This problem remains untouched when you click the Cancel button. You must manually activate the bypass route resetting mechanism later."

By displaying such a message, an operator is urged to set a bypass route.

When a NODE Access Route Control button is clicked in the FIG. 123 window, a NODE Access Route Control window shown in FIG. 132 is displayed. The window depicted in FIG. 132 is used for forcibly detouring the access route between the U-NME 3 and the NODE in the same station irrespective of presence/absence of a failure in the SSE 2.

When a Station button is clicked in the FIG. 132 window, a Station Selection window illustrated in FIG. 134 is opened. In the FIG. 134 window, an arbitrary station is selected. When the Exec button is clicked in the FIG. 134 window, display returns to the window shown in FIG. 132, and either Main Route or Detoir is selected in a section Process in this window.

When the Main Route is selected in the window shown in FIG. 132, a main route indicated by a solid line is set between the U-NME 3 and the NODE 1-1 (this can be also applied to other NODEs 1-2 to 1-n) as shown in a type drawing of FIG. 137. This route is a standard access route. When the Detour is selected in the window illustrated in FIG. 132, a bypass route is forcibly set between the U-NME 3 and the NODE 1-1 as indicated by a dotted line in the type drawing of FIG. 137.

When a DB Synchronizing Control button is clicked in the window shown in FIG. 123, a DB Synchronizing Control window illustrated in FIG. 133 is displayed. The window depicted in FIG. 133 concerns management of notification information transmitted from the NODE 1-1 to the NODE 1-n.

The notification information sent from each of the NODEs 1-1 to 1-n to the U-NME 3 is transmitted through the SSE 2 in each station. The SSE 2 accumulates the notification information sent from the NODEs 1-1 to 1-n in the data base as a history.

When a failure is generated in the SSE 2, that SSE 2 cannot accumulate the history of the notification information in the data base. Thus, in this system, the history of the notification information is alternatively accumulated in the SSE 2 existing in the bypass route.

When the SSE is restored from a failure, the processing for accumulating the history of the notification information in the data base is restarted in the restored SSE 2, but the notification information during a period of the failure does not exist in the data base of that SSE 2. Therefore, by moving the notification information during the period of the failure from the SSE 2 existing in the bypass route to the restored SSE, data is complemented. The window shown in FIG. 133 is used for executing this complement processing.

When the Station button is clicked in the window illustrated in FIG. 133, a Station Selection window shown in FIG. 134 is opened. An arbitrary station is selected in the FIG. 134 window.

When the Exec button is clicked after a desired station is selected in the window shown in FIG. 134, information indicating whether data to be subjected to the complement processing exists in the selected station is read. This read information is reflected in the display content of the FIG. 133 window. FIG. 133 shows that data to be moved exists by a message "a synchronizing log record exists". When a Synchronizing process start button is clicked in the window illustrated in FIG. 133 is clicked, the data moving processing is executed.

Description will now be given as to the CAUTION window shown in FIG. 135. In a station in which an access route between the U-NME 3 and the SSE 2 is detoured due to a failure in the SSE 2, this window is displayed in the U-NME 3 of that station when the SSE 2 is restored. This window displays a message "A failure in the SSE has been resolved. Do you want to execute the processing for switching back the bypass route?" and function buttons "Restoration", "Restoration and DB. synchro." and "No restoration", prompt an operator to perform the operation.

When the Restoration button is clicked in the FIG. 135 window, the access route is switched back from the bypass route to the regular route. When the Restoration and DB. synchro. button is clicked, the access route switching back processing and the data moving processing are executed. When the No restoration button is clicked, the access route is not switched back, and bypassing is continued. However, even if the No restoration button is clicked, it is possible to manually abort bypassing by using the FIG. 132 window or execute the data moving processing by using the FIG. 133 window.

(Display Control)

Description will now be given on functions used when a Display button is clicked in the main screen in FIG. 3.

When the Display button is clicked in the window illustrated in FIG. 3, a Display Control window shown in FIG. 138 is displayed. The FIG. 138 window displays items concerning setting of display colors in the screen. That is, respective clickable Color buttons are provided in accordance with items Critical, Major, Minor, Warning, Clear, Other Notifications, Not Mount, Time out, Maintenance, APS Active and APS Normal. The items Critical, Major, Minor, Warning, Clear, Other Notifications, Not Mount, Time out, Maintenance relate to the alarm. The items APS Active and APS Normal concern the APS function, and relate to, for example, the state of display in the windows illustrated in FIGS. 20 and 21.

A square [▫] on the left side with the Color button between itself and the item indicates a current display color of each item, and a square ▫ on the right side indicates a newly set display color. Although not shown, each square is colored.

When the Color button is clicked in the FIG. 138 window, a color pallet shown in a Color Selection window in FIG. 139 is displayed. An arbitrary color is selected from this pallet in accordance with each item in the FIG. 138 window. When an Initialize button is clicked in FIG. 138, a set display color can be returned to the initial setting.

A display color set in the windows illustrated in FIGS. 138 and 139 is applied to, for example, distinction of a faulty station and a faulty line by using different colors in the Observation Display shown in FIG. 3, distinction of a faulty ring network and a faulty NODE by using different colors in FIGS. 13 and 20, distinction of a faulty shelf by using different colors in FIG. 15, distinction of a faulty card by using different colors in FIG. 16 and others. In short, display colors set in the FIG. 138 window are all reflected to distinction using different colors in windows which graphically display the state of the network.

Further, the window illustrated in FIG. 138 is provided with an item Date/Time Sorting for setting a display order of a date and a time and an item Date Type for setting a display format of a date. An arbitrary sub item is checked by a radio button in accordance with each item. In FIG. 138, sub items Time Date and MMM-DD-YYY (month/day/year) are checked. The setting in these sub items is reflected to all the windows which display a date or a time. Furthermore, in the window depicted in FIG. 138, a display order of data is set in a section Sorting. That is, either displaying sets of data shown in an arbitrary window from the latest one (Latest) or displaying the same from the earliest one (Earliest) is selected.

As described above, according to this embodiment, it is possible to provide a network management equipment which improves the human-machine interface and enhances the convenience of the operation.

It is to be noted that the present invention is not restricted to the above-described embodiment.

For example, the functions in the U-NME 3 have been explained in the foregoing embodiment. However, the same type of functions as those described above can be provided to the SSE 2 within the capabilities of the processor.

Moreover, although one U-NME 3 is set in each station in the above-described embodiment, one U-NME 3 may monitor and control the entire network depending on the system configuration. Alternatively, the U-NME 3 may be set in a plurality of arbitrary stations.

Names of each window and each function button mentioned above, arrangement of a display object in each window, a position of each function button and others are not restricted to those in the foregoing embodiment.

Besides, various modifications are possible without departing from the scope of the present invention.

As described above, according to the present invention, it is possible to provide the network management equipment and the communication path setting method which improve the human-machine interface and enhance the convenience of the operation.

As a result, the present invention is effective in technical fields relating to an optical submarine cable system, and technical fields concerning a network complying with the SDH/SONET in particular.

What is claimed is:

1. A network management equipment for managing a network system including a plurality of stations, a communication line provided between said stations, and one or a plurality of nodes which are set in each of said station and connected to each other through said communication line, said network management equipment comprising:

a display unit;

information acquiring means for acquiring notification information respectively transmitted from a plurality of said nodes;

information processing means for managing a state of occurrence of a failure in said network system based on said notification information acquired by said information acquiring means; and display controlling means for displaying information processed by said display processing means on said display unit, wherein said display controlling means displays an area map of an area in which said network system is set on said display unit;

displays on said area map a plurality of station icons respectively associated with said stations and a line associated with said communication line;

displays a plurality of said station icons in a display mode which varies depending on presence/absence of a failure in each corresponding station; and displays said line in a display mode which varies depending on presence/absence of a failure in said corresponding communication line.

2. The network management equipment according to claim 1, wherein said display controlling means displays on said area map a current time indicated by the universal time coordinated (Universal Time Coordinated: UTC) and a standard time of each area in which a plurality of said stations are respectively set.

3. A network management equipment for managing a network system including a plurality of nodes based on notification information transmitted from a plurality of said nodes, said network management equipment comprising:

a display unit;

operating means for accepting click operations by a user;

information acquiring means for acquiring notification information including alarm information respectively transmitted from a plurality of said nodes; and display controlling means for displaying information processed by said information processing means on said display unit, wherein said display controlling means displays a first button on a screen of said display unit;

displays a first window on said screen of said display unit when said first button is clicked by said operating means; and displays a list of notification information acquired by said information acquiring means in said first window in a text format together with a plurality of attributes for characterizing each set of said notification information.

4. The network management equipment according to claim 3, wherein said display controlling means displays a second button on said screen of said display unit;

displays a second window on said screen of said display unit when said second button is clicked by said operating means;

displays an attribute specification section for arbitrary selecting and specifying a plurality of said attributes in said second window; and selectively displays in said first window notification information having attributes specified in said attribute specification section.

5. The network management equipment according to claim 3, wherein said display controlling means displays a third button on said screen of said display unit;

displays a third window on said screen of said display unit when said third button is clicked by said operating means;

displays in said third window a section for setting an order for displaying said attributes in said first window; and rearranges an order of said attributes displayed in said first window in accordance with said order set in said section.

6. The network management equipment according to claim 3, wherein said display controlling means displays a fourth button on said screen of said display unit;

displays a fourth window on said screen of said display unit when said fourth button is clicked by said operating means; and displays in said fourth window a list of nodes which is targets of management by its own apparatus, and wherein when one or more nodes among nodes displayed in said fourth window are specified by said operating means, said information acquiring means masks alarm information included in notification information transmitted from said specified nodes.

7. The network management equipment according to claim 3, further comprising an alarm buzzer which sounds under predetermined conditions; and buzzer controlling means for controlling sounding of said alarm buzzer, wherein said display controlling means displays a fifth button on said screen of said display unit;

displays a fifth window on said screen of said display unit when said fifth button is clicked by said operating means; and displays in said fifth window a condition setting section for setting conditions for sounding said alarm buzzer; and wherein said buzzer controlling means sounds said alarm buzzer under conditions set in said condition setting section in said fifth window.

8. A network management equipment provided to a network system including a plurality of ring networks having a plurality of nodes connected to each other in a ring form through a communication line, said network management equipment comprising:

a display unit;

information acquiring means for acquiring notification information respectively transmitted from a plurality of said nodes;

information processing means for managing an occurrence state of a failure in said network system based on said notification information acquired by said information acquiring means; and display controlling means for displaying information processed by said information processing means on said display unit, wherein said display controlling means displays a sixth button on a screen of said display unit;

displays a sixth window on said screen of said display unit when said sixth button is clicked by said operating means;

displays in said sixth window a plurality of headers respectively associated with a plurality of said ring networks;

displays a plurality of said headers in a display mode which varies depending on presence/absence of a failure in respective corresponding ring networks;

displays in said sixth window a view showing a configuration of a ring network corresponding to any header clicked by said operating means when said header is clicked by said operating means; and displays a plurality of nodes shown in said view of said configuration of said ring network in display modes which differ from each other depending on presence/absence of a failure in said each node.

9. The network management equipment according to claim 8, wherein when each of said nodes includes a plurality of shelves, said display controlling means displays a seventh window on said screen of said display unit when any node shown in said type drawing is clicked by said operating means;

displays a type drawing showing a shelf configuration of said clicked node in said seventh window; and displays a plurality of shelves shown in said type drawing in display modes which differ from each other depending on presence/absence of a failure in said each shelf.

10. The network management equipment according to claim 9, wherein when each of a plurality of said shelves includes one or a plurality of cards, said display controlling means displays an 11th window on said screen of said display unit when any one of a plurality of said shelves shown in said type drawing is clicked by said operating means;

displays a view showing a card configuration of said clicked shelf in said 11th window; and displays a plurality of cards shown in said view of said card configuration in display modes which differ from each other depending on presence/absence of a failure in each of said cards.

11. A network management equipment for managing a network system including a plurality of stations, a communication line provided between said stations, and one or a plurality of nodes which are respectively provided in said stations and connected to each other through said communication line, said network management equipment comprising:

a display unit;

operating means for accepting first and second click operations different from each other by a user;

information acquiring means for acquiring notification information respectively transmitted from a plurality of said nodes;

information processing means for managing an occurrence state of a failure in said network system based on said notification information acquired by said information acquiring means; and display controlling means for displaying information processed by said information processing means on said display unit, wherein said display controlling means displays a plurality of station icons respectively associated with said stations on a screen of said display unit;

displays a plurality of said station icons in a display mode which varies depending on presence/absence of a failure in each corresponding station;

displays an eighth window on said screen of said display unit when any one of said station icons is clicked by said first click operation of said operating means;

displays in said eighth window one or a plurality of node icons respectively associated with said nodes set in a station corresponding to said clicked station icon; and displays one or a plurality of said node icons in a display mode which varies depending on presence/absence of a failure in each corresponding node.

12. The network management equipment according to claim 11, wherein when each of said nodes includes a plurality of shelves, said display controlling means displays on said screen of said display unit a ninth window when any node icon displayed in said eighth window is clicked;

displays a type drawing showing a shelf configuration of said clicked node in said ninth window; and displays a plurality of shelves shown in said type drawing in display modes which differ from each other depending on presence/absence of a failure in each of said shelves.

13. The network management equipment according to claim 11, wherein when each of said nodes includes a plurality of shelves, said display controlling means displays a tenth window on said screen of said display unit when any of said station icons is clicked by said second click operation of said operating means;

displays in said tenth window a list of nodes set in a station corresponding to said clicked station icon;

displays a ninth window on said screen of said display unit when any node shown in said list is selected by said operating means;

displays in said ninth window a type drawing showing a shelf configuration of said selected node; and displays a plurality of shelves shown in said type drawing in display modes which differ from each other depending on presence/absence of a failure in each of said shelves.

14. A network management equipment provided in a network system including a plurality of ring networks, each of a plurality of ring networks including a plurality of nodes and a traffic bypass function, a plurality of said nodes being connected to each other in a ring form through a communication line, said communication line including a working system line and a preliminary system line, and said traffic bypass function being a function which causes service traffic transmitted through said working system line to make a detour to said preliminary line, and being a function which enters either an active status or a normal status, said network management equipment comprising:

a display unit;

information acquiring means for acquiring notification information respectively transmitted from a plurality of said nodes;

information processing means for managing statuses of said traffic bypass function in said network system based on said notification information acquired by said information acquiring means; and display controlling means for displaying information processed by said information processing means on said display unit, wherein said display controlling means displays a seventh button on a screen of said display unit;

displays a 12th window on said screen of said display unit when said seventh button is clicked by said operating means;

displays in said 12th window a plurality of icons respectively associated with a plurality of said ring networks;

displays a plurality of said icons in a display mode which varies depending on said active status or said normal status which said traffic bypass function in said each corresponding ring network enters; and displays a plurality of said icons in a display mode which varies depending on whether said status of said traffic bypass function in said each corresponding ring network has been confirmed by an operator of its own apparatus.

15. The network management equipment according to claim 14, wherein said display control button displays in a blinking manner an icon corresponding to a ring network that said status of said traffic bypass function has not been confirmed; and displays in a lit manner an icon corresponding to a ring network that said status of said traffic bypass function has been confirmed.

16. A network management equipment for managing a network system including a plurality of nodes based on notification information transmitted from a plurality of said nodes, said network management equipment comprising:

a display unit;

information acquiring means for acquiring notification information respectively transmitted from a plurality of said nodes;

storing means for accumulating a history of said notification information acquired by said information acquiring means;

information processing means for managing said network system based on said notification information acquired by said information acquiring means; and display controlling means for displaying information processed by said information processing means on said display unit, wherein said display controlling means displays a 13th window on a screen of said display unit; and displays in said 13th window a retrieval condition specification section for specifying retrieval conditions for retrieving desired notification information from said history accumulated in said storing means, wherein said information processing means retrieves from said history accumulated in said storing means notification information according to retrieval conditions specified in said 13th window, wherein said display controlling means displays a 14th window on said screen of said display unit; and displays in said 14th window notification information retrieved by said information processing means in a text format together with a plurality of attributes for characterizing said retrieved notification information.

17. The network management equipment according to claim 16, further comprising operating means for accepting click operations by a user, wherein said display controlling means displays an eighth button on said screen of said display unit;

displays a 15th window on said screen of said display unit when said eighth button is clicked by said operating means;

displays in said 15th window an attribute specification section for arbitrarily selecting and specifying a plurality of said attributes; and selectively displays in said 14th window notification information having attributes specified in said attribute specification section.

18. The network management equipment according to claim 17, wherein said display controlling means displays a 16th window on said screen of said display unit when arbitrary notification information is clicked by said operating means in said 14th window; and displays in said 16th window a section for causing an operator of its own apparatus to input memo data written in connection with said clicked notification information, and wherein said information processing means gives said memo data inputted in said 16th window to said clicked notification information.

19. The network management equipment according to claim 16, further comprising operating means for accepting click operations by a user, wherein said display controlling means displays a ninth button on said screen of said display unit;

displays a 17th window on said screen of said display unit when said 9th button is clicked by said operating means; and displays in said 17th window:

a section for selectively specifying allowance or inhibition of writing new notification information with respect to a history accumulated in said storing means;

a section for specifying either overwriting of new notification or abortion of writing of new notification when a storage area in said storing means is full;

a section for specifying a maximum number of histories accumulated in said storing means; and a section for setting a threshold value of a ratio of a storage area in which said histories in said storing means are accumulated, and wherein said information processing means accumulates said histories in said storing means in accordance with contents set in said 17th window; and generates an alarm to an operator of its own apparatus when a ratio of said storage area in which said histories in said storing means are accumulated may exceed said threshold value.

20. The network management equipment according to claim 16, further comprising operating means for accepting click operations by a user,
wherein said display controlling means displays a 10th button on said screen of said display unit;
displays an 18th window on said screen of said display unit when said 10th button is clicked by said operating means; and
displays in said 18th window:
a section for specifying a node as an operation target and setting a maximum value of a size of a storage resource area for a history accumulated in said node; and
a section for individually setting a size of a storage resource area of a notification information history to be accumulated, and
wherein said information processing means varies a size of a storage resource area for said history in an arbitrary node in accordance with contents set in said 18th window.

21. A network management equipment for managing a network system including a plurality of nodes based on notification information transmitted from a plurality of said nodes, said network management equipment comprising:
a display unit;
information acquiring means for acquiring notification information respectively transmitted from a plurality of said nodes;
storing means for accumulating a history of said notification information acquired by said information acquiring means;
information processing means for managing said network system based on said notification information acquired by said information acquiring means; and
display controlling means for displaying information processed by said information processing means on said display unit,
wherein said display controlling means displays an 11th button on a screen of said display unit;
displays a 19th window on said screen of said display unit when said 11th button is clicked by said operating means; and
displays in said 19th window a retrieval condition specification section for specifying retrieval conditions for retrieving desired notification information from a history accumulated in said storing means,
wherein said information processing means retrieves notification information satisfying said retrieval conditions specified in said 13th window from said history accumulated in said storing means, and
wherein said display controlling means displays a 20th window on said screen of said display unit; and
graphs out and displays a result of retrieval of notification information by said information processing means in said 20th window.

22. The network management equipment according to claim 21, wherein said display controlling means displays in said 20th window a plurality of graphs which differ in accordance with each object of retrieval specified under said retrieval conditions.

23. The network management equipment according to claim 21, wherein said display controlling means displays a marker which can move on a horizontal axis of each graph displayed in said 20th window; and
displays a data value on a vertical axis corresponding to a position of said marker on said horizontal axis by a numeric figure.

24. The network management equipment according to claim 21, wherein said display controlling means varies a vertical axis scale of a graph displayed in said 20th window in accordance with a maximum value of data to be displayed or in accordance with setting by a user.

25. The network management equipment according to claim 21, wherein said display controlling means displays 12th buttons in accordance with each graph displayed in said 20th window;
displays a 21st window on said screen of said display unit when any one of said 12th button is clicked by said operating means; and
opens said 21st window which displays in a table form a result of retrieval of said quality information shown in a graph concerning said clicked 12th button.

26. The network management equipment according to claim 21, wherein said display controlling means displays a 22nd window on said screen of said display unit when arbitrary notification information is clicked by said operating means in said 21st window; and
displays in said 22nd window a section for causing an operator of its own apparatus to input memo data which is written in connection with said clicked notification information, and
wherein said information processing means gives said memo data inputted in said 22nd window to said clicked notification information.

27. The network management equipment according to claim 21, wherein said display controlling means displays a 14th button on said screen of said display unit;
displays a 24th window on said screen of said display unit when said 14th button is clicked by said operating means; and
displays in said 24th window:
an operation target specification section for specifying a node as an operation target, and a channel and a section thereof;
a section for specifying whether quality information measured for said operation target specified in said operation target specification section is to be notified in accordance with each type thereof;
a section for setting an importance level of quality information measured for said operation target specified in said operation target specification section in accordance with each type thereof; and
a section for setting a threshold value used for notifying quality information measured for said operation target specified in said operation target specification section, and
wherein said information processing means notifies a node as said operation target of a content specified in said 24th window, and notifies said node of quality information in accordance with said content.

28. The network management equipment according to claim 21, further comprising printout means,
wherein said display controlling means displays a 13th button on said screen of said display unit;
displays a 23rd window on said screen of said display unit when said 13th button is clicked by said operating means; and displays in said 23rd window:
a period specification section for specifying any of daily basis, monthly basis, or annual basis as a retrieval period of quality information; and
a quality information attribute specification section for specifying attributes of quality information to be retrieved, and
wherein said information processing means retrieves desired quality information from a history of said accumulated quality information in accordance with a content specified in said 23rd window; and
prints out a result of retrieval to said printout means.

29. A network management equipment for managing a network system including a plurality of nodes based on notification information transmitted from a plurality of said nodes, said network management equipment comprising:
a display unit;
information acquiring means for acquiring notification information respectively transmitted from a plurality of said nodes;
information processing means for managing an occurrence state of an alarm in said network system based on said notification information acquired by said information acquiring means; and
display controlling means for displaying information processed by said information processing means on said display unit,
wherein said display controlling means displays a 16th button on a screen of said display unit;
displays a 26th window on said screen of said display unit when said 16th button is clicked by said operating means; and
displays in said 26th window:
a first section for specifying an operation target of severity of said alarm; and
a second section for selecting an occurrence factor of said alarm for said operation target specified in said first section;
reads a current set state of severity of said specified alarm occurrence factor with respect to a node including said operation target and displays a list of read results in accordance with each occurrence factor when said operation target and said alarm occurrence factor are specified in said 26th window, and
wherein said information processing means individually sets severity for an operator of its own apparatus in accordance with each alarm occurrence factor displayed in a list in said 26th window; and
sets severity of each set alarm occurrence factor with respect to said node of said operation target.

30. The network management equipment according to claim 29, wherein said display controlling means displays a 17th button on said screen of said display unit;
displays a 27th window on said screen of said display unit when said 17th button is clicked by said operating means; and
displays in said 27th window:
a node selection section for causing an operator of its own apparatus to select a node as an operation target; and
an operation mode specification section for causing an operator of its own apparatus to specify an operation mode of said node selected in said node selection section to either a maintenance state mode or a non-maintenance state mode, and
wherein said information processing means sets said operation mode specified in said operation mode specification section with respect to said node selected by said node selection section.

31. The network management equipment according to claim 29, wherein said display controlling means displays an 18th button on said screen of said display unit;
displays a 28th window on said screen of said display unit when said 18th button is clicked by said operating means; and
displays in said 28th window:
a section for causing an operator of its own apparatus to specify a node as an operation target and shelves thereof, and set transmission or non-transmission of a maintenance signal to said specified operation target, and
wherein said information processing means sets a content set in said 28th window with respect to a node including said operating target.

32. The network management equipment according to claim 29, wherein said display controlling means displays a 19th button on said screen of said display unit;
displays a 29th window on said screen of said display unit when said 19th button is clicked by said operating means;
displays in said 29th window a section for causing an operator of its own apparatus to specify a node as an operation target and shelves thereof, and set a threshold value of an alarm indicative of signal quality degradation with respect to said specified operation target; and
sets said threshold value determined in said section with respect to a node including said operation target.

33. A network management equipment provided in a network system including a plurality of ring networks,
each of a plurality of said ring networks including a plurality of nodes and a traffic bypass function,
a plurality of said nodes being connected with each other in a ring form through a communication line in which a plurality of paths are multiplexed,
said communication line including a working system line and a preliminary system line,
said traffic bypass function is a function for causing service traffic transmitted through said working system line to make a detour to said preliminary system line,
said network management equipment comprising:
a display unit;
information acquiring means for acquiring notification information respectively transmitted from a plurality of said nodes;
information processing means for managing a state of said traffic bypass function in said network system based on said notification information acquired by said information acquiring means; and
display controlling means for displaying information processed by said information processing means on said display unit,
wherein said display controlling means displays on a screen of said display unit a clickable button for displaying on said screen of said display unit a window for setting parameters concerning said traffic bypass function.

34. The network management equipment according to claim 33, wherein said display controlling means displays a 21st button on said screen of said display unit;

displays a 30th window on said screen of said display unit when said 21st button is clicked by said operating means;

and displays in said 30th window a section for causing an operator of its own apparatus to specify a transmission interval as an operation target and set values of said parameters concerning said traffic bypass function with respect to said specified operation target, and wherein said information processing means sets values determined in said section with respect to a node concerning said operation target.

35. The network management equipment according to claim 33, wherein said display controlling means displays a 22nd button on said screen of said display unit;

displays a 31st window on said screen of said display unit when said 22nd button is clicked by said operating means; and displays in said 31st window a section for causing an operator of its own apparatus to specify a switching interval as an operation target, and setting forcible switching with respect to said specified operation target, and wherein said information processing means sets a switching state set in said 31st window with respect to a node concerning said operation target.

36. The network management equipment according to claim 33, wherein said display controlling means displays a 23rd button on said screen of said display unit;

displays a 32nd window on said screen of said display unit when said 23rd button is clicked by said operating means;

displays in said 32nd window a set status of a path in said network system with selected ring network; and divides a display area in said 32nd window in association with an interval between nodes belonging to said selected ring network, and displays in said divided area an arrow associated with each path existing in said divided area.

37. The network management equipment according to claim 36, wherein said display controlling means displays both a path as a symbol indicative of existence of a path and a current path indicative of a current state of said path.

38. The network management equipment according to claim 36, wherein said display controlling means divides said divided area in said 32nd window into an area corresponding to a working system and an area corresponding to a preliminary system, displays a second arrow forming a pair with said arrow, and displays said second arrow in either said area corresponding to said working system or said area corresponding to said preliminary system in accordance with a state of a path corresponding to said pair of arrows.

39. The network management equipment according to claim 36, wherein when a failure is generated in said network system, said display controlling means displays a display mode of said divided area in said 32nd window corresponding to an interval of said failure in distinction from an area in which no failure is generated.

40. The network management equipment according to claim 36, wherein said display controlling means displays in said 32nd window a scroll button for scrolling a display content in said 32nd window.

41. The network management equipment according to claim 36, wherein said display controlling means displays each identifier used for discriminating a path corresponding to said arrow in association with said arrow displayed in said 32nd window.

42. The network management equipment according to claim 36, wherein said display controlling means displays information indicative of a position to which said path corresponding to said arrow displayed in said 32nd window is dropped in association with said arrow.

43. The network management equipment according to claim 42, wherein said information indicative of said position to which said path is dropped includes at least a low-speed side channel number of a node to which said path is dropped and information indicative of a type of concatenation of said path.

44. The network management equipment according to claim 36, wherein said display controlling means displays a diagnostics button on said screen of said display unit; and displays a 33rd window on said screen of said display unit when said diagnostics button is clicked by said operating means, wherein said information processing means diagnoses in accordance with each node whether a first data base which is managed in accordance with each ring network and indicative of set statuses of all the paths which exist in said ring network is matched with a second data base which is managed in accordance with each node and indicative of the corresponding relationship between a high-speed side time slot and a low-speed side channel of said node, wherein said display controlling means displays a 33rd window on said screen of said display unit; and displays a result of diagnosis of matching of said first and second data bases diagnosed by said information processing means in said 33rd window, and wherein said information processing means executes processing for matching said first and second data bases with respect to a node concerning said result of diagnosis when it is determined that said first and second data bases are not matched with each other.

45. The network management equipment according to claim 36, wherein said display controlling means specifies a node, and displays on said screen of said display unit a 24th button used for asking said specified node for a request for releasing a resource which is not used in said specified node.

46. The network management equipment according to claim 33, wherein said display controlling means displays on said screen of said display unit a 25th button for locking or unlocking the operation of said traffic bypass function by an operator of its own apparatus.

47. The network management equipment according to claim 33, wherein said display controlling means displays on said screen of said display unit a 26th function button for causing an operator of its own apparatus to specify a node and set how to take an operation clock in said specified node.

48. A communication path setting method in a network management equipment with a display unit which is provided in a network system including a plurality of ring networks, each of a plurality of said ring networks including a plurality of nodes connected to each other in a ring form through a communication line in which a plurality of communication paths are multiplexed, said method comprising:

a step of selecting any ring network, dividing a screen of said display unit into a plurality of areas in association with intervals between nodes belonging to said selected ring network, and displaying in said divided areas each arrow corresponding to each communication path existing in said interval;

a first step of specifying a low-speed side channel of a node as a start point of a communication path to be set on said screen;

a second step of specifying a low-speed side channel of a node as an end point of said communication path to be set on said screen;

a third step of displaying an arrow associated with said communication path to be set in a display area corresponding to a node interval specified in said first and second steps;

a fourth step of repeating said first to third steps when there is any other communication path to be set;

a fifth step of transmitting a request for setting a communication path corresponding to said arrow associated with said communication path to be set to a node concerning formation of said communication path; and a sixth step of causing a node which has accepted said request for setting said communication path to form a new communication path based on said request.

49. The communication path setting method according to claim 48, wherein said first and second steps also perform specification of a type of concatenation of said communication path to be set as well as specification of a low-speed side channel of a node.

50. The communication path setting method according to claim 49, wherein when said communication path to be set is a dual homing path, said method further comprises a seventh step of specifying a low-speed side channel of a node as an intermediate drop point of said communication path to be set, and wherein said first, second and seventh steps also perform setting of a node type in addition to specification of a low-speed side channel of a node.

51. The communication path setting method according to claim 48, wherein said communication line includes a working system line and a preliminary system line, and wherein when each of a plurality of said ring networks includes a traffic bypass function for causing service traffic transmitted through said working system line to make a detour to said preliminary system line, said sixth step includes:

an eighth step of causing a node which has accepted a request for setting a communication path to lock said traffic bypass function of its own apparatus;

a ninth step of forming a new communication path based on said request for setting a communication path upon completion of said eight step; and a tenth step of unlocking said traffic bypass function upon completion of said ninth step.

52. A network management equipment for managing a network system including a plurality of nodes having a plurality of boards based on notification information transmitted from a plurality of said node, said network management equipment comprising:

a display unit;

operating means for accepting click operations by a user;

information acquiring means for acquiring notification information respectively transmitted from a plurality of said nodes;

information processing means for managing said network system based on said notification information acquired by said information acquiring means; and display controlling means for displaying information processed by said information processing means on said display unit, wherein said display controlling means displays a 27th button on a screen of said display unit;

displays a 34th window on said screen of said display unit when said 27th button is clicked by said operating means; and displays in said 34th window a section for causing an operator of its own apparatus to select one of said nodes existing in said network system and specify a low-speed board of said selected node, and wherein said information processing means deletes said low-speed side board selected in said 34th window from supervisory control targets of its own apparatus.

53. The network management equipment according to claim 52, wherein said display controlling means displays a 28th button on said screen of said display unit;

displays a 35th window on said screen of said display unit when said 28th button is clicked by said operating means;

displays in said 35th window a section for causing an operator of its own apparatus to specify an arbitrary node and specify a type of notification information transmitted from said specified node, and wherein said information processing means reads set states of destinations of said notification information specified in said 35th window from said specified node and displays a list of said set states in said 35th window;

causes a user to set allowance or inhibition of notification of said specified notification information with respect to said destinations displayed in said list; and sets a content set in said 35th window with respect to said specified node.

54. A network management equipment provided in a network system including a plurality of nodes, said network management equipment comprising:

a display unit;

information acquiring means for acquiring notification information respectively transmitted from a plurality of said nodes;

information processing means for managing said network system based on said notification information acquired by said information acquiring means; and display controlling means for displaying information processed by said information processing means on said display unit, wherein said display controlling means displays a 29th button on a screen of said display unit;

displays a 36th window on said screen of said display unit when said 29th button is clicked by said operating means; and displays a list of operators who are allowed to login to its own apparatus in said 36th window while associating a name of each operator with an expiration date of a password and an access level of said operator.

55. The network management equipment according to claim 54, wherein said display controlling means displays a 30th button on said screen of said display unit;

displays a 37th window on said screen of said display unit when said 30th button is clicked by said operating means; and displays in said 37th window:

a section for causing an operator of its own apparatus to input a name of said operator; and a section for causing said operator to input a password of said operator and an access level of said operator, and wherein said information processing means newly registers said operator inputted in said 37th window as a user who can login to its own apparatus.

56. The network management equipment according to claim 54, wherein said display controlling means displays a 31st button on said screen of said display unit;
   displays a 38th window on said screen of said display unit when said 31st button is clicked by said operating means; and
   displays in said 38th window a section for causing an operator of its own apparatus to select an arbitrary node in said network system,
   wherein said information processing means reads names of network management equipments registered to said node selected in said 38th window from said selected node, and
   wherein said display controlling means displays in said 38th window a list of said names of network management equipments read by said information processing means.

57. The network management equipment according to claim 56, wherein said display controlling means displays a 32nd button on said screen of said display unit;
   displays a 39th window on said screen of said display unit when said 32nd button is clicked by said operating means; and
   display in said 39th window:
   a section for causing an operator of its own apparatus to select an arbitrary control apparatus in said network system; and
   a section for causing an operator of its own apparatus to set an access level with respect to said network management equipment selected in said section, and
   wherein said information processing means determines said node selected in said 38th window as a control target of said network management equipment selected in said 39th window, and registers it together with said selected access level.

58. A network management equipment provided in a network system including a plurality of node, said network management equipment comprising:
   a display unit;
   information acquiring means for acquiring notification information respectively transmitted from a plurality of said nodes;
   information processing means for managing said network system based on said notification information acquired by said information acquiring means; and
   display controlling means for displaying information processed by said information processing means on said display unit,
   wherein said display controlling means displays a 33rd button on a screen of said display unit;
   displays a 40th window on said screen of said display unit when said 33rd button is clicked by said operating means; and
   displays in said 40th window:
   a section for causing an operator of its own apparatus to select an arbitrary node in a network system;
   a list of a current set state of an operation reference time of each node selected in said section; and
   a section for causing a user to select an arbitrary apparatus from said list and causing a user to individually set an operation reference time with respect to said selected apparatus, and
   wherein said information processing means sets said operation reference time set in said 40th window with respect to said selected node.

59. The network management equipment according to claim 58, wherein said display controlling means displays a 34th button on said screen of said display unit;
   displays a 41st window on said screen of said display unit when said 34th button is clicked by said operating means; and
   displays in said 41st window a section for causing an operator of its own apparatus to select an arbitrary node in said network system,
   wherein said information processing means reads version information of software installed in a node selected in said 41st window and a date of installation of said software from said selected node, and
   wherein said display controlling means displays in said 41st window said version information of said software read by said information processing means and said date of installation of said software.

60. The network management equipment according to claim 58, wherein said display controlling means displays a 35th button on said screen of said display unit;
   displays a 42nd window on said screen of said display unit when said 35th button is clicked by said operating means; and
   displays in said 42nd window:
   a section for causing an operator of its own apparatus to select an arbitrary ring network in said network system; and
   current names of nodes belonging to said ring network together with a type drawing of said ring network selected in said section, and
   wherein when a name is newly given to a node arbitrarily selected in said 42nd window, said information processing means sets said name to said corresponding node.

61. A network management equipment provided to a network system including a plurality of nodes, said network management equipment comprising:
   a display unit;
   information acquiring means for acquiring notification information respectively transmitted from a plurality of said nodes;
   information processing means for managing said network system based on said notification information acquired by said information acquiring means; and
   display controlling means for displaying information processed by said information processing means on said display unit,
   wherein said display controlling means displays a 36th button on a screen of said display unit;
   displays a 43rd window on said screen of said display unit when said 36th button is clicked by said operating means; and
   displays in said 43rd window:
   a color specification button in accordance with each state that an object displayed on said screen of said display unit can enter;
   a color pallet to cause an operator of its own apparatus to set a display color of a state corresponding to said color specification button when said color specification button is arbitrarily clicked;
   an object displayed on said screen of said display unit in a display color set in said color pallet.

* * * * *